(12) United States Patent
Sone

(10) Patent No.: US 8,866,331 B2
(45) Date of Patent: Oct. 21, 2014

(54) POWER SUPPLY DEVICE AND POWER SUPPLY SYSTEM FOR FUEL CELL VEHICLE

(75) Inventor: Toshihiro Sone, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 785 days.

(21) Appl. No.: 13/125,786

(22) PCT Filed: Oct. 23, 2009

(86) PCT No.: PCT/JP2009/068643
§ 371 (c)(1),
(2), (4) Date: Apr. 22, 2011

(87) PCT Pub. No.: WO2010/047422
PCT Pub. Date: Apr. 29, 2010

(65) Prior Publication Data
US 2011/0198921 A1    Aug. 18, 2011

(30) Foreign Application Priority Data

Oct. 24, 2008  (JP) ................. 2008-274302
Oct. 24, 2008  (JP) ................. 2008-274303
Oct. 24, 2008  (JP) ................. 2008-274304
Oct. 24, 2008  (JP) ................. 2008-274308

(51) Int. Cl.
*B60L 1/00*    (2006.01)
(Continued)

(52) U.S. Cl.
CPC ............ *B60L 11/1887* (2013.01); *Y02E 60/12* (2013.01); *H01M 16/003* (2013.01); *B60L 2210/10* (2013.01); *H01M 2250/20* (2013.01); *Y02T 10/7216* (2013.01); *H01M 8/04559* (2013.01); *Y02T 90/34* (2013.01); *H01M 8/04626* (2013.01); *Y02E 60/50* (2013.01); *H01M 8/04589* (2013.01); *H01M 8/04029* (2013.01); *Y02T 90/32* (2013.01); *H02M 3/158* (2013.01); *H01M 10/46* (2013.01)

USPC .............. 307/9.1; 307/10.1; 307/43; 307/44; 307/48

(58) Field of Classification Search
CPC .................. H02J 1/10; H02J 7/34; B60L 1/00
USPC ................. 307/9.1, 10.1, 43, 44, 48
See application file for complete search history.

(56) References Cited

U.S. PATENT DOCUMENTS

2004/0083039 A1    4/2004  Hunt et al.
2004/0100149 A1    5/2004  Lai
2005/0099155 A1    5/2005  Okuda et al.

FOREIGN PATENT DOCUMENTS

CN    1993879       7/2007
EP    1275553 A2    1/2003
(Continued)

OTHER PUBLICATIONS

International Search Report for Application No. PCT/JP2009/068643, dated Apr. 5, 2010.

(Continued)

*Primary Examiner* — Hal Kaplan
(74) *Attorney, Agent, or Firm* — Nelson Mullins Riley & Scarborough LLP; Anthony A. Laurentano

(57) ABSTRACT

A power supply device includes: a first line, a second line, and a third line, each having a different electric potential from one another; a battery circuit in which a fuel cell stack and an electric storage device are connected in series; and a first DC-DC converter, wherein both ends of the battery circuit are connected to the first line and the third line, a connection point of the electric storage device and the fuel cell stack of the battery circuit is connected to the second line, a primary side of the first DC-DC converter is connected to the second line and the third line, a secondary side of the first DC-DC converter is connected to the first line and the third line, and electric power is outputted from the first line and the third line.

20 Claims, 83 Drawing Sheets

(51) Int. Cl.
*H02J 1/00* (2006.01)
*H01M 16/00* (2006.01)
*H01M 8/04* (2006.01)
*H02M 3/158* (2006.01)
*B60L 11/18* (2006.01)
*H01M 10/46* (2006.01)

(56) References Cited

FOREIGN PATENT DOCUMENTS

| | | |
|---|---|---|
| EP | 1615325 A2 | 1/2006 |
| JP | 5-38136 | 2/1993 |
| JP | 05-146009 | 6/1993 |
| JP | 2002-218667 | 8/2002 |
| JP | 2002-231287 | 8/2002 |
| JP | 2004-357388 | 12/2004 |
| JP | 2006-59685 | 3/2006 |
| JP | 2006-60912 | 3/2006 |
| JP | 2007-159177 | 6/2007 |
| JP | 2007-318938 | 12/2007 |
| JP | 2007-336758 | 12/2007 |
| JP | 2008-77920 | 4/2008 |
| JP | 2008-211952 | 9/2008 |
| JP | 2010-102992 | 5/2010 |
| JP | 2010-104165 | 5/2010 |
| WO | 2007/125673 A1 | 11/2007 |
| WO | 2008/004564 A1 | 1/2008 |
| WO | 2008/099558 A1 | 8/2008 |

OTHER PUBLICATIONS

Japanese Office Action for Application No. 2008-274302, 8 pages, dated Nov. 20, 2012.
Japanese Office Action for Application No. 2008-274303, 7 pages, dated Nov. 20, 2012.
Japanese Office Action for Application No. 2008-274304, 7 pages, dated Nov. 20, 2012.
Japanese Office Action for Application No. 2008-274307, 8 pages, dated Nov. 20, 2012.
Japanese Notice of Allowance for Application No. 2008-274308, 6 pages, dated Jul. 30, 2013.
Japanese Office Action for Application No. 2008-274305, 3 pages, dated Sep. 25, 2012.
Chinese Office Action for Application No. 200980141745.7, 11 pages, dated Jan. 14, 2013.
Japanese Office Action for Application No. 2008-274306, 3 pages, dated Jul. 24, 2012.

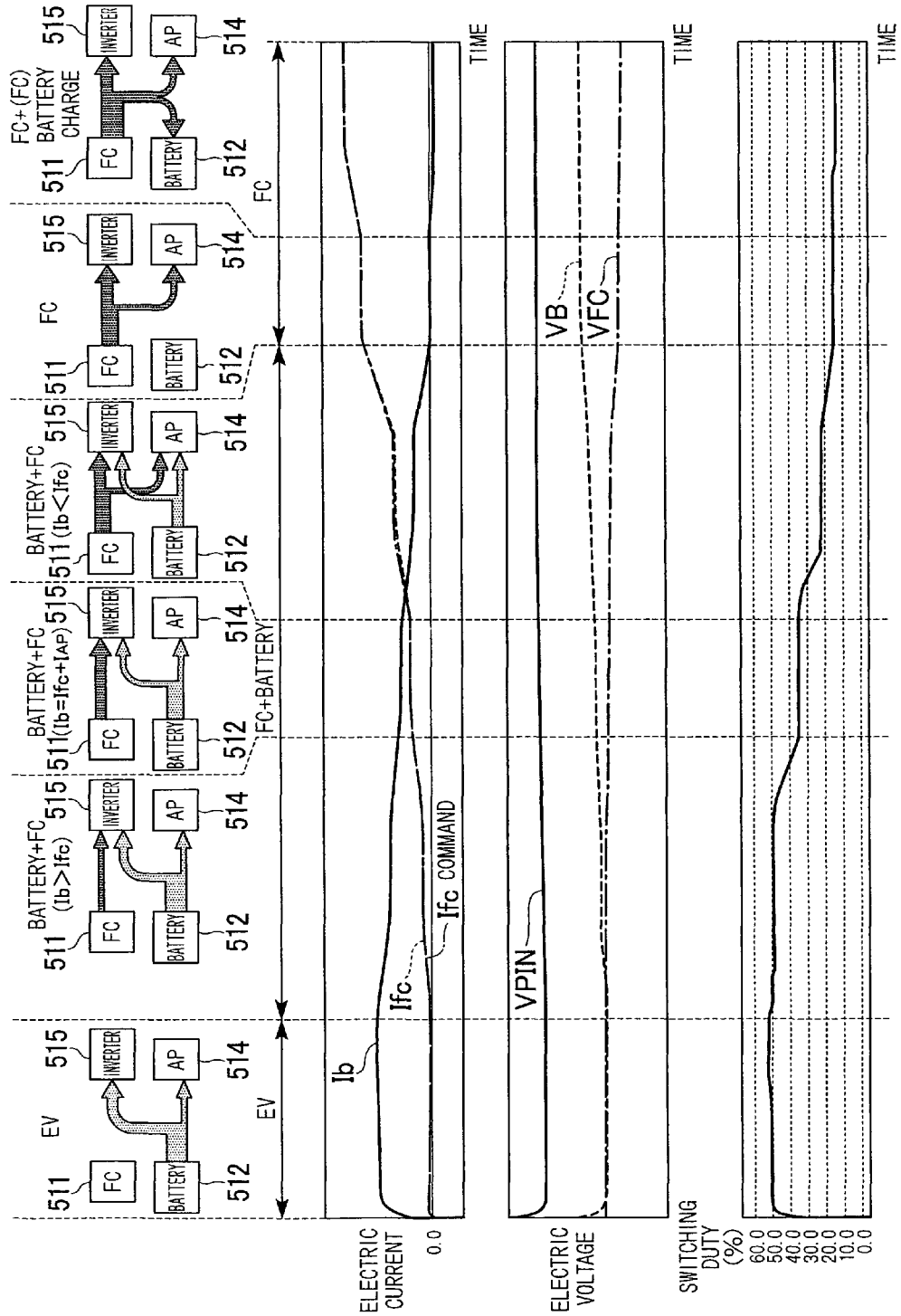

POWER SUPPLY DEVICE AND POWER SUPPLY SYSTEM FOR FUEL CELL VEHICLE

RELATED APPLICATIONS

This application is a 35 U.S.C. 371 national stage filing of International Application No. PCT/JP2009/068643, filed Oct. 23, 2009, which claims priority to Japanese Patent Application No. 2008-274302, Japanese Application No. 2008-274303, Japanese Application No. 2008-274304; and Japanese Application No. 2008-274308, all filed on Oct. 24, 2008 in Japan. The contents of the aforementioned applications are hereby incorporated by reference.

TECHNICAL FIELD

The present invention relates to a power supply device and a power supply system for a fuel cell vehicle.

Priority is claimed on Japanese Patent Application No. 2008-274302, filed Oct. 24, 2008; Japanese Patent Application No. 2008-274303, filed Oct. 24, 2008; Japanese Patent Application No. 2008-274304, filed Oct. 24, 2008; and Japanese Patent Application No. 2008-274308, filed Oct. 24, 2008; the contents of which are incorporated herein by reference.

BACKGROUND ART

Conventionally, a power supply system is known, which includes a first DC-DC converter connected to a fuel cell, and a second DC-DC converter connected to a electric storage device, wherein the power supply system supplies electric power from the first and second DC-DC converters to a load such as an electric motor for driving motor vehicles (refer to, for example, Patent Document 1).

In addition, a device is known, in which a plurality of chopper devices are connected in parallel (refer to, for example, Patent Document 2).

CITATION LIST

Patent Literature

[Patent Document 1] Japanese Unexamined Patent Application, First Publication No. 2007-318938
[Patent Document 2] Japanese Unexamined Patent Application, First Publication No. H5-38136

SUMMARY OF INVENTION

Technical Problem

According to the conventionally known power supply system, a DC-DC converter is provided for each of a plurality of power supply devices (in other words, a fuel cell and an electric storage device). As a result, the cost required to configure the power supply system becomes high. In addition, the size of the power supply system becomes large. Therefore, there is a demand to lower the cost and reduce the size of the power supply system.

In addition, according to the conventionally known device comprised of a plurality of chopper devices connected in parallel, a reactor of each of the chopper devices are connected in parallel. This configuration prevents the wire diameter of a coil from increasing too much when a single reactor is used. However, the inductance of the reactors in general decreases in inverse proportion to the number of parallel connections. Further, the current ripple increases, and the switching loss or noise increases. In response to these problems, if the inductance of each of the reactors is increased in order to increase the overall inductance of the reactors, the size and weight of the device increases, as well as the cost required to configure the device.

Moreover, when chopper devices are connected in parallel, as in the above device, to the DC-DC converter provided for each of the plurality of power supply devices (in other words, a fuel cell and an electric storage device), as in the conventionally known power supply system, the current ripple and the switching loss or noise increases even further. At the same time, the size and the weight of the power supply system increases, as well as the cost required to configure the power supply system.

Considering the problems described above, the object of the present invention is to provide a power supply device and a power supply system for a fuel cell vehicle, capable of lowering the cost required for configuration and reducing the size.

Solution to the Problem

A power supply device according to an aspect of the present invention includes: a first line, a second line, and a third line, each having a different electric potential from one another; a battery circuit in which a fuel cell stack and an electric storage device are connected in series; and a first DC-DC converter, wherein both ends of the battery circuit are connected to the first line and the third line, a connection point of the electric storage device and the fuel cell stack of the battery circuit is connected to the second line, a primary side of the first DC-DC converter is connected to the second line and the third line, a secondary side of the first DC-DC converter is connected to the first line and the third line, and electric power is outputted from the first line and the third line.

The power supply device according to the above aspect of the present invention may be configured as follows: the electric storage device is connected to the first line and the second line; and the fuel cell stack is connected to the second line and the third line.

The power supply device according to the above aspect of the present invention may be configured as follows: a drive circuit, driving at least one of a first pump supplying reactive gas to the fuel cell stack and a second pump supplying refrigerant to the fuel cell stack, is connected to the first line and the second line.

In addition, a power supply system of a fuel cell vehicle according to an aspect of the present invention includes the power supply device described above; and an electric motor that drives a vehicle, the electric motor being supplied with electric power from the power supply device.

The power supply system of a fuel cell vehicle according to the above aspect of the present invention may be configured as follows: the power supply system further includes a vehicle auxiliary machinery, wherein at least one part of the vehicle auxiliary machinery is connected to the first line and the second line.

The power supply system of a fuel cell vehicle according to the above aspect of the present invention may be configured as follows: the power supply system further includes a vehicle auxiliary machinery, wherein at least one part of the vehicle auxiliary machinery is connected to the second line and the third line.

The power supply system of a fuel cell vehicle according to the above aspect of the present invention may be configured as follows: the power supply system further includes a vehicle auxiliary machinery, wherein at least one part of the vehicle auxiliary machinery is connected to the first line and the third line.

The power supply system of a fuel cell vehicle according to the above aspect of the present invention may be configured as follows: the at least one part of the vehicle auxiliary machinery is connected to the power supply device through the second DC-DC converter.

The power supply system of a fuel cell vehicle according to the above aspect of the present invention may be configured as follows: the at least one part of the vehicle auxiliary machinery includes an air conditioner.

The power supply device according to the above aspect of the present invention may be configured as follows: the electric storage device is connected to the first line and the second line, the fuel cell stack is connected to the second line and the third line, a drive circuit, driving at least one of a first pump supplying reactive gas to the fuel cell stack and a second pump supplying refrigerant to the fuel cell stack, is connected to the second line and the third line.

The power supply device according to the above aspect of the present invention may be configured as follows: a drive circuit, driving at least one of a first pump supplying reactive gas to the fuel cell stack and a second pump supplying refrigerant to the fuel cell stack, is connected to the first line and the third line.

The power supply device according to the above aspect of the present invention may be configured as follows: the first DC-DC converter is a chopper type comprising a plurality of choke coils; and the plurality of choke coils are a common mode coil.

The power supply device according to the above aspect of the present invention may be configured as follows: the first DC-DC converter includes a three-phase bridge circuit in which a switching element is bridge-connected, and a three-phase choke coil as the plurality of choke coils; a core of the common mode coil is a rectangular core; any one-phase choke coil of the three-phase choke coil is dispersed and wrapped around one pair of opposite sides among two pairs of opposing sides included in the rectangular core; and a two-phase choke coil of the three-phase choke coil, excluding the one-phase choke coil, is respectively concentrated and wrapped around another pair of opposite sides among the two pairs of opposing sides included in the rectangular core.

The power supply device according to the above aspect of the present invention may be configured as follows: electric power is supplied to a load from the first line and the third line, the power supply device further including: a power consumption obtaining unit, obtaining a power consumption of the load; a target electric power distribution setting unit, setting a target electric power distribution of the fuel cell stack and the electric storage device, based on the power consumption; and a duty control unit, controlling a switching duty of the first DC-DC converter so that an actual electric power distribution of the fuel cell stack and the electric storage device equals the target electric power distribution.

The power supply device according to the above aspect of the present invention may be configured as follows: the power consumption obtaining unit obtains the power consumption, the power consumption including an external load power consumption of an external load of the power supply device and an internal load power consumption of an internal load of the power supply device.

The power supply device according to the above aspect of the present invention may be configured as follows: the power supply device further includes a target electric current setting unit, setting a target electric current of the fuel cell stack or the electric storage device according to the target electric power distribution, wherein the duty control unit performs a feedback control of the switching duty so that an actual electric current of the fuel cell stack or the electric storage device equals the target electric current.

The power supply device according to the above aspect of the present invention may be configured as follows: the power supply device further includes a target electric voltage setting unit, setting a target electric voltage of the fuel cell stack or the electric storage device according to the target electric power distribution, wherein the duty control unit performs a feedback control of the switching duty so that an actual electric voltage of the fuel cell stack or the electric storage device equals the target electric voltage.

The power supply device according to the above aspect of the present invention may be configured as follows: the target electric power distribution setting unit sets a target output ratio of the fuel cell stack and the electric storage device as the target electric power distribution; and the duty control unit performs a feedback control of the switching duty so that an actual output ratio of the fuel cell stack and the electric storage device equals the target output ratio.

The power supply device according to the above aspect of the present invention may be configured as follows: the power supply device further includes an electric motor that drives a vehicle, the electric motor being supplied with electric power from the battery circuit; a target setting unit, setting a target output electric current or a target output electric power of the fuel cell stack as zero or a positive value; a detection unit, detecting an output electric current or an output electric voltage of the fuel cell stack; and a duty control unit, performing a feedback control a switching duty of the first DC-DC converter, so that the output electric current detected by the detection unit equals the target output electric current, or the output electric voltage detected by the detection unit equals the target output electric voltage; wherein the duty control unit continues the feedback control during a regenerative operation of the electric motor that drives a vehicle; and electric power is supplied from the first line and the third line to a load.

The power supply device according to the above aspect of the present invention may be configured as follows: the target setting unit sets the target output electric current or the target output electric power to zero during the regenerative operation of the electric motor that drives a vehicle.

Advantageous Effects of Invention

According to the power supply device based on the present invention, a plurality of operation modes can be switched over by providing a single first DC-DC converter to a battery circuit in which a fuel cell stack and an electric storage device are connected in series. Compared to the case in which a DC-DC converter is equipped individually to each of the fuel cell stack and the electric storage device, the cost required for configuration can be lowered, and the size can be made smaller.

Since the power supply system for a fuel cell vehicle according to the present invention includes a single first DC-DC converter, it is possible to lower the cost required to configure the power supply device and reduce the size. In addition, since the fuel cell stack and the electric storage device are connected in series, it is possible to increase the operating voltage of a drive circuit of an electric motor for driving a vehicle, compared to the case in which the fuel cell stack and the electric storage device are connected in parallel.

At the same time, the electric current can be reduced. Further, the size of the drive circuit and the electric motor for driving a vehicle can be reduced. In addition, the operating efficiency can be enhanced. In these ways, the cost required for configuring the power supply system for the fuel cell vehicle can be lowered, and the size can be reduced.

Even during an emergency concerning the first DC-DC converter (for example, when an open failure occurs), it is possible to drive the fuel cell vehicle, by supplying electric power from the battery circuit to the drive circuit of the electric motor for driving the vehicle.

According to the power supply device according to the present invention, the magnetic flux is amplified because a plurality of choke coils are winded in common mode and electric current is applied in one direction. Thus, it is possible to prevent a decline in inductance compared to the case in which a plurality of choke coils are simply connected in parallel. It is also possible to reduce the current ripple, switching loss, and noise. At the same time, the DC-DC converter can be made smaller and lighter. Furthermore, a plurality of operation modes can be switched over, merely by providing a single first DC-DC converter to a battery circuit in which a fuel cell stack and an electric storage device are connected in series. Compared to the case in which a DC-DC converter is equipped individually to each of the fuel cell stack and the electric storage device, it is possible to lower the cost required for configuration and reduce the size.

According to the power supply device according to the present invention, a single DC-DC converter is provided to a battery circuit in which the fuel cell stack and the electric storage device are connected in series. A switching duty of a DC-DC converter is controlled so that the actual electric power distribution of the fuel cell stack and the electric storage device with respect to the power consumption of the load equals a target electric power distribution. Therefore, a plurality of operation modes, corresponding to the electric power of the fuel cell stack and the electric storage device, can be freely switched over. Compared to the case in which a DC-DC converter is equipped individually to each of the fuel cell stack and the electric storage device, it is possible to lower the cost required for configuration, reduce the size, and control the electric power supply in an appropriate manner.

According to a power supply system for a fuel cell vehicle according to the present invention, a single DC-DC converter is provided to a battery circuit in which a fuel cell stack and an electric storage device are connected in series. A feedback control is performed on the switching duty of the DC-DC converter so that the detected output current or the output power of the fuel cell stack equals a target output current or a target output power set to be zero or a positive value. As a result, it is possible to efficiently use the regenerative electric power generated during the regenerative operation of the electric motor for driving a vehicle. Compared to the case in which a DC-DC converter is provided individually to each of the fuel cell stack and the electric storage device, it is possible to lower the cost required for configuration, reduce the size, and control the electric power in an efficient manner.

BRIEF DESCRIPTION OF DRAWINGS

FIG. 89 shows an example of a change in an electric current and an electric voltage of a fuel cell stack and a battery, a change in an operation mode of a power supply device, corresponding to a change in a switching duty of a first DC-DC converter when a drive motor is driven according to the above embodiment.

FIG. 93A shows an electricity supply state during an operation mode (third (FC+battery) mode) of a power supply device when a drive motor is driven according to the above embodiment.

FIG. 93B shows an electricity supply state during an operation mode (third (FC+battery) mode) of a power supply device when a drive motor is driven according to the above embodiment.

FIG. 94A shows an electricity supply state during an operation mode (first FC mode) of a power supply device when a drive motor is driven according to the above embodiment.

FIG. 94B shows an electricity supply state during an operation mode (first FC mode) of a power supply device when a drive motor is driven according to the above embodiment.

FIG. 95A shows an electricity supply state during an operation mode (second FC mode) of a power supply device when a drive motor is driven according to the above embodiment.

FIG. 95B shows an electricity supply state during an operation mode (second FC mode) of a power supply device when a drive motor is driven according to the above embodiment.

FIG. 96A shows an electricity supply state during an operation mode (regeneration mode) of a power supply device when a drive motor is regenerated according to the above embodiment.

FIG. 96B shows an electricity supply state during an operation mode (regeneration mode) of a power supply device when a drive motor is regenerated according to the above embodiment.

FIG. 97A shows an electricity supply state during an operation mode ((regeneration+battery charging by FC) mode) of a power supply device when a drive motor is regenerated according to the above embodiment.

FIG. 97B shows an electricity supply state during an operation mode ((regeneration+battery charging by FC) mode) of a power supply device when a drive motor is regenerated according to the above embodiment.

FIG. 98 is a flowchart showing an operation of a power supply system for a fuel cell device according to the above embodiment.

FIG. 99 is a configuration diagram of a power supply system of a fuel cell vehicle according to a second variation of the above embodiment.

Figure 100:
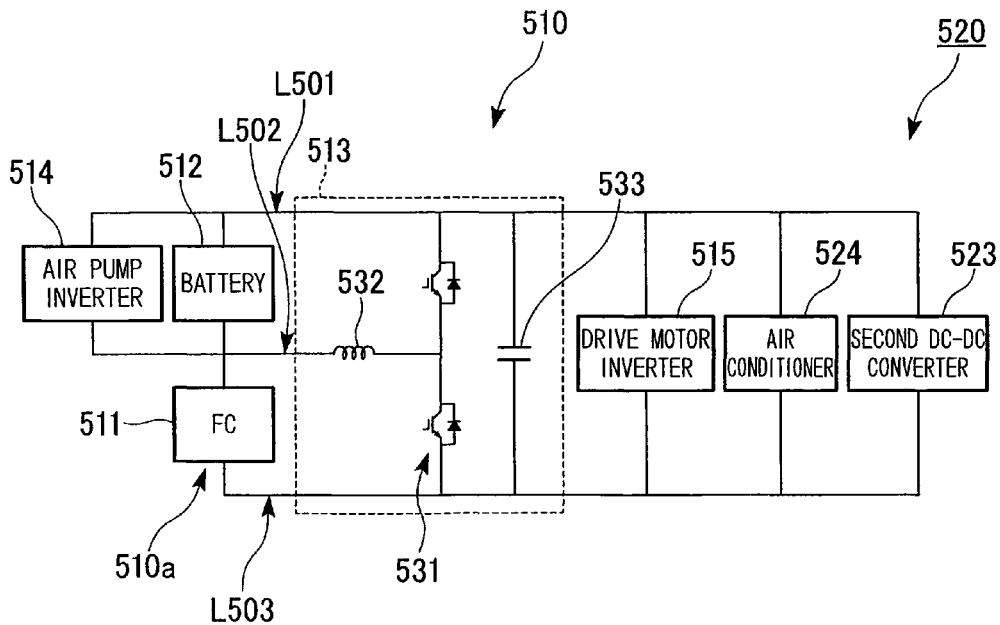

FIG. 100 is a configuration diagram of a power supply system of a fuel cell vehicle according to a third variation of the above embodiment.

Figure 101:
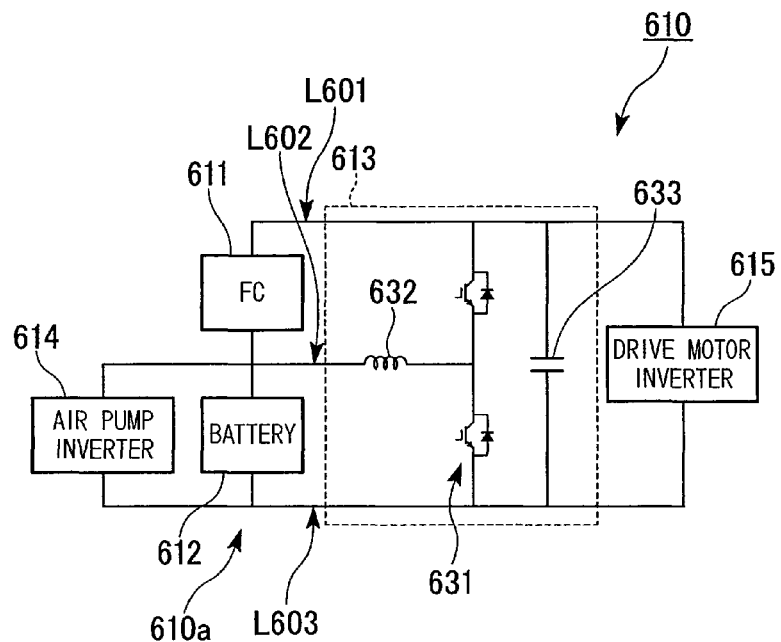

FIG. 101 is a configuration diagram of a power supply device according to a first embodiment of the present invention.

Figure 102:
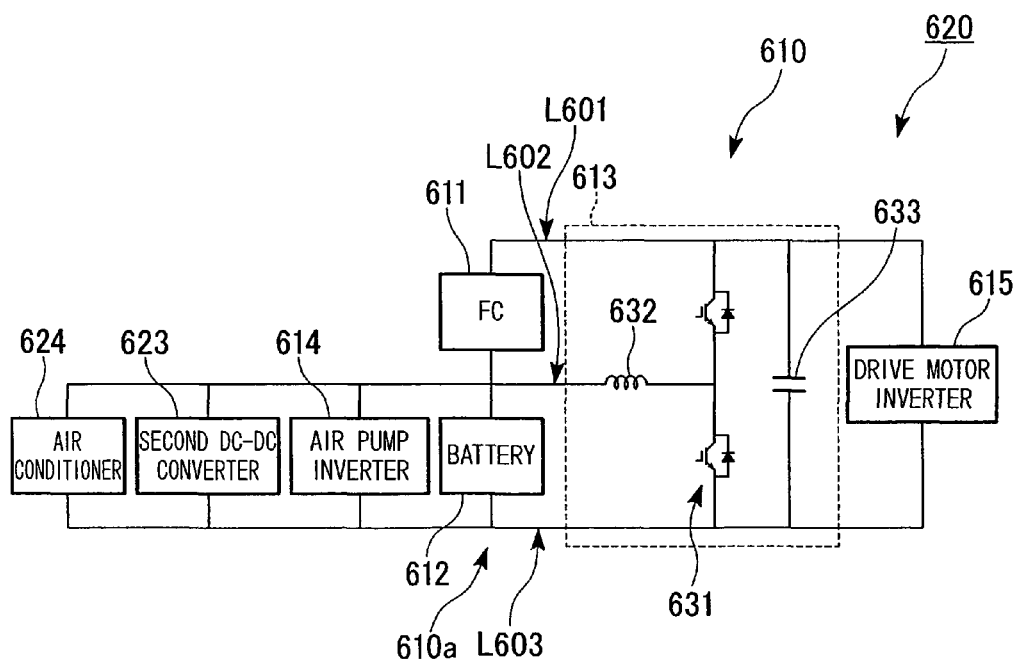

FIG. 102 is a configuration diagram of a power supply system for a fuel cell vehicle according to the above embodiment.

Figure 103:
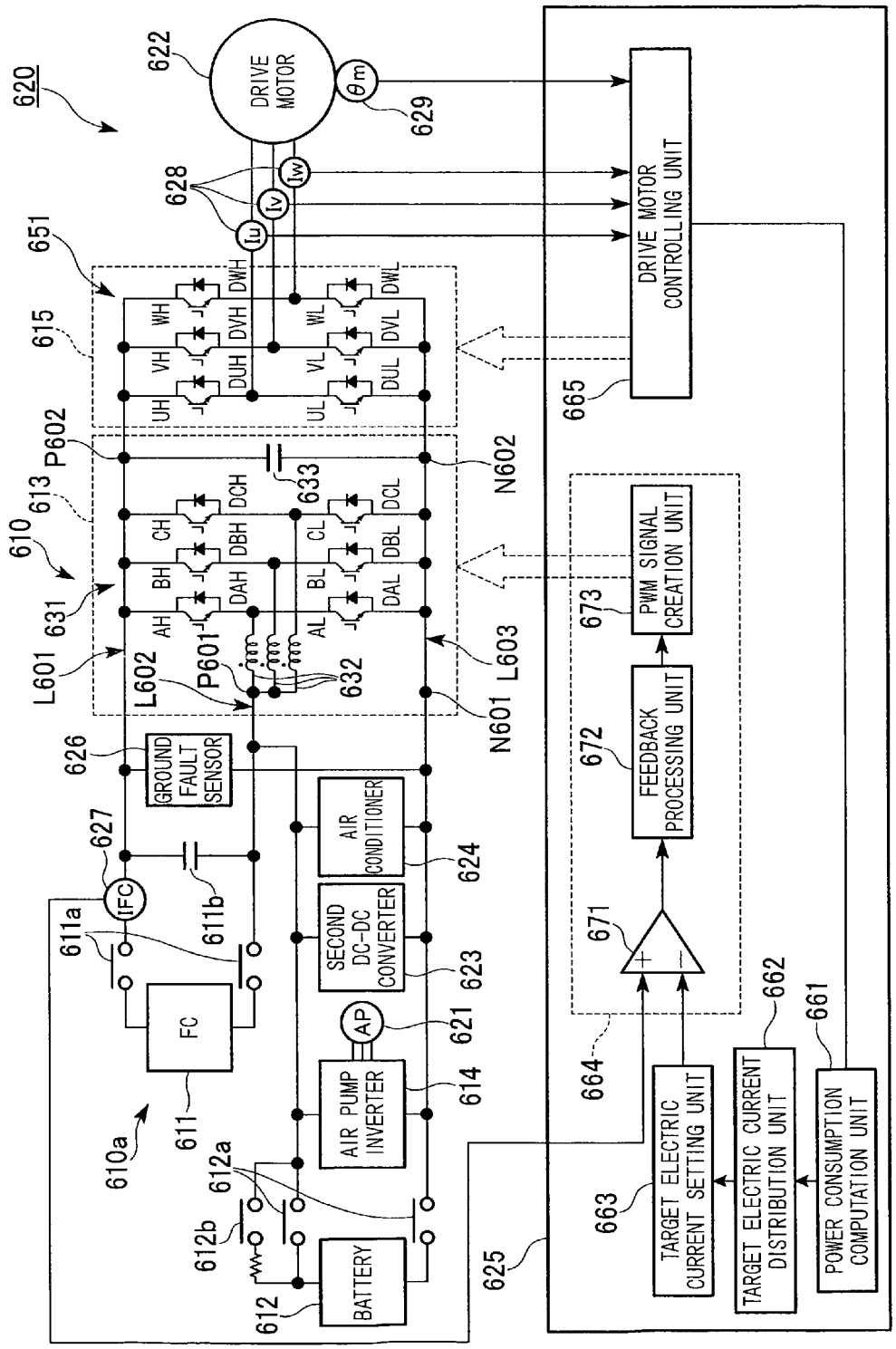

FIG. 103 is a configuration diagram of a power supply system for a fuel cell vehicle according to the above embodiment.

Figure 104:
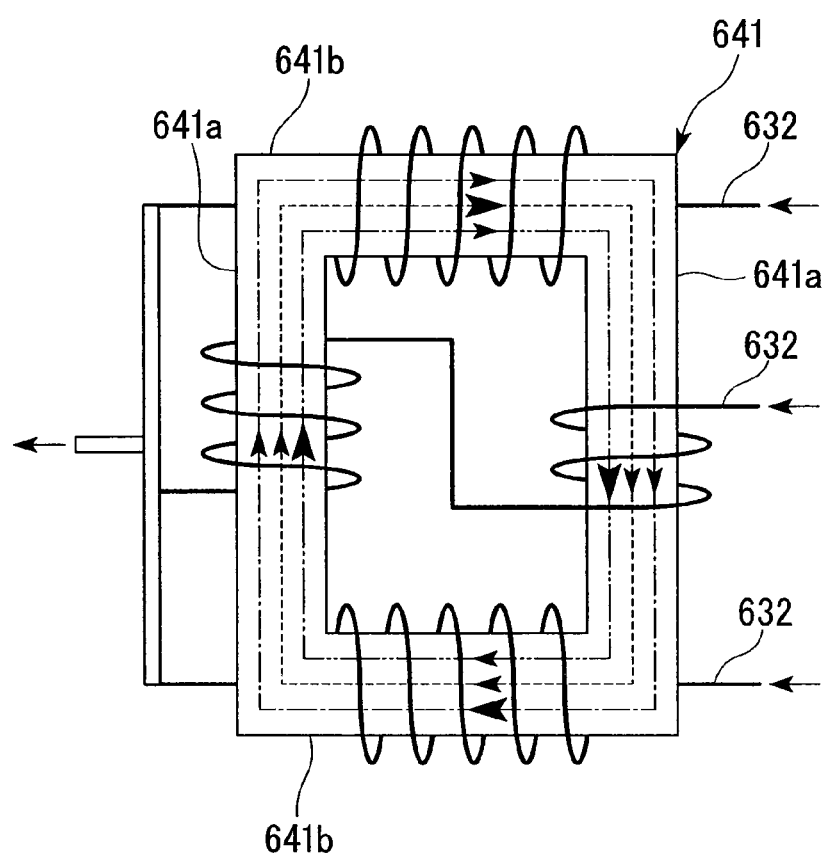

FIG. 104 is a configuration diagram of a choke coil with three phases according to the above embodiment.

Figure 105:
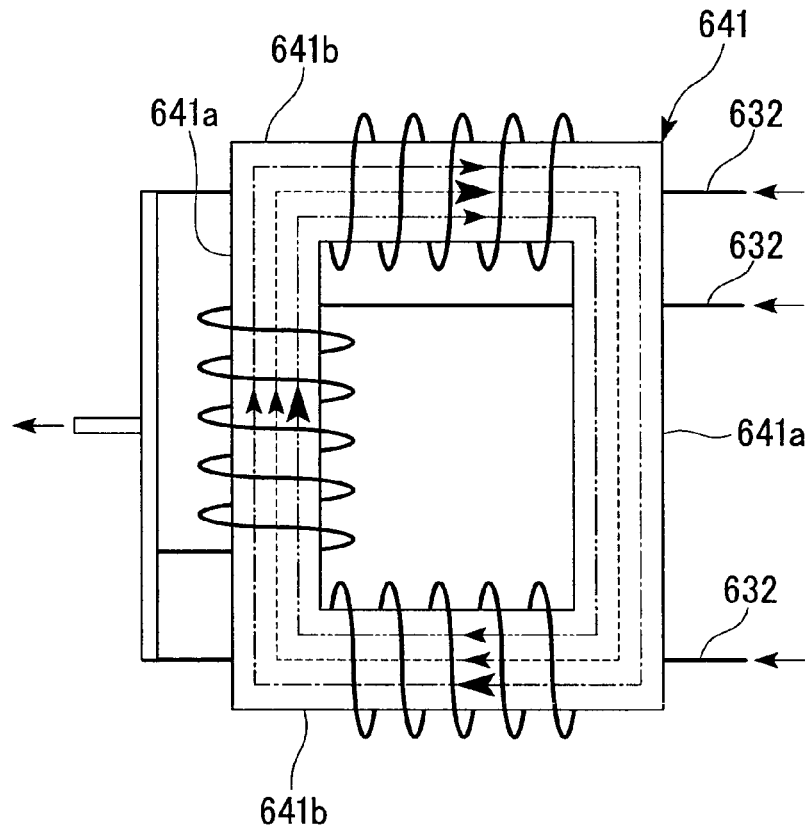

FIG. 105 is a configuration diagram of a choke coil with three phases according to a first variation of the above embodiment.

Figure 106:
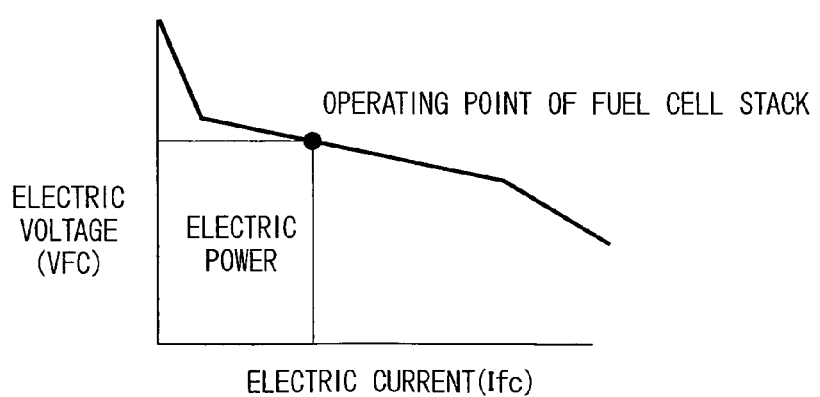

FIG. 106 shows an example of an operating point of a fuel cell stack according to the above embodiment.

Figure 107:
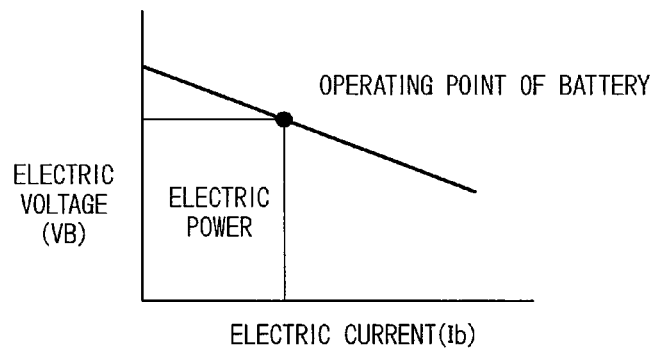

FIG. 107 shows an example of an operating point of a battery according to the above embodiment.

Figure 108:
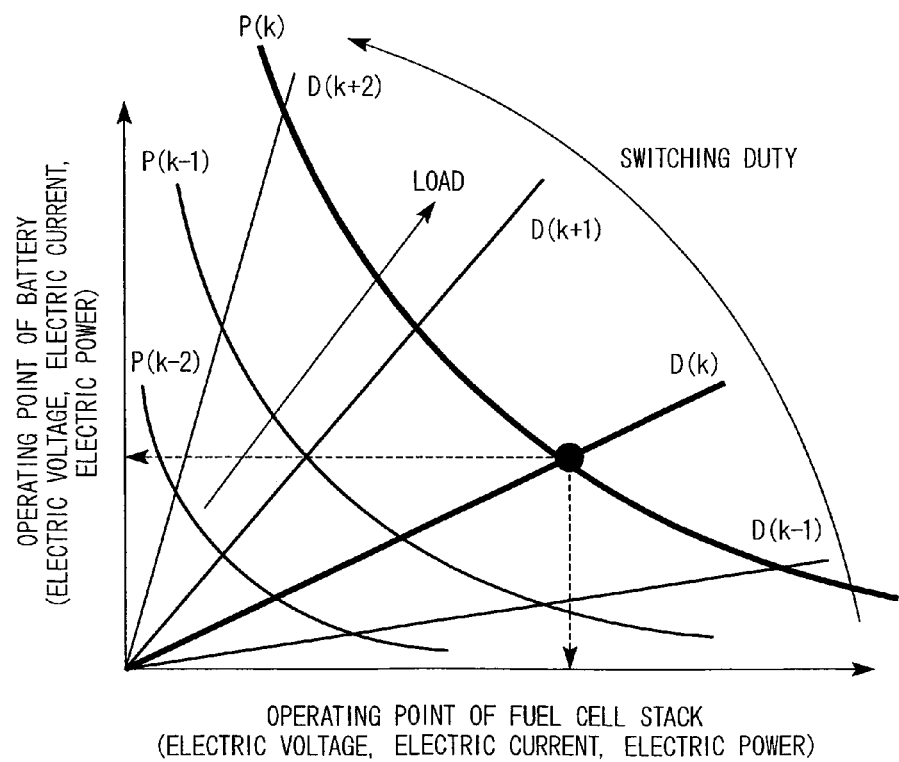

FIG. 108 shows an example of a predetermined map representing a correspondence relationship between an operating point of a fuel cell stack, an operating point of a battery, a switching duty of a first DC-DC converter, and a total power consumption of a load according to the above embodiment.

Figure 109:
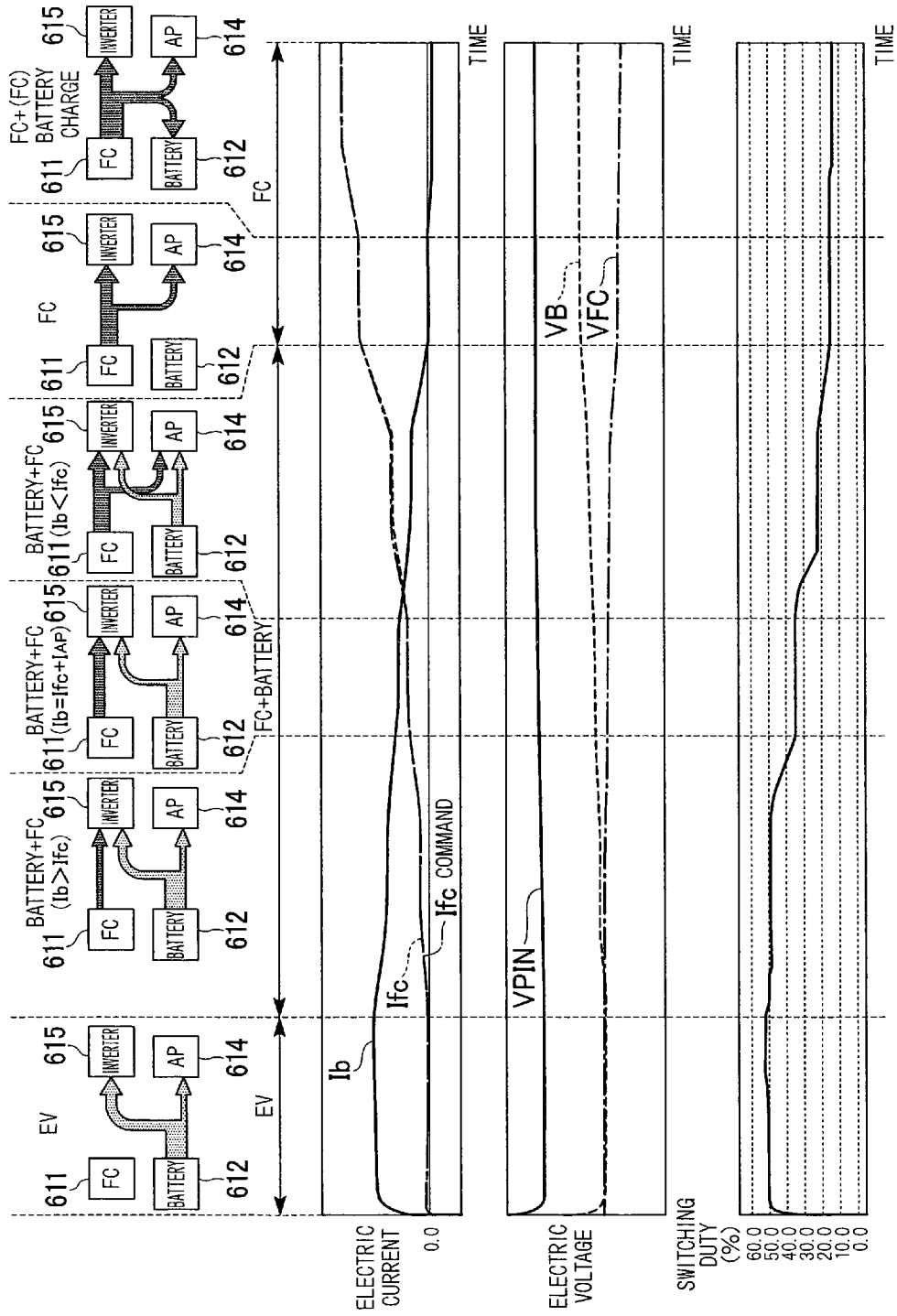

FIG. 109 shows an example of a change in an electric current and an electric voltage of a fuel cell stack and a battery, a change in an operation mode of a power supply device, corresponding to a change in a switching duty of a first DC-DC converter when a drive motor is driven according to the above embodiment.

Figure 110:
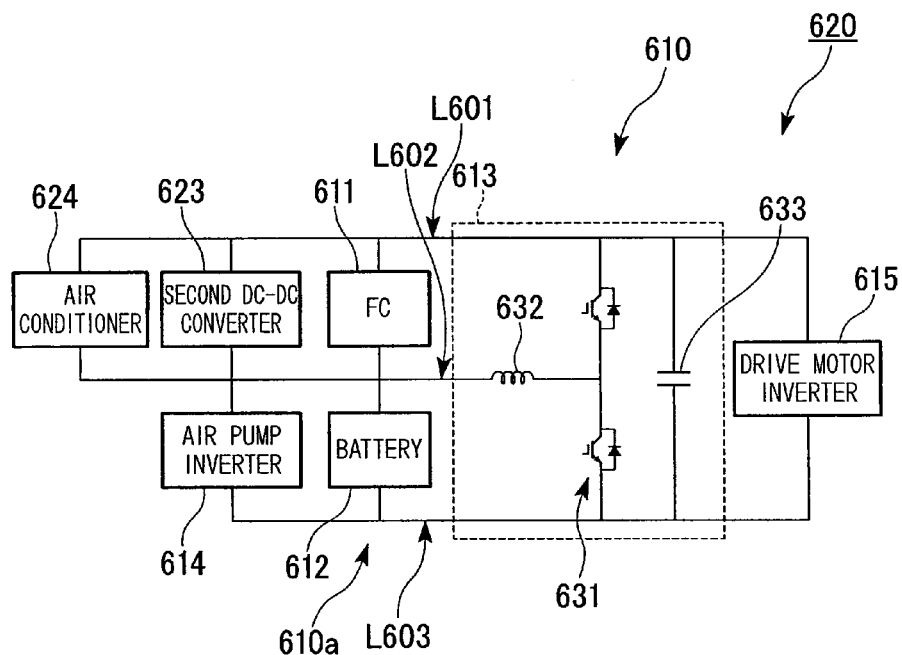

FIG. 110 is a configuration diagram of a power supply system of a fuel cell vehicle according to a second variation of the above embodiment.

Figure 111:
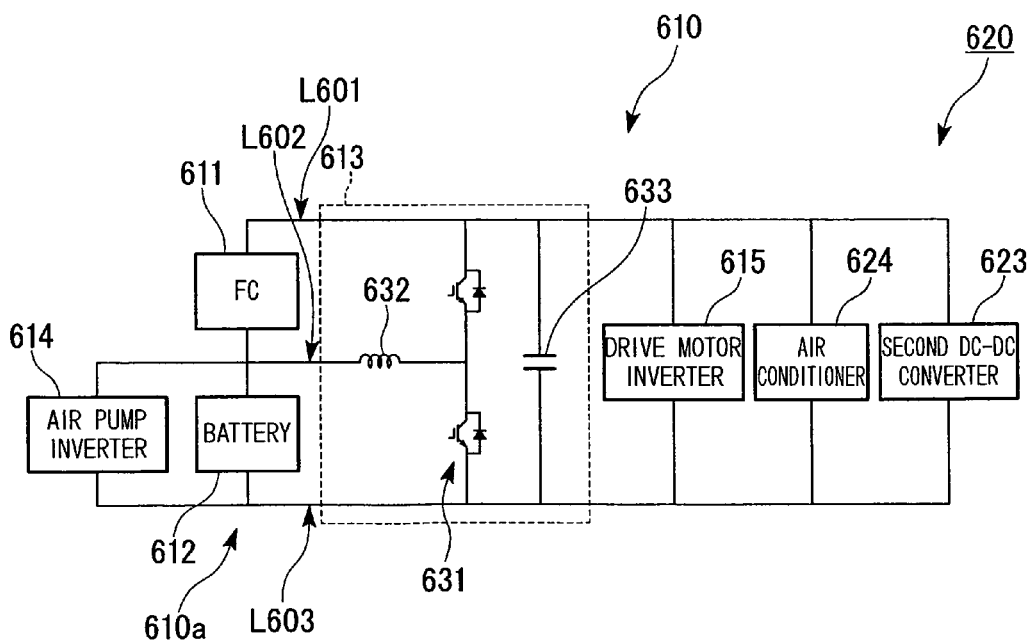

FIG. 111 is a configuration diagram of a power supply system of a fuel cell vehicle according to a third variation of the above embodiment.

DESCRIPTION OF EMBODIMENTS

Below, a description of a power supply device and a power supply system for a fuel cell vehicle according to a first embodiment of the present invention is provided with reference to FIGS. 1 to 19.

Figure 1:
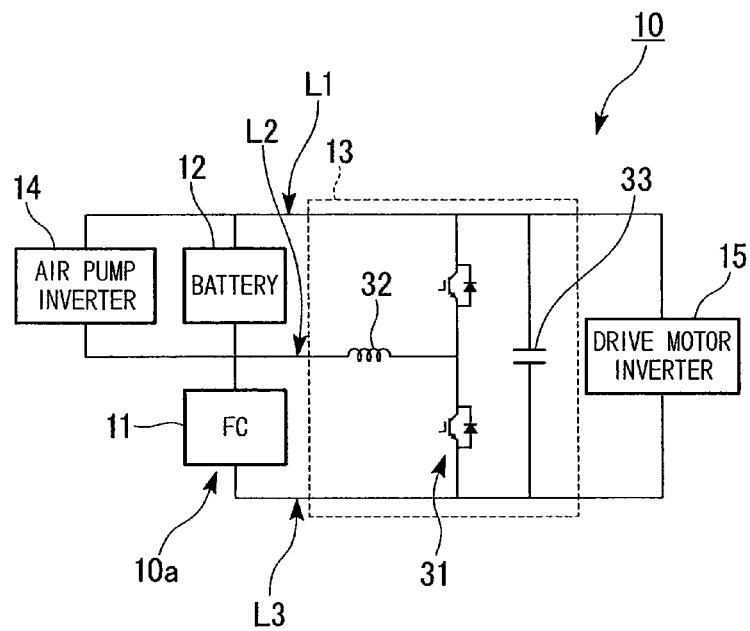
FIG. 1 is a configuration diagram of a power supply device according to a first embodiment of the present invention.

A power supply device 10 according to the present embodiment includes a fuel cell stack (FC) 11, a battery 12, a first DC-DC converter 13, and an air pump inverter 14, as shown in FIG. 1 for example. The power supply device 10 is connected to a drive motor inverter 15, for example.

Figure 2:
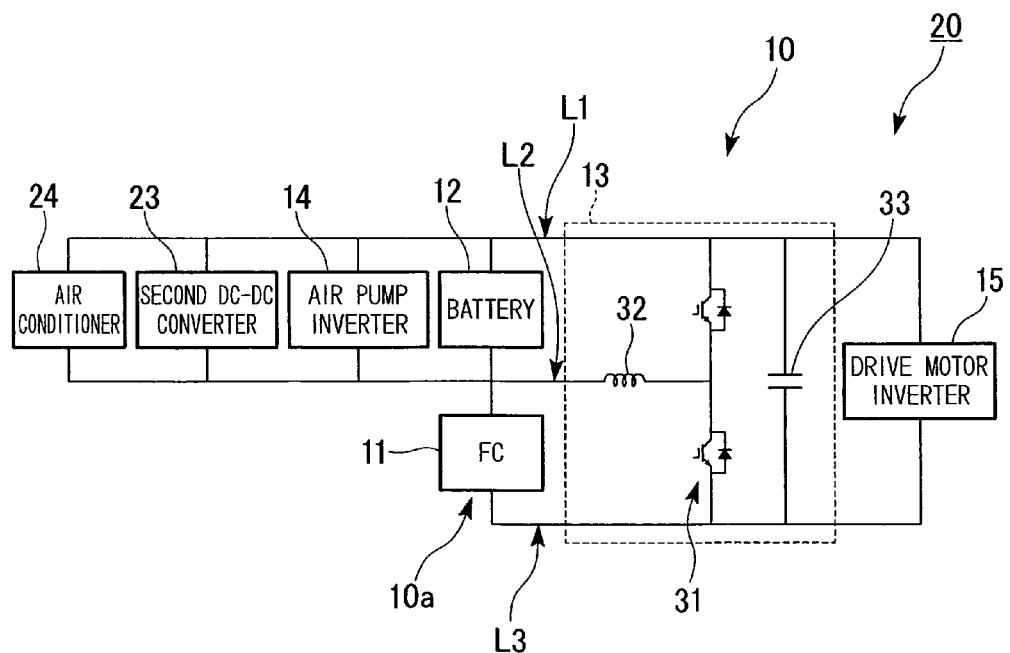
FIG. 2 is a configuration diagram of a power supply system for a fuel cell vehicle according to the above embodiment.
Figure 3:
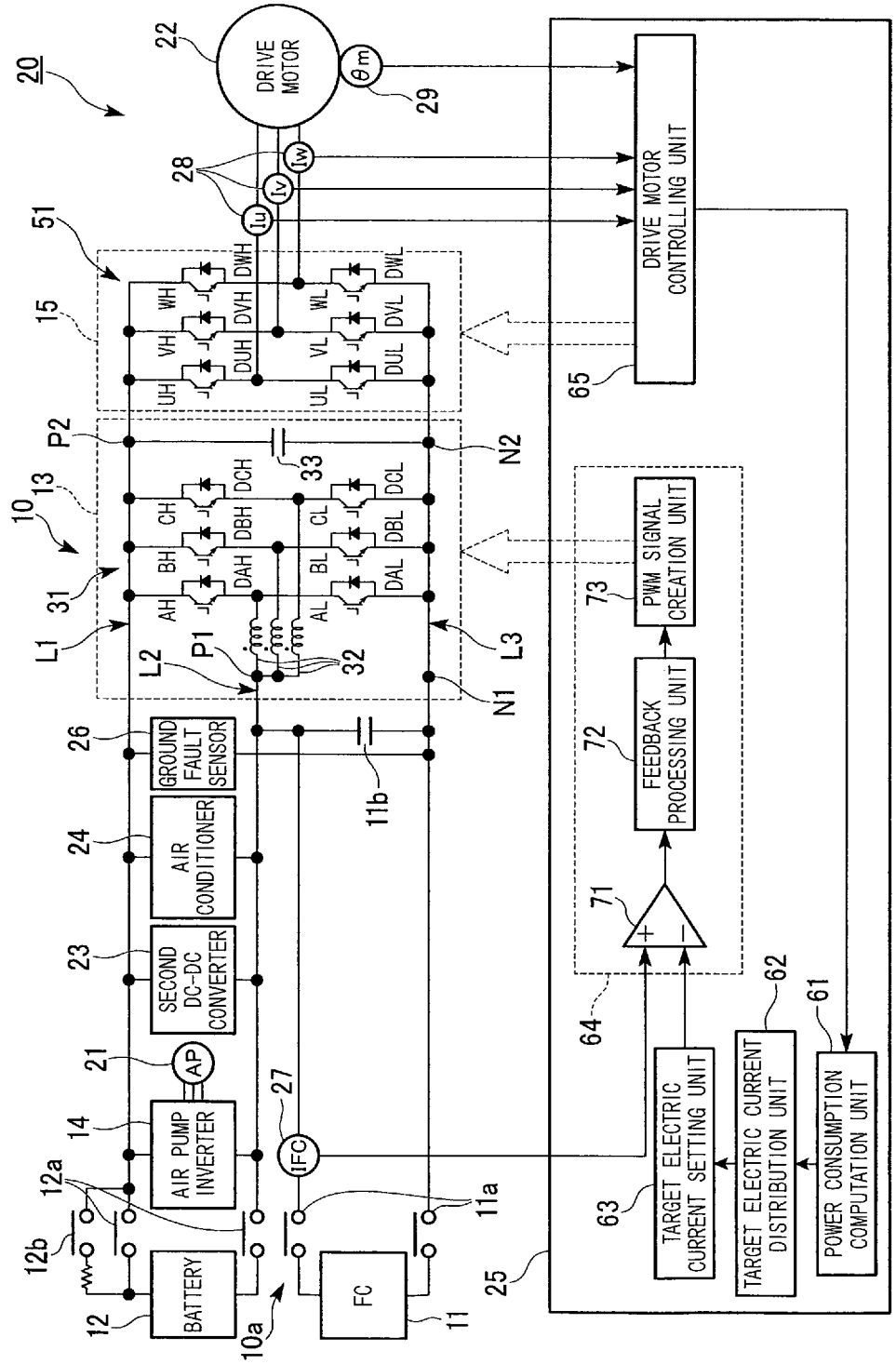
FIG. 3 is a configuration diagram of a power supply system for a fuel cell vehicle according to the above embodiment.

The power supply device 10 is provided in a power supply system 20 for a fuel cell vehicle, for example. This power supply system 20 for the fuel cell vehicle includes the power supply device 10, an air pump (AP) 21, a drive motor 22, a second DC-DC converter 23, an air conditioner 24, a control device 25, a ground fault sensor 26, an output current sensor 27, a phase current sensor 28, and an angle sensor 29, as shown in FIGS. 2 and 3 for example.

The fuel cell stack 11 is formed by layering multiple fuel cells including a solid polymer electrolyte membrane comprising a cation exchange membrane and the like, the solid polymer electrolyte membrane being held by a fuel electrode (anode) including an anode catalyst and a gas diffusion layer, and an oxygen electrode (cathode) including a cathode catalyst and a gas diffusion layer, the solid polymer electrolyte membrane and the anode and the cathode thus forming an electrolytic electrode structure, the electrolytic electrode structure further being held by a pair of separators. The laminated body of the fuel cell is sandwiched by a pair of end plates from both sides of the direction in which the layers are formed.

Air is supplied to the cathode of the fuel cell stack 11 from the air pump 21, the air being an oxidant gas (reactant gas) including oxygen. A fuel gas (reactant gas) including hydrogen is supplied to the anode from a high-pressure hydrogen tank (not diagramed), for example.

The hydrogen is ionized by the catalytic reaction with the anode catalyst at the anode and moves to the cathode through a reasonably humidified solid polymer electrolyte membrane. An electron is generated while the hydrogen moves, and the electron is extracted by the external circuit, and is utilized as an electric energy of the direct current. At this time, the hydrogen ion, the electron, and oxygen react at the cathode, forming water.

Here, the air pump 21 brings in air from outside the vehicle and compresses the air, for example. The air pump 21 supplies this air to the cathode of the fuel cell stack 11 as reactive gas. The number of rotations of a motor (not diagramed) driving this air pump 21 is controlled by the air pump inverter 14 according to a control command outputted by the control device 25. The air pump inverter 14 includes a PWM inverter based on a pulse width modulation (PWM).

As an alternative to the battery 12, the power supply device 10 can include, for example, a capacitor as an electric storage device, the capacitor including an electric double layer capacitor or an electrolytic capacitor.

The first DC-DC converter 13 is, for example, a chopper type DC-DC converter. As shown in FIG. 3, this first DC-DC converter 13 includes a bridge circuit 31 with three phases, a choke coil 32 with three phases, and a smoothing capacitor 33. The above bridge circuit 31 comprises a plurality of switching elements (for example, an IGBT: Insulated Gate Bipolar Mode Transistor) which are bridge-connected. The first DC-DC converter 13 is shown in FIGS. 1 and 2 in simplified form. Thus, among the three phases, only one phase of the switching element and the choke coil 32 is shown in FIGS. 1 and 2.

The bridge circuit 31 is same as a three-phase bridge circuit 51 forming the drive motor inverter 15 described later. In the bridge circuit 31, a high-side and a low-side first transistor AH and AL, a high-side and a low-side second transistor BH and BL, and a high-side and a low-side third transistor CH and CL, which form a pair for each of the phases, are bridge-connected. Each of the transistors AH, BH, and CH form a high side arm by a collector being connected to a secondary side positive terminal P2. Each of the transistors AL, BL, and CL form a low side arm by an emitter being connected to a secondary side negative terminal N2. For each phase, the emitter of each of the transistors AH, BH, and CH of the high side arm is connected to the collector of each of the transistors AL, BL, and CL of the low side arm. Between the collector and the emitter of each of the transistors AH, AL, BH, BL, CH, and CL, each of the diodes DAH, DAL, DBH, DBL, DCH, and DCL are connected, so that the direction from the emitter to the collector is the forward direction.

This bridge circuit 31 is driven by a signal (PWM signal) which is pulse-width modulated (PWM), the signal being outputted from the control device 25 and inputted to a gate of each of the transistors. A condition in which each of the transistors AH, BH, and CH of the high side arm are turned on and each of the transistors AL, BL, and CL of the low side arm are turned off, and another condition in which each of the transistors AH, BH, and CH of the high side arm are turned off and each of the transistors AL, BL, and CL of the low side arm are turned on, are switched over in alternation.

The smoothing capacitor 33 is connected to the secondary side positive terminal P2 and the secondary side negative terminal N2.

Regarding the three-phase choke coil 32, an end of each of the choke coil 32 is connected between the collector and the emitter of each of the phases of the bridge circuit 31. In other words, the end of each of the choke coil 32 is connected, respectively, between the collector and the emitter of each of the transistors AH and AL, between the collector and emitter of each of the transistors BH and BL, and between the collector and emitter of each of the transistors CH and CL. The other side of each of the choke coil 32 is connected mutually to the primary side positive terminal P1.

Figure 4:
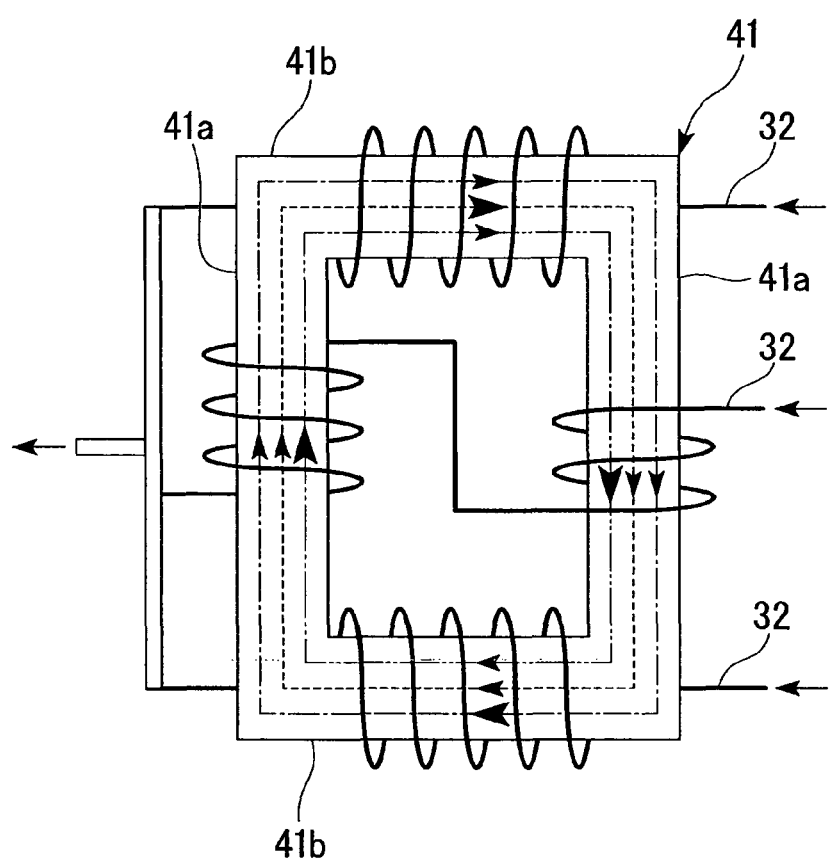
FIG. 4 is a configuration diagram of a choke coil with three phases according to the above embodiment.

The three-phase choke coil 32 is formed by wrapping around a single rectangular core 41 in common mode, as shown in FIG. 4 for example. This choke coil 32 is set so that the direction of the magnetic flux, generated by each of the choke coil 32 while electricity is supplied, is in the same direction.

One phase of the three-phase choke coil 32 is dispersed and wrapped around a pair of opposite sides 41a which is one of the two pairs of opposite sides forming the rectangular core 41. The other two phases of the three-phase choke coil 32 is concentrated and wrapped around the other pair of opposite sides 41b among the two pairs of opposite sides forming the rectangular core 41.

Figure 5:
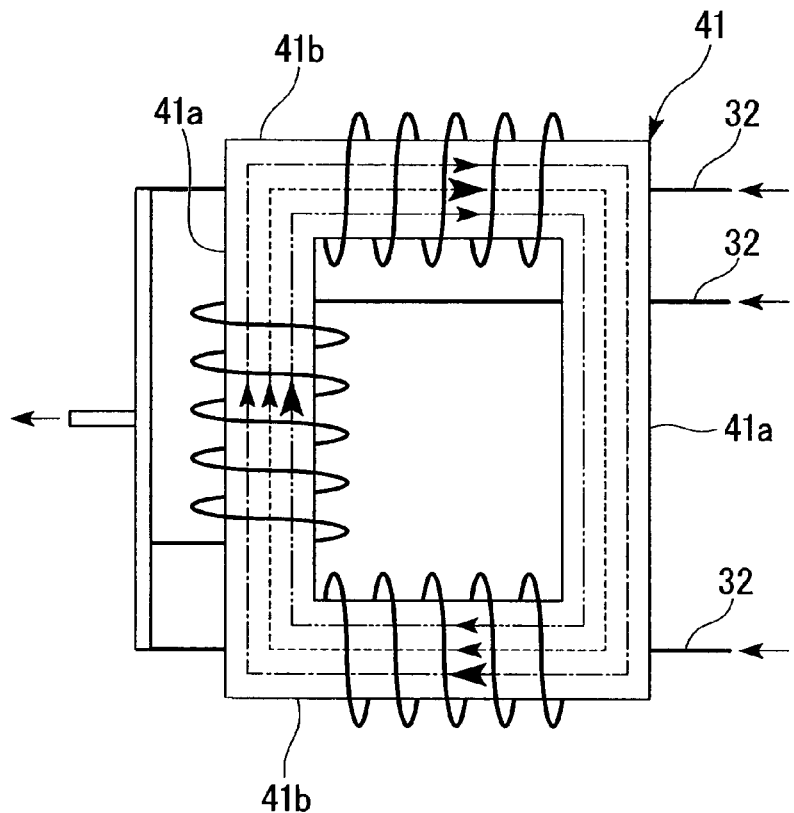
FIG. 5 is a configuration diagram of a choke coil with three phases according to a first variation of the above embodiment.

Each of the three-phase choke coil 32 can be concentrated and wrapped around three sides of the four sides forming the rectangular core 41, as shown in FIG. 5 for example. Further, each of the three-phase choke coil 32 can have a different winding structure.

With respect to three lines L1, L2, and L3, each having a different electric potential from one another (for example, electric potential of L1>electric potential of L2>electric potential of L3), a primary side of the first DC-DC converter 13 is connected to the second line L2 and the third line L3. The secondary side of the DC-DC converter 13 is connected to the first line L1 and the third line L3. In other words, the first line L1 is connected to the secondary side positive terminal P2, the second line L2 is connected to the primary side positive terminal P1, and the third line L3 is connected to the primary side negative terminal N1 and the secondary side negative terminal N2.

Concerning this first DC-DC converter 13, when a boost operation is performed from the primary side to the secondary side, at the time the drive motor 22 is driven for example, each of the transistors AH, BH, and CH of the high side arm are first turned off. At the same time, each of the transistors AL, BL, and CL of the low side arm are turned on. Due to the electric current flowing from the primary side, the choke coil 32 undergoes a direct current energization, and magnetic energy is accumulated.

Then, each of the transistors AH, BH, and CH of the high side arm are turned on. At the same time, each of the transistors AL, BL, and CL of the low side arm are turned of While preventing a change in the magnetic flux due to the interruption of the electric current flowing through the choke coil 32, an induced voltage is generated between both ends of the choke coil 32. The induced voltage, generated by magnetic energy accumulated in the choke coil 32, is added to the input voltage in the primary side. In this way, a boosting voltage, higher than the input voltage in the primary side, is applied to the secondary side. The fluctuation in voltage, generated during this switchover operation, is smoothed by the smoothing capacitor 33. In addition, a boosting voltage is outputted from the secondary side.

On the other hand, during a regenerating operation from the secondary side to the primary side when the drive motor 22 is regenerated for example, each of the transistors AH, BH, and CH of the high side arm are first turned off. At the same time, each of the transistors AL, BL, and CL of the low side arm are turned on. The choke coil 32 undergoes a direct-current energization by the electric current inputted from the secondary side, and magnetic energy is accumulated.

Then, each of the transistors AH, BH, and CH of the high side arm are turned on. At the same time, each of the transistors AL, BL, and CL of the low side arm are turned off. While preventing a change in the magnetic flux due to the blockage of the electric current flowing through the choke coil 32, an induced voltage is generated between both ends of the choke coil 32. The induced voltage, generated by the magnetic energy accumulated in the choke coil 32, becomes a depressed voltage generated by stepping down the input voltage of the secondary side according to the on/off ratio of each of the transistors AH, BH, and CH of the high side arm. In this way, a depressed voltage is applied to the primary side.

The first DC-DC converter 13 is driven by a signal (PWM signal) which is pulse-width modulated (PWM), the signal being outputted from the control device 25 and inputted to a gate of each of the transistors. The first DC-DC converter 13 switches over the on/off condition of each of the transistors AH, BH, and CH of the high side arm and each of the transistors AL, BL, and CL of the low side arm, according to a switching duty defined, for example, as a ratio of each of the transistors AH, BH, and CH of the high side arm that are turned on during one cycle of the PWM signal.

Incidentally, each of the transistors AH, BH, and CH of the high side arm and each of the transistors AL, BL, and CL of the low side arm are prohibited from being simultaneously turned on when the on/off condition is switched over. An appropriate dead time is provided during which each of the above transistors can be simultaneously turned off.

The fuel cell stack 11 is connected to the second line L2 and the third line L3 through a contactor 11a and a capacitor 11b placed in the positive electrode side and the negative electrode side. The battery 12 is connected to the first line L1 and the second line L2 through a contactor 12a placed in the positive electrode side and the negative electrode side, and through a current limiting circuit 12b placed in the positive electrode side. Therefore, the fuel cell stack 11 and the battery 12 are connected in series between the first line L1 and the third line L3. The fuel cell stack 11 and the battery 12 thus comprise the battery circuit 10a.

While electric power is outputted from the first line L1 and the third line L3 to a load (for example, the drive motor 22), the first line L1 and the third line L3 are connected to the drive motor inverter 15.

The air pump inverter 14 is connected to the first line L1 and the second line L2. This air pump inverter 14 is a drive circuit of the air pump 21.

The drive motor inverter 15, comprising a drive circuit of the three-phase drive motor 22, is a PWM inverter with a pulse-width modulation (PWM). This drive motor inverter 15 includes a three-phase bridge circuit 51 comprising a plurality of switching elements (for example, an IGBT: Insulated Gate Bipolar Mode Transistor) which are bridge-connected.

The bridge circuit 51 is same as a three-phase bridge circuit 31 forming the first DC-DC converter 13. In the bridge circuit 51, a high-side and a low-side U-phase transistor UH and UL, a high-side and a low-side V-phase transistor VH and VL, and a high-side and a low-side W-phase transistor WH and WL, which form a pair for each of the phases, are bridge-connected for example. Each of the transistors UH, VH, and WH form a high side arm by a collector being connected to a secondary side positive terminal P2 of the first DC-DC converter 13. Each of the transistors UL, VL, and WL form a low side arm by an emitter being connected to a secondary side negative terminal N2 of the first DC-DC converter 13. For each phase, the emitter of each of the transistors UH, VH, and WH of the high side arm is connected to the collector of each of the transistors UL, VL, and WL of the low side arm. Between the collector and the emitter of each of the transistors UH, UL, VH, VL, WH, and WL, each of the diodes DUH, DUL, DVH, DVL, DWH, and DWL are connected, so that the direction from the emitter to the collector is the forward direction.

This drive motor inverter 15 is driven by a signal (PWM signal) which is pulse-width modulated (PWM), the signal being outputted from the control device 25 and inputted to a gate of each of the transistors of the bridge circuit 51. For example, when the drive motor 22 is driven, the direct-current power outputted from the power supply device 10 is converted to a three phase alternating-current power, by switching over the on (conduction) and off (interruption) condition of each of the transistors forming a pair for each of the phases. By sequentially commutating the electric current to the three phase stator winding, a U phase electric current Iu, a V phase electric current Iv, and a W phase electric current Iw, all of which are an alternating-current, are supplied to the stator winding of each phase. Meanwhile, when the drive motor 22 is regenerated, for example, the three phase alternating-current power, outputted from the drive motor 22, is converted to a direct-current power, and is supplied to the first DC-DC converter 13. Then, the battery is charged, and power is fed to a load connected to the first DC-DC converter 13.

The drive motor 22 is, for example, a three phase alternating-current synchronous motor of a permanent magnet type utilizing a permanent magnet as a field. This drive motor 22 is driven and controlled by a three phase alternating-current power supplied by the drive motor inverter 15. At the same time, when the drive power is transmitted from the drive wheel side to the driver motor 22 side while the vehicle is decelerating, the drive motor 22 functions as an electric generator. In this way, the drive motor 22 creates a so-called regenerative breaking force. Further, the drive motor 22 recovers the kinetic energy of the vehicle as an electric energy.

The second DC-DC converter 23 is, for example, a chopper type DC-DC converter. At least a part of the vehicle auxiliary machinery equipped on the fuel cell vehicle (for example, a processing device, a magnetic valve, and a 12 volt type load) is connected to the second DC-DC converter 23 as a load.

The second DC-DC converter 23 is connected to the first line L1 and the second line L2. This second DC-DC converter 23 depresses the electric voltage applied between the first line L1 and the second line L2, by a chopping movement according to a control command outputted from the control device 25, and supplies the electric voltage to the load connected to the second DC-DC converter 23.

The air conditioner 24 is included in at least a part of the vehicle auxiliary machinery equipped on the fuel cell vehicle. This air conditioner 24 includes, for example, a heater loaded on the fuel cell vehicle, a motor for a compressor, and a drive circuit (for example, an inverter).

The air conditioner 24 is connected to the first line L1 and the second line L2. Electric power is supplied from the first line L1 and the second line L2 to the air conditioner 24.

The control device 25 performs a duty control, controlling the switching duty of the first DC-DC converter 13. At the same time, the control device 25 controls the electric power conversion operation of the drive motor inverter 15.

The control device 25 receives an input of a detection signal outputted by, for example, a ground fault sensor 26 which is connected to the first line L1 and the third line L3 and detects the occurrence of a ground fault, an output current sensor 27 which detects an output current IFC of the fuel cell stack 11, a phase current sensor 28 which detects each of the three phase current between the drive motor inverter 15 and the drive motor 22, and an angle sensor 29 which detects a rotational angle of a rotator of the drive motor 22 (in other words, a rotational angle of the magnetic pole of the rotor from a predetermined standard rotational position, and a rotational position of the rotational axis of the drive motor 22).

The control device 25 includes, for example, a power consumption computation unit 61, a target electric current distribution unit 62, a target electric current setting unit 63, a duty controlling unit 64, and a drive motor controlling unit 65.

The power consumption computation unit 61 computes the total power consumption of the load (from example, the drive motor 22 and the air conditioner and the vehicle auxiliary device, which are loads outside of the power supply device 10, and the air pump inverter 14, which is a load inside of the power supply device 10) to which electric power is supplied from the power supply device 10.

When the drive motor 22 is driven, for example, the target electric power distribution setting unit 62 sets the electric power distribution of the fuel cell stack 11 and the battery 12 forming the battery circuit 10a of the power supply device 10, based on, for example, the condition of the fuel cell stack (for instance, the rate of change of the condition of the fuel cell stack 11 according to a command for power generation) and the remaining capacity SOC of the battery 12. In other words, the target electric power distribution setting unit 62 sets the distribution when the total electric power consumption computed by the electric power consumption computation unit 61 is a value obtained by adding an electric power outputted by the fuel cell stack 11 and an electric power outputted by the battery 12.

For example, when the drive motor 22 is driven, the electric power distribution becomes a value corresponding to the switching duty of the first DC-DC converter 13 (in other words, the proportion of each of the transistors AH, BH, and CH of the high side arm in one cycle of the PWM signal that are turned on). The switching duty ("duty") can be expressed using the electric voltage of the fuel cell stack 11 ("VFC") and the electric voltage of the battery 12 ("VB"), as shown below.

$$duty = VFC/(VFC+VB)$$

From this equation, the ratio of the electric voltage of the fuel cell stack 11 ("VFC") and the electric voltage of the battery 12 ("VB") can be expressed, as shown below, using the switching duty ("duty").

$$VB/VFC = (1-duty)/duty$$

Figure 6:
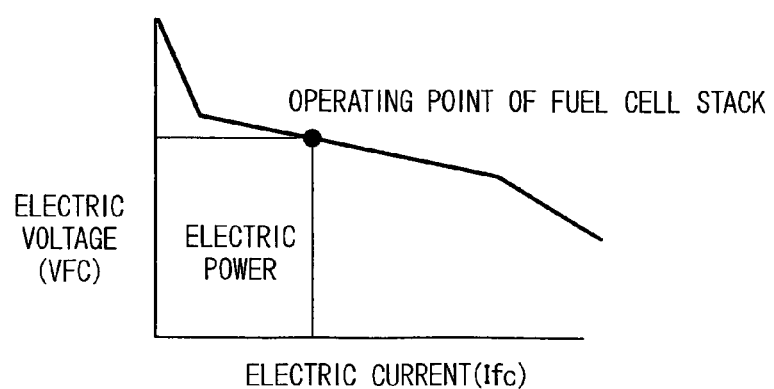
FIG. 6 shows an example of an operating point of a fuel cell stack according to the above embodiment.
Figure 7:
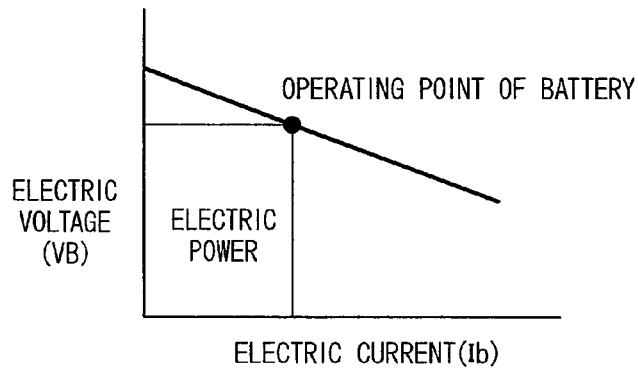
FIG. 7 shows an example of an operating point of a battery according to the above embodiment.

The electric voltage of the fuel cell stack 11 ("VFC") and the electric voltage of the battery 12 ("VB") are in a predetermined correspondence relationship with each of the electric current (output electric current Ifc) and the electric power of the fuel cell stack 11 as well as the electric current (Ib) and the electric power of the battery 12, as shown in FIGS. 6 and 7 for example. From this correspondence relationship, the ratio of the operating point of the fuel cell stack 11 (for example, the electric voltage or the electric current or the electric power) and the operating point of the battery 12 (for example, the electric voltage or the electric current or the electric power) is expressed using the switching duty ("duty").

When the drive motor 22 is regenerated, for example, the target electric power distribution setting unit 62 sets the electric power distribution of the electric power supplying side of the fuel cell stack 11 and the drive motor inverter 15, and also sets the electric power distribution of the electric power receiving side of the battery 12 and the load (for example, the air conditioner 24 and the vehicle auxiliary device and the air pump inverter 14), based on the condition of the fuel cell stack 11 (for instance, the rate of change of the condition of the fuel cell stack 11 according to a command for power generation) and the remaining capacity SOC of the battery 12, and the regenerative electric power of the drive motor 22, and the like.

Because the ratio of the operating point of the fuel cell stack 11 (for example, the electric voltage or the electric current or the electric power) and the operating point of the battery 12 (for example, the electric voltage or the electric current or the electric power) is expressed using the switching duty ("duty"), the target electric current setting unit 63 obtains the target electric current corresponding to the output electric current Ifc of the fuel cell stack 11, when the drive motor 22 is driven for example, by referring to a predetermined map representing the correspondence relationship between the operating point of the fuel cell stack 11, the operating point of the battery 12, the switching duty of the first DC-DC converter 13, and the total power consumption of the load.

Figure 8:
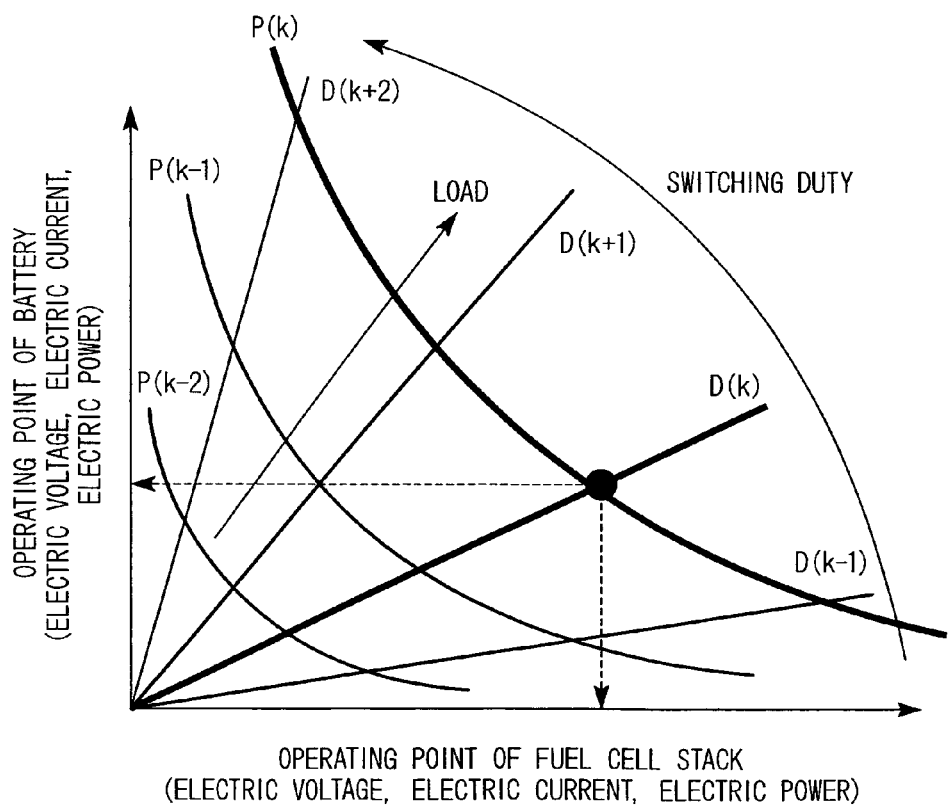
FIG. 8 shows an example of a predetermined map representing a correspondence relationship between an operating point of a fuel cell stack, an operating point of a battery, a switching duty of a first DC-DC converter, and a total power consumption of a load according to the above embodiment.

This predetermined map shows a correspondence relationship of the operating point of the fuel cell stack 11 and the operating point of the battery 12 which are set with respect to each of multiple values of the switching duty of the first DC-DC converter 13 (D(1), . . . , D(k), . . . ) on a two-dimensional coordinate in which the operating point of the fuel cell stack 11 and the operating point of the battery 12 are the orthogonal coordinates, as shown in FIG. 8, for example. In addition, the predetermined map shows the correspondence relationship between the operating point of the fuel cell stack 11 and the operating point of the battery 12 which are set with respect to each of the multiple values of the total power consumption of the load (P(1), . . . , P(k), . . . ).

Considering the correspondence relationship set for each of the multiple values of the switching duty of the first DC-DC converter 13, the operating point of the battery 12 is set to have a tendency to increase at a rate according to the switching duty, as the operating point of the fuel cell stack 11 increases.

Meanwhile, considering the correspondence relationship between the operating point of the fuel cell stack 11 and the operating point of the battery 12 which are set for each of the multiple values of the total consumption power of the load, a combination of the operating points is set so that the sum of the electric power corresponding to the operating point of the fuel cell stack 11 and the electric power corresponding to the operating point of the battery 12 equals the total consumption power of the load.

When, on a two-dimensional coordinate in which the operating point of the fuel cell stack 11 and the operating point of the battery 12 are the orthogonal coordinates, the operating point of the fuel cell stack 11 and the battery 12 is set to be the intersection between the correspondence relationship P(k) according to the total power consumption of the load computed by the consumption power computation unit 61 and the correspondence relationship D(k) according to the switching duty of the first DC-DC converter 13 according to the electric power distribution set by the target electric power distribution unit 62, the target electric current setting unit 63 outputs the electric current (output current Ifc) of the fuel cell stack 11 corresponding to this operating point, as the target electric current.

In addition, when the drive motor 22 is regenerated, for example, the target electric current setting unit 63 outputs zero or a positive value as the target electric current of the electric current (output current Ifc) of the fuel cell stack 11 according to the electric power distribution set by the target electric power distribution setting unit 62.

The duty controlling unit 64 controls the switching duty of the first DC-DC converter 13, so that the actual electric power distribution of the fuel cell stack 11 and the battery 12 equals the electric power distribution (target electric power distribution) set by the target electric power distribution setting unit 62. For example, the duty controlling unit 64 controls the switching duty of the first DC-DC converter 13 so that, the detected value of the output current IFC of the fuel cell stack 11 outputted by the output current sensor 27 equals the target electric current of the fuel cell stack 11 outputted by the target electric current setting unit 63 (the output current Ifc).

This duty controlling unit 64 includes, for example, an electric current deviation computation unit 71, a feed back processing unit 72, and a PWM signal generation unit 73.

The electric current deviation computation unit 71 computes and outputs the electric current deviation between the detected value of the output current IFC of the fuel cell stack 11 outputted from the output current sensor 27 and the target electric current of the fuel cell stack 11 (the output current Ifc) outputted from the target electric current setting unit 63.

The feedback processing unit 72 computes an electric voltage command value by controlling and amplifying the electric current deviation outputted by the electric current deviation computation unit 71 through, for example, a PID (Proportional Integral Derivative) operation.

In order to output an output current Ifc from the fuel cell stack 11 corresponding to the electric voltage command value outputted from the feedback processing unit 72, the PWM signal creation unit 73 creates and outputs a gate signal (namely, a PWM signal) that turns on and off each of the transistors AH, BH, and CH of the high side arm of the first DC-DC converter 13 as well as each of the transistors AL, BL, and CL of the low side arm.

While the drive motor 22 is driven, for example, the drive motor controlling unit 65 performs a feed back control (a vector control) of the electric current on a dq-coordinate system in the form of a rotating orthogonal coordinate. This drive motor controlling unit 65 computes a target d-axis electric current and a target q-axis electric current according to a torque command based on a driver's accelerating operation and the number of rotations of the drive motor 22. Then, the drive motor controlling unit 65 computes each of the three phase output electric voltage Vu, Vv, and Vw based on the target d-axis electric current and the target q-axis electric current. Further, the drive motor controlling unit 65 inputs a PWM signal, which is a gate signal, to the bridge circuit 51 of the drive motor inverter 15 according to each phase of the output electric voltage Vu, Vv, and Vw. At the same time, the drive motor controlling unit 65 performs a control so that the deviation between the d-axis electric current and the q-axis electric current obtained by converting the detected values of each phase of the electric current Iu, Iv, and Iw, actually supplied by the F-drive motor inverter 15 to the drive motor 22, to the dq-coordinate system, and the deviation between the target d-axis electric current and the target q-axis electric current equal zero.

In addition, when the drive motor 22 is regenerated, for example, the drive motor controlling unit 65 turns on and off, each of the transistors of the bridge circuit 51 of the drive motor inverter 15 according to a pulse synchronized based on the output waveform of the rotational angle θm of the rotator of the drive motor 22 outputted by the angle sensor 29. The three-phase alternating-current power outputted from the drive motor controlling unit 65 is converted to a direct-current power. At this time, the drive motor controlling unit 65 performs a feedback control of the regenerating electric voltage according to the duty of the gate signal that turns each of the transistors of the bridge circuit 51 on and off. The drive motor controlling unit 65 outputs a predetermined electric voltage value to a primary side of the drive motor inverter 15, in other words, between the secondary side positive terminal P2 of the first DC-DC converter 13 and the secondary side negative terminal N2.

In other words, when the drive motor 22 is driven, for example, the control device 25 performs a feedback control so that the detected value of the electric current (the output electric current Ifc) of the fuel cell stack 11 equals the target electric current. Thus, the control device 25 controls the switching duty of the first DC-DC converter 13. This control device 25 continuously controls the operating mode of the power supply device 10 as shown in FIG. 9, for example.

Figure 10A:
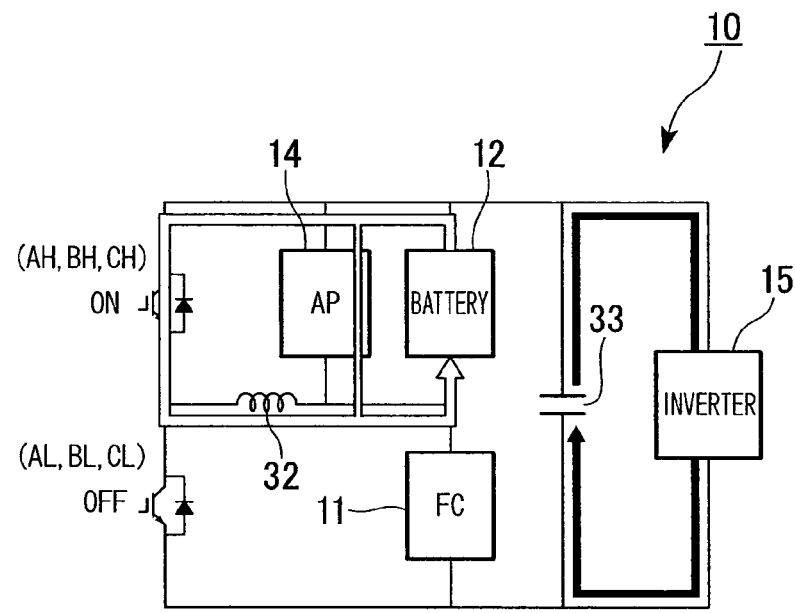
FIG. 10A shows an electricity supply state during an operation mode (EV mode) of a power supply device when a drive motor is driven according to the above embodiment.
Figure 10B:
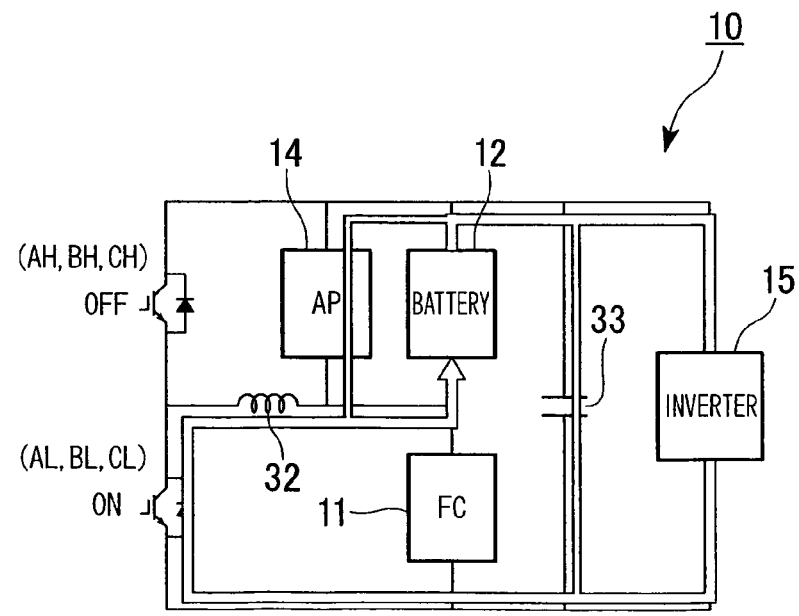
FIG. 10B shows an electricity supply state during an operation mode (EV mode) of a power supply device when a drive motor is driven according to the above embodiment.
Figure 11A:
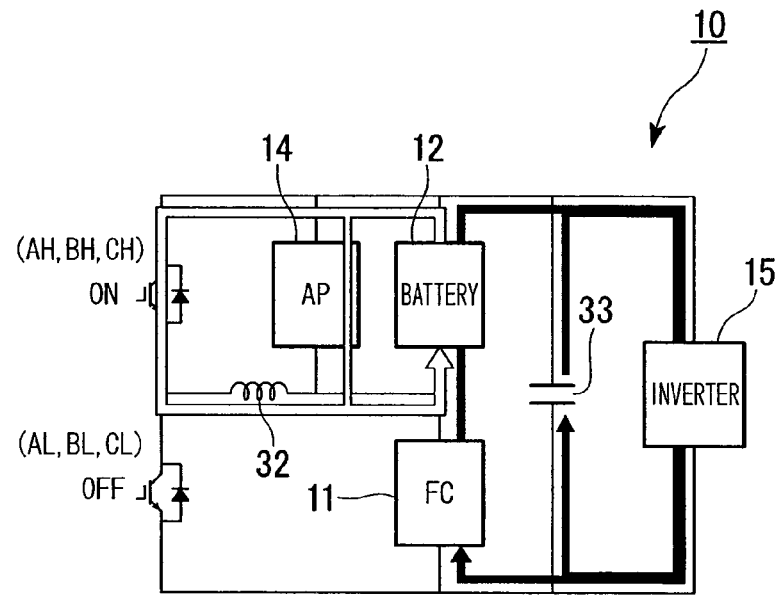
FIG. 11A shows an electricity supply state during an operation mode (first (FC+battery) mode) of a power supply device when a drive motor is driven according to the above embodiment.
Figure 11B:
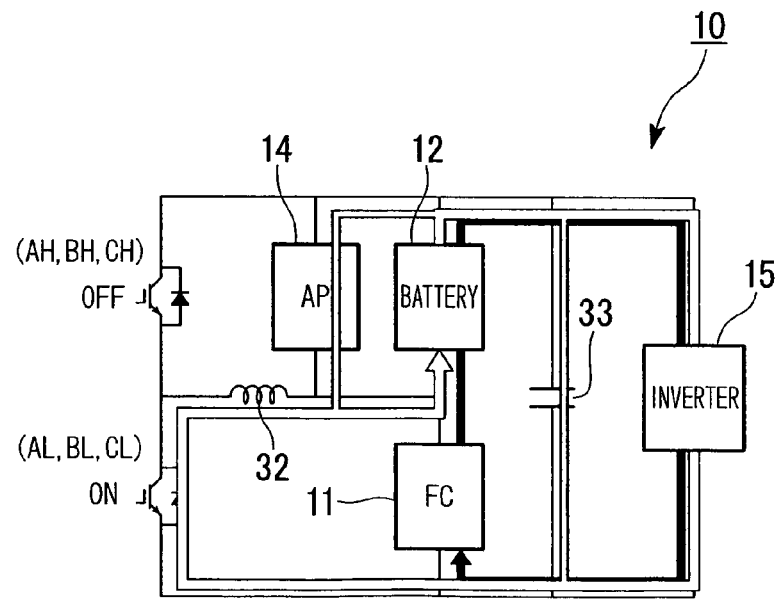
FIG. 11B shows an electricity supply state during an operation mode (first (FC+battery) mode) of a power supply device when a drive motor is driven according to the above embodiment.
Figure 12A:
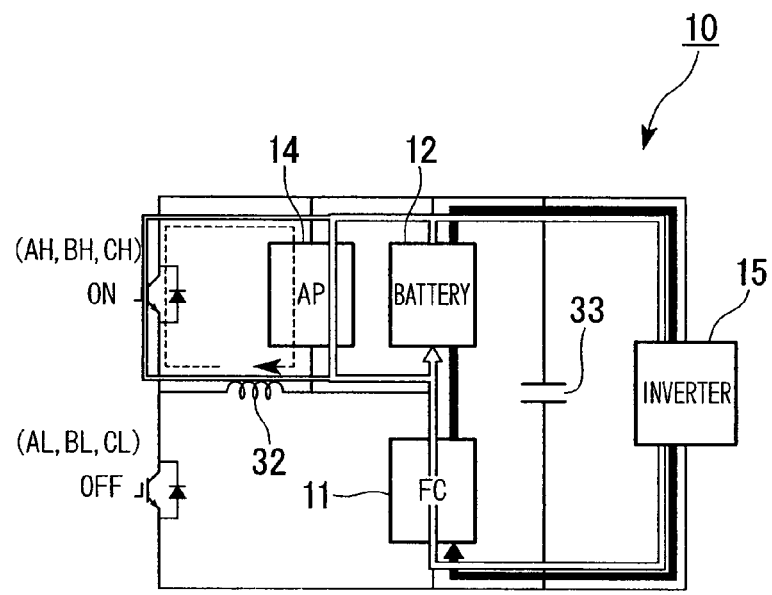
FIG. 12A shows an electricity supply state during an operation mode (second (FC+battery) mode) of a power supply device when a drive motor is driven according to the above embodiment.
Figure 12B:
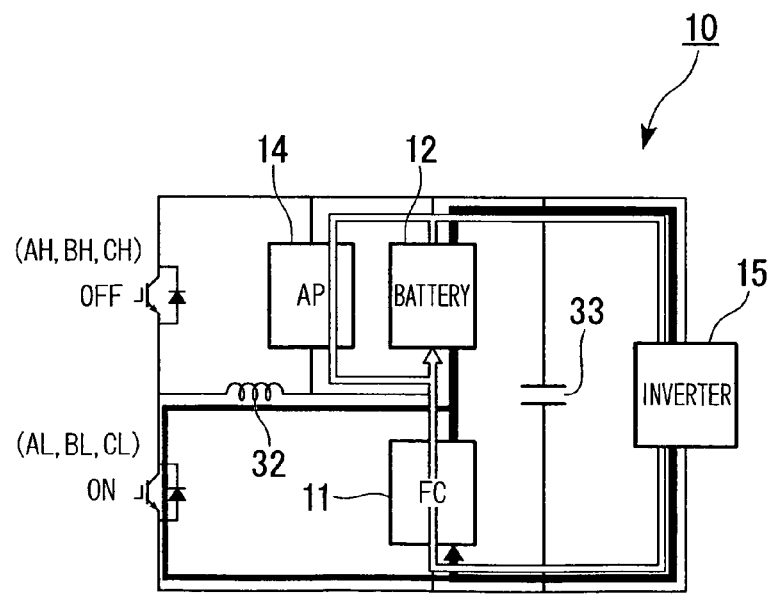
FIG. 12B shows an electricity supply state during an operation mode (second (FC+battery) mode) of a power supply device when a drive motor is driven according to the above embodiment.
Figure 13A:
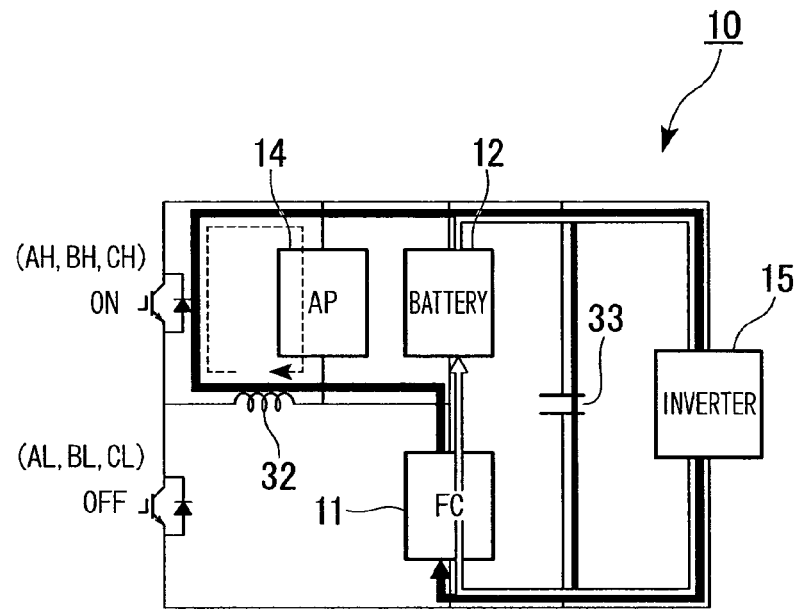
FIG. 13A shows an electricity supply state during an operation mode (third (FC+battery) mode) of a power supply device when a drive motor is driven according to the above embodiment.
Figure 13B:
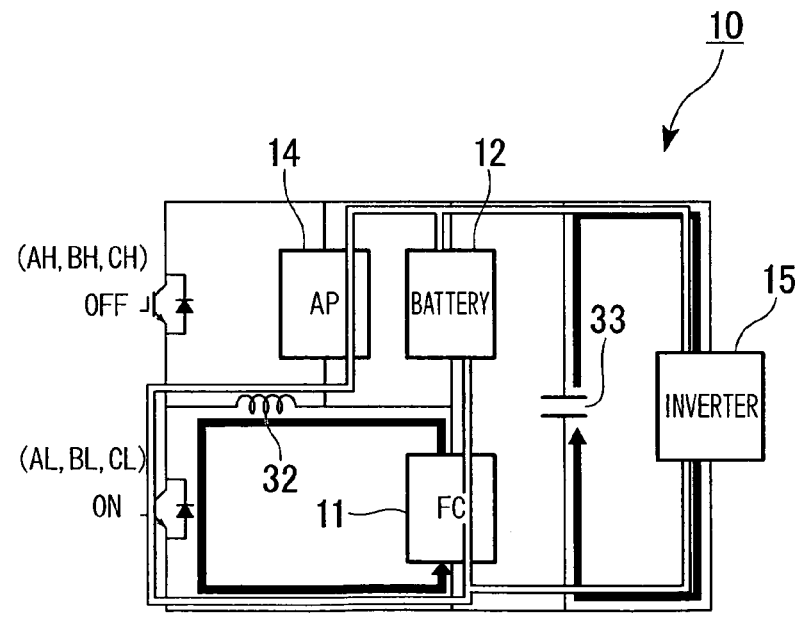
FIG. 13B shows an electricity supply state during an operation mode (third (FC+battery) mode) of a power supply device when a drive motor is driven according to the above embodiment.
Figure 14A:
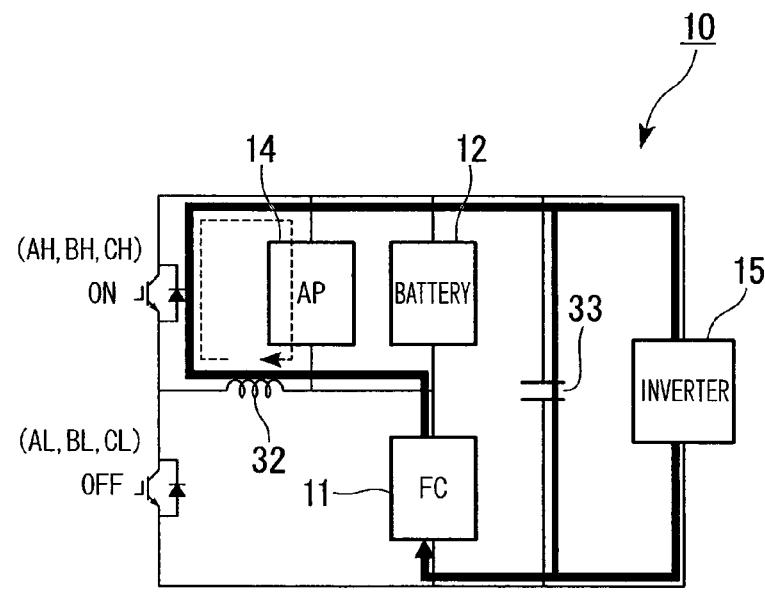
FIG. 14A shows an electricity supply state during an operation mode (first FC mode) of a power supply device when a drive motor is driven according to the above embodiment.
Figure 14B:
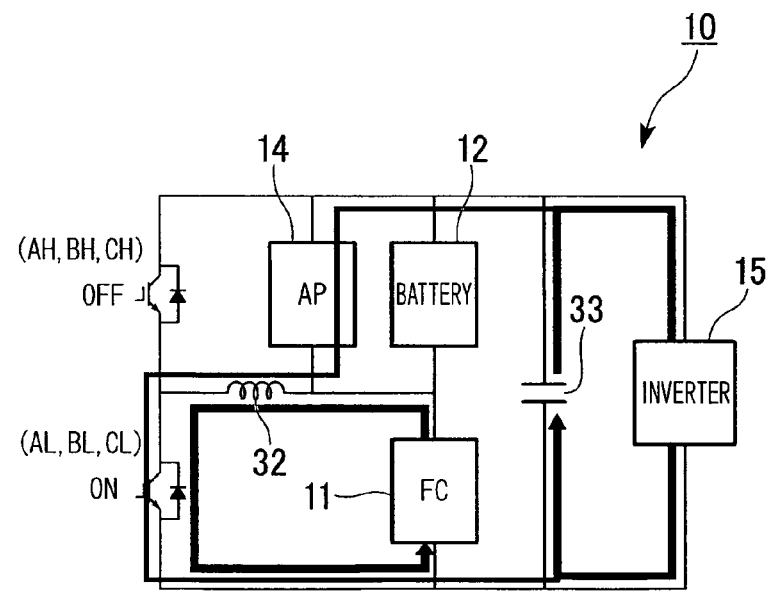
FIG. 14B shows an electricity supply state during an operation mode (first FC mode) of a power supply device when a drive motor is driven according to the above embodiment.
Figure 15A:
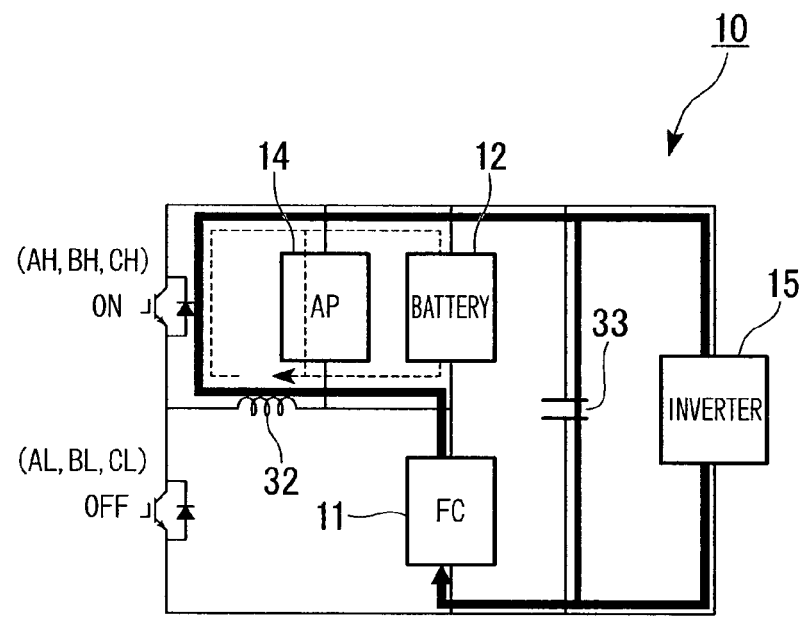
FIG. 15A shows an electricity supply state during an operation mode (second FC mode) of a power supply device when a drive motor is driven according to the above embodiment.
Figure 15B:
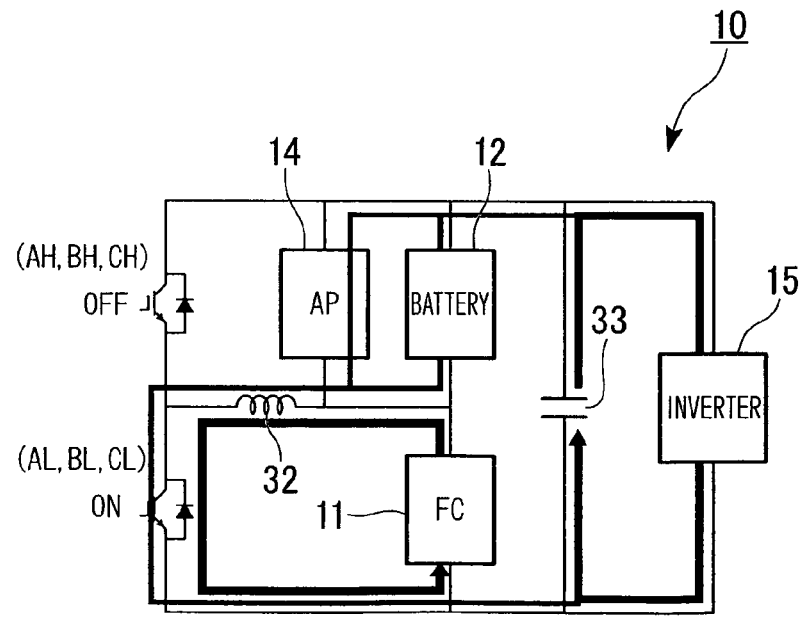
FIG. 15B shows an electricity supply state during an operation mode (second FC mode) of a power supply device when a drive motor is driven according to the above embodiment.

When, for example, the boosting ratio of the first DC-DC converter 13 approximately equals 2 to 3, the operating mode of the power supply device 10 that maximizes the switching duty is an EV mode in which only the output by the battery 12 is supplied to the drive motor inverter 15 and the air pump inverter 14, as shown in FIGS. 10A and 10B, for example.

As the switching duty tends to decline from the EV mode, the operating mode of the power supply device 10 shifts sequentially from a first (FC+battery) mode to a second (FC+battery) mode to a third (FC+battery) mode, as shown in FIGS. 11A to 13B, for example. In the first mode, the output of the battery 12 is supplied to the drive motor inverter 15 and the air pump inverter 14. At the same time, in the first mode, the output of the fuel cell stack 11 is supplied to the drive motor inverter 15, and the electric current (Ib) of the battery 12 becomes larger than the electric current (output current Ifc) of the fuel cell stack 11. In the second mode, the output of the battery 12 is supplied to the drive motor inverter 15 and the air pump inverter 14. At the same time, in the second mode, the output of the fuel cell stack 11 is supplied to the drive motor inverter 15, and the electric current (Ib) of the battery 12 becomes equal to the sum of the electric current (output current Ifc) of the fuel cell stack 11 and the electric current (IAP) flowing through the air pump inverter 14. In the third mode, the output of the battery 12 and the fuel cell stack 11 is supplied to the drive motor inverter 15 and the air pump inverter 14, and the electric current (Ib) of the battery 12 becomes smaller than the electric current (output current Ifc) of the fuel cell stack 11.

Figure 9:
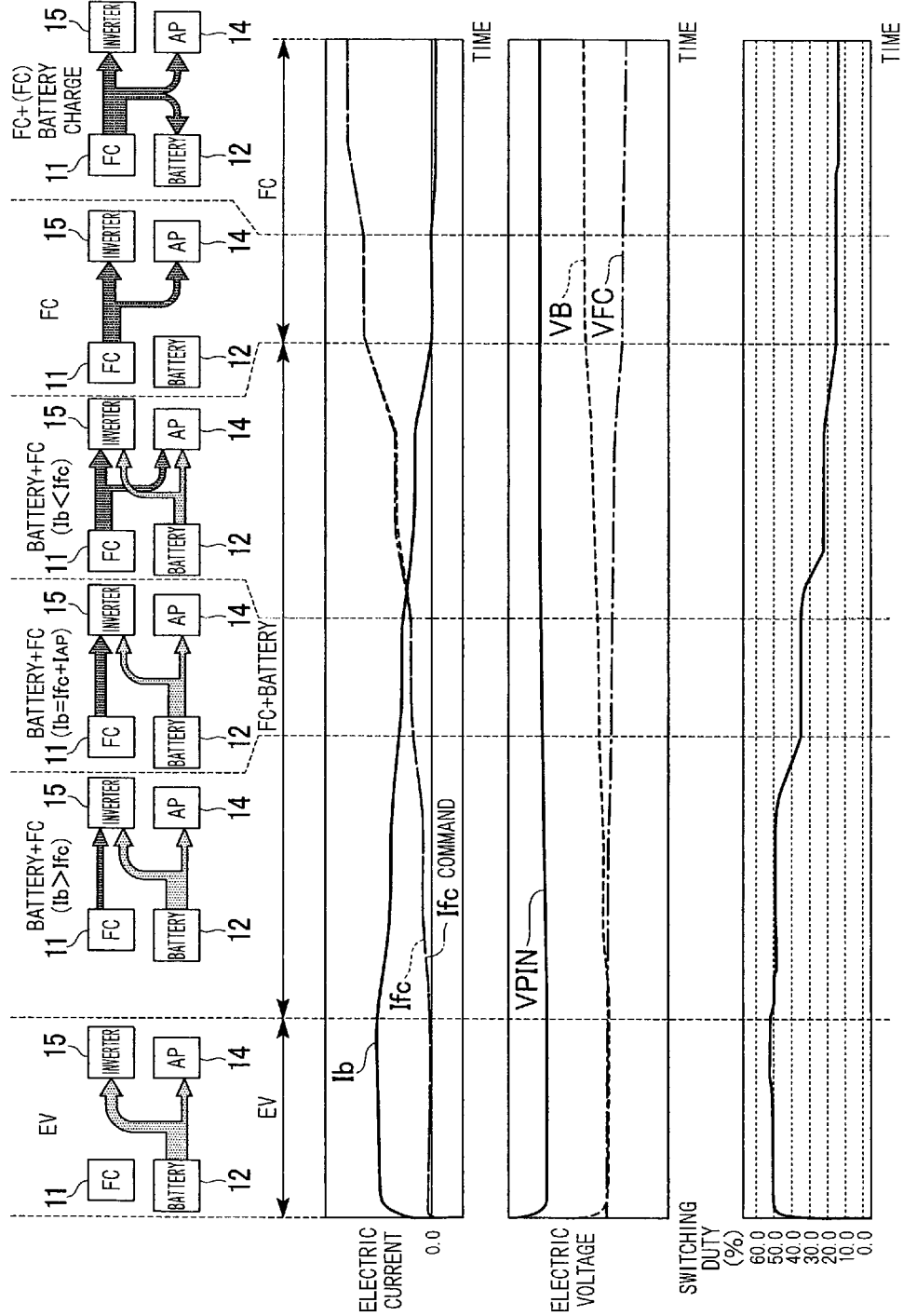
FIG. 9 shows an example of a change in an electric current and an electric voltage of a fuel cell stack and a battery, a change in an operation mode of a power supply device, corresponding to a change in a switching duty of a first DC-DC converter when a drive motor is driven according to the above embodiment.

Accordingly, the electric current (Ib) of the battery 12 tends to decline, as shown in FIG. 9 for example. In addition, the electric current (output current Ifc) of the fuel cell stack 11 and the target electric current (the Ifc command) tend to increase. The input electric voltage (VPIN) of the primary side of the drive motor inverter 15 is maintained to be approximately constant. The electric voltage of the battery 12 (VB) tends to increase, while the electric voltage of the fuel cell stack 11 (VFC) tends to decrease.

Further, as the switching duty tends to decline to a minimum value from the third (FC+battery) mode, the operating mode of the power supply device 10 shifts to the first FC mode and the second FC mode, in sequence, as shown in FIGS. 14A to 15B, for example. In the first FC mode, only the output of the fuel cell stack 11 is supplied to the drive motor inverter 15 and the air pump inverter 14. In the second FC mode, only the output of the fuel cell stack 11 is supplied to the drive motor inverter 15, the air pump inverter 14, and the battery 12, therefore charging the battery 12.

Accordingly, the electric current (Ib) of the battery 12 tends to decrease from zero to a negative value as shown in FIG. 9 for example. Meanwhile, the electric current (the output current Ifc) of the fuel cell stack 11 and the target electric current (the Ifc command) tend to increase. In addition, the input electric voltage (VPIN) in the primary side of the drive motor inverter 15 is maintained to be approximately constant. The electric voltage of the battery 12 (VB) tends to increase. On the other hand, the electric voltage of the fuel cell stack 11 (VFC) tends to decrease.

When the drive motor 22 is regenerated, for example, the control device 25 performs a feedback control so that the detected value of the electric current of the fuel cell stack 11 (the output current Ifc) equals the target electric current (either zero or a positive value). This control device 25 controls the switching duty of the first DC-DC converter 13 by performing a feedback control of the regenerative electric voltage.

Figure 16A:
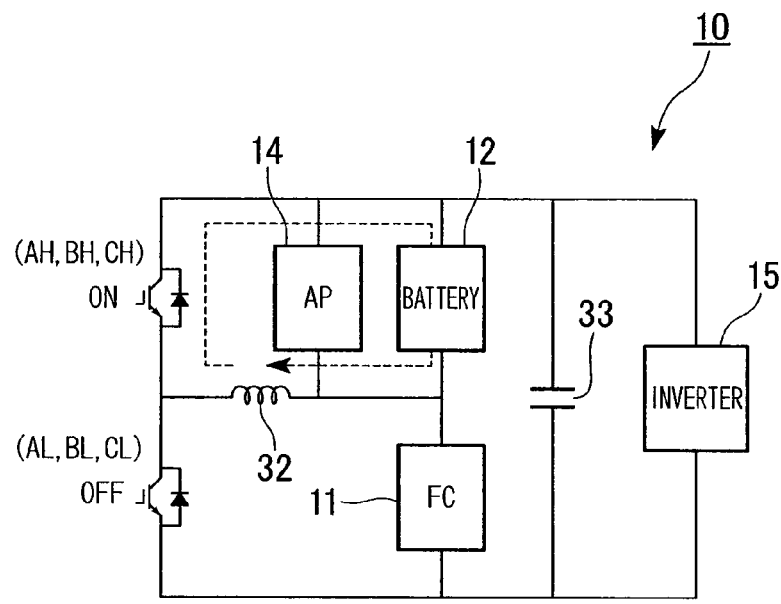
FIG. 16A shows an electricity supply state during an operation mode (regeneration mode) of a power supply device when a drive motor is regenerated according to the above embodiment.
Figure 16B:
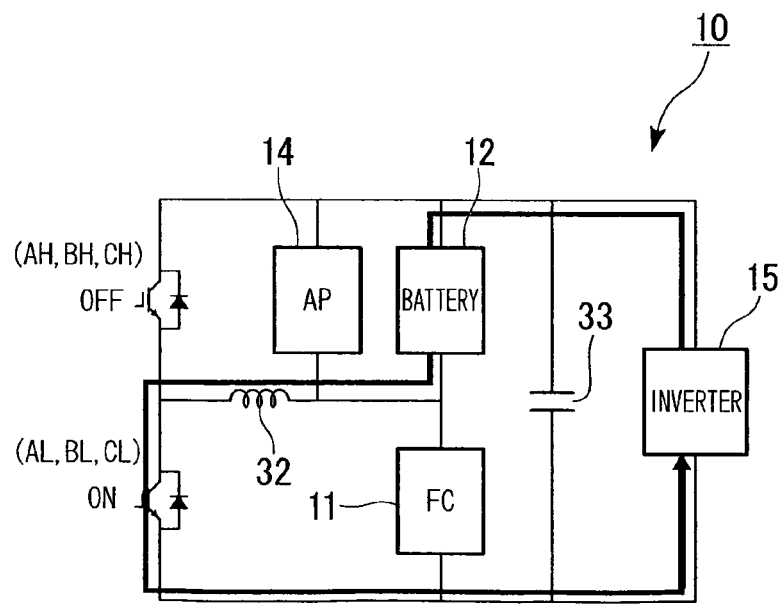
FIG. 16B shows an electricity supply state during an operation mode (regeneration mode) of a power supply device when a drive motor is regenerated according to the above embodiment.

For example, the operating mode of the power supply device 10 in which the target of the electric current of the fuel cell stack 11 (the output current Ifc) equals zero is, as shown in FIGS. 16A and 16B, the regenerative mode in which the battery 12 is charged by the regenerative electric power of the drive motor inverter 15.

Figure 17A:
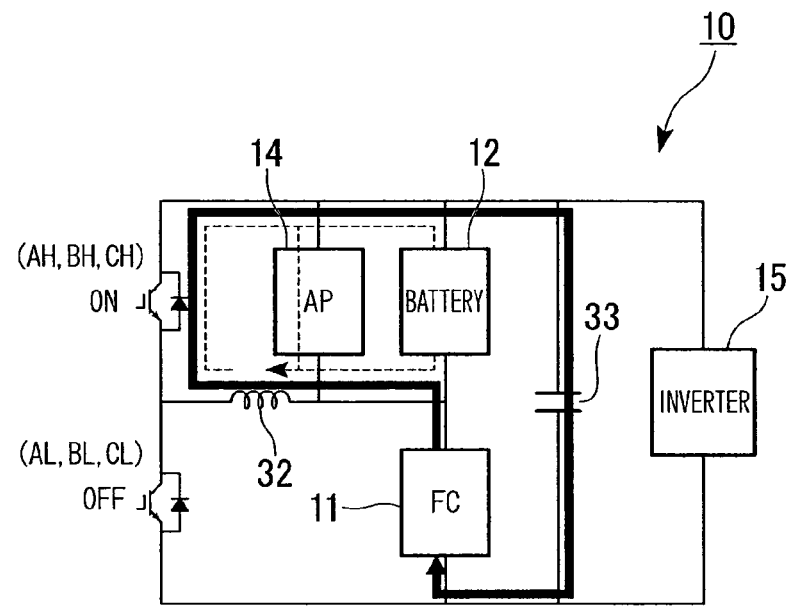
FIG. 17A shows an electricity supply state during an operation mode ((regeneration+battery charging by FC) mode) of a power supply device when a drive motor is regenerated according to the above embodiment.
Figure 17B:
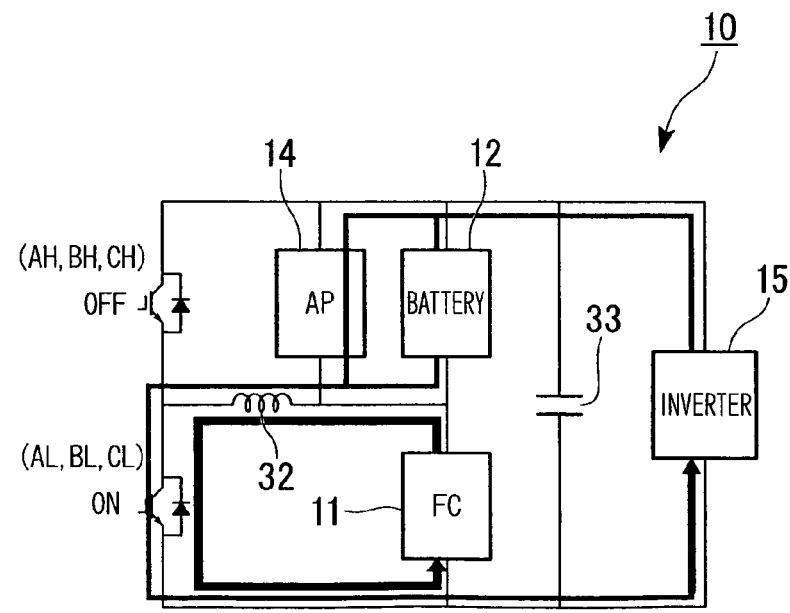
FIG. 17B shows an electricity supply state during an operation mode ((regeneration+battery charging by FC) mode) of a power supply device when a drive motor is regenerated according to the above embodiment.

Meanwhile, the operating mode of the power supply device 10 in which the target of the electric current of the fuel cell stack 11 (the output current Ifc) equals a positive value, for example, is a (regenerative+battery charging by the FC) mode in which the regenerative electric power of the drive motor inverter 15 and the output of the fuel cell stack 11 are supplied to the air pump inverter 14 and the battery 12, and the battery 12 is charged, as shown in FIGS. 17A and 17B.

The control device 25 outputs a command value regarding the pressure and the flux of the reactive gas supplied to the fuel cell stack 11, as a command to the fuel cell stack 11 to generate electric power, the output of the command value being based on, for example, the condition in which the fuel cell vehicle is driven, the concentration of hydrogen included in the reactive gas supplied to the anode of the fuel cell stack 11, the concentration of hydrogen included in the discharge gas emitted from the anode of the fuel cell stack 11, the condition in which the fuel cell stack 11 is generating electric power, the electric voltage between the terminals of each of the plurality of fuel cells, the electric voltage VFC of the fuel cell stack 11, the output current Ifc of the fuel cell stack 11, and the internal temperature of the fuel cell stack 11. In this way, the control device 25 controls the condition in which the fuel cell stack 11 generates electric power.

The control device 25 switches over the on and off conditions of the contactor 11a according to the condition in which the fuel cell stack 11 is generating electric power. In addition, the control device 25 controls the connection between the fuel cell stack 11, the second line L2, and the third line L3.

The control device 25 also switches over the on and off conditions of the contactor 12a and the current limiting circuit 12b according to the remaining capacity SOC of the battery 12, for example. Thus, the control device 25 controls the connection between the battery 12 and the first line L1 and the second line L2.

As described above, according to the power supply device 10 based on the above embodiment of the present invention, a plurality of operating modes can be switched over merely by providing a single first DC-DC converter 13 with respect to the battery circuit 10a in which the fuel cell stack 11 and the battery 12 are connected in series. Compared to the case in which a DC-DC converter is equipped individually for each of the fuel cell stack 11 and the battery 12, for example, it is possible to lower the cost necessary for configuration and reduce the size.

Further, according to the power supply system 20 of the fuel cell vehicle based on the above embodiment of the present invention, the cost necessary for configuring the power supply device 10 can be lowered, and the size of the power supply device 10 can be reduced, by providing a single first DC-DC converter 13. Because the fuel cell stack 11 and the battery 12 are connected in series, the operating electric voltage of the drive motor inverter 15 can be augmented, and the electric current can be reduced, compared to the case in which the fuel cell stack 11 and the battery 12 are connected in parallel. In this way, the size of the drive motor 22 and the drive motor inverter 15 can be reduced. At the same time the operating efficiency can be enhanced. Therefore, the cost necessary for configuring the power supply system 20 of the fuel cell vehicle can be lowered, and the size can be reduced.

In addition, electric power can be supplied directly from the battery 12 to the air pump inverter 14. It is also possible to operate the fuel cell stack 11 appropriately.

Further, even though the condition of the first DC-DC converter 13 is abnormal (for example, when an open failure occurs), it is possible to drive the fuel cell vehicle, by supplying electric power from the battery circuit 10a to the drive motor inverter 15.

Figure 18:
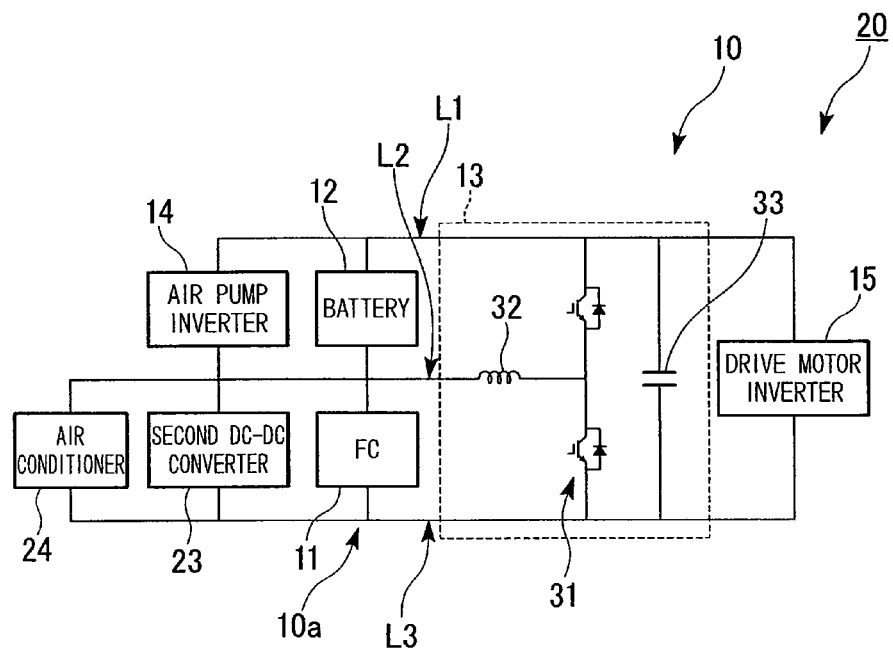
FIG. 18 is a configuration diagram of a power supply system of a fuel cell vehicle according to a second variation of the above embodiment.
Figure 19:
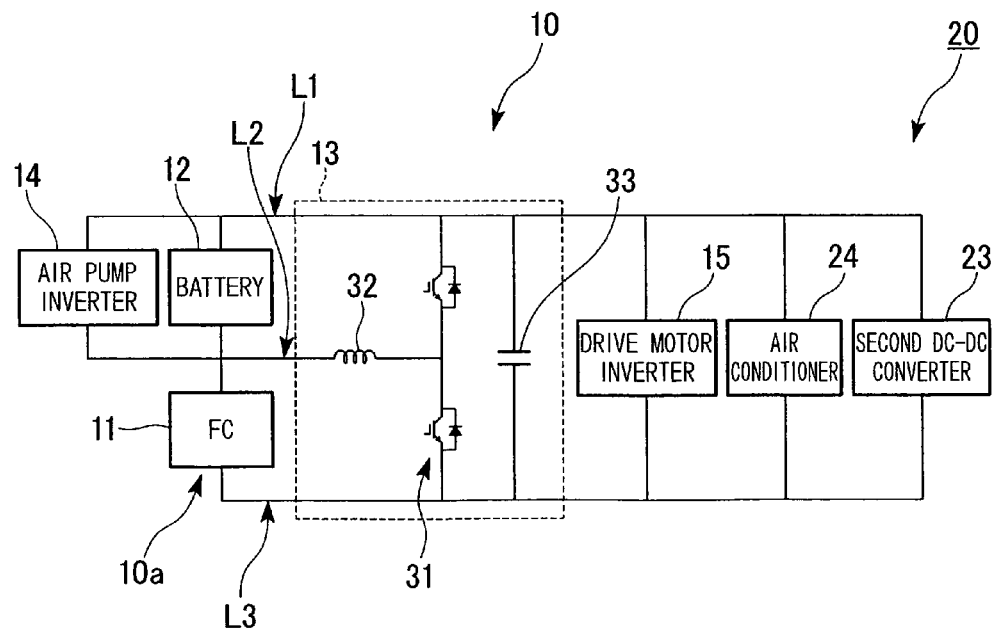
FIG. 19 is a configuration diagram of a power supply system of a fuel cell vehicle according to a third variation of the above embodiment.

According to the above embodiment, at least a portion of the vehicle auxiliary machinery equipped on the fuel cell vehicle (for example, an air conditioner 24 separate from the second DC-DC converter 23, and a load connected to the second DC-DC converter 23 (a processing device, a magnetic valve, and a 12 volt type load)) is connected to the first line L1 and the second line L2 either directly or through the second DC-DC converter 23. However, the present invention is not limited to this configuration. For example, as shown in FIG. 18, at least a part of the vehicle auxiliary machinery can be connected to the second line L2 and the third line L3. In addition, as shown in FIG. 19, at least a part of the vehicle auxiliary machinery can be connected to the first line L1 and the third line L3.

According to the above configuration, the air pump inverter 14 is connected to the first line L1 and the second line L2, the air pump inverter 14 being a drive circuit of the air pump 21. However, the present invention is not limited to this configuration. The drive circuit of at least one of a pump that supplies reactive gas to the fuel cell stack 11 (for example, the air pump 21) and a pump that supplies a refrigerant (not diagramed) can be connected to the first line L1 and the second line L2.

In addition, the drive circuit of at least one of a pump that supplies reactive gas to the fuel cell stack 11 (for example, the air pump 21) and a pump that supplies a refrigerant (not diagramed) can be connected to the second line L2 and the third line L3. The drive circuit of at least one of the above pumps can be connected to the first line L1 and the third line L3.

According to the above embodiment, the battery 12 is connected to the first line L1 and the second line L2, while the fuel cell stack 11 is connected to the second line L2 and the third line L3. However, the present invention is not limited to the above configuration. The fuel cell stack 11 can be connected to the first line L1 and the second line L2. The battery 12 can be connected to the second line L2 and the third line L3.

According to the above embodiment, the control device 25 controls the switching duty of the first DC-DC converter 13 by performing a feedback control so that the actual electric power distribution of the fuel cell stack 11 and the battery 12 equals the target electric power distribution, for example, so that the detected value of the electric current (the output current Ifc) of the fuel cell stack 11 equals the target electric current. However, the present invention is not limited to this configuration. For example, a feedback control can be performed so that, instead of the electric current of the fuel cell stack 11 (the output electric current Ifc), the electric current of the battery 12 (Ib) equals a target value. Further, a feedback control can be performed so that, instead of the electric current, the detected value of the electric voltage of the fuel cell stack 11 (VFC) or the electric voltage of the battery 12 (VB) equals a target value. It is also possible to perform a feedback control of the switching duty so that the output ratio of the fuel cell stack 11 and the battery 12 equals a target value.

Moreover, when the drive motor 22 is regenerating, for example, a feedback control can be performed so that, instead of the electric current of the fuel cell stack 11 (the output current Ifc), the output of the fuel cell stack 11 equals a target value.

According to the above embodiment, the first DC-DC converter 13, alternately switches over between a condition in which each of the transistors AH, BH, and CH of the high side arm are turned off and each of the transistors AL, BL, and CL of the low side arm are turned on, and a condition in which each of the transistors AH, BH, and CH of the high side arm are turned on and each of the transistors AL, BL, and CL of the low side arm are turned off. However, the present invention is not limited to this configuration. For example, during a boosting operation from the primary side to the secondary side when the drive motor 22 is driven, each of the transistors AL, BL, and CL of the low side arm can alternately be switched on and off while each of the transistors AH, BH, and CH of the high side arm are turned off. As another example, during a regenerative operation from the secondary side to the primary side when the drive motor 22 is regenerated, each of the transistors AH, BH, and CH of the high side arm can be alternately switched on and off while each of the transistors AL, BL, and CL of the low side arm are turned off.

Below, a description of a power supply device and a power supply system for a fuel cell vehicle according to a second embodiment of the present invention is provided with reference to FIGS. 20 to 30.

Figure 20:
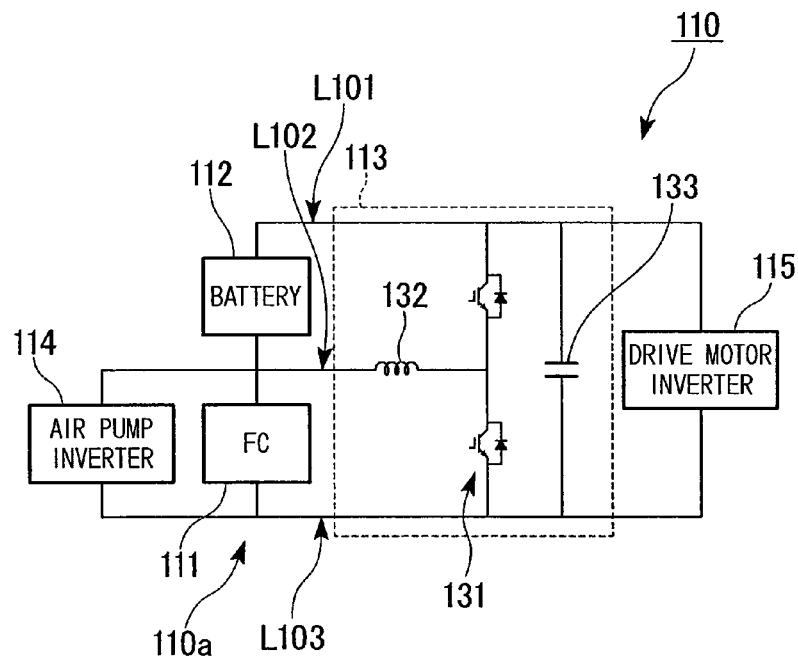
FIG. 20 is a configuration diagram of a power supply device according to a second embodiment of the present invention.

A power supply device 110 according to the present embodiment includes a fuel cell stack (FC) 111, a battery 112, a first DC-DC converter 113, and an air pump inverter 114, as shown in FIG. 20 for example. The power supply device 110 is connected to a drive motor inverter 115, for example.

Figure 21:
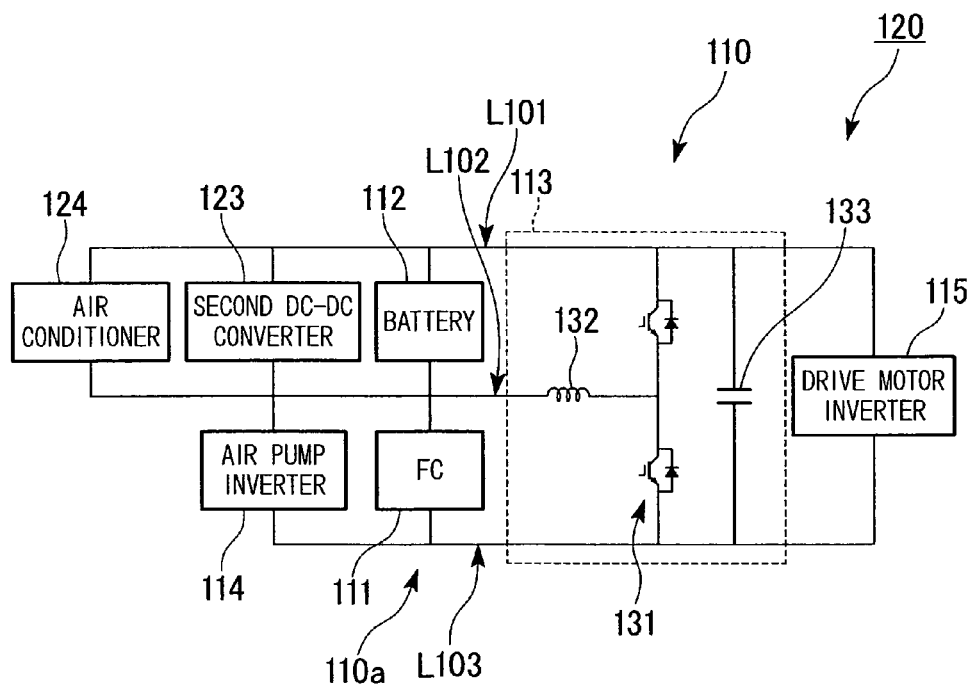
FIG. 21 is a configuration diagram of a power supply system for a fuel cell vehicle according to the above embodiment.
Figure 22:
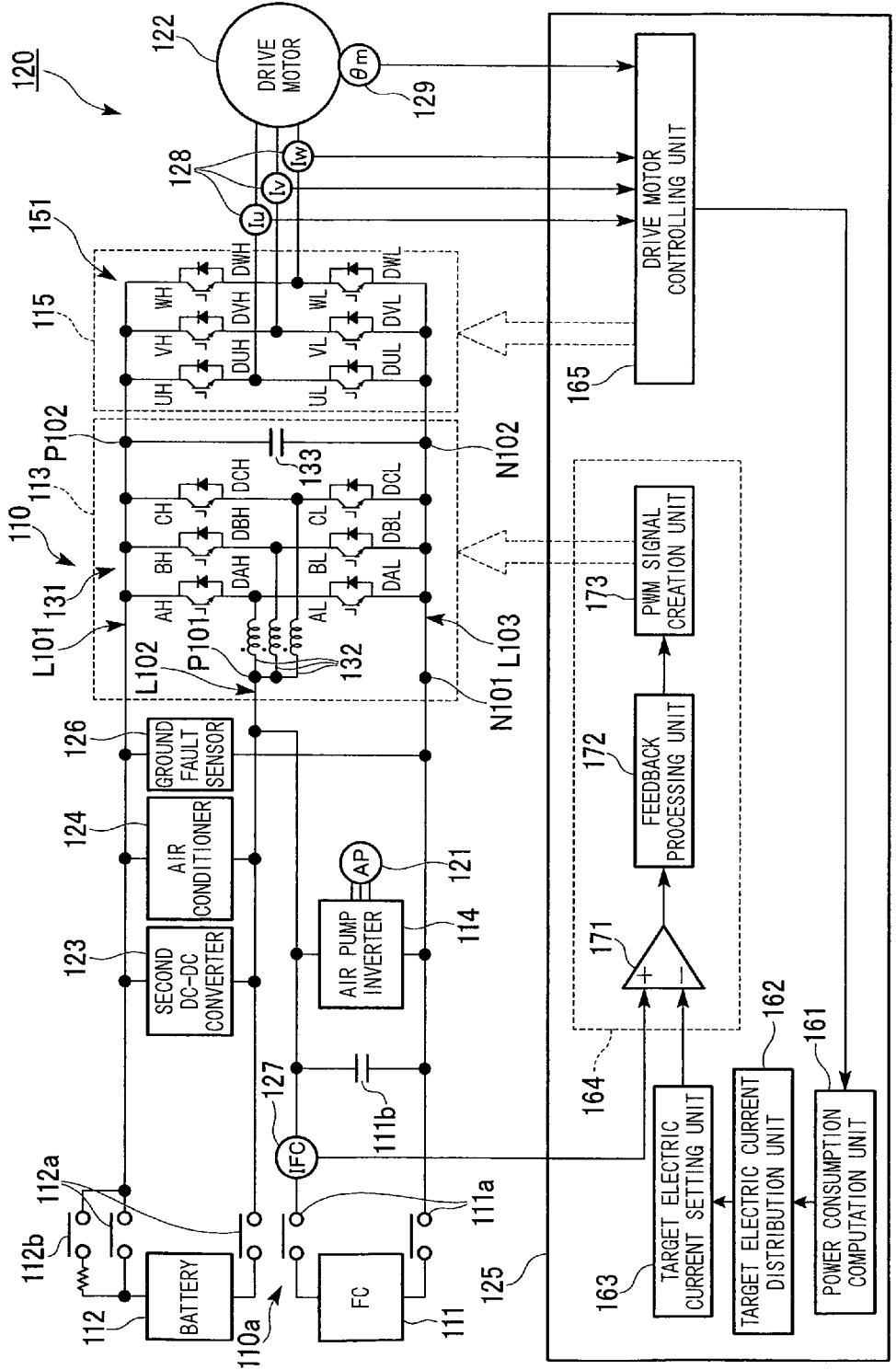
FIG. 22 is a configuration diagram of a power supply system for a fuel cell vehicle according to the above embodiment.

The power supply device 110 is provided in a power supply system 120 for a fuel cell vehicle, for example. This power supply system 120 for the fuel cell vehicle includes the power supply device 110, an air pump (AP) 121, a drive motor 122, a second DC-DC converter 123, an air conditioner 124, a control device 125, a ground fault sensor 126, an output current sensor 127, a phase current sensor 128, and an angle sensor 129, as shown in FIGS. 21 and 22 for example.

The fuel cell stack 111 is formed by layering multiple fuel cells including a solid polymer electrolyte membrane comprising a cation exchange membrane and the like, the solid polymer electrolyte membrane being held by a fuel electrode (anode) including an anode catalyst and a gas diffusion layer, and an oxygen electrode (cathode) including a cathode catalyst and a gas diffusion layer, the solid polymer electrolyte membrane and the anode and the cathode thus forming an electrolytic electrode structure, the electrolytic electrode structure further being held by a pair of separators. The laminated body of the fuel cell is sandwiched by a pair of end plates from both sides of the direction in which the layers are formed.

Air is supplied to the cathode of the fuel cell stack 111 from the air pump 121, the air being an oxidant gas (reactant gas) including oxygen. A fuel gas (reactant gas) including hydrogen is supplied to the anode from a high-pressure hydrogen tank (not diagramed), for example.

The hydrogen is ionized by the catalytic reaction with the anode catalyst at the anode and moves to the cathode through a reasonably humidified solid polymer electrolyte membrane. An electron is generated while the hydrogen moves, and the electron is extracted by the external circuit, and is utilized as an electric energy of the direct current. At this time, the hydrogen ion, the electron, and oxygen react at the cathode, forming water.

Here, the air pump 121 brings in air from outside the vehicle and compresses the air, for example. The air pump 121 supplies this air to the cathode of the fuel cell stack 111 as reactive gas. The number of rotations of a motor (not diagramed) driving this air pump 121 is controlled by the air pump inverter 114 according to a control command outputted by the control device 125. The air pump inverter 114 includes a PWM inverter based on a pulse width modulation (PWM).

As an alternative to the battery 112, the power supply device 110 can include, for example, a capacitor as an electric storage device, the capacitor including an electric double layer capacitor or an electrolytic capacitor.

The first DC-DC converter 113 is, for example, a chopper type DC-DC converter. As shown in FIG. 22, this first DC-DC converter 113 includes a bridge circuit 131 with three phases, a choke coil 132 with three phases, and a smoothing capacitor 133. The above bridge circuit 131 comprises a plurality of switching elements (for example, an IGBT: Insulated Gate Bipolar Mode Transistor) which are bridge-connected.

The first DC-DC converter 113 is shown in FIGS. 20 and 21 in simplified form. Thus, among the three phases, only one phase of the switching element and the choke coil 132 is shown in FIGS. 20 and 21.

The bridge circuit 131 is same as a three-phase bridge circuit 151 forming the drive motor inverter 115 described later. In the bridge circuit 131, a high-side and a low-side first transistor AH and AL, a high-side and a low-side second transistor BH and BL, and a high-side and a low-side third transistor CH and CL, which form a pair for each of the phases, are bridge-connected. Each of the transistors AH, BH, and CH form a high side arm by a collector being connected to a secondary side positive terminal P102. Each of the transistors AL, BL, and CL form a low side arm by an emitter being connected to a secondary side negative terminal N102. For each phase, the emitter of each of the transistors AH, BH, and CH of the high side arm is connected to the collector of each of the transistors AL, BL, and CL of the low side arm. Between the collector and the emitter of each of the transistors AH, AL, BH, BL, CH, and CL, each of the diodes DAH, DAL, DBH, DBL, DCH, and DCL are connected, so that the direction from the emitter to the collector is the forward direction.

This bridge circuit 131 is driven by a signal (PWM signal) which is pulse-width modulated (PWM), the signal being outputted from the control device 125 and inputted to a gate of each of the transistors. A condition in which each of the transistors AH, BH, and CH of the high side arm are turned on and each of the transistors AL, BL, and CL of the low side arm are turned off, and another condition in which each of the transistors AH, BH, and CH of the high side arm are turned off and each of the transistors AL, BL, and CL of the low side arm are turned on, are switched over in alternation.

The smoothing capacitor 133 is connected to the secondary side positive terminal P102 and the secondary side negative terminal N102.

Regarding the three-phase choke coil 132, an end of each of the choke coil 132 is connected between the collector and the emitter of each of the phases of the bridge circuit 131. In other words, the end of each of the choke coil 132 is connected, respectively, between the collector and the emitter of each of the transistors AH and AL, between the collector and emitter of each of the transistors BH and BL, and between the collector and emitter of each of the transistors CH and CL. The other side of each of the choke coil 132 is connected mutually to the primary side positive terminal P101.

Figure 23:
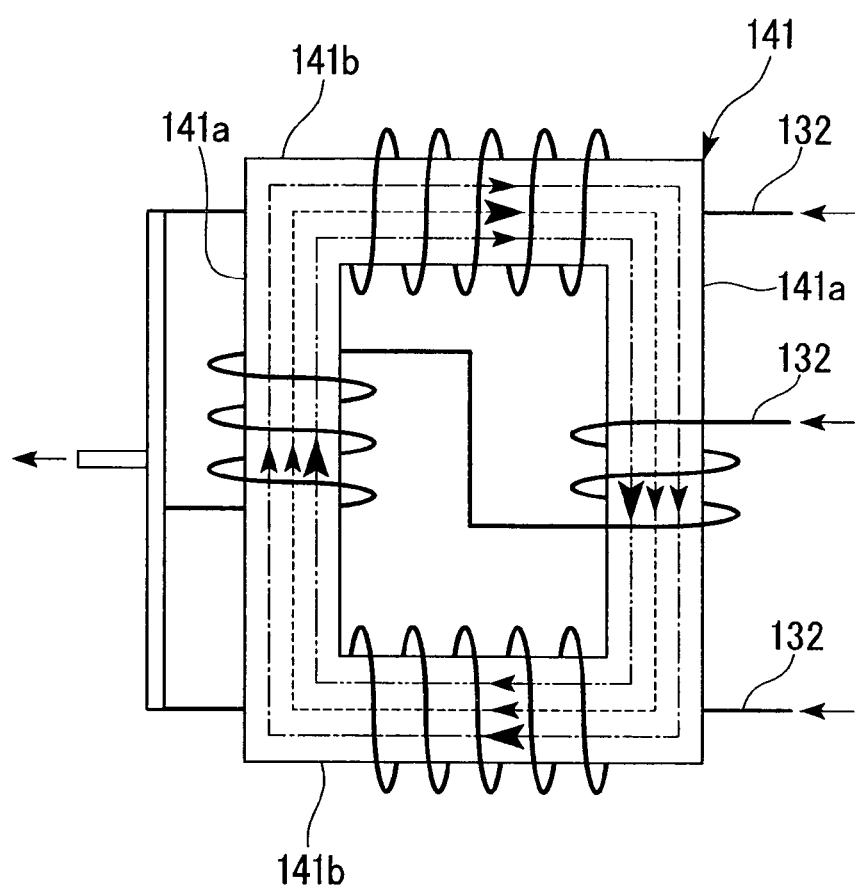
FIG. 23 is a configuration diagram of a choke coil with three phases according to the above embodiment.

The three-phase choke coil 132 is formed by wrapping around a single rectangular core 141 in common mode, as shown in FIG. 23 for example. This choke coil 132 is set so that the direction of the magnetic flux, generated by each of the choke coil 132 while electricity is supplied, is in the same direction.

One phase of the three-phase choke coil 132 is dispersed and wrapped around a pair of opposite sides 141a which is one of the two pairs of opposite sides forming the rectangular core 141. The other two phases of the three-phase choke coil 132 is concentrated and wrapped around the other pair of opposite sides 141b among the two pairs of opposite sides forming the rectangular core 141.

Figure 24:
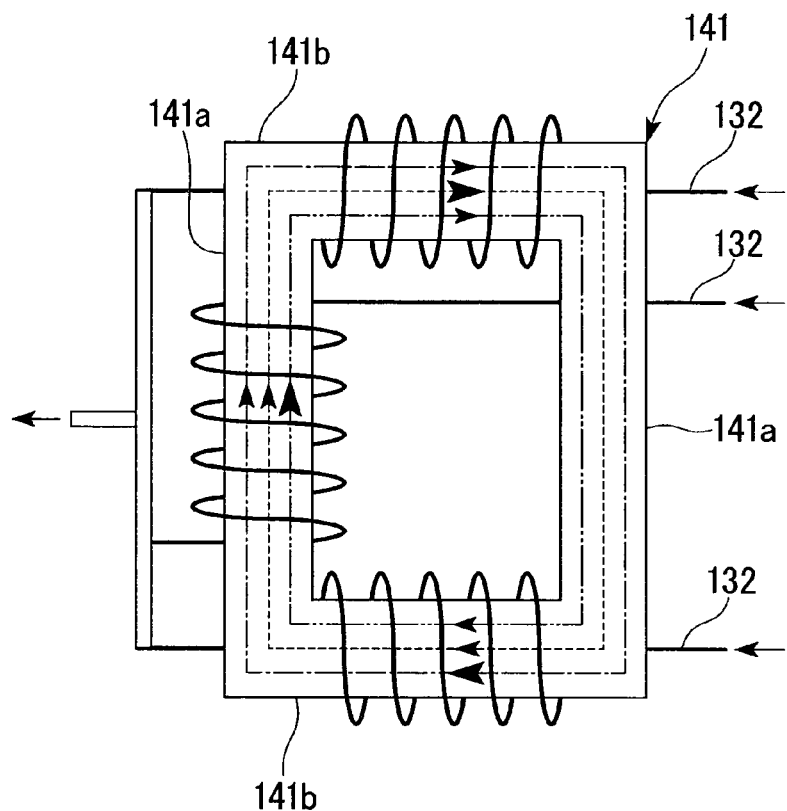
FIG. 24 is a configuration diagram of a choke coil with three phases according to a first variation of the above embodiment.

Each of the three-phase choke coil 132 can be concentrated and wrapped around three sides of the four sides forming the rectangular core 141, as shown in FIG. 24 for example. Further, each of the three-phase choke coil 132 can have a different winding structure.

With respect to three lines L101, L102, and L103, each having a different electric potential from one another (for example, electric potential of L101>electric potential of L102>electric potential of L103), a primary side of the first DC-DC converter 113 is connected to the second line L102 and the third line L103. The secondary side of the DC-DC converter 113 is connected to the first line L101 and the third line L103. In other words, the first line L101 is connected to the secondary side positive terminal P102, the second line L102 is connected to the primary side positive terminal P101, and the third line L103 is connected to the primary side negative terminal N101 and the secondary side negative terminal N102.

Concerning this first DC-DC converter 113, when a boost operation is performed from the primary side to the secondary side, at the time the drive motor 122 is driven for example, each of the transistors AH, BH, and CH of the high side arm are first turned off. At the same time, each of the transistors AL, BL, and CL of the low side arm are turned on. Due to the electric current flowing from the primary side, the choke coil 132 undergoes a direct current energization, and magnetic energy is accumulated.

Then, each of the transistors AH, BH, and CH of the high side arm are turned on. At the same time, each of the transistors AL, BL, and CL of the low side arm are turned off. While preventing a change in the magnetic flux due to the interruption of the electric current flowing through the choke coil 132, an induced voltage is generated between both ends of the choke coil 132. The induced voltage, generated by magnetic energy accumulated in the choke coil 132, is added to the input voltage in the primary side. In this way, a boosting voltage, higher than the input voltage in the primary side, is applied to the secondary side. The fluctuation in voltage, generated during this switchover operation, is smoothed by the smoothing capacitor 133. In addition, a boosting voltage is outputted from the secondary side.

On the other hand, during a regenerating operation from the secondary side to the primary side when the drive motor 122 is regenerated for example, each of the transistors AH, BH, and CH of the high side arm are first turned off. At the same time, each of the transistors AL, BL, and CL of the low side arm are turned on. The choke coil 132 undergoes a direct-current energization by the electric current inputted from the secondary side, and magnetic energy is accumulated.

Then, each of the transistors AH, BH, and CH of the high side arm are turned on. At the same time, each of the transistors AL, BL, and CL of the low side arm are turned off. While preventing a change in the magnetic flux due to the blockage of the electric current flowing through the choke coil 132, an induced voltage is generated between both ends of the choke coil 132. The induced voltage, generated by the magnetic energy accumulated in the choke coil 132, becomes a depressed voltage generated by stepping down the input voltage of the secondary side according to the on/off ratio of each of the transistors AH, BH, and CH of the high side arm. In this way, a depressed voltage is applied to the primary side.

The first DC-DC converter 113 is driven by a signal (PWM signal) which is pulse-width modulated (PWM), the signal being outputted from the control device 125 and inputted to a gate of each of the transistors. The first DC-DC converter 113 switches over the on/off condition of each of the transistors AH, BH, and CH of the high side arm and each of the transistors AL, BL, and CL of the low side arm, according to a switching duty defined, for example, as a ratio of each of the transistors AH, BH, and CH of the high side arm that are turned on during one cycle of the PWM signal.

Incidentally, each of the transistors AH, BH, and CH of the high side arm and each of the transistors AL, BL, and CL of the low side arm are prohibited from being simultaneously turned on when the on/off condition is switched over. An appropriate dead time is provided during which each of the above transistors can be simultaneously turned off.

The fuel cell stack 111 is connected to the second line L102 and the third line L103 through a contactor 111a and a capacitor 111b placed in the positive electrode side and the negative electrode side. The battery 112 is connected to the first line L101 and the second line L102 through a contactor 112a placed in the positive electrode side and the negative electrode side, and through a current limiting circuit 112b placed in the positive electrode side. Therefore, the fuel cell stack 111 and the battery 112 are connected in series between the first line L101 and the third line L103. The fuel cell stack 111 and the battery 112 thus are included in the battery circuit 110a.

While electric power is outputted from the first line L101 and the third line L103 to a load (for example, the drive motor 122), the first line L101 and the third line L103 are connected to the drive motor inverter 115.

The air pump inverter 114, being a drive circuit of the air pump 121, is connected to the second line L102 and the third line L103.

The drive motor inverter 115, included in a drive circuit of the three-phase drive motor 122, is a PWM inverter with a pulse-width modulation (PWM). This drive motor inverter 115 includes a three-phase bridge circuit 151 comprising a plurality of switching elements (for example, an IGBT: Insulated Gate Bipolar Mode Transistor) which are bridge-connected.

The bridge circuit 151 is same as a three-phase bridge circuit 131 forming the first DC-DC converter 113. In the bridge circuit 51, a high-side and a low-side U-phase transistor UH and UL, a high-side and a low-side V-phase transistor VH and VL, and a high-side and a low-side W-phase transistor WH and WL, which form a pair for each of the phases, are bridge-connected for example. Each of the transistors UH, VH, and WH form a high side arm by a collector being connected to a secondary side positive terminal P102 of the first DC-DC converter 113. Each of the transistors UL, VL, and WL form a low side arm by an emitter being connected to a secondary side negative terminal N102 of the first DC-DC converter 113. For each phase, the emitter of each of the transistors UH, VH, and WH of the high side arm is connected to the collector of each of the transistors UL, VL, and WL of the low side arm. Between the collector and the emitter of each of the transistors UH, UL, VH, VL, WH, and WL, each of the diodes DUH, DUL, DVH, DVL, DWH, and DWL are connected, so that the direction from the emitter to the collector is the forward direction.

This drive motor inverter 115 is driven by a signal (PWM signal) which is pulse-width modulated (PWM). The signal is outputted from the control device 125 and is inputted to a gate of each of the transistors of the bridge circuit 151. For example, when the drive motor 122 is driven, the drive motor inverter 115 converts the direct-current power outputted from the power supply device 110 to a three phase alternating-current power, by switching over the on (conduction) and off (interruption) condition of each of the transistors forming a pair for each of the phases. By sequentially commutating the electric current to the three phase stator winding, the drive motor inverter 115 supplies a U phase electric current Iu, a V phase electric current Iv, and a W phase electric current Iw, all of which are an alternating-current, to the stator winding of each phase. Meanwhile, when the drive motor 122 is regenerated, for example, the drive motor inverter converts the three phase alternating-current power, outputted from the drive motor 122, to a direct-current power, supplies the direct-current power to the first DC-DC converter 113. Then, the drive motor inverter 115 charges the battery, and feeds power to a load connected to the first DC-DC converter 113.

The drive motor 122 is, for example, a three phase alternating-current synchronous motor of a permanent magnet type utilizing a permanent magnet as a field. This drive motor 122 is driven and controlled by a three phase alternating-current power supplied by the drive motor inverter 115. At the same time, when the drive power is transmitted from the drive wheel side to the driver motor 122 side while the vehicle is decelerating, the drive motor 122 functions as an electric generator. In this way, the drive motor 122 creates a so-called regenerative breaking force. Further, the drive motor 122 recovers the kinetic energy of the vehicle as an electric energy.

The second DC-DC converter 123 is, for example, a chopper type DC-DC converter. At least a part of the vehicle auxiliary machinery equipped on the fuel cell vehicle (for example, a processing device, a magnetic valve, and a 12 volt type load) is connected to the second DC-DC converter 123 as a load.

The second DC-DC converter 123 is connected to the first line L101 and the second line L102. This second DC-DC converter 123 depresses the electric voltage applied between the first line L101 and the second line L102, by a chopping movement according to a control command outputted from the control device 125, and supplies the electric voltage to the load connected to the second DC-DC converter 123.

The air conditioner 124 is included in at least a part of the vehicle auxiliary machinery equipped on the fuel cell vehicle. This air conditioner 124 includes, for example, a heater loaded on the fuel cell vehicle, a motor for a compressor, and a drive circuit (for example, an inverter).

The air conditioner 124 is connected to the first line L101 and the second line L102. Electric power is supplied from the first line L101 and the second line L102 to the air conditioner 124.

The control device 125 performs a duty control, controlling the switching duty of the first DC-DC converter 113. At the same time, the control device 125 controls the electric power conversion operation of the drive motor inverter 115.

The control device 125 receives an input of a detection signal outputted by, for example, a ground fault sensor 126 which is connected to the first line L101 and the third line L103 and detects the occurrence of a ground fault, an output current sensor 127 which detects an output current IFC of the fuel cell stack 111, a phase current sensor 128 which detects each of the three phase current between the drive motor inverter 115 and the drive motor 122, and an angle sensor 129 which detects a rotational angle of a rotator of the drive motor 122 (in other words, a rotational angle of the magnetic pole of the rotor from a predetermined standard rotational position, and a rotational position of the rotational axis of the drive motor 122).

The control device 125 includes, for example, a power consumption computation unit 161, a target electric current distribution unit 162, a target electric current setting unit 163, a duty controlling unit 164, and a drive motor controlling unit 165.

The power consumption computation unit 161 computes the total power consumption of the load (from example, the drive motor 122 and the air conditioner and the vehicle auxiliary device, which are loads outside of the power supply device 110, and the air pump inverter 114, which is a load inside of the power supply device 110) to which electric power is supplied from the power supply device 110.

When the drive motor 122 is driven, for example, the target electric power distribution setting unit 162 sets the electric power distribution of the fuel cell stack 111 and the battery 112 forming the battery circuit 110a of the power supply device 110, based on, for example, the condition of the fuel cell stack 111 (for instance, the rate of change of the condition of the fuel cell stack 111 according to a command for power generation) and the remaining capacity SOC of the battery 112. In other words, the target electric power distribution setting unit 62 sets the distribution when the total electric power consumption computed by the electric power consumption computation unit 161 is regarded as a value obtained by adding an electric power outputted by the fuel cell stack 111 and an electric power outputted by the battery 112.

For example, when the drive motor 122 is driven, the electric power distribution becomes a value corresponding to the switching duty of the first DC-DC converter 113 (in other words, the proportion of each of the transistors AH, BH, and CH of the high side arm in one cycle of the PWM signal that are turned on). The switching duty ("duty") can be expressed using the electric voltage of the fuel cell stack 111 ("VFC") and the electric voltage of the battery 112 ("VB"), as shown below.

$$duty = VFC/(VFC+VB)$$

From this equation, the ratio of the electric voltage of the fuel cell stack 111 ("VFC") and the electric voltage of the battery 112 ("VB") can be expressed, as shown below, using the switching duty ("duty").

$$VB/VFC = (1-duty)/duty$$

Figure 25:
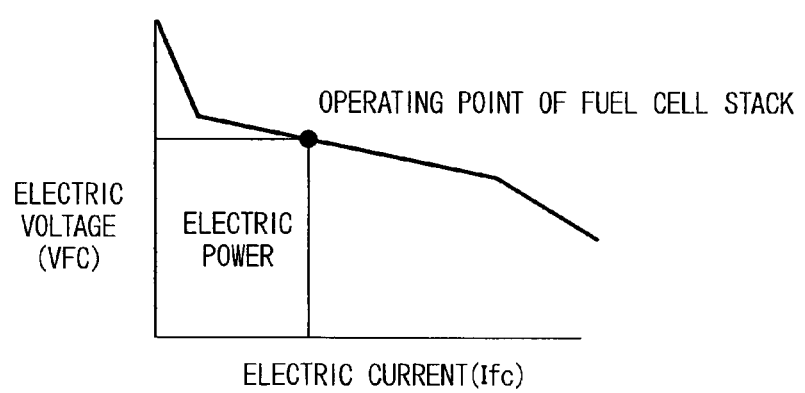
FIG. 25 shows an example of an operating point of a fuel cell stack according to the above embodiment.
Figure 26:
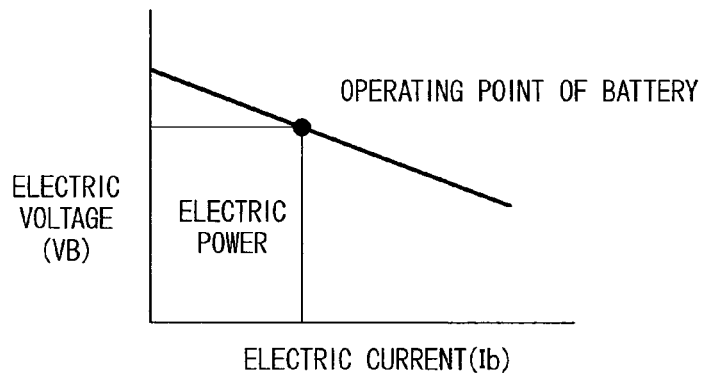
FIG. 26 shows an example of an operating point of a battery according to the above embodiment.

The electric voltage of the fuel cell stack 111 ("VFC") and the electric voltage of the battery 112 ("VB") are in a predetermined correspondence relationship with each of the electric current (output electric current Ifc) and the electric power of the fuel cell stack 111 as well as the electric current (Ib) and the electric power of the battery 112, as shown in FIGS. 25 and 26 for example. From this correspondence relationship, the ratio of the operating point of the fuel cell stack 111 (for example, the electric voltage or the electric current or the electric power) and the operating point of the battery 112 (for example, the electric voltage or the electric current or the electric power) is expressed using the switching duty ("duty").

When the drive motor 122 is regenerated, for example, the target electric power distribution setting unit 162 sets the electric power distribution of the electric power supplying side of the fuel cell stack 111 and the drive motor inverter 115, and also sets the electric power distribution of the electric power receiving side of the battery 112 and the load (for example, the air conditioner 124 and the vehicle auxiliary device and the air pump inverter 114), based on the condition of the fuel cell stack 111 (for instance, the rate of change of the condition of the fuel cell stack 111 according to a command for power generation) and the remaining capacity SOC of the battery 112, and the regenerative electric power of the drive motor 122, and the like.

Because the ratio of the operating point of the fuel cell stack 111 (for example, the electric voltage or the electric current or the electric power) and the operating point of the battery 112 (for example, the electric voltage or the electric current or the electric power) is expressed using the switching duty ("duty"), the target electric current setting unit 163 obtains the target electric current corresponding to the output electric current Ifc of the fuel cell stack 111, when the drive motor 122 is driven for example, by referring to a predetermined map representing the correspondence relationship between the operating point of the fuel cell stack 111, the operating point of the battery 112, the switching duty of the first DC-DC converter 113, and the total power consumption of the load.

Figure 27:
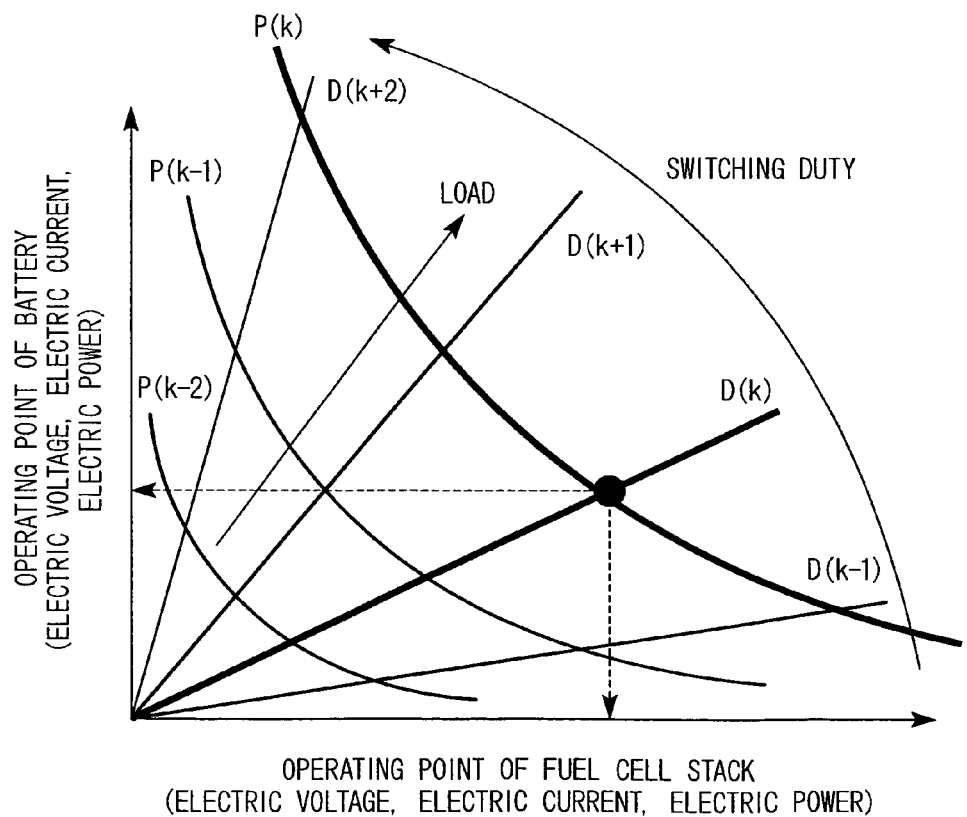
FIG. 27 shows an example of a predetermined map representing a correspondence relationship between an operating point of a fuel cell stack, an operating point of a battery, a switching duty of a first DC-DC converter, and a total power consumption of a load according to the above embodiment.

This predetermined map shows a correspondence relationship of the operating point of the fuel cell stack 111 and the operating point of the battery 112 which are set with respect to each of multiple values of the switching duty of the first DC-DC converter 113 (D(1), . . . , D(k), . . . ) on a two-dimensional coordinate in which the operating point of the fuel cell stack 111 and the operating point of the battery 112 are the orthogonal coordinates, as shown in FIG. 27, for example. In addition, the predetermined map shows the correspondence relationship between the operating point of the fuel cell stack 111 and the operating point of the battery 112 which are set with respect to each of the multiple values of the total power consumption of the load (P(1), . . . , P(k), . . . ).

Considering the correspondence relationship set for each of the multiple values of the switching duty of the first DC-DC converter 113, the operating point of the battery 112 is set to have a tendency to increase at a rate according to the switching duty, as the operating point of the fuel cell stack 111 increases.

Meanwhile, considering the correspondence relationship between the operating point of the fuel cell stack 111 and the operating point of the battery 112 which are set for each of the multiple values of the total consumption power of the load, a combination of the operating points is set so that the sum of the electric power corresponding to the operating point of the fuel cell stack 111 and the electric power corresponding to the operating point of the battery 112 equals the total consumption power of the load.

When, on a two-dimensional coordinate in which the operating point of the fuel cell stack 111 and the operating point of the battery 112 are the orthogonal coordinates, the operating point of the fuel cell stack 111 and the battery 112 is set to be the intersection between the correspondence relationship P(k) according to the total power consumption of the load computed by the consumption power computation unit 161 and the correspondence relationship D(k) according to the switching duty of the first DC-DC converter 113 according to the electric power distribution set by the target electric power distribution unit 162, the target electric current setting unit 163 outputs the electric current (output current Ifc) of the fuel cell stack 111 corresponding to this operating point, as the target electric current.

In addition, when the drive motor 122 is regenerated, for example, the target electric current setting unit 163 outputs zero or a positive value as the target electric current of the electric current (output current Ifc) of the fuel cell stack 111 according to the electric power distribution set by the target electric power distribution setting unit 162.

The duty controlling unit 164 controls the switching duty of the first DC-DC converter 113, so that the actual electric power distribution of the fuel cell stack 111 and the battery 112 equals the electric power distribution (target electric power distribution) set by the target electric power distribution setting unit 162. For example, the duty controlling unit 164 controls the switching duty of the first DC-DC converter 113 so that, the detected value of the output current IFC of the fuel cell stack 111 outputted by the output current sensor 127 equals the target electric current of the fuel cell stack 111 outputted by the target electric current setting unit 163 (the output current Ifc).

This duty controlling unit 164 includes, for example, an electric current deviation computation unit 171, a feedback processing unit 172, and a PWM signal generation unit 173.

The electric current deviation computation unit 171 computes and outputs the electric current deviation between the detected value of the output current IFC of the fuel cell stack 111 outputted from the output current sensor 127 and the target electric current of the fuel cell stack 111 (the output current Ifc) outputted from the target electric current setting unit 163.

The feedback processing unit 172 computes an electric voltage command value by controlling and amplifying the electric current deviation outputted by the electric current deviation computation unit 171 through, for example, a PID (Proportional Integral Derivative) operation.

In order to output an output current Ifc from the fuel cell stack 111 corresponding to the electric voltage command value outputted from the feedback processing unit 172, the PWM signal creation unit 173 creates and outputs a gate signal (namely, a PWM signal) that turns on and off each of the transistors AH, BH, and CH of the high side arm of the first DC-DC converter 113 as well as each of the transistors AL, BL, and CL of the low side arm.

While the drive motor 122 is driven, for example, the drive motor controlling unit 165 performs a feed back control (a vector control) of the electric current on a dq-coordinate system in the form of a rotating orthogonal coordinate. This drive motor controlling unit 165 computes a target d-axis electric current and a target q-axis electric current according to a torque command based on a driver's accelerating operation and the number of rotations of the drive motor 122. Then, the drive motor controlling unit 165 computes each of the three phase output electric voltage Vu, Vv, and Vw based on the target d-axis electric current and the target q-axis electric current. Further, the drive motor controlling unit 165 inputs a PWM signal, which is a gate signal, to the bridge circuit 151 of the drive motor inverter 115 according to each phase of the output electric voltage Vu, Vv, and Vw. At the same time, the drive motor controlling unit 165 performs a control so that the deviation between the d-axis electric current and the q-axis electric current obtained by converting the detected values of each phase of the electric current Iu, Iv, and Iw, actually supplied by the F-drive motor inverter 115 to the drive motor 122, to the dq-coordinate system, and the deviation between the target d-axis electric current and the target q-axis electric current equal zero.

In addition, when the drive motor 122 is regenerated, for example, the drive motor controlling unit 165 turns on and off, each of the transistors of the bridge circuit 151 of the drive motor inverter 115 according to a pulse synchronized based on the output waveform of the rotational angle θm of the rotator of the drive motor 122 outputted by the angle sensor 129. The three-phase alternating-current power outputted from the drive motor controlling unit 165 is converted to a direct-current power. At this time, the drive motor controlling unit 165 performs a feedback control of the regenerative electric voltage according to the duty of the gate signal that turns each of the transistors of the bridge circuit 151 on and off. The drive motor controlling unit 165 outputs a predetermined electric voltage value to a primary side of the drive motor inverter 115, in other words, between the secondary side positive terminal P102 of the first DC-DC converter 113 and the secondary side negative terminal N102.

In other words, when the drive motor 122 is driven, for example, the control device 125 performs a feedback control so that the detected value of the electric current (the output electric current Ifc) of the fuel cell stack 111 equals the target electric current. Thus, the control device 125 controls the switching duty of the first DC-DC converter 113. This control device 125 continuously controls the operating mode of the power supply device 110 as shown in FIG. 28, for example.

When, for example, the boosting ratio of the first DC-DC converter 113 approximately equals 2 to 3, the operating mode of the power supply device 110 that maximizes the switching duty is an EV mode in which only the output by the battery 112 is supplied to the drive motor inverter 115 and the air pump inverter 114.

As the switching duty tends to decline from the EV mode, the operating mode of the power supply device 110 shifts sequentially from a first (FC+battery) mode to a second (FC+battery) mode to a third (FC+battery) mode. In the first mode, the output of the battery 112 is supplied to the drive motor inverter 115 and the air pump inverter 114. At the same time, in the first mode, the output of the fuel cell stack 111 is supplied to the drive motor inverter 115, and the electric current (Ib) of the battery 112 becomes larger than the electric current (output current Ifc) of the fuel cell stack 111. In the second mode, the output of the battery 112 is supplied to the drive motor inverter 115 and the air pump inverter 114. At the same time, in the second mode, the output of the fuel cell stack 111 is supplied to the drive motor inverter 115, and the electric current (Ib) of the battery 112 becomes equal to the sum of the electric current (output current Ifc) of the fuel cell stack 111 and the electric current (IAP) flowing through the air pump inverter 114. In the third mode, the output of the battery 112 and the fuel cell stack 111 is supplied to the drive motor inverter 115 and the air pump inverter 114, and the electric current (Ib) of the battery 112 becomes smaller than the electric current (output current Ifc) of the fuel cell stack 111.

Figure 28:
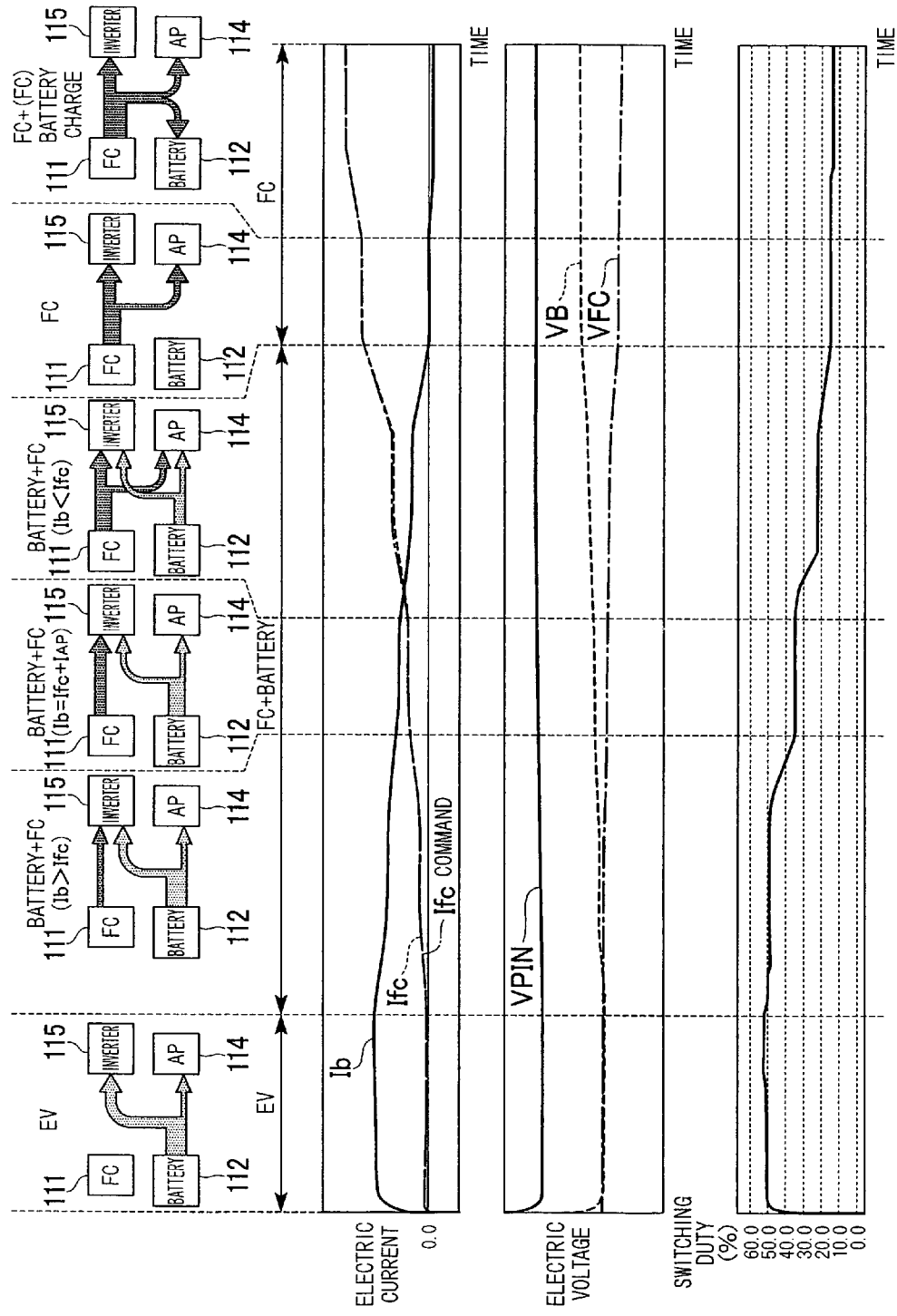
FIG. 28 shows an example of a change in an electric current and an electric voltage of a fuel cell stack and a battery, a change in an operation mode of a power supply device, corresponding to a change in a switching duty of a first DC-DC converter when a drive motor is driven according to the above embodiment.

Accordingly, the electric current (Ib) of the battery 112 tends to decline, as shown in FIG. 28 for example. In addition, the electric current (output current Ifc) of the fuel cell stack 111 and the target electric current (the Ifc command) tend to increase. The input electric voltage (VPIN) of the primary side of the drive motor inverter 115 is maintained to be approximately constant. At the same time, the electric voltage of the battery 112 (VB) tends to increase, while the electric voltage of the fuel cell stack 111 (VFC) tends to decrease.

Further, as the switching duty tends to decline to a minimum value from the third (FC+battery) mode, the operating mode of the power supply device 110 shifts to the first FC mode and the second FC mode, in sequence. In the first FC mode, only the output of the fuel cell stack 111 is supplied to the drive motor inverter 115 and the air pump inverter 14. In the second FC mode, only the output of the fuel cell stack 111 is supplied to the drive motor inverter 115, the air pump inverter 114, and the battery 112, therefore charging the battery 112.

Accordingly, the electric current (Ib) of the battery 112 tends to decrease from zero to a negative value as shown in FIG. 28 for example. Meanwhile, the electric current (the output current Ifc) of the fuel cell stack 111 and the target electric current (the Ifc command) tend to increase. In addition, the input electric voltage (VPIN) of the primary side of the drive motor inverter 115 is maintained to be approximately constant. The electric voltage of the battery 112 (VB) tends to increase. On the other hand, the electric voltage of the fuel cell stack 111 (VFC) tends to decrease.

When the drive motor 122 is regenerated, for example, the control device 125 performs a feedback control so that the detected value of the electric current of the fuel cell stack 111 (the output current Ifc) equals the target electric current (either zero or a positive value). This control device 125 controls the switching duty of the first DC-DC converter 113 by performing a feedback control of the regenerative electric voltage.

For example, the operating mode of the power supply device 110 in which the target of the electric current of the fuel cell stack 111 (the output current Ifc) equals zero is the regenerative mode in which the battery 112 is charged by the regenerative electric power of the drive motor inverter 115.

Meanwhile, the operating mode of the power supply device 110 in which the target of the electric current of the fuel cell stack 111 (the output current Ifc) equals a positive value, for example, is a (regenerative+battery charging by the FC) mode in which the regenerative electric power of the drive motor inverter 115 and the output of the fuel cell stack 111 are supplied to the air pump inverter 114 and the battery 112, and the battery 112 is charged.

The control device 125 outputs a command value regarding the pressure and the flux of the reactive gas supplied to the fuel cell stack 111, as a command to the fuel cell stack 111 to generate electric power, the output of the command value being based on, for example, the condition in which the fuel cell vehicle is driven, the concentration of hydrogen included in the reactive gas supplied to the anode of the fuel cell stack 111, the concentration of hydrogen included in the discharge gas emitted from the anode of the fuel cell stack 111, the condition in which the fuel cell stack 111 is generating electric power, the electric voltage between the terminals of each of the plurality of fuel cells, the electric voltage VFC of the fuel cell stack 111, the output current Ifc of the fuel cell stack 111, and the internal temperature of the fuel cell stack 111. In this way, the control device 125 controls the condition in which the fuel cell stack 111 generates electric power.

The control device 125 switches over the on and off conditions of the contactor 111a according to the condition in which the fuel cell stack 111 is generating electric power. In addition, the control device 125 controls the connection between the fuel cell stack 111, the second line L102, and the third line L103.

The control device 125 also switches over the on and off conditions of the contactor 112a and the current limiting circuit 112b according to the remaining capacity SOC of the battery 112, for example. Thus, the control device 125 controls the connection between the battery 112 and the first line L101 and the second line L102.

As described above, according to the power supply device 110 based on the above embodiment of the present invention, a plurality of operating modes can be switched over merely by providing a single first DC-DC converter 113 with respect to the battery circuit 110a in which the fuel cell stack 111 and the battery 112 are connected in series. Compared to the case in which a DC-DC converter is equipped individually for each of the fuel cell stack 111 and the battery 112, for example, it is possible to lower the cost necessary for configuration and reduce the size.

Further, according to the power supply system 120 of the fuel cell vehicle based on the above embodiment of the present invention, the cost necessary for configuring the power supply device 110 can be lowered, and the size of the power supply device 110 can be reduced, by providing a single first DC-DC converter 113. Because the fuel cell stack 111 and the battery 112 are connected in series, the operating electric voltage of the drive motor inverter 115 can be augmented, and the electric current can be reduced, compared to the case in which the fuel cell stack 111 and the battery 112 are connected in parallel. In this way, the size of the drive motor 122 and the drive motor inverter 115 can be reduced. At the same time the operating efficiency can be enhanced. Therefore, the cost necessary for configuring the power supply system 120 of the fuel cell vehicle can be lowered, and the size can be reduced.

Further, even though the condition of the first DC-DC converter 113 is abnormal (for example, when an open failure occurs), electric power can be supplied from the battery circuit 110a to the drive motor inverter 115. In particular, by outputting from the fuel cell stack 111, it is possible to run the fuel cell vehicle for a relatively longer period of time compared to the case in which an output is made from the battery 112.

Figure 29:
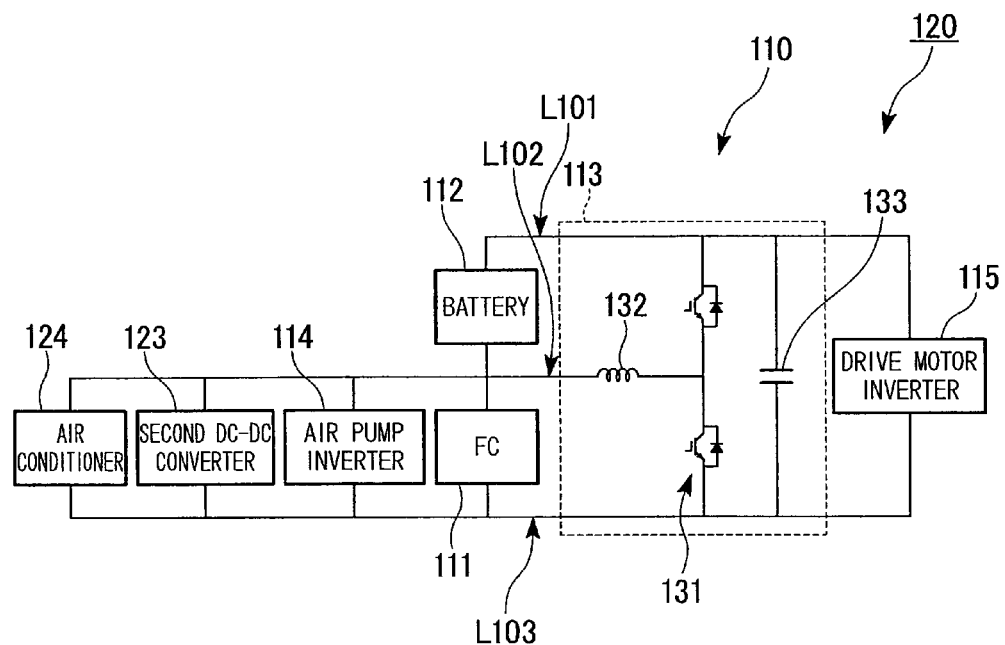
FIG. 29 is a configuration diagram of a power supply system of a fuel cell vehicle according to a second variation of the above embodiment.
Figure 30:
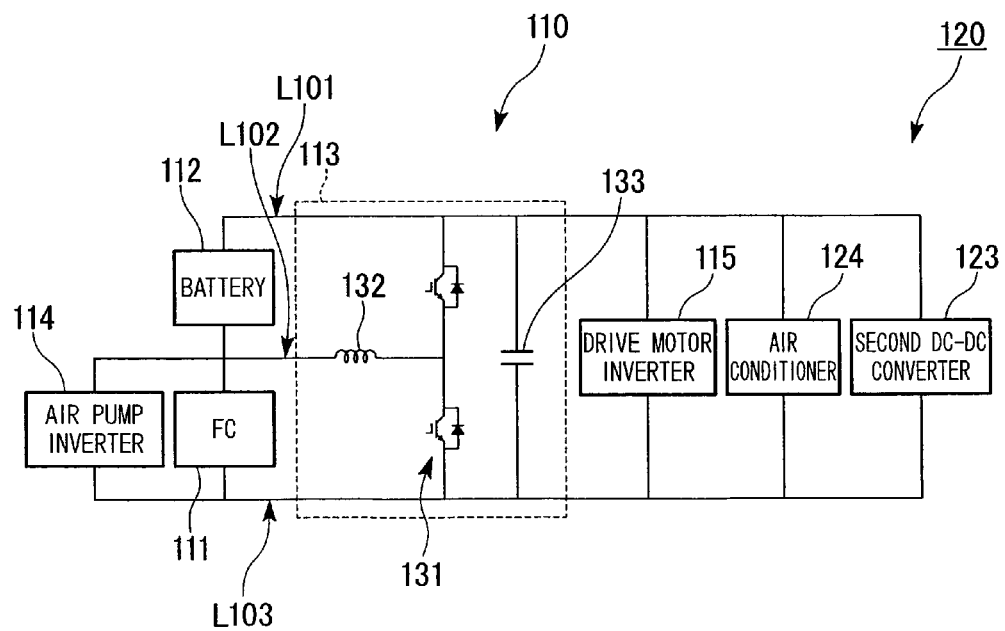
FIG. 30 is a configuration diagram of a power supply system of a fuel cell vehicle according to a third variation of the above embodiment.

According to the above embodiment, at least a portion of the vehicle auxiliary machinery equipped on the fuel cell vehicle (for example, an air conditioner 124 separate from the second DC-DC converter 123, and a load connected to the second DC-DC converter 123 (a processing device, a magnetic valve, and a 12 volt type load)) is connected to the first line L101 and the second line L102 either directly or through the second DC-DC converter 123. However, the present invention is not limited to this configuration. For example, as shown in FIG. 29, at least a part of the vehicle auxiliary machinery can be connected to the second line L102 and the third line L103. In addition, as shown in FIG. 30, at least a part of the vehicle auxiliary machinery can be connected to the first line L101 and the third line L103.

According to the above configuration, the air pump inverter 114, being a drive circuit of the air pump 121, is connected to the second line L102 and the third line L103. However, the present invention is not limited to this configuration. The drive circuit of at least one of a pump that supplies reactive gas to the fuel cell stack 111 (for example, the air pump 121) and a pump that supplies a refrigerant (not diagramed) can be connected to the second line L102 and the third line L103.

According to the above embodiment, the first DC-DC converter 113, alternately switches over between a condition in which each of the transistors AH, BH, and CH of the high side arm are turned off and each of the transistors AL, BL, and CL of the low side arm are turned on, and a condition in which each of the transistors AH, BH, and CH of the high side arm are turned on and each of the transistors AL, BL, and CL of the low side arm are turned off. However, the present invention is not limited to this configuration. For example, during a boosting operation from the primary side to the secondary side when the drive motor 122 is driven, each of the transistors AL, BL, and CL of the low side arm can alternately be switched on and off while each of the transistors AH, BH, and CH of the high side arm are turned off. As another example, during a regenerative operation from the secondary side to the primary side when the drive motor 122 is regenerated, each of the transistors AH, BH, and CH of the high side arm can be alternately switched on and off while each of the transistors AL, BL, and CL of the low side arm are turned off.

Below, a description of a power supply device and a power supply system for a fuel cell vehicle according to a third embodiment of the present invention is provided with reference to FIGS. 31 to 41.

Figure 31:
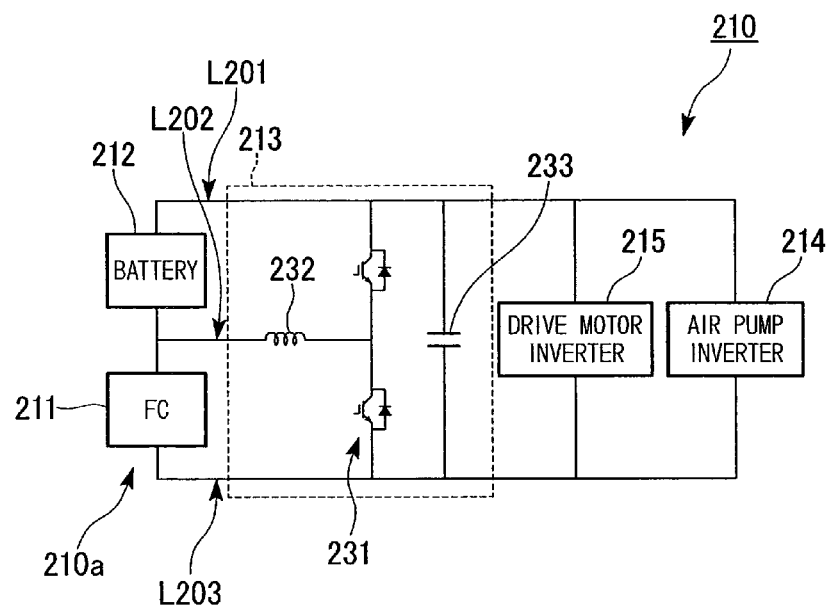
FIG. 31 is a configuration diagram of a power supply device according to a third embodiment of the present invention.

A power supply device 210 according to the present embodiment includes a fuel cell stack (FC) 211, a battery 212, a first DC-DC converter 213, and an air pump inverter 214, as shown in FIG. 31 for example. The power supply device 210 is connected to a drive motor inverter 215, for example.

Figure 32:
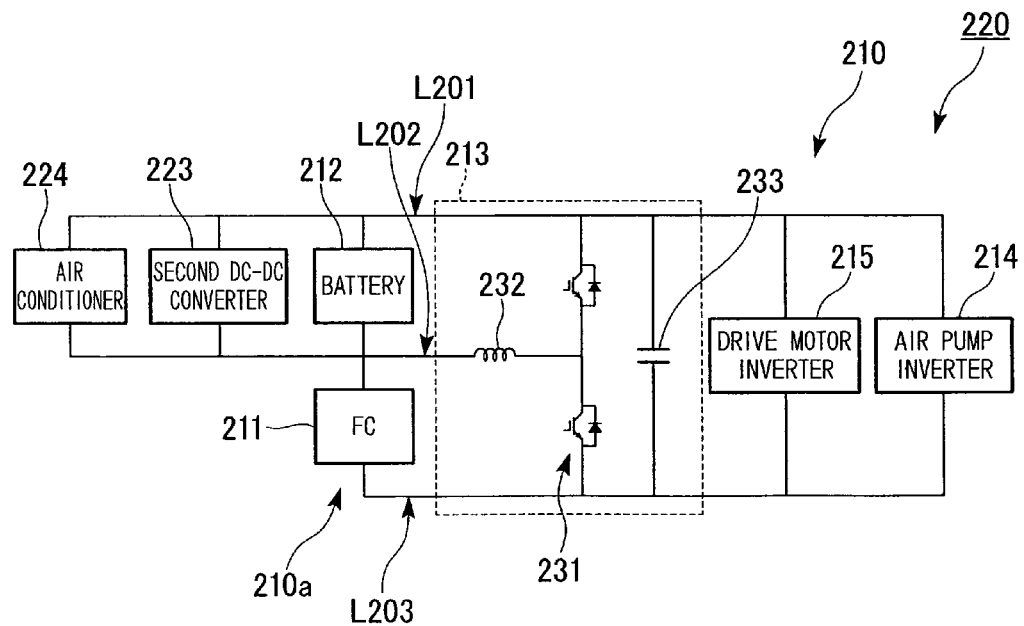
FIG. 32 is a configuration diagram of a power supply system for a fuel cell vehicle according to the above embodiment.
Figure 33:
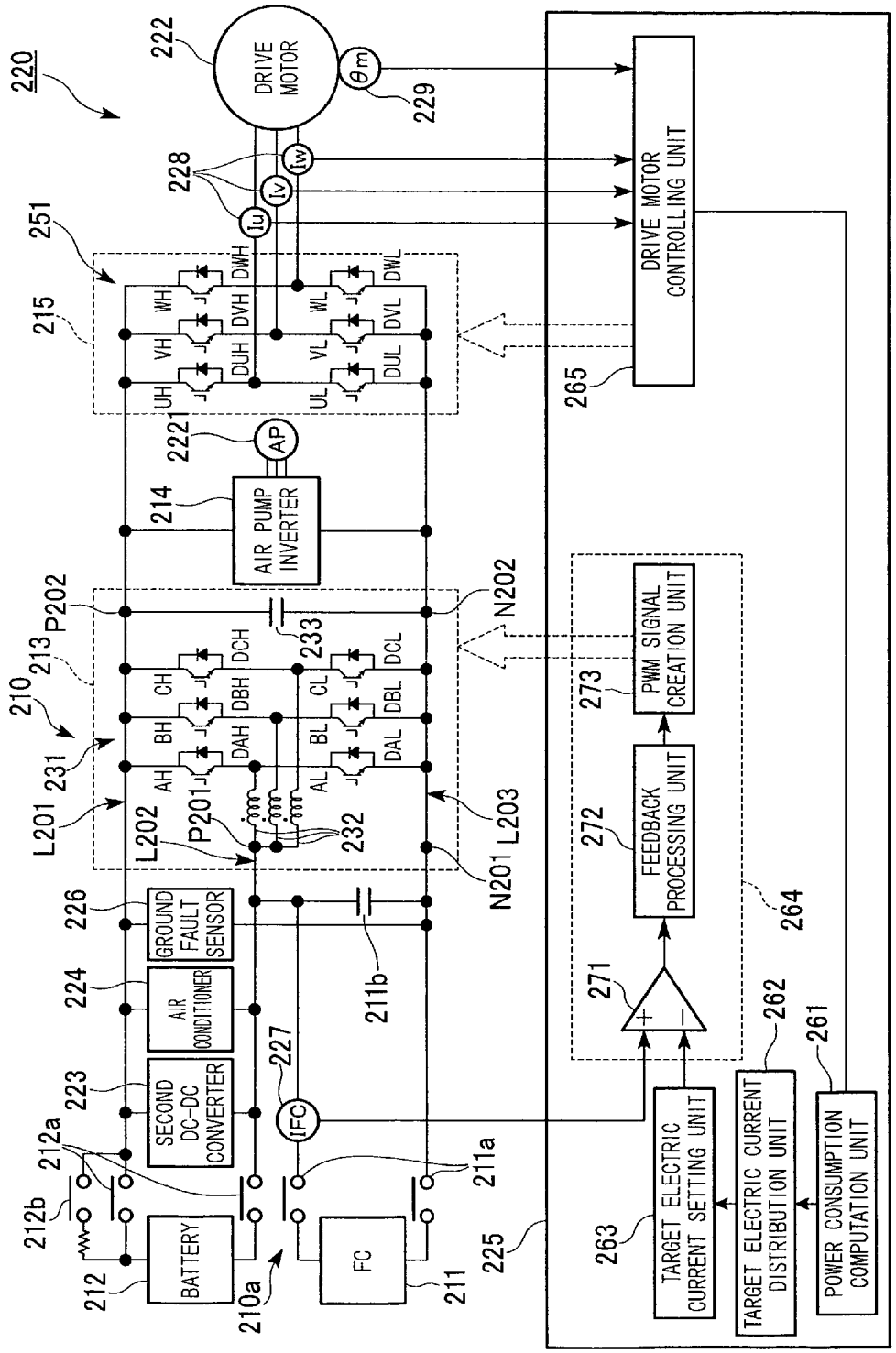
FIG. 33 is a configuration diagram of a power supply system for a fuel cell vehicle according to the above embodiment.

The power supply device 210 is provided in a power supply system 220 for a fuel cell vehicle, for example. This power supply system 220 for the fuel cell vehicle includes the power supply device 210, an air pump (AP) 221, a drive motor 222, a second DC-DC converter 223, an air conditioner 224, a control device 225, a ground fault sensor 226, an output current sensor 227, a phase current sensor 228, and an angle sensor 229, as shown in FIGS. 32 and 33 for example.

The fuel cell stack 211 is formed by layering multiple fuel cells including a solid polymer electrolyte membrane comprising a cation exchange membrane and the like, the solid polymer electrolyte membrane being held by a fuel electrode (anode) including an anode catalyst and a gas diffusion layer, and an oxygen electrode (cathode) including a cathode catalyst and a gas diffusion layer, the solid polymer electrolyte membrane and the anode and the cathode thus forming an electrolytic electrode structure, the electrolytic electrode structure further being held by a pair of separators. The laminated body of the fuel cell is sandwiched by a pair of end plates from both sides of the direction in which the layers are formed.

Air is supplied to the cathode of the fuel cell stack 211 from the air pump 221, the air being an oxidant gas (reactant gas) including oxygen. A fuel gas (reactant gas) including hydrogen is supplied to the anode from a high-pressure hydrogen tank (not diagramed), for example.

The hydrogen is ionized by the catalytic reaction with the anode catalyst at the anode and moves to the cathode through a reasonably humidified solid polymer electrolyte membrane. An electron is generated while the hydrogen moves, and the electron is extracted by the external circuit, and is utilized as an electric energy of the direct current. At this time, the hydrogen ion, the electron, and oxygen react at the cathode, forming water.

Here, the air pump 221 brings in air from outside the vehicle and compresses the air, for example. The air pump 221 supplies this air to the cathode of the fuel cell stack 211 as reactive gas. The number of rotations of a motor (not diagramed) driving this air pump 221 is controlled by the air pump inverter 214 according to a control command outputted by the control device 225. The air pump inverter 214 includes, for example, a PWM inverter based on a pulse width modulation (PWM).

As an alternative to the battery 212, the power supply device 210 can include, for example, a capacitor as an electric storage device, the capacitor including an electric double layer capacitor or an electrolytic capacitor.

The first DC-DC converter 213 is, for example, a chopper type DC-DC converter. As shown in FIG. 33, this first DC-DC converter 213 includes a bridge circuit 231 with three phases, a choke coil 232 with three phases, and a smoothing capacitor 233. The above bridge circuit 31 comprises a plurality of switching elements (for example, an IGBT: Insulated Gate Bipolar Mode Transistor) which are bridge-connected.

The first DC-DC converter 213 is shown in FIGS. 31 and 32 in simplified form. Thus, among the three phases, only one phase of the switching element and the choke coil 232 is shown in FIGS. 31 and 32.

The bridge circuit 231 is same as a three-phase bridge circuit 251 forming the drive motor inverter 215 described later. In the bridge circuit 231, a high-side and a low-side first transistor AH and AL, a high-side and a low-side second transistor BH and BL, and a high-side and a low-side third transistor CH and CL, which form a pair for each of the phases, are bridge-connected. Each of the transistors AH, BH, and CH form a high side arm by a collector being connected to a secondary side positive terminal P202. Each of the transistors AL, BL, and CL form a low side arm by an emitter being connected to a secondary side negative terminal N202. For each phase, the emitter of each of the transistors AH, BH, and CH of the high side arm is connected to the collector of each of the transistors AL, BL, and CL of the low side arm. Between the collector and the emitter of each of the transistors AH, AL, BH, BL, CH, and CL, each of the diodes DAH, DAL, DBH, DBL, DCH, and DCL are connected, so that the direction from the emitter to the collector is the forward direction.

This bridge circuit 231 is driven by a signal (PWM signal) which is pulse-width modulated (PWM), the signal being outputted from the control device 225 and inputted to a gate of each of the transistors. A condition in which each of the transistors AH, BH, and CH of the high side arm are turned on and each of the transistors AL, BL, and CL of the low side arm are turned off, and another condition in which each of the transistors AH, BH, and CH of the high side arm are turned off and each of the transistors AL, BL, and CL of the low side arm are turned on, are switched over in alternation.

The smoothing capacitor 233 is connected to the secondary side positive terminal P202 and the secondary side negative terminal N202.

Regarding the three-phase choke coil 232, an end of each of the choke coil 232 is connected between the collector and the emitter of each of the phases of the bridge circuit 231. In other words, the end of each of the choke coil 232 is connected, respectively, between the collector and the emitter of each of the transistors AH and AL, between the collector and emitter of each of the transistors BH and BL, and between the collector and emitter of each of the transistors CH and CL. The other side of each of the choke coil 232 is connected mutually to the primary side positive terminal P201.

Figure 34:
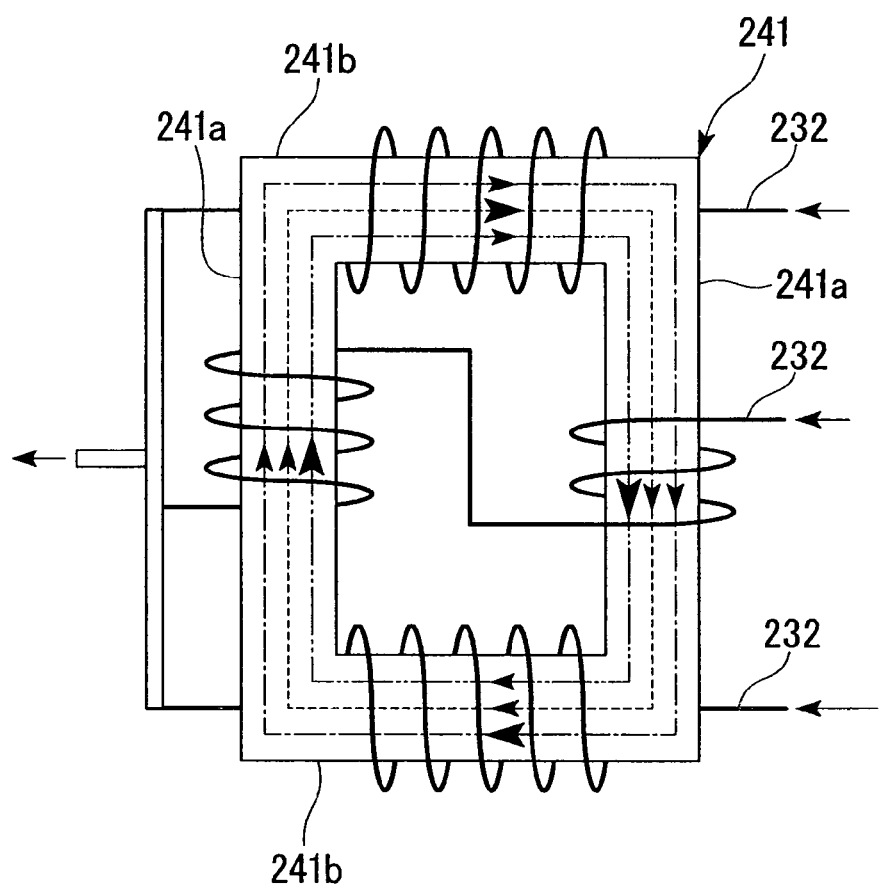
FIG. 34 is a configuration diagram of a choke coil with three phases according to the above embodiment.

The three-phase choke coil 232 is formed by wrapping around a single rectangular core 241 in common mode, as shown in FIG. 34 for example. This choke coil 232 is set so that the direction of the magnetic flux, generated by each of the choke coil 232 while electricity is supplied, is in the same direction.

One phase of the three-phase choke coil 232 is dispersed and wrapped around a pair of opposite sides 241a which is one of the two pairs of opposite sides forming the rectangular core 241. The other two phases of the three-phase choke coil 232 is concentrated and wrapped around the other pair of opposite sides 241b among the two pairs of opposite sides forming the rectangular core 241.

Figure 35:
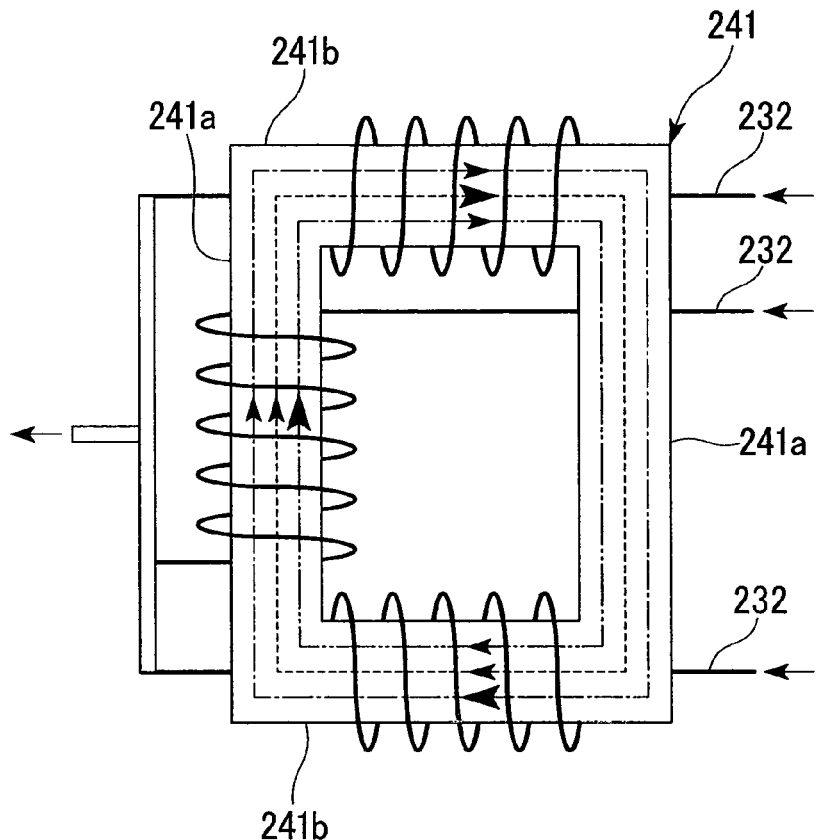
FIG. 35 is a configuration diagram of a choke coil with three phases according to a first variation of the above embodiment.

Each of the three-phase choke coil 232 can be concentrated and wrapped around three sides of the four sides forming the rectangular core 241, as shown in FIG. 35 for example. Further, each of the three-phase choke coil 232 can have a different winding structure.

With respect to three lines L201, L202, and L203, each having a different electric potential from one another (for example, electric potential of L201>electric potential of L202>electric potential of L203), a primary side of the first DC-DC converter 213 is connected to the second line L202 and the third line L203. The secondary side of the DC-DC converter 213 is connected to the first line L201 and the third line L203. In other words, the first line L201 is connected to the secondary side positive terminal P202, the second line L202 is connected to the primary side positive terminal P201, and the third line L203 is connected to the primary side negative terminal N201 and the secondary side negative terminal N202.

Concerning this first DC-DC converter 213, when a boost operation is performed from the primary side to the secondary side, at the time the drive motor 222 is driven for example, each of the transistors AH, BH, and CH of the high side arm are first turned off. At the same time, each of the transistors AL, BL, and CL of the low side arm are turned on. Due to the electric current flowing from the primary side, the choke coil 232 undergoes a direct current energization, and magnetic energy is accumulated.

Then, each of the transistors AH, BH, and CH of the high side arm are turned on. At the same time, each of the transistors AL, BL, and CL of the low side arm are turned off. While preventing a change in the magnetic flux due to the interruption of the electric current flowing through the choke coil 232, an induced voltage is generated between both ends of the choke coil 232. The induced voltage, generated by magnetic energy accumulated in the choke coil 232, is added to the input voltage in the primary side. In this way, a boosting voltage, higher than the input voltage in the primary side, is applied to the secondary side. The fluctuation in voltage, generated during this switchover operation, is smoothed by the smoothing capacitor 233. In addition, a boosting voltage is outputted from the secondary side.

On the other hand, during a regenerating operation from the secondary side to the primary side when the drive motor 222 is regenerated for example, each of the transistors AH, BH, and CH of the high side arm are first turned off. At the same time, each of the transistors AL, BL, and CL of the low side arm are turned on. The choke coil 232 undergoes a direct-current energization by the electric current inputted from the secondary side, and magnetic energy is accumulated.

Then, each of the transistors AH, BH, and CH of the high side arm are turned on. At the same time, each of the transistors AL, BL, and CL of the low side arm are turned off. While preventing a change in the magnetic flux due to the blockage of the electric current flowing through the choke coil 232, an induced voltage is generated between both ends of the choke coil 232. The induced voltage, generated by the magnetic energy accumulated in the choke coil 232, becomes a depressed voltage generated by stepping down the input voltage of the secondary side according to the on/off ratio of each of the transistors AH, BH, and CH of the high side arm. In this way, a depressed voltage is applied to the primary side.

The first DC-DC converter 213 is driven by a signal (PWM signal) which is pulse-width modulated (PWM), the signal being outputted from the control device 225 and inputted to a gate of each of the transistors. The first DC-DC converter 213 switches over the on/off condition of each of the transistors AH, BH, and CH of the high side arm and each of the transistors AL, BL, and CL of the low side arm, according to a switching duty defined, for example, as a ratio of each of the transistors AH, BH, and CH of the high side arm that are turned on during one cycle of the PWM signal.

Incidentally, each of the transistors AH, BH, and CH of the high side arm and each of the transistors AL, BL, and CL of the low side arm are prohibited from being simultaneously turned on when the on/off condition is switched over. An appropriate dead time is provided during which each of the above transistors can be simultaneously turned off.

The fuel cell stack 211 is connected to the second line L202 and the third line L203 through a contactor 211a and a capacitor 211b placed in the positive electrode side and the negative electrode side. The battery 212 is connected to the first line L201 and the second line L202 through a contactor 212a placed in the positive electrode side and the negative electrode side, and through a current limiting circuit 212b placed in the positive electrode side. Therefore, the fuel cell stack 211 and the battery 212 are connected in series between the first line L201 and the third line L203. The fuel cell stack 211 and the battery 212 are thus included in the battery circuit 210a.

While electric power is outputted from the first line L201 and the third line L203 to a load (for example, the drive motor 222), the first line L201 and the third line L203 are connected to the drive motor inverter 215.

The air pump inverter 214 is connected to the first line L201 and the third line L203. This air pump inverter 214 is a drive circuit of the air pump 221.

The drive motor inverter 215, comprising a drive circuit of the three-phase drive motor 222, is a PWM inverter with a pulse-width modulation (PWM). This drive motor inverter 215 includes a three-phase bridge circuit 251 comprising a plurality of switching elements (for example, an IGBT: Insulated Gate Bipolar Mode Transistor) which are bridge-connected.

The bridge circuit 251 is same as a three-phase bridge circuit 231 forming the first DC-DC converter 213. In the bridge circuit 251, a high-side and a low-side U-phase transistor UH and UL, a high-side and a low-side V-phase transistor VH and VL, and a high-side and a low-side W-phase transistor WH and WL, which form a pair for each of the phases, are bridge-connected for example. Each of the transistors UH, VH, and WH form a high side arm by a collector being connected to a secondary side positive terminal P202 of the first DC-DC converter 213. Each of the transistors UL, VL, and WL form a low side arm by an emitter being connected to a secondary side negative terminal N202 of the first DC-DC converter 213. For each phase, the emitter of each of the transistors UH, VH, and WH of the high side arm is connected to the collector of each of the transistors UL, VL, and WL of the low side arm. Between the collector and the emitter of each of the transistors UH, UL, VH, VL, WH, and WL, each of the diodes DUH, DUL, DVH, DVL, DWH, and DWL are connected, so that the direction from the emitter to the collector is the forward direction.

This drive motor inverter 215 is driven by a signal (PWM signal) which is pulse-width modulated (PWM). The signal is outputted from the control device 225 and is inputted to a gate of each of the transistors of the bridge circuit 251. For example, when the drive motor 222 is driven, the drive motor inverter 215 converts the direct-current power outputted from the power supply device 210 to a three phase alternating-current power, by switching over the on (conduction) and off (interruption) condition of each of the transistors forming a pair for each of the phases. By sequentially commutating the electric current to the three phase stator winding, the drive motor inverter 215 supplies a U phase electric current Iu, a V phase electric current Iv, and a W phase electric current Iw, all of which are an alternating-current, to the stator winding of each phase. Meanwhile, when the drive motor 222 is regenerated, for example, the drive motor inverter converts the three phase alternating-current power, outputted from the drive motor 222, to a direct-current power, supplies the direct-current power to the first DC-DC converter 213. Then, the drive motor inverter 215 charges the battery, and feeds power to a load connected to the first DC-DC converter 213.

The drive motor 222 is, for example, a three phase alternating-current synchronous motor of a permanent magnet type utilizing a permanent magnet as a field. This drive motor 222 is driven and controlled by a three phase alternating-current power supplied by the drive motor inverter 215. At the same time, when the drive power is transmitted from the drive wheel side to the driver motor 222 side while the vehicle is decelerating, the drive motor 222 functions as an electric generator. In this way, the drive motor 222 creates a so-called regenerative breaking force. Further, the drive motor 222 recovers the kinetic energy of the vehicle as an electric energy.

The second DC-DC converter 223 is, for example, a chopper type DC-DC converter. At least a part of the vehicle auxiliary machinery equipped on the fuel cell vehicle (for example, a processing device, a magnetic valve, and a 12 volt type load) is connected to the second DC-DC converter 223 as a load.

The second DC-DC converter 223 is connected to the first line L201 and the second line L202. This second DC-DC converter 223 depresses the electric voltage applied between the first line L201 and the second line L202, by a chopping movement according to a control command outputted from the control device 225, and supplies the electric voltage to the load connected to the second DC-DC converter 223.

The air conditioner 224 is included in at least a part of the vehicle auxiliary machinery equipped on the fuel cell vehicle. This air conditioner 224 includes, for example, a heater loaded on the fuel cell vehicle, a motor for a compressor, and a drive circuit (for example, an inverter).

The air conditioner 224 is connected to the first line L201 and the second line L202. Electric power is supplied from the first line L201 and the second line L202 to the air conditioner 224.

The control device 225 performs a duty control, controlling the switching duty of the first DC-DC converter 213. At the same time, the control device 225 controls the electric power conversion operation of the drive motor inverter 215.

The control device 225 receives an input of a detection signal outputted by, for example, a ground fault sensor 226 which is connected to the first line L201 and the third line L203 and detects the occurrence of a ground fault, an output current sensor 227 which detects an output current IFC of the fuel cell stack 211, a phase current sensor 228 which detects each of the three phase current between the drive motor inverter 215 and the drive motor 222, and an angle sensor 229 which detects a rotational angle of a rotator of the drive motor 222 (in other words, a rotational angle of the magnetic pole of the rotor from a predetermined standard rotational position, and a rotational position of the rotational axis of the drive motor 222).

The control device 225 includes, for example, a power consumption computation unit 261, a target electric current distribution unit 262, a target electric current setting unit 263, a duty controlling unit 264, and a drive motor controlling unit 265.

The power consumption computation unit 261 computes the total power consumption of the load (from example, the drive motor 222 and the air conditioner 224 and the vehicle auxiliary device, which are loads outside of the power supply device 210, and the air pump inverter 214, which is a load inside of the power supply device 210) to which electric power is supplied from the power supply device 210.

When the drive motor 222 is driven, for example, the target electric power distribution setting unit 262 sets the electric power distribution of the fuel cell stack 211 and the battery 212 forming the battery circuit 210a of the power supply device 210, based on, for example, the condition of the fuel cell stack (for instance, the rate of change of the condition of the fuel cell stack 211 according to a command for power generation) and the remaining capacity SOC of the battery 212. In other words, the target electric power distribution setting unit 262 sets the distribution when the total electric power consumption computed by the electric power consumption computation unit 261 is a value obtained by adding an electric power outputted by the fuel cell stack 211 and an electric power outputted by the battery 212.

For example, when the drive motor 222 is driven, the electric power distribution becomes a value corresponding to the switching duty of the first DC-DC converter 213 (in other words, the proportion of each of the transistors AH, BH, and CH of the high side arm in one cycle of the PWM signal that are turned on). The switching duty ("duty") can be expressed using the electric voltage of the fuel cell stack 211 ("VFC") and the electric voltage of the battery 212 ("VB"), as shown below.

$$duty = VFC/(VFC+VB)$$

From this equation, the ratio of the electric voltage of the fuel cell stack 211 ("VFC") and the electric voltage of the battery 212 ("VB") can be expressed, as shown below, using the switching duty ("duty").

$$VB/VFC = (1-duty)/duty$$

Figure 36:
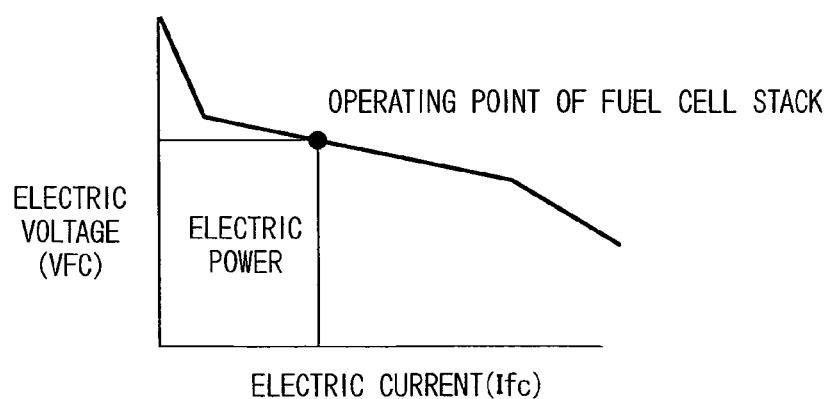
FIG. 36 shows an example of an operating point of a fuel cell stack according to the above embodiment.
Figure 37:
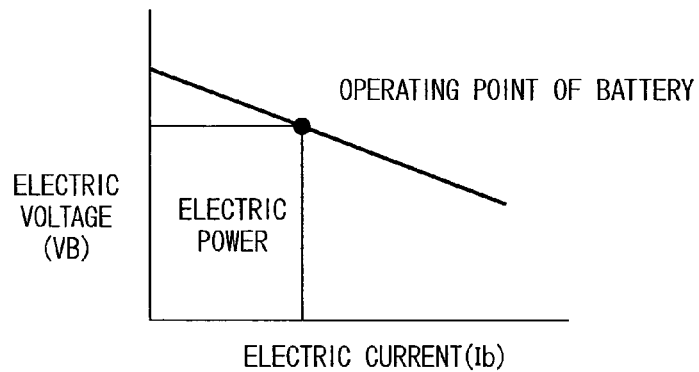
FIG. 37 shows an example of an operating point of a battery according to the above embodiment.

The electric voltage of the fuel cell stack 211 ("VFC") and the electric voltage of the battery 212 ("VB") are in a predetermined correspondence relationship with each of the electric current (output electric current Ifc) and the electric power of the fuel cell stack 211 as well as the electric current (Ib) and the electric power of the battery 212, as shown in FIGS. 36 and 37 for example. From this correspondence relationship, the ratio of the operating point of the fuel cell stack 211 (for example, the electric voltage or the electric current or the electric power) and the operating point of the battery 212 (for example, the electric voltage or the electric current or the electric power) is expressed using the switching duty ("duty").

When the drive motor 222 is regenerated, for example, the target electric power distribution setting unit 262 sets the electric power distribution of the electric power supplying side of the fuel cell stack 211 and the drive motor inverter 215, and also sets the electric power distribution of the electric power receiving side of the battery 212 and the load (for example, the air conditioner 224 and the vehicle auxiliary machinery and the air pump inverter 214), based on the condition of the fuel cell stack 211 (for instance, the rate of change of the condition of the fuel cell stack 211 according to a command for power generation) and the remaining capacity SOC of the battery 212, and the regenerative electric power of the drive motor 222, and the like.

Because the ratio of the operating point of the fuel cell stack 211 (for example, the electric voltage or the electric current or the electric power) and the operating point of the battery 212 (for example, the electric voltage or the electric current or the electric power) is expressed using the switching duty ("duty"), the target electric current setting unit 263 obtains the target electric current corresponding to the output electric current Ifc of the fuel cell stack 211, when the drive motor 222 is driven for example, by referring to a predetermined map representing the correspondence relationship between the operating point of the fuel cell stack 211, the operating point of the battery 212, the switching duty of the first DC-DC converter 213, and the total power consumption of the load.

Figure 38:
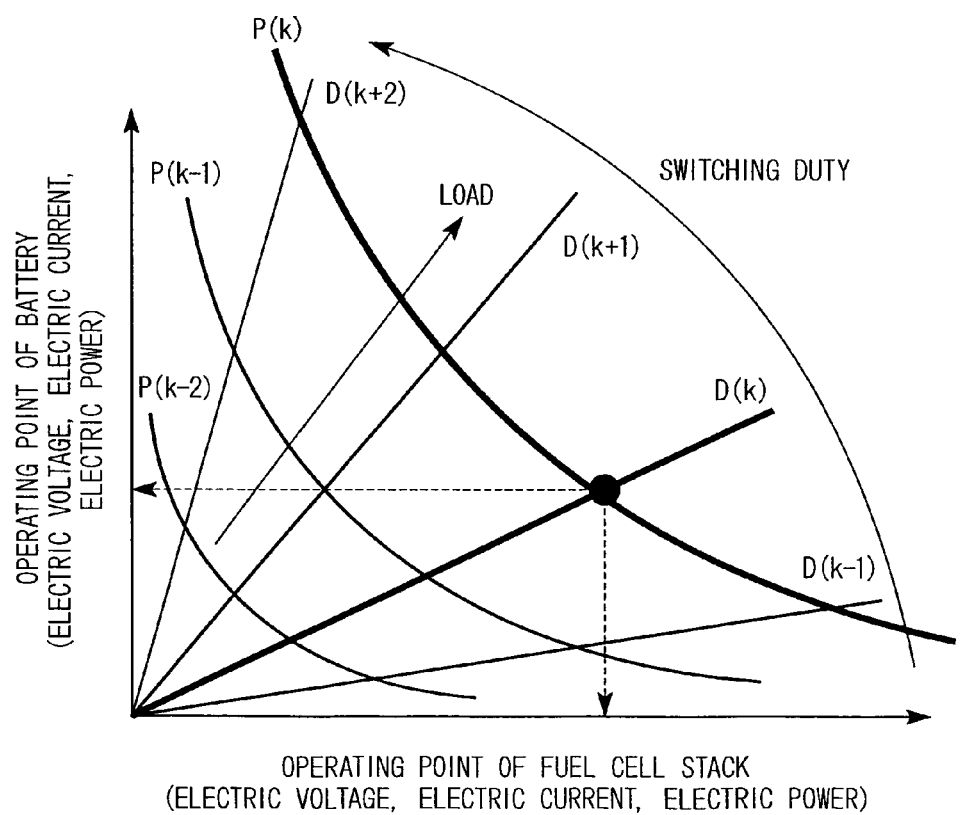
FIG. 38 shows an example of a predetermined map representing a correspondence relationship between an operating point of a fuel cell stack, an operating point of a battery, a switching duty of a first DC-DC converter, and a total power consumption of a load according to the above embodiment.

This predetermined map shows a correspondence relationship of the operating point of the fuel cell stack 211 and the operating point of the battery 212 which are set with respect to each of multiple values of the switching duty of the first DC-DC converter 13 (D(1), ..., D(k), ...) on a two-dimensional coordinate in which the operating point of the fuel cell stack 211 and the operating point of the battery 212 are the orthogonal coordinates, as shown in FIG. 38, for example. In addition, the predetermined map shows the correspondence relationship between the operating point of the fuel cell stack 211 and the operating point of the battery 212 which are set with respect to each of the multiple values of the total power consumption of the load (P(1), ..., P(k), ...).

Considering the correspondence relationship set for each of the multiple values of the switching duty of the first DC-DC converter 213, the operating point of the battery 212 is set to have a tendency to increase at a rate according to the switching duty, as the operating point of the fuel cell stack 211 increases.

Meanwhile, considering the correspondence relationship between the operating point of the fuel cell stack 211 and the operating point of the battery 212 which are set for each of the multiple values of the total consumption power of the load, a combination of the operating points is set so that the sum of the electric power corresponding to the operating point of the fuel cell stack 211 and the electric power corresponding to the operating point of the battery 212 equals the total consumption power of the load.

When, on a two-dimensional coordinate in which the operating point of the fuel cell stack 211 and the operating point of the battery 212 are the orthogonal coordinates, the operating point of the fuel cell stack 211 and the battery 212 is set to be the intersection between the correspondence relationship P(k) according to the total power consumption of the load computed by the consumption power computation unit 261 and the correspondence relationship D(k) according to the switching duty of the first DC-DC converter 213 according to the electric power distribution set by the target electric power distribution unit 262, the target electric current setting unit 263 outputs the electric current (output current Ifc) of the fuel cell stack 211 corresponding to this operating point, as the target electric current.

In addition, when the drive motor 222 is regenerated, for example, the target electric current setting unit 263 outputs zero or a positive value as the target electric current of the electric current (output current Ifc) of the fuel cell stack 211 according to the electric power distribution set by the target electric power distribution setting unit 262.

The duty controlling unit 264 controls the switching duty of the first DC-DC converter 213, so that the actual electric power distribution of the fuel cell stack 211 and the battery 212 equals the electric power distribution (target electric power distribution) set by the target electric power distribution setting unit 262. For example, the duty controlling unit 264 controls the switching duty of the first DC-DC converter 213 so that, the detected value of the output current IFC of the fuel cell stack 211 outputted by the output current sensor 227 equals the target electric current of the fuel cell stack 211 outputted by the target electric current setting unit 263 (the output current Ifc).

This duty controlling unit 264 includes, for example, an electric current deviation computation unit 271, a feed back processing unit 272, and a PWM signal generation unit 273.

The electric current deviation computation unit 271 computes and outputs the electric current deviation between the detected value of the output current IFC of the fuel cell stack 211 outputted from the output current sensor 227 and the target electric current of the fuel cell stack 211 (the output current Ifc) outputted from the target electric current setting unit 263.

The feedback processing unit 272 computes an electric voltage command value by controlling and amplifying the electric current deviation outputted by the electric current deviation computation unit 271 through, for example, a PID (Proportional Integral Derivative) operation.

In order to output an output current Ifc from the fuel cell stack 211 corresponding to the electric voltage command value outputted from the feedback processing unit 272, the PWM signal creation unit 273 creates and outputs a gate signal (namely, a PWM signal) that turns on and off each of the transistors AH, BH, and CH of the high side arm of the first DC-DC converter 213 as well as each of the transistors AL, BL, and CL of the low side arm.

While the drive motor 222 is driven, for example, the drive motor controlling unit 265 performs a feedback control (a vector control) of the electric current on a dq-coordinate system in the form of a rotating orthogonal coordinate. This drive motor controlling unit 265 computes a target d-axis electric current and a target q-axis electric current according to a torque command based on a driver's accelerating operation and the number of rotations of the drive motor 222. Then, the drive motor controlling unit 265 computes each of the three phase output electric voltage Vu, Vv, and Vw based on the target d-axis electric current and the target q-axis electric current. Further, the drive motor controlling unit 265 inputs a PWM signal, which is a gate signal, to the bridge circuit 251 of the drive motor inverter 215 according to each phase of the output electric voltage Vu, Vv, and Vw. At the same time, the drive motor controlling unit 265 performs a control so that the deviation between the d-axis electric current and the q-axis electric current obtained by converting the detected values of each phase of the electric current Iu, Iv, and Iw, actually supplied by the F-drive motor inverter 215 to the drive motor 222, to the dq-coordinate system, and the deviation between the target d-axis electric current and the target q-axis electric current equal zero.

In addition, when the drive motor 222 is regenerated, for example, the drive motor controlling unit 265 turns on and off, each of the transistors of the bridge circuit 251 of the drive motor inverter 215 according to a pulse synchronized based on the output waveform of the rotational angle Gm of the rotator of the drive motor 222 outputted by the angle sensor 229. The three-phase alternating-current power outputted from the drive motor controlling unit 265 is converted to a direct-current power. At this time, the drive motor controlling unit 265 performs a feedback control of the regenerating electric voltage according to the duty of the gate signal that turns each of the transistors of the bridge circuit 251 on and off. The drive motor controlling unit 265 outputs a predetermined electric voltage value to a primary side of the drive motor inverter 215, in other words, between the secondary side positive terminal P202 of the first DC-DC converter 213 and the secondary side negative terminal N202.

In other words, when the drive motor 222 is driven, for example, the control device 225 performs a feedback control so that the detected value of the electric current (the output electric current Ifc) of the fuel cell stack 211 equals the target electric current. Thus, the control device 225 controls the switching duty of the first DC-DC converter 213. This control device 225 continuously controls the operating mode of the power supply device 210 as shown in FIG. 39, for example.

When, for example, the boosting ratio of the first DC-DC converter 213 approximately equals 2 to 3, the operating mode of the power supply device 210 that maximizes the switching duty is an EV mode in which only the output by the battery 212 is supplied to the drive motor inverter 215 and the air pump inverter 214, as shown in FIGS. 40A and 40B, for example.

As the switching duty tends to decline from the EV mode, the operating mode of the power supply device 210 shifts sequentially from a first (FC+battery) mode to a second (FC+battery) mode to a third (FC+battery) mode. In the first mode, the output of the battery 212 is supplied to the drive motor inverter 215 and the air pump inverter 214. At the same time, in the first mode, the output of the fuel cell stack 211 is supplied to the drive motor inverter 215, and the electric current (Ib) of the battery 212 becomes larger than the electric current (output current Ifc) of the fuel cell stack 211. In the second mode, the output of the battery 212 is supplied to the drive motor inverter 215 and the air pump inverter 214. At the same time, in the second mode, the output of the fuel cell stack 211 is supplied to the drive motor inverter 215, and the electric current (Ib) of the battery 212 becomes equal to the sum of the electric current (output current Ifc) of the fuel cell stack 211 and the electric current (IAP) flowing through the air pump inverter 214. In the third mode, the output of the battery 212 and the fuel cell stack 211 is supplied to the drive motor inverter 215 and the air pump inverter 214, and the electric current (Ib) of the battery 212 becomes smaller than the electric current (output current Ifc) of the fuel cell stack 211.

Figure 39:
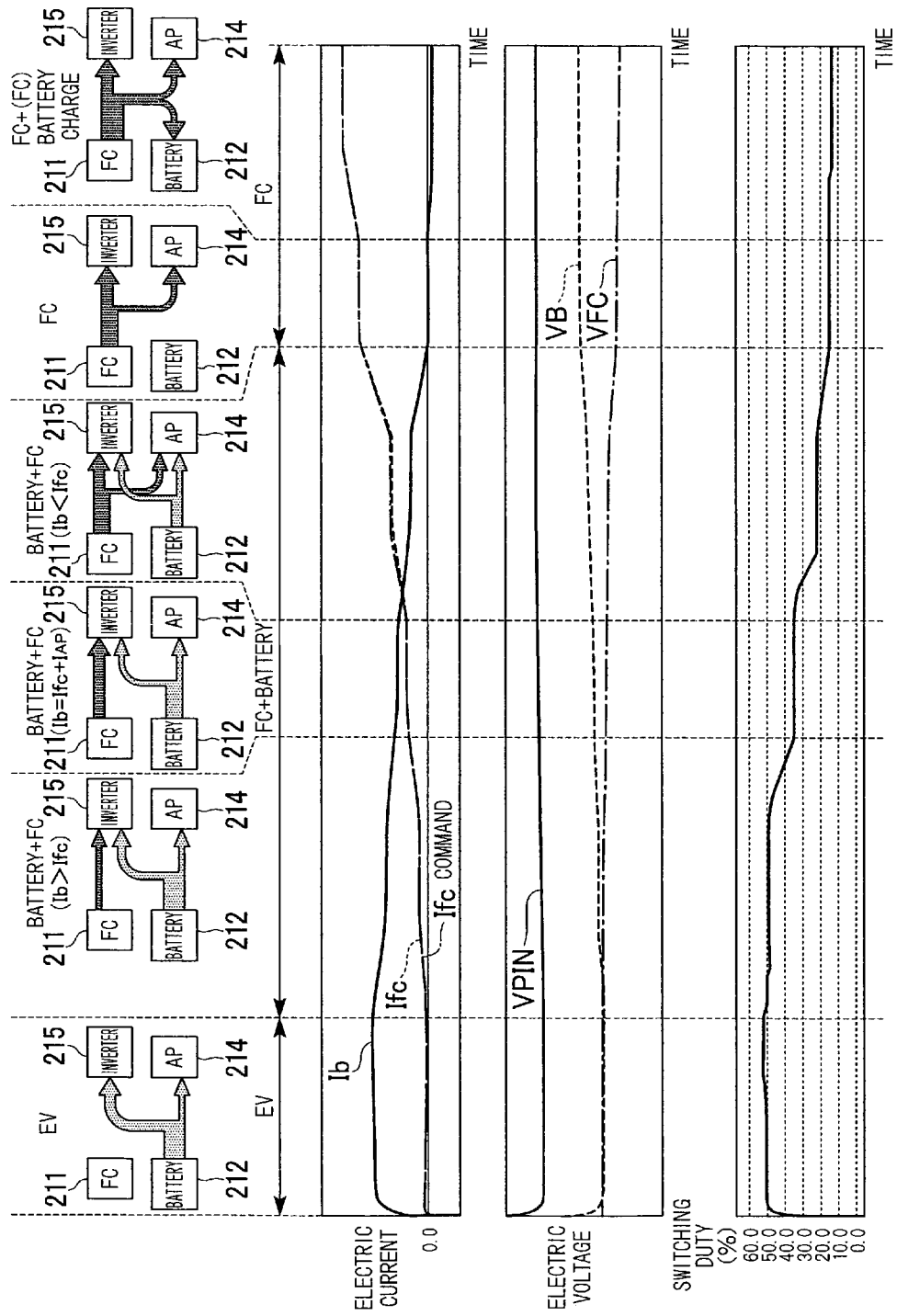
FIG. 39 shows an example of a change in an electric current and an electric voltage of a fuel cell stack and a battery, a change in an operation mode of a power supply device, corresponding to a change in a switching duty of a first DC-DC converter when a drive motor is driven according to the above embodiment.

Accordingly, the electric current (Ib) of the battery 212 tends to decline, as shown in FIG. 39 for example. In addition, the electric current (output current Ifc) of the fuel cell stack 211 and the target electric current (the Ifc command) tend to increase. The input electric voltage (VPIN) of the primary side of the drive motor inverter 215 is maintained to be approximately constant. The electric voltage of the battery 212 (VB) tends to increase, while the electric voltage of the fuel cell stack 211 (VFC) tends to decrease.

Further, as the switching duty tends to decline to a minimum value from the third (FC+battery) mode, the operating mode of the power supply device 210 shifts to the first FC mode and the second FC mode, in sequence. In the first FC mode, only the output of the fuel cell stack 211 is supplied to the drive motor inverter 215 and the air pump inverter 214. In the second FC mode, only the output of the fuel cell stack 211 is supplied to the drive motor inverter 215, the air pump inverter 214, and the battery 212, therefore charging the battery 212.

Accordingly, the electric current (Ib) of the battery 212 tends to decrease from zero to a negative value as shown in FIG. 39 for example. Meanwhile, the electric current (the output current Ifc) of the fuel cell stack 211 and the target electric current (the Ifc command) tend to increase. In addition, the input electric voltage (VPIN) in the primary side of the drive motor inverter 215 is maintained to be approximately constant. The electric voltage of the battery 212 (VB) tends to increase. On the other hand, the electric voltage of the fuel cell stack 211 (VFC) tends to decrease.

When the drive motor 222 is regenerated, for example, the control device 225 performs a feedback control so that the detected value of the electric current of the fuel cell stack 211 (the output current Ifc) equals the target electric current (either zero or a positive value). At the same time, this control device 225 controls the switching duty of the first DC-DC converter 213 by performing a feedback control of the regenerative electric voltage.

For example, the operating mode of the power supply device 210 in which the target of the electric current of the fuel cell stack 211 (the output current Ifc) equals zero is the regenerative mode in which the battery 212 is charged by the regenerative electric power of the drive motor inverter 215.

Meanwhile, the operating mode of the power supply device 210 in which the target of the electric current of the fuel cell stack 211 (the output current Ifc) equals a positive value, for example, is a (regenerative+battery charging by the FC) mode in which the regenerative electric power of the drive motor inverter 215 and the output of the fuel cell stack 211 are supplied to the air pump inverter 214 and the battery 212, and the battery 212 is charged.

The control device 225 outputs a command value regarding the pressure and the flux of the reactive gas supplied to the fuel cell stack 211, as a command to the fuel cell stack 211 to generate electric power, the output of the command value being based on, for example, the condition in which the fuel cell vehicle is driven, the concentration of hydrogen included in the reactive gas supplied to the anode of the fuel cell stack 211, the concentration of hydrogen included in the discharge gas emitted from the anode of the fuel cell stack 211, the condition in which the fuel cell stack 211 is generating electric power, the electric voltage between the terminals of each of the plurality of fuel cells, the electric voltage VFC of the fuel cell stack 211, the output current Ifc of the fuel cell stack 211, and the internal temperature of the fuel cell stack 211. In this way, the control device 225 controls the condition in which the fuel cell stack 211 generates electric power.

The control device 225 switches over the on and off conditions of the contactor 211a according to the condition in which the fuel cell stack 211 is generating electric power. In addition, the control device 225 controls the connection between the fuel cell stack 211, the second line L202, and the third line L203.

The control device 225 also switches over the on and off conditions of the contactor 212a and the current limiting circuit 212b according to the remaining capacity SOC of the battery 212. Thus, the control device 225 controls the connection between the battery 212 and the first line L201 and the second line L202.

As described above, according to the power supply device 210 based on the above embodiment of the present invention, a plurality of operating modes can be switched over merely by providing a single first DC-DC converter 213 with respect to the battery circuit 210a in which the fuel cell stack 211 and the battery 212 are connected in series. Compared to the case in which a DC-DC converter is equipped individually for each of the fuel cell stack 211 and the battery 212, for example, it is possible to lower the cost necessary for configuration and reduce the size.

Further, according to the power supply system 220 of the fuel cell vehicle based on the above embodiment of the present invention, the cost necessary for configuring the power supply device 210 can be lowered, and the size of the power supply device 210 can be reduced, by providing a single first DC-DC converter 213. Because the fuel cell stack 211 and the battery 212 are connected in series, the operating electric voltage of the drive motor inverter 215 can be augmented, and the electric current can be reduced, compared to the case in which the fuel cell stack 211 and the battery 212 are connected in parallel. In this way, the size of the drive motor 222 and the drive motor inverter 215 can be reduced. At the same time the operating efficiency can be enhanced.

Therefore, the cost necessary for configuring the power supply system 220 of the fuel cell vehicle can be lowered, and the size can be reduced.

Further, the operating electric voltage of the air pump inverter 214 can be augmented, and, the electric current can be reduced. In addition, the size of the motor of the air pump (AP) 221 and the air pump inverter 214 can be reduced. At the same time, the operating efficiency can be enhanced. In this way, the necessary cost for configuring the power supply system 220 of the fuel cell device can be reduced, and the size can be made smaller.

Further, even though the condition of the first DC-DC converter 213 is abnormal (for example, when an open failure occurs), it is possible to drive the fuel cell vehicle, by supplying electric power from the battery circuit 210a to the drive motor inverter 215.

Figure 40:
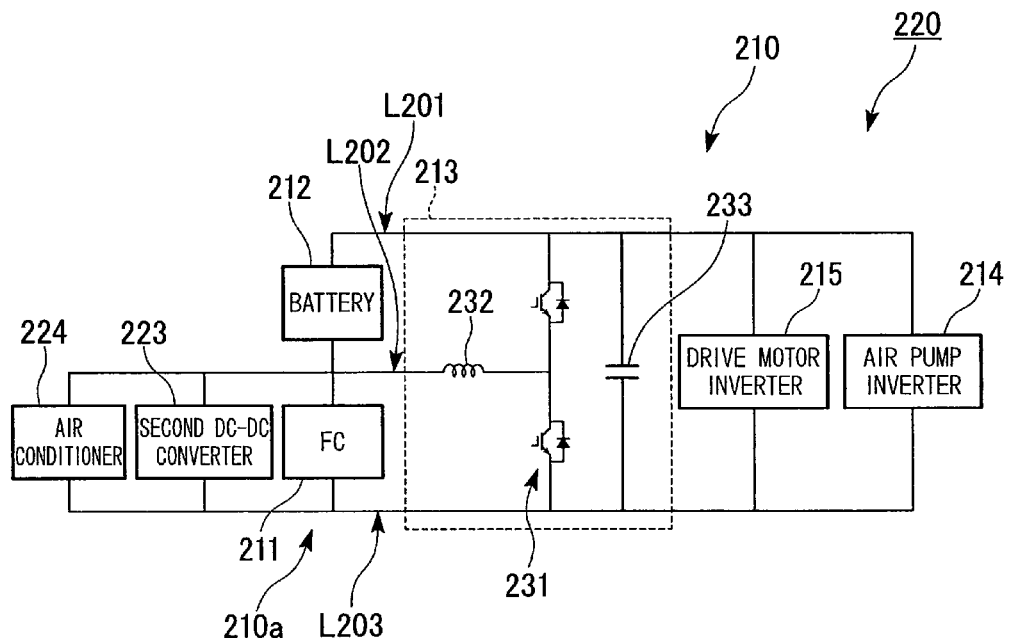
FIG. 40 is a configuration diagram of a power supply system of a fuel cell vehicle according to a second variation of the above embodiment.
Figure 41:
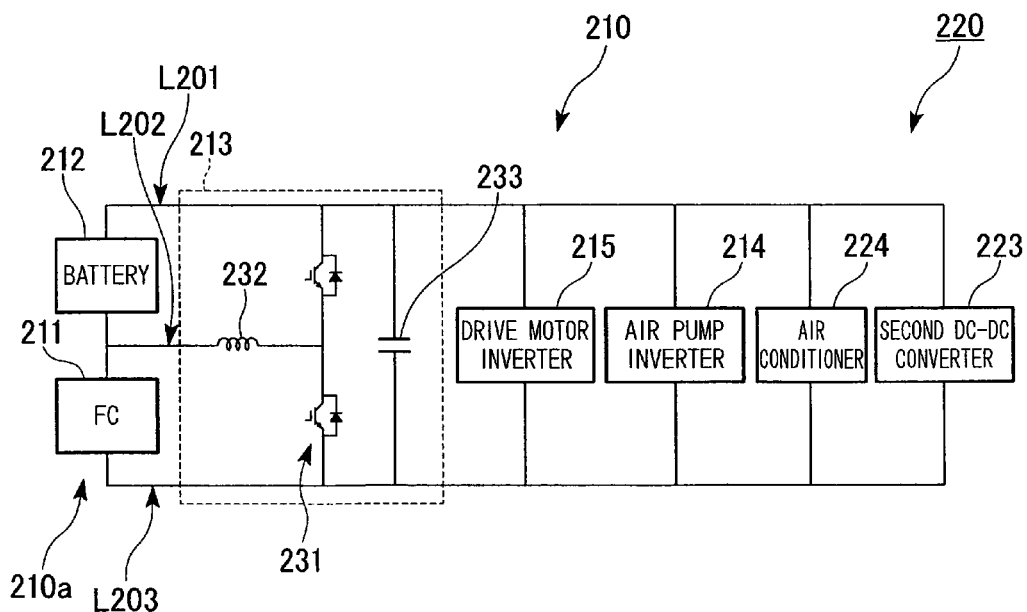
FIG. 41 is a configuration diagram of a power supply system of a fuel cell vehicle according to a third variation of the above embodiment.

According to the above embodiment, at least a portion of the vehicle auxiliary machinery equipped on the fuel cell vehicle (for example, an air conditioner 224 separate from the second DC-DC converter 223, and a load connected to the second DC-DC converter 223 (a processing device, a magnetic valve, and a 12 volt type load)) is connected to the first line L201 and the second line L202 either directly or through the second DC-DC converter 223. However, the present invention is not limited to this configuration. For example, as shown in FIG. 40, at least a part of the vehicle auxiliary machinery can be connected to the second line L202 and the third line L203. In addition, as shown in FIG. 41, at least a part of the vehicle auxiliary machinery can be connected to the first line L201 and the third line L203.

According to the above configuration, the air pump inverter 214 is connected to the first line L201 and the third line L2. This air pump inverter 214 is a drive circuit of the air pump 221. However, the present invention is not limited to this configuration. The drive circuit of at least one of a pump that supplies reactive gas to the fuel cell stack 211 (for example, the air pump 221) and a pump that supplies a refrigerant (not diagramed) can be connected to the first line L201 and the third line L203.

According to the above embodiment, the battery 212 is connected to the first line L201 and the second line L202, while the fuel cell stack 211 is connected to the second line L202 and the third line L203. However, the present invention is not limited to the above configuration. The fuel cell stack 211 can be connected to the first line L201 and the second line L202. The battery 212 can be connected to the second line L202 and the third line L203.

According to the above embodiment, the first DC-DC converter 213, alternately switches over between a condition in which each of the transistors AH, BH, and CH of the high side arm are turned off and each of the transistors AL, BL, and CL of the low side arm are turned on, and a condition in which each of the transistors AH, BH, and CH of the high side arm are turned on and each of the transistors AL, BL, and CL of the low side arm are turned off. However, the present invention is not limited to this configuration. For example, during a boosting operation from the primary side to the secondary side when the drive motor 222 is driven, each of the transistors AL, BL, and CL of the low side arm can alternately be switched on and off while each of the transistors AH, BH, and CH of the high side arm are turned off. As another example, during a regenerative operation from the secondary side to the primary side when the drive motor 222 is regenerated, each of the transistors AH, BH, and CH of the high side arm can be alternately switched on and off while each of the transistors AL, BL, and CL of the low side arm are turned off.

Below, a description of a power supply device and a power supply system for a fuel cell vehicle according to a fourth embodiment of the present invention is provided with reference to FIGS. 42 to 62.

Figure 42:
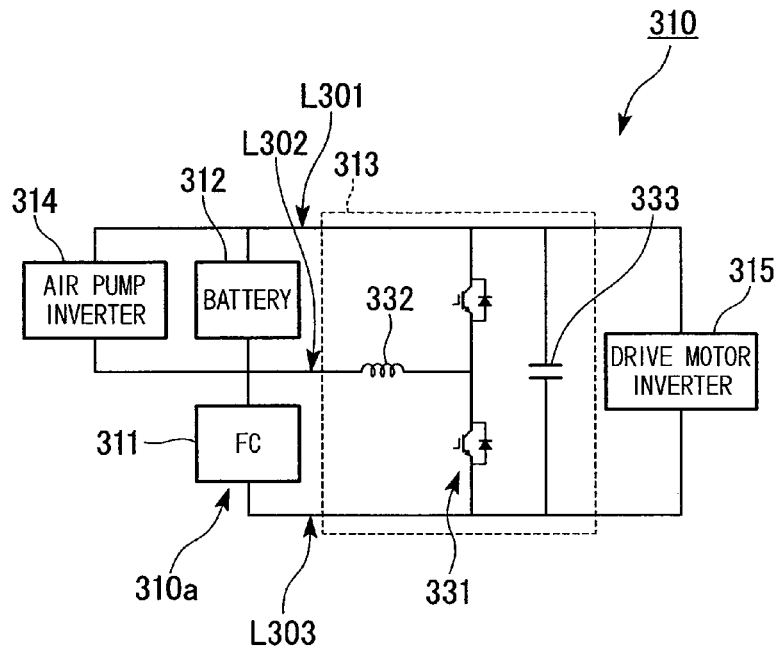
FIG. 42 is a configuration diagram of a power supply device according to a fourth embodiment of the present invention.

A power supply device 310 according to the present embodiment includes a fuel cell stack (FC) 311, a battery 312, a first DC-DC converter 313, and an air pump inverter 314, as shown in FIG. 42 for example. The power supply device 310 is connected to a drive motor inverter 315, for example.

Figure 43:
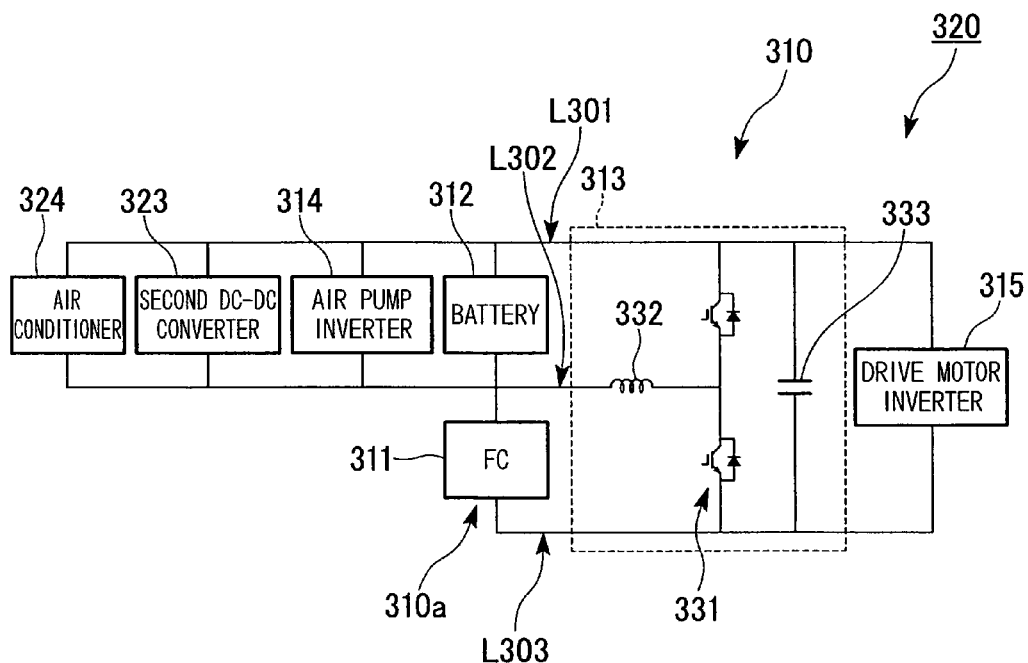
FIG. 43 is a configuration diagram of a power supply system for a fuel cell vehicle according to the above embodiment.
Figure 44:
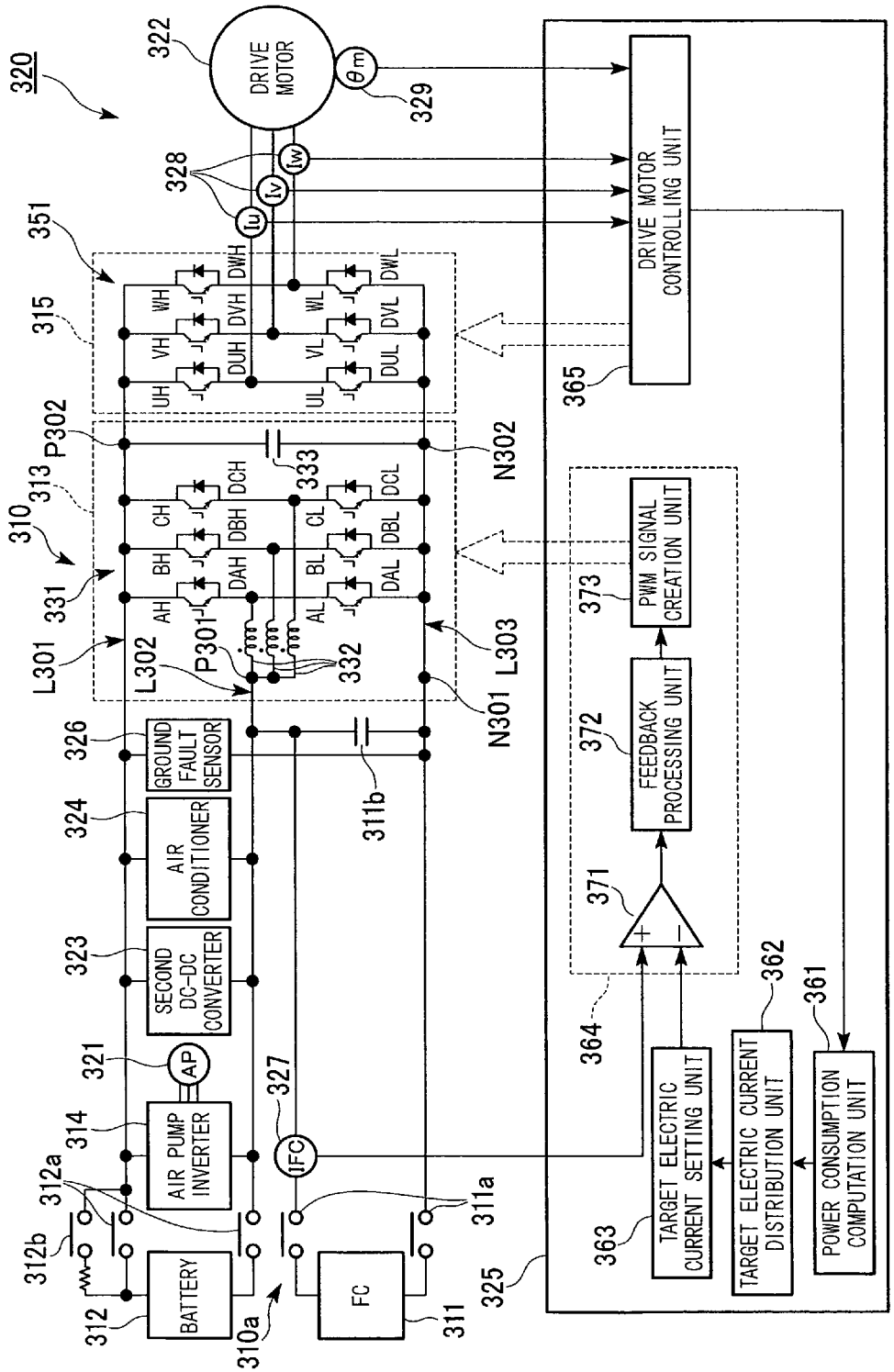
FIG. 44 is a configuration diagram of a power supply system for a fuel cell vehicle according to the above embodiment.

The power supply device 310 is provided in a power supply system 320 for a fuel cell vehicle, for example. This power supply system 320 for the fuel cell vehicle includes the power supply device 310, an air pump (AP) 321, a drive motor 322, a second DC-DC converter 323, an air conditioner 324, a control device 325, a ground fault sensor 326, an output current sensor 327, a phase current sensor 328, and an angle sensor 329, as shown in FIGS. 43 and 44 for example.

The fuel cell stack 311 is formed by layering multiple fuel cells including a solid polymer electrolyte membrane comprising a cation exchange membrane and the like, the solid polymer electrolyte membrane being held by a fuel electrode (anode) including an anode catalyst and a gas diffusion layer, and an oxygen electrode (cathode) including a cathode catalyst and a gas diffusion layer, the solid polymer electrolyte membrane and the anode and the cathode thus forming an electrolytic electrode structure, the electrolytic electrode structure further being held by a pair of separators. The laminated body of the fuel cell is sandwiched by a pair of end plates from both sides of the direction in which the layers are formed.

Air is supplied to the cathode of the fuel cell stack 311 from the air pump 321, the air being an oxidant gas (reactant gas) including oxygen. A fuel gas (reactant gas) including hydrogen is supplied to the anode from a high-pressure hydrogen tank (not diagramed), for example.

The hydrogen is ionized by the catalytic reaction with the anode catalyst at the anode and moves to the cathode through a reasonably humidified solid polymer electrolyte membrane. An electron is generated while the hydrogen moves, and the electron is extracted by the external circuit, and is utilized as an electric energy of the direct current. At this time, the hydrogen ion, the electron, and oxygen react at the cathode, forming water.

Here, the air pump 321 brings in air from outside the vehicle and compresses the air, for example. The air pump 321 supplies this air to the cathode of the fuel cell stack 311 as reactive gas. The number of rotations of a motor (not diagramed) driving this air pump 321 is controlled by the air pump inverter 314 according to a control command outputted by the control device 325. The air pump inverter 314 includes a PWM inverter based on a pulse width modulation (PWM).

As an alternative to the battery 312, the power supply device 310 can include, for example, a capacitor as an electric storage device, the capacitor including an electric double layer capacitor or an electrolytic capacitor.

The first DC-DC converter 313 is, for example, a chopper type DC-DC converter. As shown in FIG. 44, this first DC-DC converter 313 includes a bridge circuit 331 with three phases, a choke coil 332 with three phases, and a smoothing capacitor 333. The above bridge circuit 331 includes a plurality of switching elements (for example, an IGBT: Insulated Gate Bipolar Mode Transistor) which are bridge-connected.

The first DC-DC converter 313 is shown in FIGS. 42 and 43 in simplified form. Thus, among the three phases, only one phase of the switching element and the choke coil 332 is shown in FIGS. 42 and 43.

The bridge circuit 331 is same as a three-phase bridge circuit 351 forming the drive motor inverter 315 described later. In the bridge circuit 331, a high-side and a low-side first transistor AH and AL, a high-side and a low-side second transistor BH and BL, and a high-side and a low-side third transistor C11 and CL, which form a pair for each of the phases, are bridge-connected. Each of the transistors AH, BH, and CH form a high side arm by a collector being connected to a secondary side positive terminal P302. Each of the transistors AL, BL, and CL form a low side arm by an emitter being connected to a secondary side negative terminal N302. For each phase, the emitter of each of the transistors AH, BH, and CH of the high side arm is connected to the collector of each of the transistors AL, BL, and CL of the low side arm. Between the collector and the emitter of each of the transistors AH, AL, BH, BL, CH, and CL, each of the diodes DAH, DAL, DBH, DBL, DCH, and DCL are connected, so that the direction from the emitter to the collector is the forward direction.

This bridge circuit 331 is driven by a signal (PWM signal) which is pulse-width modulated (PWM), the signal being outputted from the control device 325 and inputted to a gate of each of the transistors. A condition in which each of the transistors AH, BH, and CH of the high side arm are turned on and each of the transistors AL, BL, and CL of the low side arm are turned off, and another condition in which each of the transistors AH, BH, and CH of the high side arm are turned off and each of the transistors AL, BL, and CL of the low side arm are turned on, are switched over in alternation.

The smoothing capacitor 333 is connected to the secondary side positive terminal P302 and the secondary side negative terminal N302.

Regarding the three-phase choke coil 332, an end of each of the choke coil 332 is connected between the collector and the emitter of each of the phases of the bridge circuit 331. In other words, the end of each of the choke coil 332 is connected, respectively, between the collector and the emitter of each of the transistors AH and AL, between the collector and emitter of each of the transistors BH and BL, and between the collector and emitter of each of the transistors CH and CL. The other side of each of the choke coil 332 is connected mutually to the primary side positive terminal P301.

Figure 45:
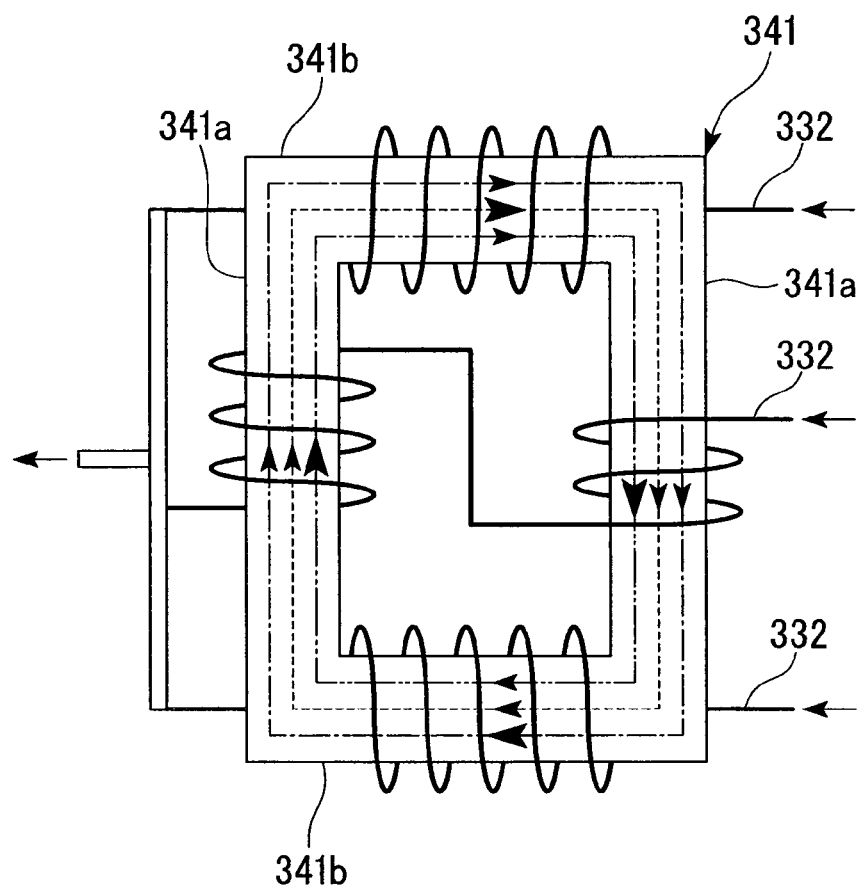
FIG. 45 is a configuration diagram of a choke coil with three phases according to the above embodiment.

The three-phase choke coil 332 is formed by wrapping around a single rectangular core 341 in common mode, as shown in FIG. 45 for example. This choke coil 332 is set so that the direction of the magnetic flux, generated by each of the choke coil 332 while electricity is supplied, is in the same direction.

One phase of the three-phase choke coil 332 is dispersed and wrapped around a pair of opposite sides 341a which is one of the two pairs of opposite sides forming the rectangular core 341. The other two phases of the three-phase choke coil 332 is concentrated and wrapped around the other pair of opposite sides 341b among the two pairs of opposite sides forming the rectangular core 341.

Figure 46:
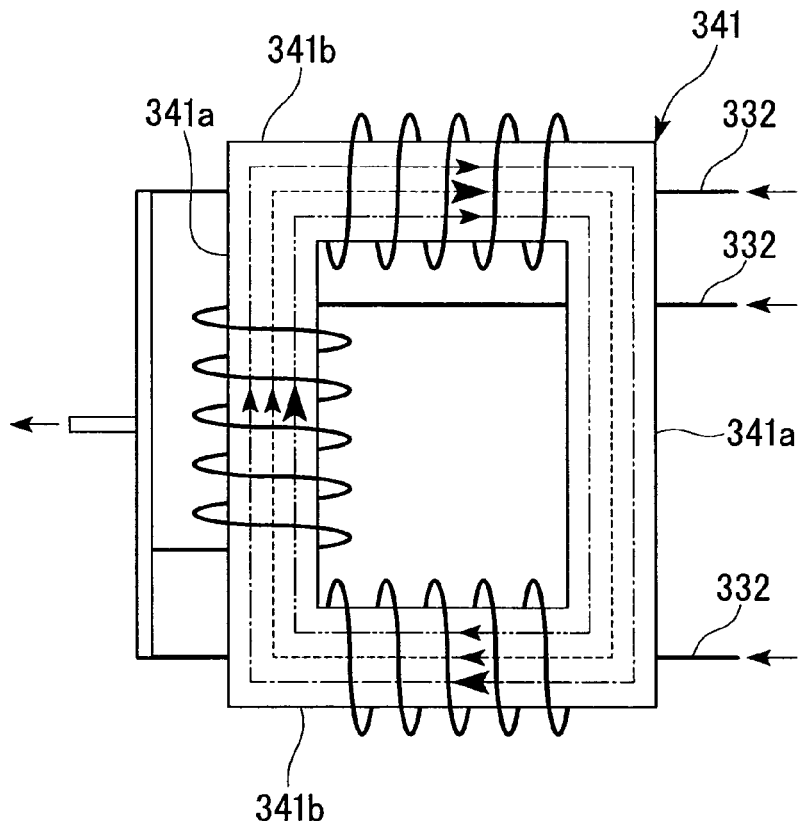
FIG. 46 is a configuration diagram of a choke coil with three phases according to a first variation of the above embodiment.

Each of the three-phase choke coil 332 can be concentrated and wrapped around three sides of the four sides forming the rectangular core 341, as shown in FIG. 46 for example. Further, each of the three-phase choke coil 332 can have a different winding structure.

With respect to three lines L301, L302, and L303, each having a different electric potential from one another (for example, electric potential of L301>electric potential of L302>electric potential of L303), a primary side of the first DC-DC converter 313 is connected to the second line L302 and the third line L303. The secondary side of the DC-DC converter 313 is connected to the first line L301 and the third line L303. In other words, the first line L301 is connected to the secondary side positive terminal P302, the second line L302 is connected to the primary side positive terminal P301, and the third line L303 is connected to the primary side negative terminal N301 and the secondary side negative terminal N302.

Concerning this first DC-DC converter 313, when a boost operation is performed from the primary side to the secondary side, at the time the drive motor 322 is driven for example, each of the transistors AH, BH, and CH of the high side arm are first turned off. At the same time, each of the transistors AL, BL, and CL of the low side arm are turned on. Due to the electric current flowing from the primary side, the choke coil 332 undergoes a direct current energization, and magnetic energy is accumulated.

Then, each of the transistors AH, BH, and CH of the high side arm are turned on. At the same time, each of the transistors AL, BL, and CL of the low side arm are turned off. While preventing a change in the magnetic flux due to the interruption of the electric current flowing through the choke coil 332, an induced voltage is generated between both ends of the choke coil 332. The induced voltage, generated by magnetic energy accumulated in the choke coil 332, is added to the input voltage in the primary side. In this way, a boosting voltage, higher than the input voltage in the primary side, is applied to the secondary side. The fluctuation in voltage, generated during this switchover operation, is smoothed by the smoothing capacitor 333. In addition, a boosting voltage is outputted from the secondary side.

On the other hand, during a regenerating operation from the secondary side to the primary side when the drive motor 322 is regenerated for example, each of the transistors AH, BH, and CH of the high side arm are first turned off. At the same time, each of the transistors AL, BL, and CL of the low side arm are turned on. The choke coil 332 undergoes a direct-current energization by the electric current inputted from the secondary side, and magnetic energy is accumulated.

Then, each of the transistors AH, BH, and CH of the high side arm are turned on. At the same time, each of the transistors AL, BL, and CL of the low side arm are turned Off. While preventing a change in the magnetic flux due to the blockage of the electric current flowing through the choke coil 332, an induced voltage is generated between both ends of the choke coil 332. The induced voltage, generated by the magnetic energy accumulated in the choke coil 332, becomes a depressed voltage generated by stepping down the input voltage of the secondary side according to the on/off ratio of each of the transistors AH, BH, and CH of the high side arm. In this way, a depressed voltage is applied to the primary side.

The first DC-DC converter 313 is driven by a signal (PWM signal) which is pulse-width modulated (PWM), the signal being outputted from the control device 325 and inputted to a gate of each of the transistors. The first DC-DC converter 313 switches over the on/off condition of each of the transistors AH, BH, and CH of the high side arm and each of the transistors AL, BL, and CL of the low side arm, according to a switching duty defined, for example, as a ratio of each of the transistors AH, BH, and CH of the high side arm that are turned on during one cycle of the PWM signal.

Incidentally, each of the transistors AH, BH, and CH of the high side arm and each of the transistors AL, BL, and CL of the low side arm are prohibited from being simultaneously turned on when the on/off condition is switched over. An appropriate dead time is provided during which each of the above transistors can be simultaneously turned off.

The fuel cell stack 311 is connected to the second line L302 and the third line L303 through a contactor 311a and a capacitor 311b placed in the positive electrode side and the negative electrode side. The battery 312 is connected to the first line L301 and the second line L302 through a contactor 312a placed in the positive electrode side and the negative electrode side, and through a current limiting circuit 312b placed in the positive electrode side. Therefore, the fuel cell stack 311 and the battery 312 are connected in series between the first line L301 and the third line L303. The fuel cell stack 311 and the battery 312 thus are included in the battery circuit 310a.

While electric power is outputted from the first line L301 and the third line L303 to a load (for example, the drive motor 322), the first line L301 and the third line L303 are connected to the drive motor inverter 315.

The air pump inverter 314 is connected to the first line L301 and the second line L302. This air pump inverter 314 is a drive circuit of the air pump 321.

The drive motor inverter 315, included in a drive circuit of the three-phase drive motor 322, is a PWM inverter with a pulse-width modulation (PWM). This drive motor inverter 315 includes a three-phase bridge circuit 351 comprising a plurality of switching elements (for example, an IGBT: Insulated Gate Bipolar Mode Transistor) which are bridge-connected.

The bridge circuit 351 is same as a three-phase bridge circuit 331 forming the first DC-DC converter 313. In the bridge circuit 51, a high-side and a low-side U-phase transistor UH and UL, a high-side and a low-side V-phase transistor VH and VL, and a high-side and a low-side W-phase transistor WH and WL, which form a pair for each of the phases, are bridge-connected for example. Each of the transistors UH, VH, and WH form a high side arm by a collector being connected to a secondary side positive terminal P302 of the first DC-DC converter 313. Each of the transistors UL, VL, and WL form a low side arm by an emitter being connected to a secondary side negative terminal N302 of the first DC-DC converter 313. For each phase, the emitter of each of the transistors UH, VH, and WH of the high side arm is connected to the collector of each of the transistors UL, VL, and WL of the low side arm. Between the collector and the emitter of each of the transistors UH, UL, VH, VL, WH, and WL, each of the diodes DUH, DUL, DVH, DVL, DWH, and DWL are connected, so that the direction from the emitter to the collector is the forward direction.

This drive motor inverter 315 is driven by a signal (PWM signal) which is pulse-width modulated (PWM), the signal being outputted from the control device 325 and inputted to a gate of each of the transistors of the bridge circuit 351. For example, when the drive motor 322 is driven, the direct-current power outputted from the power supply device 310 is converted to a three phase alternating-current power, by switching over the on (conduction) and off (interruption) condition of each of the transistors forming a pair for each of the phases. By sequentially commutating the electric current to the three phase stator winding, a U phase electric current Iu, a V phase electric current Iv, and a W phase electric current Iw, all of which are an alternating-current, are supplied to the stator winding of each phase. Meanwhile, when the drive motor 322 is regenerated, for example, the three phase alternating-current power, outputted from the drive motor 322, is converted to a direct-current power, and is supplied to the first DC-DC converter 313. Then, the battery is charged, and power is fed to a load connected to the first DC-DC converter 313.

The drive motor 322 is, for example, a three phase alternating-current synchronous motor of a permanent magnet type utilizing a permanent magnet as a field. This drive motor 322 is driven and controlled by a three phase alternating-current power supplied by the drive motor inverter 315. At the same time, when the drive power is transmitted from the drive wheel side to the driver motor 322 side while the vehicle is decelerating, the drive motor 322 functions as an electric generator. In this way, the drive motor 322 creates a so-called regenerative breaking force. Further, the drive motor 322 recovers the kinetic energy of the vehicle as an electric energy.

The second DC-DC converter 323 is, for example, a chopper type DC-DC converter. At least a part of the vehicle auxiliary machinery equipped on the fuel cell vehicle (for example, a processing device, a magnetic valve, and a 12 volt type load) is connected to the second DC-DC converter 323 as a load.

The second DC-DC converter 323 is connected to the first line L301 and the second line L302. This second DC-DC converter 323 depresses the electric voltage applied between the first line L301 and the second line L302, by a chopping movement according to a control command outputted from the control device 325, and supplies the electric voltage to the load connected to the second DC-DC converter 323.

The air conditioner 324 is included in at least a part of the vehicle auxiliary machinery equipped on the fuel cell vehicle. This air conditioner 324 includes, for example, a heater loaded on the fuel cell vehicle, a motor for a compressor, and a drive circuit (for example, an inverter).

The air conditioner 324 is connected to the first line L301 and the second line L302. Electric power is supplied from the first line L301 and the second line L302 to the air conditioner 324.

The control device 325 performs a duty control, controlling the switching duty of the first DC-DC converter 313. At the same time, the control device 325 controls the electric power conversion operation of the drive motor inverter 315.

The control device 325 receives an input of a detection signal outputted by, for example, a ground fault sensor 326 which is connected to the first line L301 and the third line L303 and detects the occurrence of a ground fault, an output current sensor 327 which detects an output current IFC of the fuel cell stack 311, a phase current sensor 328 which detects each of the three phase current between the drive motor inverter 315 and the drive motor 322, and an angle sensor 329 which detects a rotational angle of a rotator of the drive motor 322 (in other words, a rotational angle of the magnetic pole of the rotor from a predetermined standard rotational position, and a rotational position of the rotational axis of the drive motor 322).

The control device 325 includes, for example, a power consumption computation unit 361, a target electric current distribution unit 362, a target electric current setting unit 363, a duty controlling unit 364, and a drive motor controlling unit 365.

The power consumption computation unit 361 computes the total power consumption of the load (from example, the drive motor 322 and the air conditioner 324 and the vehicle auxiliary device, which are loads outside of the power supply device 310, and the air pump inverter 314, which is a load inside of the power supply device 310) to which electric power is supplied from the power supply device 310.

When the drive motor 322 is driven, for example, the target electric power distribution setting unit 362 sets the electric power distribution of the fuel cell stack 311 and the battery 312 forming the battery circuit 310a of the power supply device 310, based on, for example, the condition of the fuel cell stack (for instance, the rate of change of the condition of the fuel cell stack 311 according to a command for power generation) and the remaining capacity SOC of the battery 312. In other words, the target electric power distribution setting unit 362 sets the distribution when the total electric power consumption computed by the electric power consumption computation unit 361 is a value obtained by adding an electric power outputted by the fuel cell stack 311 and an electric power outputted by the battery 312.

For example, when the drive motor 322 is driven, the electric power distribution becomes a value corresponding to the switching duty of the first DC-DC converter 313 (in other words, the proportion of each of the transistors AH, BH, and CH of the high side arm in one cycle of the PWM signal that are turned on). The switching duty ("duty") can be expressed using the electric voltage of the fuel cell stack 311 ("VFC") and the electric voltage of the battery 312 ("VB"), as shown below.

$$duty = VFC/(VFC+VB)$$

From this equation, the ratio of the electric voltage of the fuel cell stack 311 ("VFC") and the electric voltage of the battery 312 ("VB") can be expressed, as shown below, using the switching duty ("duty").

$$VB/VFC = (1-duty)/duty$$

Figure 47:
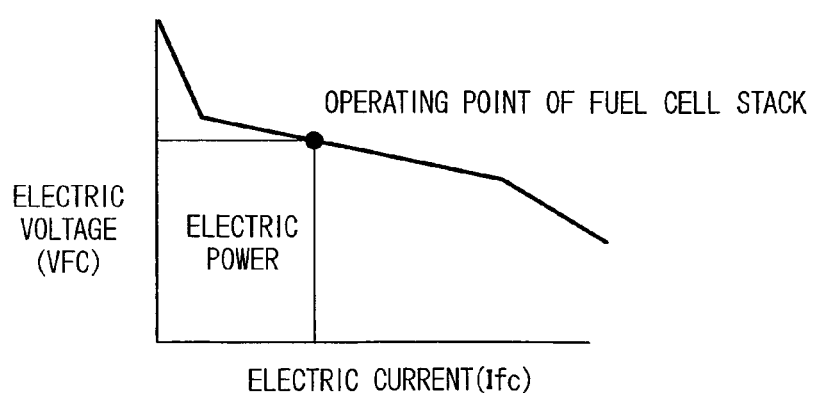
FIG. 47 shows an example of an operating point of a fuel cell stack according to the above embodiment.
Figure 48:
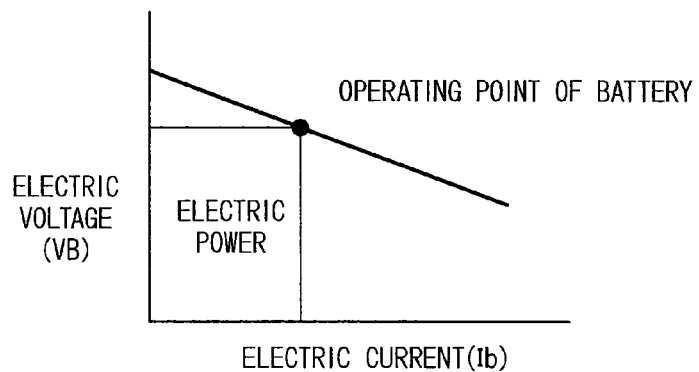
FIG. 48 shows an example of an operating point of a battery according to the above embodiment.

The electric voltage of the fuel cell stack 311 ("VFC") and the electric voltage of the battery 312 ("VB") are in a predetermined correspondence relationship with each of the electric current (output electric current Ifc) and the electric power of the fuel cell stack 311 as well as the electric current (Ib) and the electric power of the battery 312, as shown in FIGS. 47 and 48 for example. From this correspondence relationship, the ratio of the operating point of the fuel cell stack 311 (for example, the electric voltage or the electric current or the electric power) and the operating point of the battery 312 (for example, the electric voltage or the electric current or the electric power) is expressed using the switching duty ("duty").

When the drive motor 322 is regenerated, for example, the target electric power distribution setting unit 362 sets the electric power distribution of the electric power supplying side of the fuel cell stack 311 and the drive motor inverter 315, and also sets the electric power distribution of the electric power receiving side of the battery 312 and the load (for example, the air conditioner 324 and the vehicle auxiliary device and the air pump inverter 314), based on the condition of the fuel cell stack 311 (for instance, the rate of change of the condition of the fuel cell stack 311 according to a command for power generation) and the remaining capacity SOC of the battery 312, and the regenerative electric power of the drive motor 322, and the like.

Because the ratio of the operating point of the fuel cell stack 311 (for example, the electric voltage or the electric current or the electric power) and the operating point of the battery 312 (for example, the electric voltage or the electric current or the electric power) is expressed using the switching duty ("duty"), the target electric current setting unit 363 obtains the target electric current corresponding to the output electric current Ifc of the fuel cell stack 311, when the drive motor 322 is driven for example, by referring to a predetermined map representing the correspondence relationship between the operating point of the fuel cell stack 311, the operating point of the battery 312, the switching duty of the first DC-DC converter 313, and the total power consumption of the load.

Figure 49:
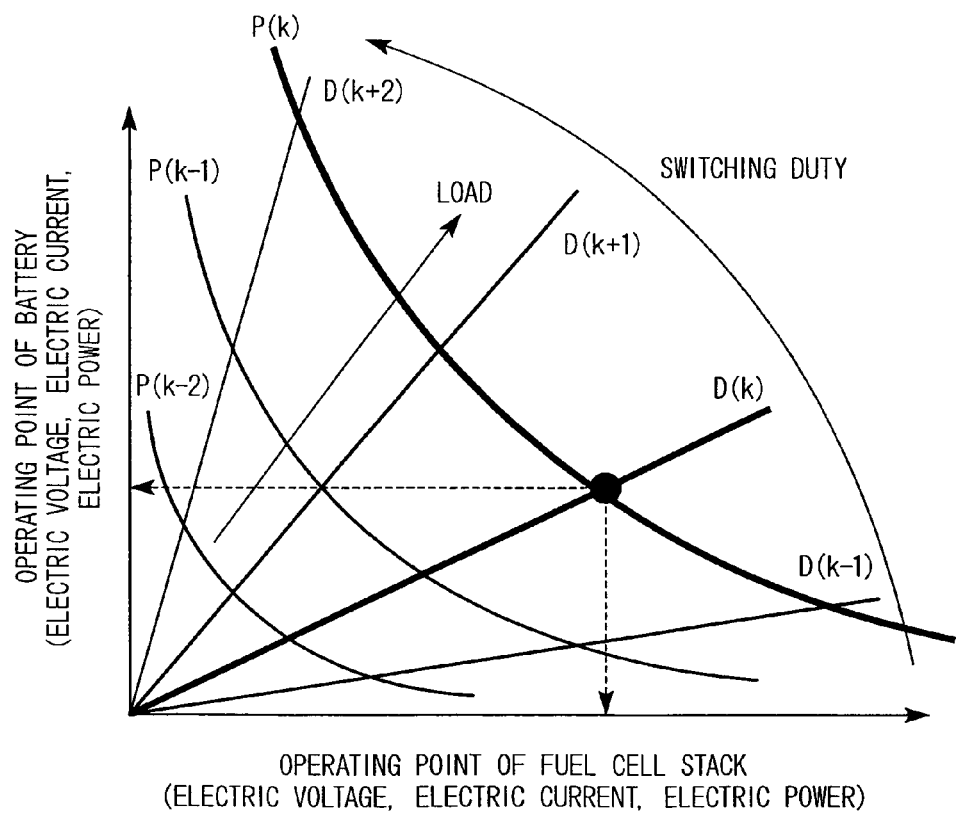
FIG. 49 shows an example of a predetermined map representing a correspondence relationship between an operating point of a fuel cell stack, an operating point of a battery, a switching duty of a first DC-DC converter, and a total power consumption of a load according to the above embodiment.

This predetermined map shows a correspondence relationship of the operating point of the fuel cell stack 311 and the operating point of the battery 312 which are set with respect to each of multiple values of the switching duty of the first DC-DC converter 313 (D(1), . . . , D(k), . . . ) on a two-dimensional coordinate in which the operating point of the fuel cell stack 311 and the operating point of the battery 312 are the orthogonal coordinates, as shown in FIG. 49, for example. In addition, the predetermined map shows the correspondence relationship between the operating point of the fuel cell stack 311 and the operating point of the battery 312 which are set with respect to each of the multiple values of the total power consumption of the load (P(1), . . . , P(k), . . . ).

Considering the correspondence relationship set for each of the multiple values of the switching duty of the first DC-DC converter 313, the operating point of the battery 312 is set to have a tendency to increase at a rate according to the switching duty, as the operating point of the fuel cell stack 311 increases.

Meanwhile, considering the correspondence relationship between the operating point of the fuel cell stack 311 and the operating point of the battery 312 which are set for each of the multiple values of the total consumption power of the load, a combination of the operating points is set so that the sum of the electric power corresponding to the operating point of the fuel cell stack 311 and the electric power corresponding to the operating point of the battery 312 equals the total consumption power of the load.

When, on a two-dimensional coordinate in which the operating point of the fuel cell stack 311 and the operating point of the battery 312 are the orthogonal coordinates, the operating point of the fuel cell stack 311 and the battery 312 is set to be the intersection between the correspondence relationship P(k) according to the total power consumption of the load computed by the consumption power computation unit 361 and the correspondence relationship D(k) according to the switching duty of the first DC-DC converter 313 according to the electric power distribution set by the target electric power distribution unit 362, the target electric current setting unit 363 outputs the electric current (output current Ifc) of the fuel cell stack 311 corresponding to this operating point, as the target electric current.

In addition, when the drive motor 322 is regenerated, for example, the target electric current setting unit 363 outputs zero or a positive value as the target electric current of the electric current (output current Ifc) of the fuel cell stack 311 according to the electric power distribution set by the target electric power distribution setting unit 362.

The duty controlling unit 364 controls the switching duty of the first DC-DC converter 313, so that the actual electric power distribution of the fuel cell stack 311 and the battery 312 equals the electric power distribution (target electric power distribution) set by the target electric power distribution setting unit 362. For example, the duty controlling unit 364 controls the switching duty of the first DC-DC converter 313 so that, the detected value of the output current IFC of the fuel cell stack 311 outputted by the output current sensor 327 equals the target electric current of the fuel cell stack 311 outputted by the target electric current setting unit 363 (the output current Ifc).

This duty controlling unit 364 includes, for example, an electric current deviation computation unit 371, a feed back processing unit 372, and a PWM signal generation unit 373.

The electric current deviation computation unit 371 computes and outputs the electric current deviation between the detected value of the output current IFC of the fuel cell stack 311 outputted from the output current sensor 327 and the target electric current of the fuel cell stack 311 (the output current Ifc) outputted from the target electric current setting unit 363.

The feedback processing unit 372 computes an electric voltage command value by controlling and amplifying the electric current deviation outputted by the electric current deviation computation unit 371 through, for example, a PID (Proportional Integral Derivative) operation.

In order to output an output current Ifc from the fuel cell stack 311 corresponding to the electric voltage command value outputted from the feedback processing unit 372, the PWM signal creation unit 373 creates and outputs a gate signal (namely, a PWM signal) that turns on and off each of the transistors AH, BH, and CH of the high side arm of the first DC-DC converter 313 as well as each of the transistors AL, BL, and CL of the low side arm.

While the drive motor 322 is driven, for example, the drive motor controlling unit 365 performs a feed back control (a vector control) of the electric current on a dq-coordinate system in the form of a rotating orthogonal coordinate. This drive motor controlling unit 365 computes a target d-axis electric current and a target q-axis electric current according to a torque command based on a driver's accelerating operation and the number of rotations of the drive motor 322. Then, the drive motor controlling unit 365 computes each of the three phase output electric voltage Vu, Vv, and Vw based on the target d-axis electric current and the target q-axis electric current. Further, the drive motor controlling unit 365 inputs a PWM signal, which is a gate signal, to the bridge circuit 351 of the drive motor inverter 315 according to each phase of the output electric voltage Vu, Vv, and Vw. At the same time, the drive motor controlling unit 365 performs a control so that the deviation between the d-axis electric current and the q-axis electric current obtained by converting the detected values of each phase of the electric current Iu, Iv, and Iw, actually supplied by the F-drive motor inverter 315 to the drive motor 322, to the dq-coordinate system, and the deviation between the target d-axis electric current and the target q-axis electric current equal zero.

In addition, when the drive motor 322 is regenerated, for example, the drive motor controlling unit 365 turns on and off, each of the transistors of the bridge circuit 351 of the drive motor inverter 315 according to a pulse synchronized based on the output waveform of the rotational angle θm of the rotator of the drive motor 322 outputted by the angle sensor 329. The three-phase alternating-current power outputted from the drive motor controlling unit 365 is converted to a direct-current power. At this time, the drive motor controlling unit 365 performs a feedback control of the regenerating electric voltage according to the duty of the gate signal that turns each of the transistors of the bridge circuit 351 on and off. The drive motor controlling unit 365 outputs a predetermined electric voltage value to a primary side of the drive motor inverter 315, in other words, between the secondary side positive terminal P302 of the first DC-DC converter 313 and the secondary side negative terminal N302.

In other words, when the drive motor 322 is driven, for example, the control device 325 performs a feedback control so that the detected value of the electric current (the output electric current Ifc) of the fuel cell stack 311 equals the target electric current. Thus, the control device 325 controls the switching duty of the first DC-DC converter 313. This control device 325 continuously controls the operating mode of the power supply device 310 as shown in FIG. 50, for example.

Figure 51A:
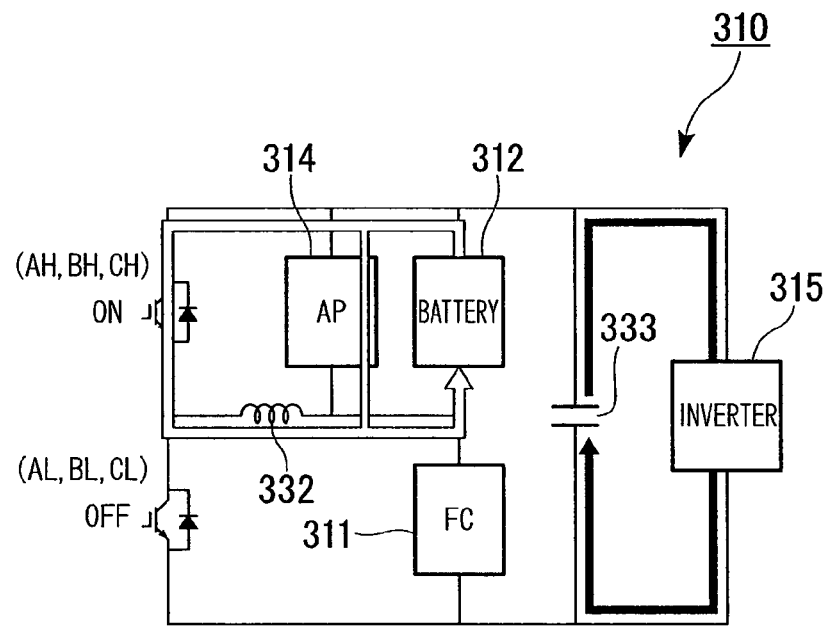
FIG. 51A shows an electricity supply state during an operation mode (EV mode) of a power supply device when a drive motor is driven according to the above embodiment.
Figure 51B:
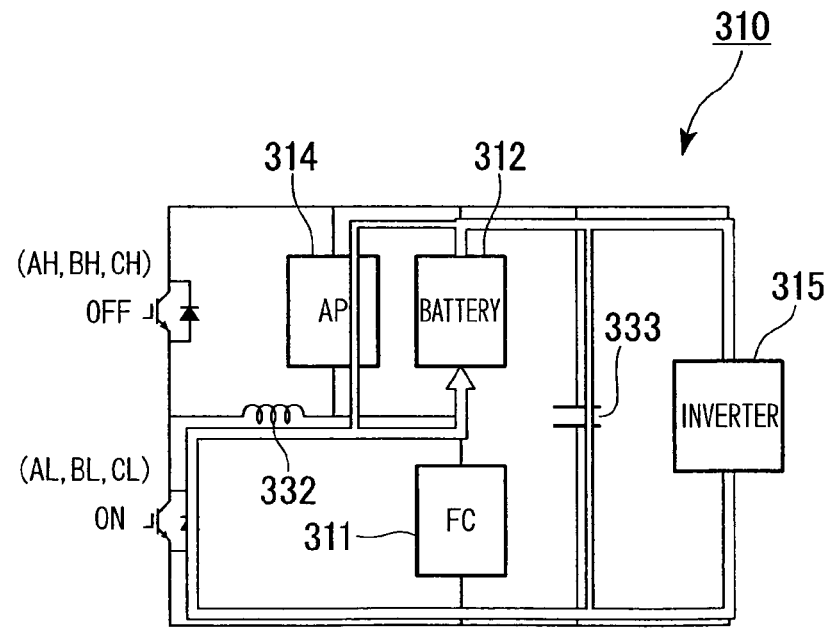
FIG. 51B shows an electricity supply state during an operation mode (EV mode) of a power supply device when a drive motor is driven according to the above embodiment.
Figure 52A:
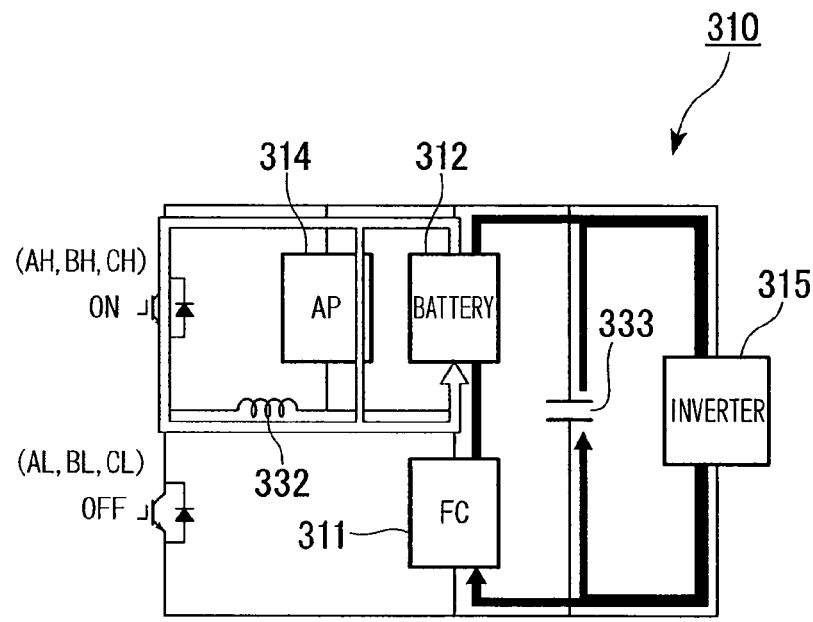
FIG. 52A shows an electricity supply state during an operation mode (first (FC+battery) mode) of a power supply device when a drive motor is driven according to the above embodiment.
Figure 52B:
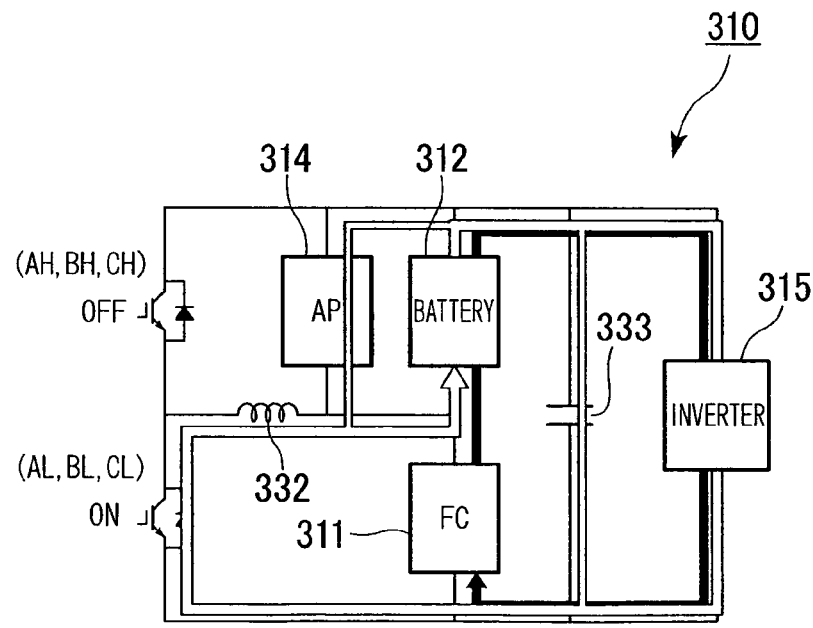
FIG. 52B shows an electricity supply state during an operation mode (first (FC+battery) mode) of a power supply device when a drive motor is driven according to the above embodiment.
Figure 53A:
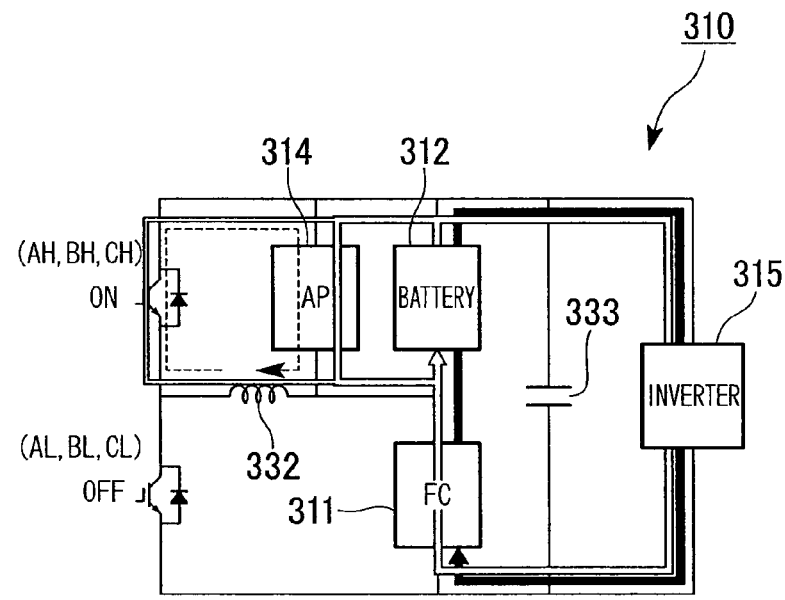
FIG. 53A shows an electricity supply state during an operation mode (second (FC+battery) mode) of a power supply device when a drive motor is driven according to the above embodiment.
Figure 53B:
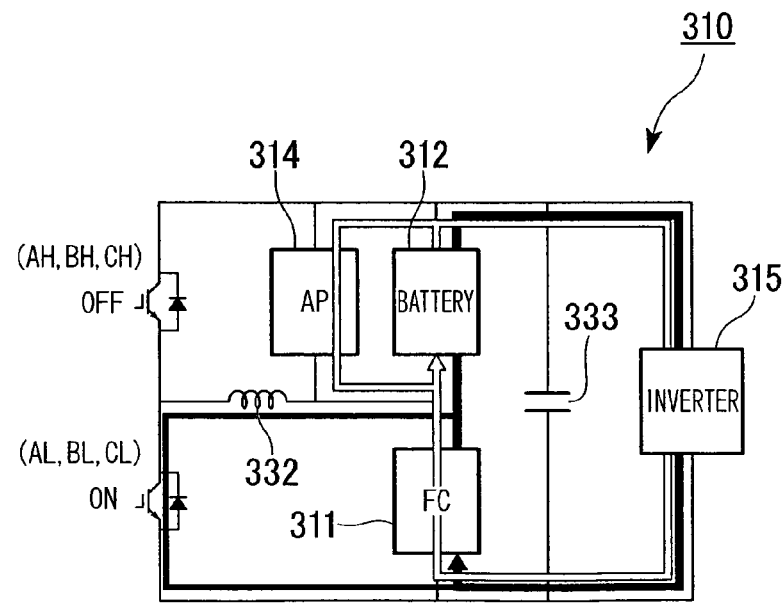
FIG. 53B shows an electricity supply state during an operation mode (second (FC+battery) mode) of a power supply device when a drive motor is driven according to the above embodiment.
Figure 54A:
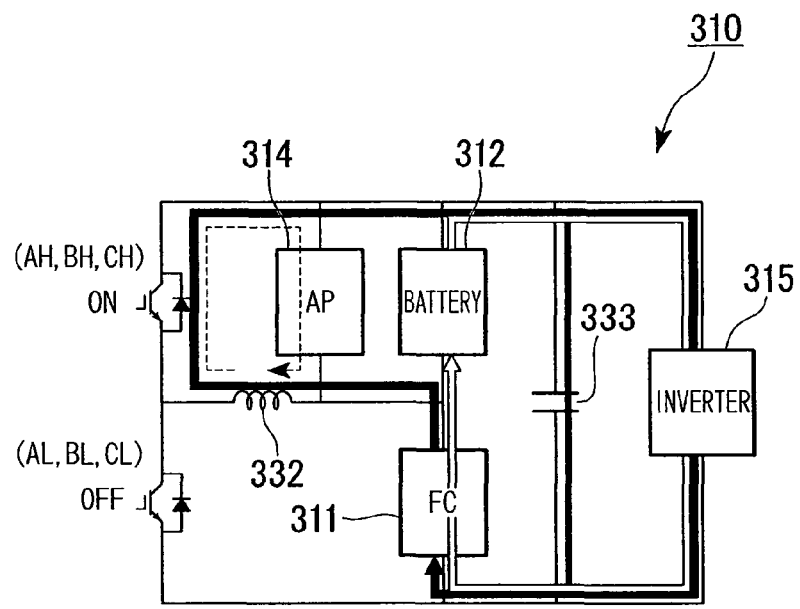
FIG. 54A shows an electricity supply state during an operation mode (third (FC+battery) mode) of a power supply device when a drive motor is driven according to the above embodiment.
Figure 54B:
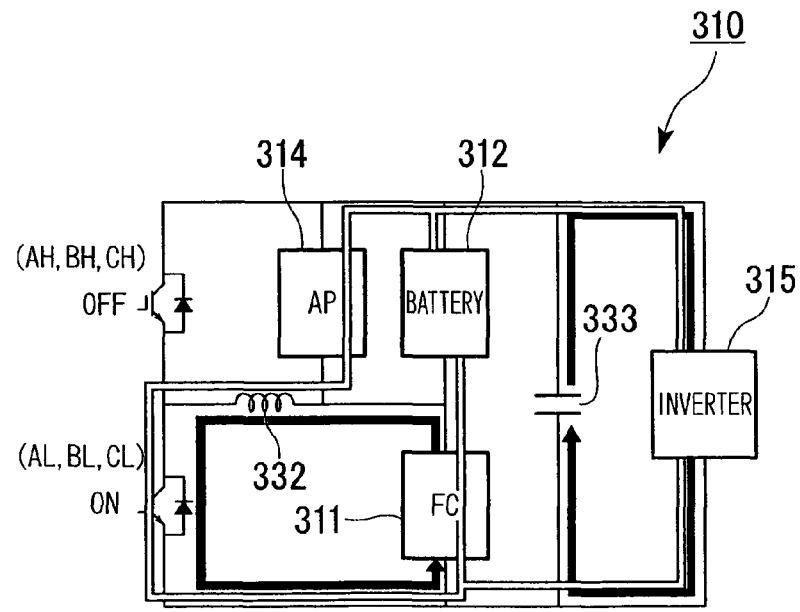
FIG. 54B shows an electricity supply state during an operation mode (third (FC+battery) mode) of a power supply device when a drive motor is driven according to the above embodiment.
Figure 55A:
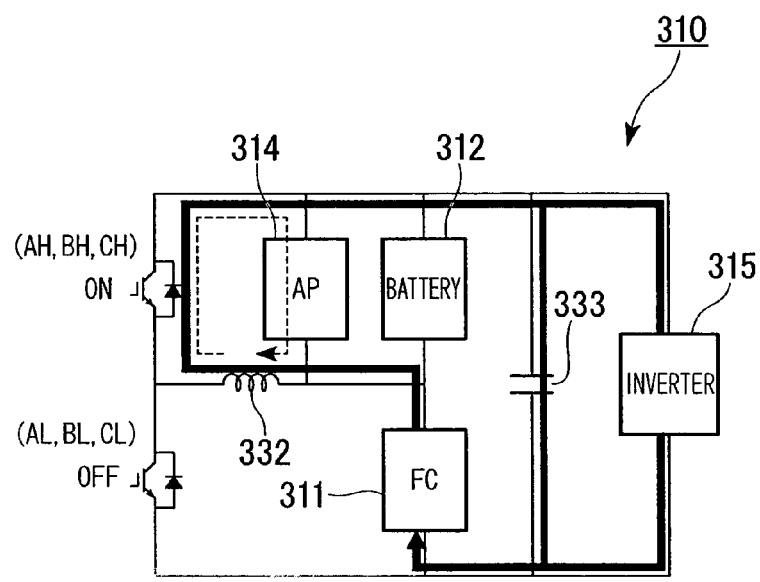
FIG. 55A shows an electricity supply state during an operation mode (first FC mode) of a power supply device when a drive motor is driven according to the above embodiment.
Figure 55B:
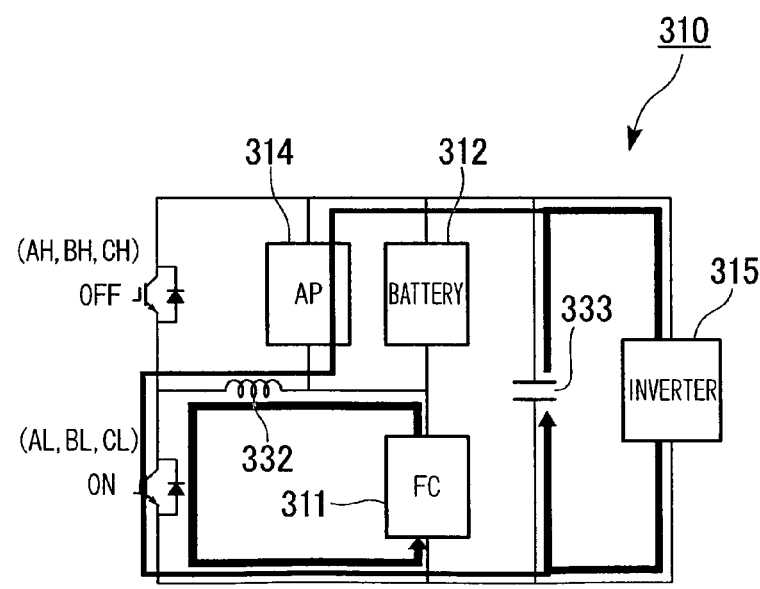
FIG. 55B shows an electricity supply state during an operation mode (first FC mode) of a power supply device when a drive motor is driven according to the above embodiment.
Figure 56A:
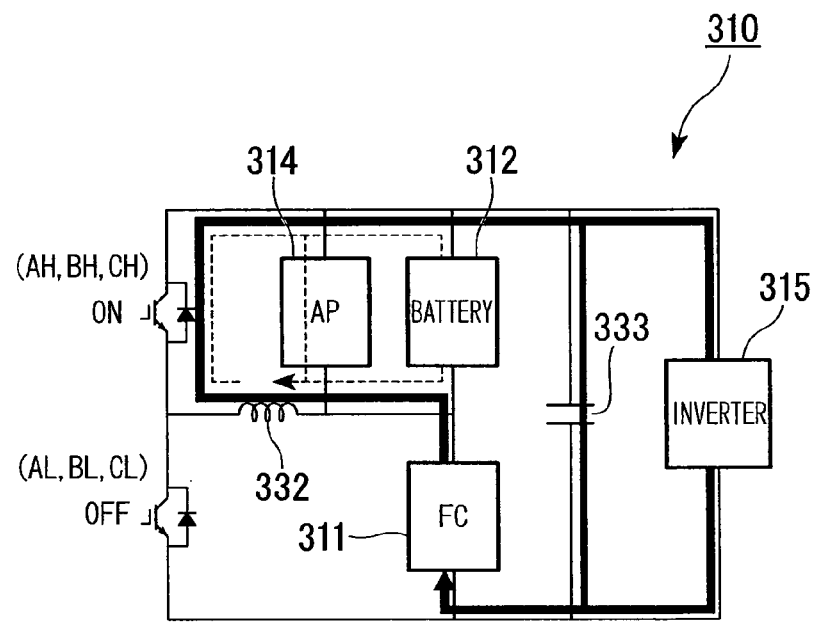
FIG. 56A shows an electricity supply state during an operation mode (second FC mode) of a power supply device when a drive motor is driven according to the above embodiment.
Figure 56B:
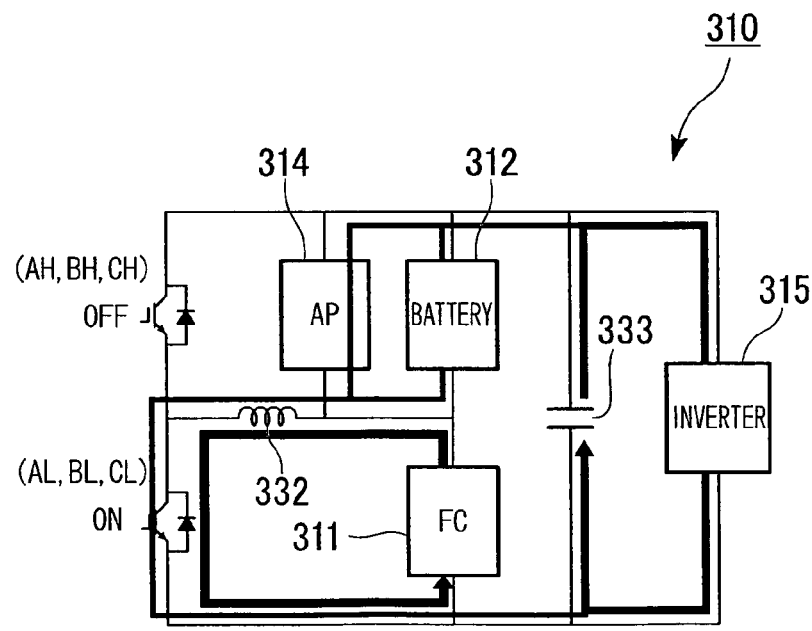
FIG. 56B shows an electricity supply state during an operation mode (second FC mode) of a power supply device when a drive motor is driven according to the above embodiment.

When, for example, the boosting ratio of the first DC-DC converter 313 approximately equals 2 to 3, the operating mode of the power supply device 310 that maximizes the switching duty is an EV mode in which only the output by the battery 312 is supplied to the drive motor inverter 315 and the air pump inverter 314, as shown in FIGS. 51A and 51B, for example.

As the switching duty tends to decline from the EV mode, the operating mode of the power supply device 310 shifts sequentially from a first (FC+battery) mode to a second (FC+battery) mode to a third (FC+battery) mode, as shown in FIGS. 52A to 54B, for example. In the first mode, the output of the battery 312 is supplied to the drive motor inverter 315 and the air pump inverter 314. At the same time, in the first mode, the output of the fuel cell stack 311 is supplied to the drive motor inverter 315, and the electric current (Ib) of the battery 312 becomes larger than the electric current (output current Ifc) of the fuel cell stack 311. In the second mode, the output of the battery 312 is supplied to the drive motor inverter 315 and the air pump inverter 314. At the same time, in the second mode, the output of the fuel cell stack 311 is supplied to the drive motor inverter 315, and the electric current (Ib) of the battery 312 becomes equal to the sum of the electric current (output current Ifc) of the fuel cell stack 311 and the electric current (IAP) flowing through the air pump inverter 314. In the third mode, the output of the battery 312 and the fuel cell stack 311 is supplied to the drive motor inverter 315 and the air pump inverter 314, and the electric current (Ib) of the battery 312 becomes smaller than the electric current (output current Ifc) of the fuel cell stack 311.

Figure 50:
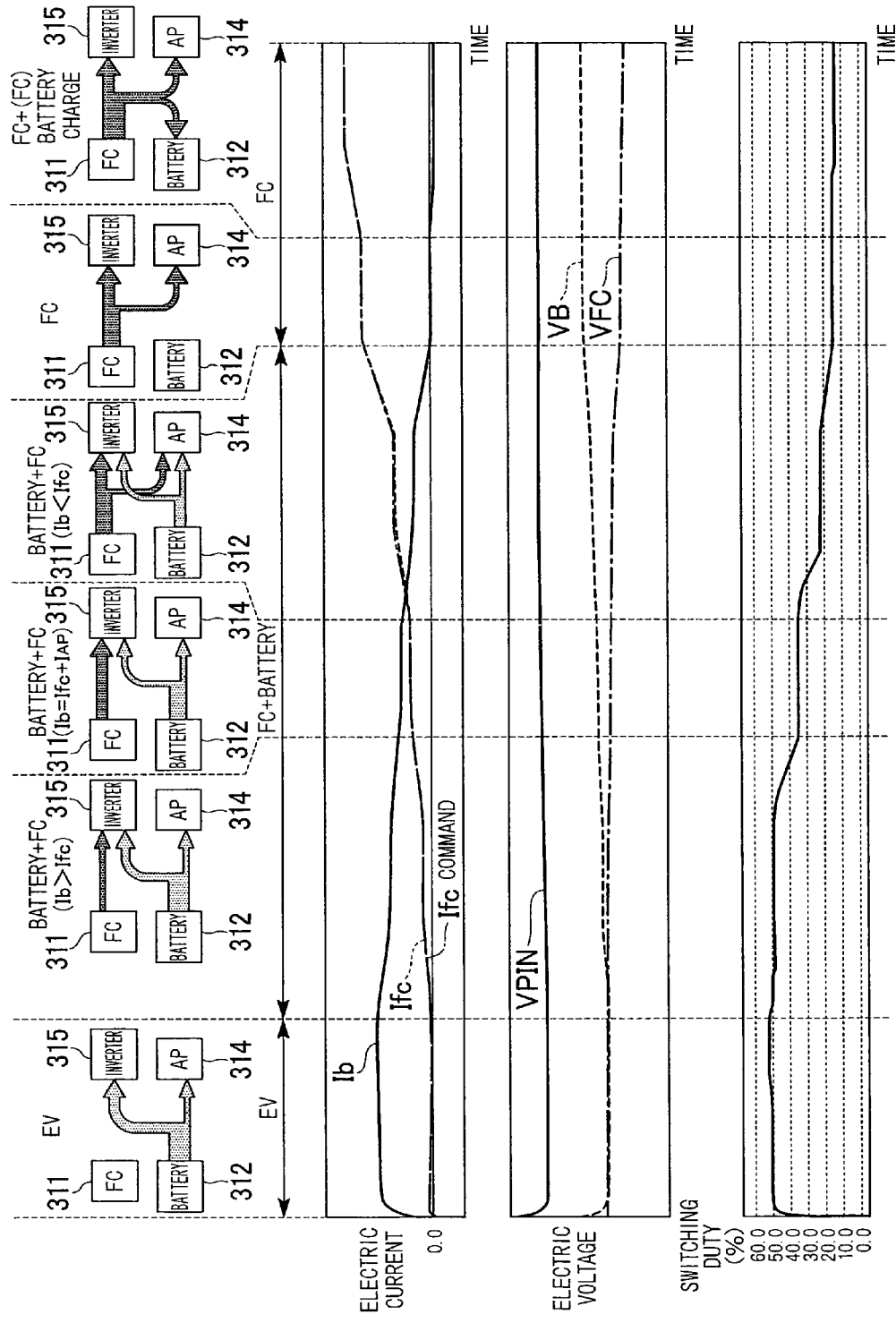
FIG. 50 shows an example of a change in an electric current and an electric voltage of a fuel cell stack and a battery, a change in an operation mode of a power supply device, corresponding to a change in a switching duty of a first DC-DC converter when a drive motor is driven according to the above embodiment.

Accordingly, the electric current (Ib) of the battery 312 tends to decline, as shown in FIG. 50 for example. In addition, the electric current (output current Ifc) of the fuel cell stack 311 and the target electric current (the Ifc command) tend to increase. The input electric voltage (VPIN) of the primary side of the drive motor inverter 315 is maintained to be approximately constant. The electric voltage of the battery 312 (VB) tends to increase, while the electric voltage of the fuel cell stack 311 (VFC) tends to decrease.

Further, as the switching duty tends to decline to a minimum value from the third (FC+battery) mode, the operating mode of the power supply device 310 shifts to the first FC mode and the second FC mode, in sequence, as shown in FIGS. 55A to 56B, for example. In the first FC mode, only the output of the fuel cell stack 311 is supplied to the drive motor inverter 315 and the air pump inverter 314. In the second FC mode, only the output of the fuel cell stack 311 is supplied to the drive motor inverter 315, the air pump inverter 314, and the battery 312, therefore charging the battery 312.

Accordingly, the electric current (Ib) of the battery 312 tends to decrease from zero to a negative value as shown in FIG. 50 for example. Meanwhile, the electric current (the output current Ifc) of the fuel cell stack 311 and the target electric current (the Ifc command) tend to increase. In addition, the input electric voltage (VPIN) in the primary side of the drive motor inverter 315 is maintained to be approximately constant. The electric voltage of the battery 312 (VB) tends to increase. On the other hand, the electric voltage of the fuel cell stack 311 (VFC) tends to decrease.

When the drive motor 322 is regenerated, for example, the control device 325 performs a feedback control so that the detected value of the electric current of the fuel cell stack 311 (the output current Ifc) equals the target electric current (either zero or a positive value). This control device 325 controls the switching duty of the first DC-DC converter 313 by performing a feedback control of the regenerative electric voltage.

Figure 57A:
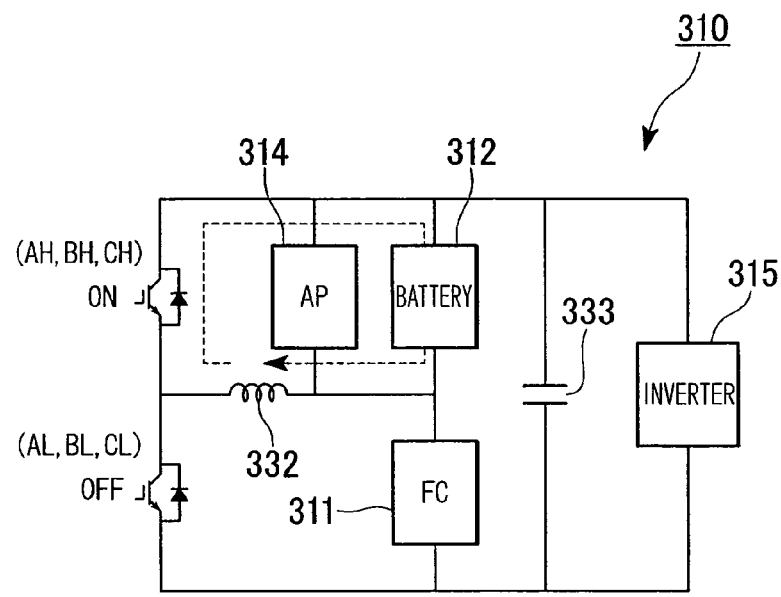
FIG. 57A shows an electricity supply state during an operation mode (regeneration mode) of a power supply device when a drive motor is regenerated according to the above embodiment.
Figure 57B:
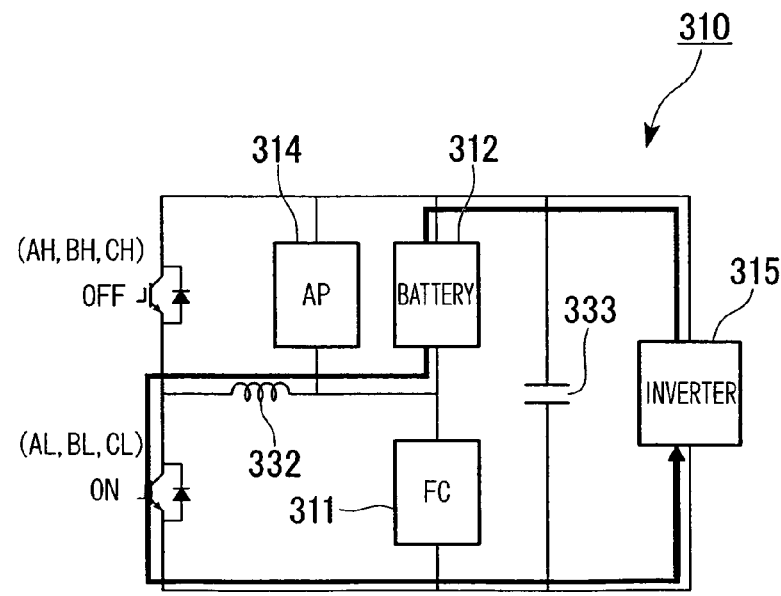
FIG. 57B shows an electricity supply state during an operation mode (regeneration mode) of a power supply device when a drive motor is regenerated according to the above embodiment.

For example, the operating mode of the power supply device 310 in which the target of the electric current of the fuel cell stack 311 (the output current Ifc) equals zero is, as shown in FIGS. 57A and 57B, the regenerative mode in which the battery 312 is charged by the regenerative electric power of the drive motor inverter 315.

Figure 58A:
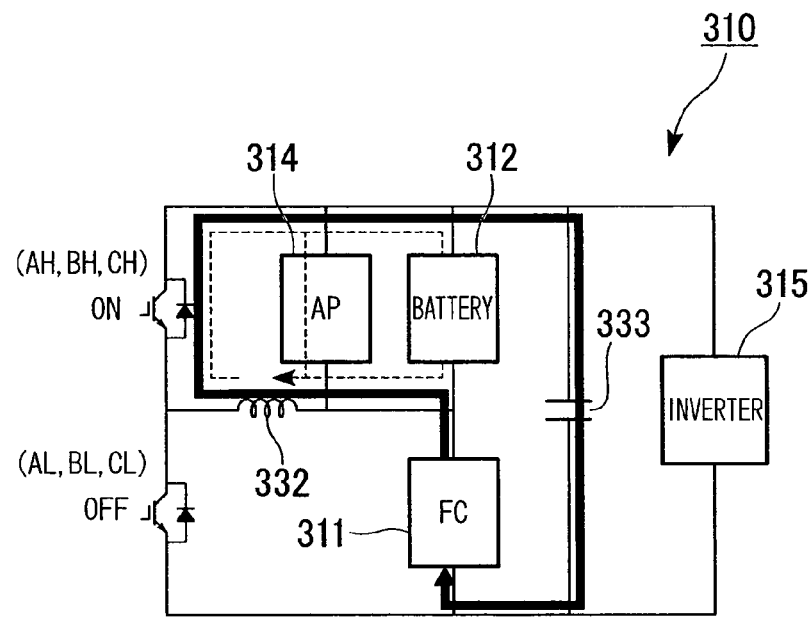
FIG. 58A shows an electricity supply state during an operation mode ((regeneration+battery charging by FC) mode) of a power supply device when a drive motor is regenerated according to the above embodiment.
Figure 58B:
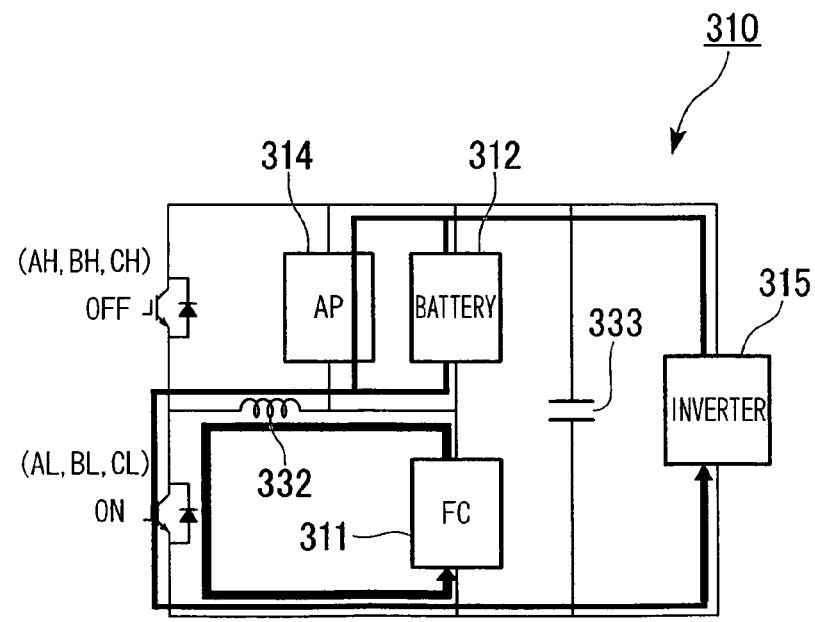
FIG. 58B shows an electricity supply state during an operation mode ((regeneration+battery charging by FC) mode) of a power supply device when a drive motor is regenerated according to the above embodiment.

Meanwhile, the operating mode of the power supply device 310 in which the target of the electric current of the fuel cell stack 311 (the output current Ifc) equals a positive value, for example, is a (regenerative+battery charging by the FC) mode in which the regenerative electric power of the drive motor inverter 315 and the output of the fuel cell stack 311 are supplied to the air pump inverter 314 and the battery 312, and the battery 312 is charged, as shown in FIGS. 58A and 58B.

The control device 325 outputs a command value regarding the pressure and the flux of the reactive gas supplied to the fuel cell stack 311, as a command to the fuel cell stack 311 to generate electric power, the output of the command value being based on, for example, the condition in which the fuel cell vehicle is driven, the concentration of hydrogen included in the reactive gas supplied to the anode of the fuel cell stack 311, the concentration of hydrogen included in the discharge gas emitted from the anode of the fuel cell stack 311, the condition in which the fuel cell stack 311 is generating electric power, the electric voltage between the terminals of each of the plurality of fuel cells, the electric voltage VFC of the fuel cell stack 311, the output current Ifc of the fuel cell stack 311, and the internal temperature of the fuel cell stack 311. In this way, the control device 325 controls the condition in which the fuel cell stack 311 generates electric power.

The control device 325 switches over the on and off conditions of the contactor 311a according to the condition in which the fuel cell stack 311 is generating electric power. In addition, the control device 325 controls the connection between the fuel cell stack 311, the second line L302, and the third line L303.

The control device 325 also switches over the on and off conditions of the contactor 312a and the current limiting circuit 312b according to the remaining capacity SOC of the battery 312, for example. Thus, the control device 325 controls the connection between the battery 312 and the first line L301 and the second line L302.

As described above, according to the power supply device 310 based on the above embodiment of the present invention, the three-phase choke coil 332 is wrapped in common mode, and electric current is supplied in the same direction. As a result, the magnetic flux is amplified. Further, the decline in the inductance can be restrained, compared to the case in which multiple choke coils 332 are simply connected in parallel, for example. At the same time, it is possible to reduce the current ripple, the switching loss, and noise. Further, the first DC-DC converter 313 can be made smaller and lighter.

Moreover, a plurality of operating modes can be switched over merely by providing a single first DC-DC converter 313 with respect to the battery circuit 310a in which the fuel cell stack 311 and the battery 312 are connected in series. Compared to the case in which a DC-DC converter is equipped individually for each of the fuel cell stack 311 and the battery 312, for example, it is possible to lower the cost necessary for configuration and reduce the size.

Further, according to the power supply system 320 of the fuel cell vehicle based on the above embodiment of the present invention, the cost necessary for configuring the power supply device 310 can be lowered, and the size of the power supply device 310 can be reduced, by providing a single first DC-DC converter 313. Because the fuel cell stack 311 and the battery 312 are connected in series, the operating electric voltage of the drive motor inverter 315 can be augmented, and the electric current can be reduced, compared to the case in which the fuel cell stack 311 and the battery 312 are connected in parallel. In this way, the size of the drive motor 322 and the drive motor inverter 315 can be reduced. At the same time the operating efficiency can be enhanced. Therefore, the cost necessary for configuring the power supply system 320 of the fuel cell vehicle can be lowered, and the size can be reduced.

In addition, electric power can be supplied directly from the battery 312 to the air pump inverter 314. It is also possible to operate the fuel cell stack 311 appropriately.

Further, even though the condition of the first DC-DC converter 313 is abnormal (for example, when an open failure occurs), it is possible to drive the fuel cell vehicle, by supplying electric power from the battery circuit 310a to the drive motor inverter 315.

Figure 59:
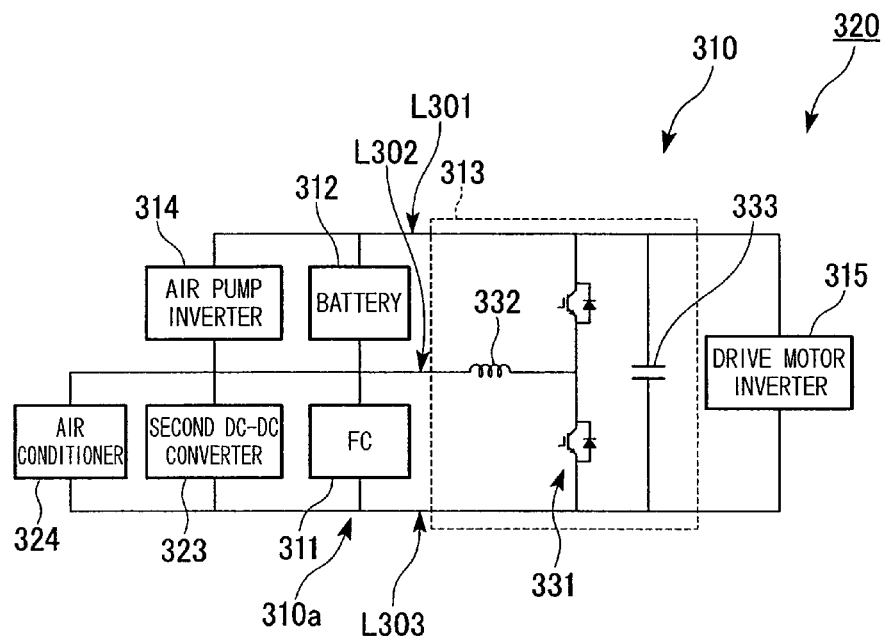
FIG. 59 is a configuration diagram of a power supply system of a fuel cell vehicle according to a second variation of the above embodiment.
Figure 60:
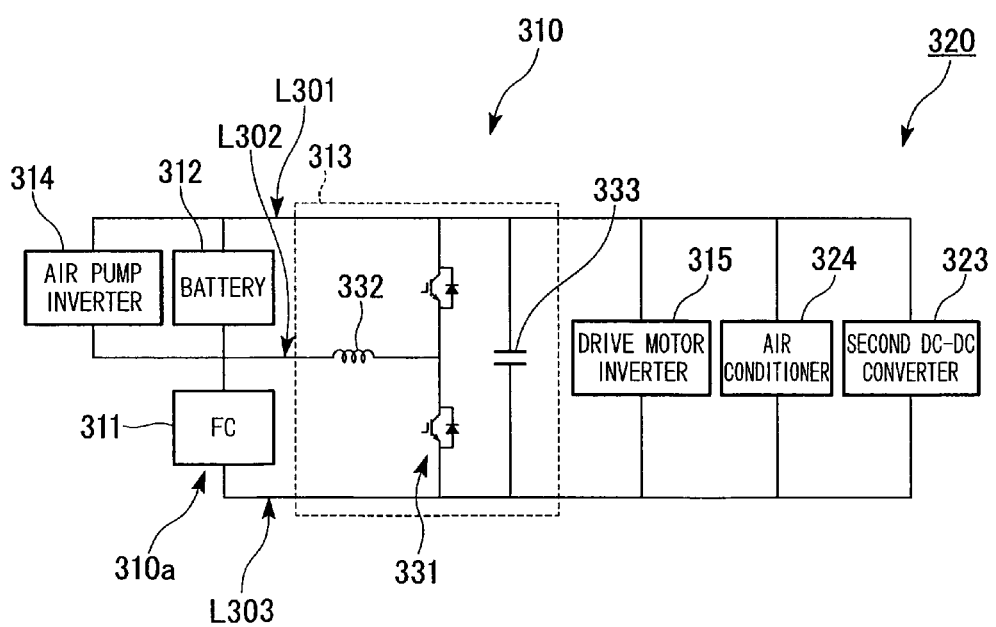
FIG. 60 is a configuration diagram of a power supply system of a fuel cell vehicle according to a third variation of the above embodiment.

According to the above embodiment, at least a portion of the vehicle auxiliary machinery equipped on the fuel cell vehicle (for example, an air conditioner 324 separate from the second DC-DC converter 323, and a load connected to the second DC-DC converter 323 (a processing device, a magnetic valve, and a 12 volt type load)) is connected to the first line L301 and the second line L302 either directly or through the second DC-DC converter 323. However, the present invention is not limited to this configuration. For example, as shown in FIG. 59, at least a part of the vehicle auxiliary machinery can be connected to the second line L302 and the third line L303. In addition, as shown in FIG. 60, at least a part of the vehicle auxiliary machinery can be connected to the first line L301 and the third line L303.

According to the above configuration, the air pump inverter 314 is connected to the first line L301 and the second line L302, the air pump inverter 314 being a drive circuit of the air pump 321. However, the present invention is not limited to this configuration. The drive circuit of at least one of a pump that supplies reactive gas to the fuel cell stack 311 (for example, the air pump 321) and a pump that supplies a refrigerant (not diagramed) can be connected to the first line L301 and the second line L302.

In addition, the drive circuit of at least one of a pump that supplies reactive gas to the fuel cell stack 311 (for example, the air pump 321) and a pump that supplies a refrigerant (not diagramed) can be connected to the second line L302 and the third line L303. The drive circuit of at least one of the above pumps can be connected to the first line L301 and the third line L303.

According to the above embodiment, the battery 312 is connected to the first line L301 and the second line L302, while the fuel cell stack 311 is connected to the second line L302 and the third line L303. However, the present invention is not limited to the above configuration. The fuel cell stack 311 can be connected to the first line L301 and the second line L302. The battery 312 can be connected to the second line L302 and the third line L303.

According to the above embodiment, the control device 325 controls the switching duty of the first DC-DC converter 313 by performing a feedback control so that the actual electric power distribution of the fuel cell stack 311 and the battery 312 equals the target electric power distribution, for example, so that the detected value of the electric current (the output current Ifc) of the fuel cell stack 311 equals the target electric current. However, the present invention is not limited to this configuration. For example, a feedback control can be performed so that, instead of the electric current of the fuel cell stack 311 (the output electric current Ifc), the electric current of the battery 312 (Ib) equals a target value. Further, a feedback control can be performed so that, instead of the electric current, the detected value of the electric voltage of the fuel cell stack 311 (VFC) or the electric voltage of the battery 312 (VB) equals a target value. It is also possible to perform a feedback control of the switching duty so that the output ratio of the fuel cell stack 311 and the battery 312 equals a target value.

Moreover, when the drive motor 322 is regenerating, for example, a feedback control can be performed so that, instead of the electric current of the fuel cell stack 311 (the output current Ifc), the output of the fuel cell stack 311 equals a target value.

According to the above embodiment, the first DC-DC converter 313, alternately switches over between a condition in which each of the transistors AH, BH, and CH of the high side arm are turned off and each of the transistors AL, BL, and CL of the low side arm are turned on, and a condition in which each of the transistors AH, BH, and CH of the high side arm are turned on and each of the transistors AL, BL, and CL of the low side arm are turned off. However, the present invention is not limited to this configuration. For example, during a boosting operation from the primary side to the secondary side when the drive motor 322 is driven, each of the transistors AL, BL, and CL of the low side arm can alternately be switched on and off while each of the transistors AH, BH, and CH of the high side arm are turned off. As another example, during a regenerative operation from the secondary side to the primary side when the drive motor 322 is regenerated, each of the transistors AH, BH, and CH of the high side arm can be alternately switched on and off while each of the transistors AL, BL, and CL of the low side arm are turned off.

Below, a description of a power supply device and a power supply system for a fuel cell vehicle according to a fifth embodiment of the present invention is provided with reference to FIGS. 61 to 80.

Figure 61:
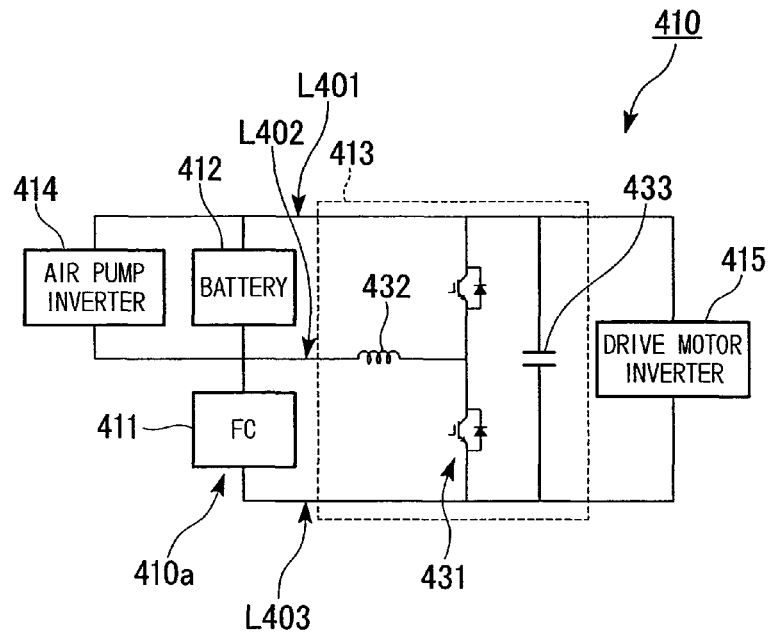
FIG. 61 is a configuration diagram of a power supply device according to a fifth embodiment of the present invention.
Figure 62:
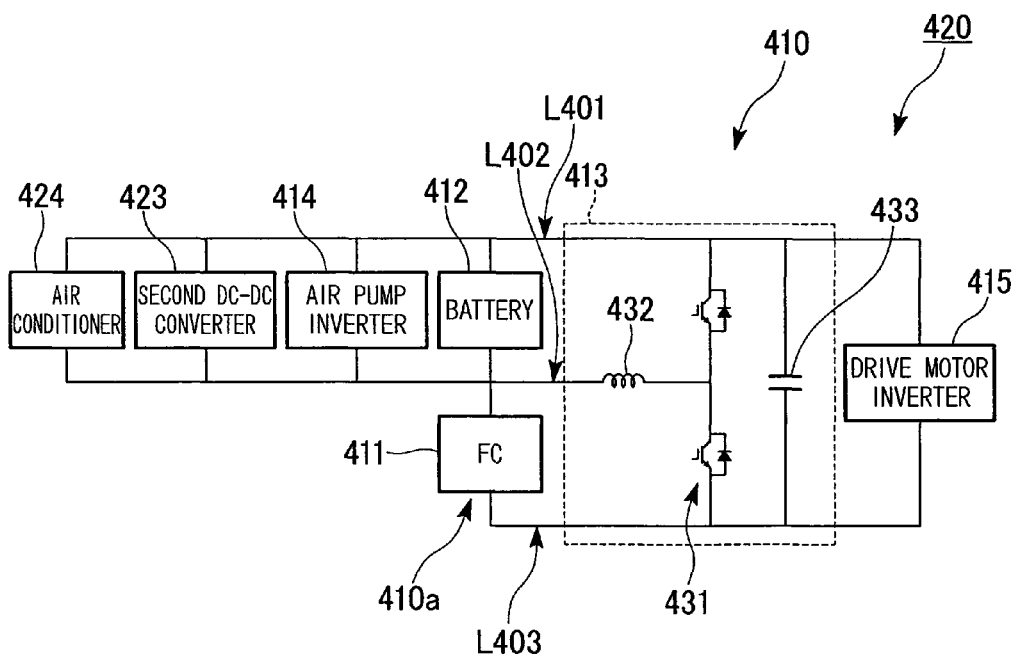
FIG. 62 is a configuration diagram of a power supply system for a fuel cell vehicle according to the above embodiment.
Figure 63:
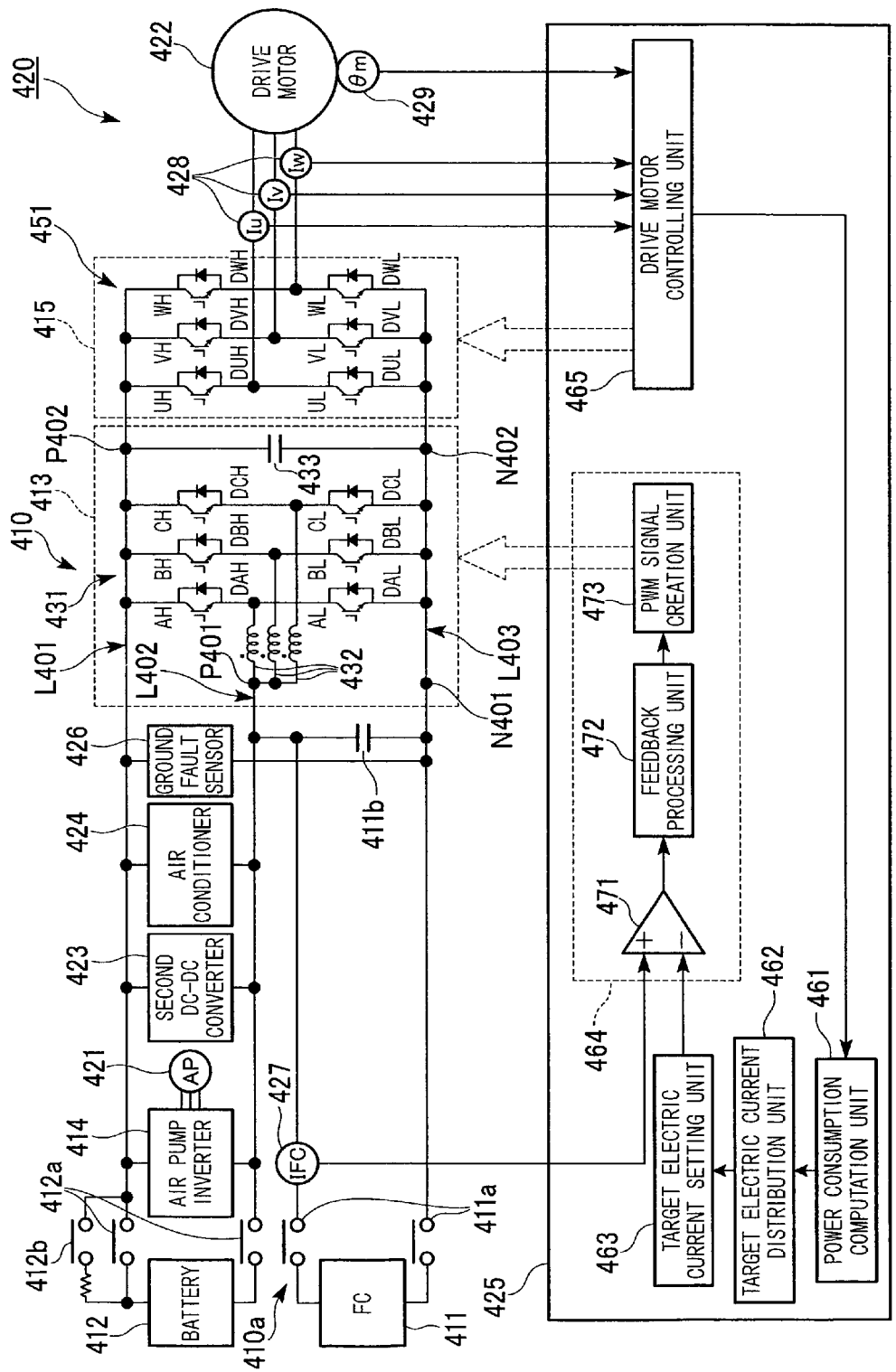
FIG. 63 is a configuration diagram of a power supply system for a fuel cell vehicle according to the above embodiment.

A power supply device 410 according to the present embodiment includes a fuel cell stack (FC) 411, a battery 412, a first DC-DC converter 413, an air pump inverter 414, and a control device 425 as shown in FIGS. 61 to 63 for example. In addition, the power supply device 410 is connected to a drive motor inverter 415, for example.

The power supply device 410 is provided in a power supply system 420 for a fuel cell vehicle, for example. For example, this power supply system 420 for the fuel cell vehicle includes, as shown in FIGS. 62 and 63, the power supply device 410, an air pump (AP) 421, a drive motor 422, a second DC-DC converter 423, an air conditioner 424, a ground fault sensor 426, an output current sensor 427, a phase current sensor 428, and an angle sensor 429.

The fuel cell stack 411 is formed by layering multiple fuel cells including a solid polymer electrolyte membrane comprising a cation exchange membrane and the like, the solid polymer electrolyte membrane being held by a fuel electrode (anode) including an anode catalyst and a gas diffusion layer, and an oxygen electrode (cathode) including a cathode catalyst and a gas diffusion layer, the solid polymer electrolyte membrane and the anode and the cathode thus forming an electrolytic electrode structure, the electrolytic electrode structure further being held by a pair of separators. The laminated body of the fuel cell is sandwiched by a pair of end plates from both sides of the direction in which the layers are formed.

Air is supplied to the cathode of the fuel cell stack 411 from the air pump 421, the air being an oxidant gas (reactant gas) including oxygen. A fuel gas (reactant gas) including hydrogen is supplied to the anode from a high-pressure hydrogen tank (not diagramed), for example.

The hydrogen is ionized by the catalytic reaction with the anode catalyst at the anode and moves to the cathode through a reasonably humidified solid polymer electrolyte membrane. An electron is generated while the hydrogen moves, and the electron is extracted by the external circuit, and is utilized as an electric energy of the direct current. At this time, the hydrogen ion, the electron, and oxygen react at the cathode, forming water.

Here, the air pump 421 brings in air from outside the vehicle and compresses the air, for example. The air pump 421 supplies this air to the cathode of the fuel cell stack 411 as reactive gas. The number of rotations of a motor (not diagramed) driving this air pump 421 is controlled by the air pump inverter 414 according to a control command outputted by the control device 425. The air pump inverter 414 includes a PWM inverter based on a pulse width modulation (PWM).

As an alternative to the battery 412, the power supply device 410 can include, for example, a capacitor as an electric storage device, the capacitor including an electric double layer capacitor or an electrolytic capacitor.

The first DC-DC converter 413 is, for example, a chopper type DC-DC converter. As shown in FIG. 63, this first DC-DC converter 413 includes a bridge circuit 431 with three phases, a choke coil 432 with three phases, and a smoothing capacitor 433. The above bridge circuit 431 includes a plurality of switching elements (for example, an IGBT: Insulated Gate Bipolar Mode Transistor) which are bridge-connected.

The first DC-DC converter 413 is shown in FIGS. 61 and 62 in simplified form. Thus, among the three phases, only one phase of the switching element and the choke coil 432 is shown in FIGS. 61 and 62.

The bridge circuit 431 is same as a three-phase bridge circuit 451 forming the drive motor inverter 415 described later. In the bridge circuit 431, a high-side and a low-side first transistor AH and AL, a high-side and a low-side second transistor BH and BL, and a high-side and a low-side third transistor CH and CL, which form a pair for each of the phases, are bridge-connected. Each of the transistors AH, BH, and CH form a high side arm by a collector being connected to a secondary side positive terminal P402. Each of the transistors AL, BL, and CL form a low side arm by an emitter being connected to a secondary side negative terminal N402. For each phase, the emitter of each of the transistors AH, BH, and CH of the high side arm is connected to the collector of each of the transistors AL, BL, and CL of the low side arm. Between the collector and the emitter of each of the transistors AH, AL, BH, BL, CH, and CL, each of the diodes DAH, DAL, DBH, DBL, DCH, and DCL are connected, so that the direction from the emitter to the collector is the forward direction.

This bridge circuit 431 is driven by a signal (PWM signal) which is pulse-width modulated (PWM), the signal being outputted from the control device 425 and inputted to a gate of each of the transistors. A condition in which each of the transistors AH, BH, and C11 of the high side arm are turned on and each of the transistors AL, BL, and CL of the low side arm are turned off, and another condition in which each of the transistors AH, BH, and CH of the high side arm are turned off and each of the transistors AL, BL, and CL of the low side arm are turned on, are switched over in alternation.

The smoothing capacitor 433 is connected to the secondary side positive terminal P402 and the secondary side negative terminal N402.

Regarding the three-phase choke coil 432, an end of each of the choke coil 432 is connected between the collector and the emitter of each of the phases of the bridge circuit 431. In other words, the end of each of the choke coil 432 is connected, respectively, between the collector and the emitter of each of the transistors AH and AL, between the collector and emitter of each of the transistors BH and BL, and between the collector and emitter of each of the transistors CH and CL. The other side of each of the choke coil 432 is connected mutually to the primary side positive terminal P401.

Figure 64:
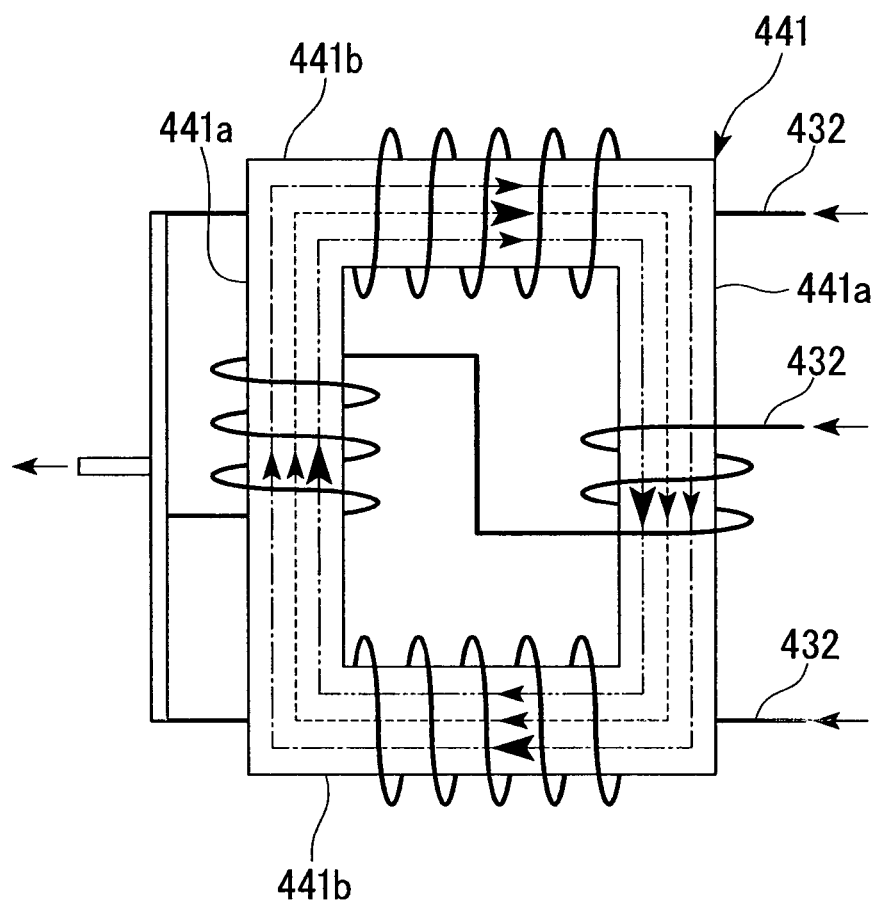
FIG. 64 is a configuration diagram of a choke coil with three phases according to the above embodiment.

The three-phase choke coil 432 is formed by wrapping around a single rectangular core 441 in common mode, as shown in FIG. 64 for example. This choke coil 432 is set so that the direction of the magnetic flux, generated by each of the choke coil 432 while electricity is supplied, is in the same direction.

One phase of the three-phase choke coil 432 is dispersed and wrapped around a pair of opposite sides 441a which is one of the two pairs of opposite sides forming the rectangular core 441. The other two phases of the three-phase choke coil 432 is concentrated and wrapped around the other pair of opposite sides 441b among the two pairs of opposite sides forming the rectangular core 441.

Figure 65:
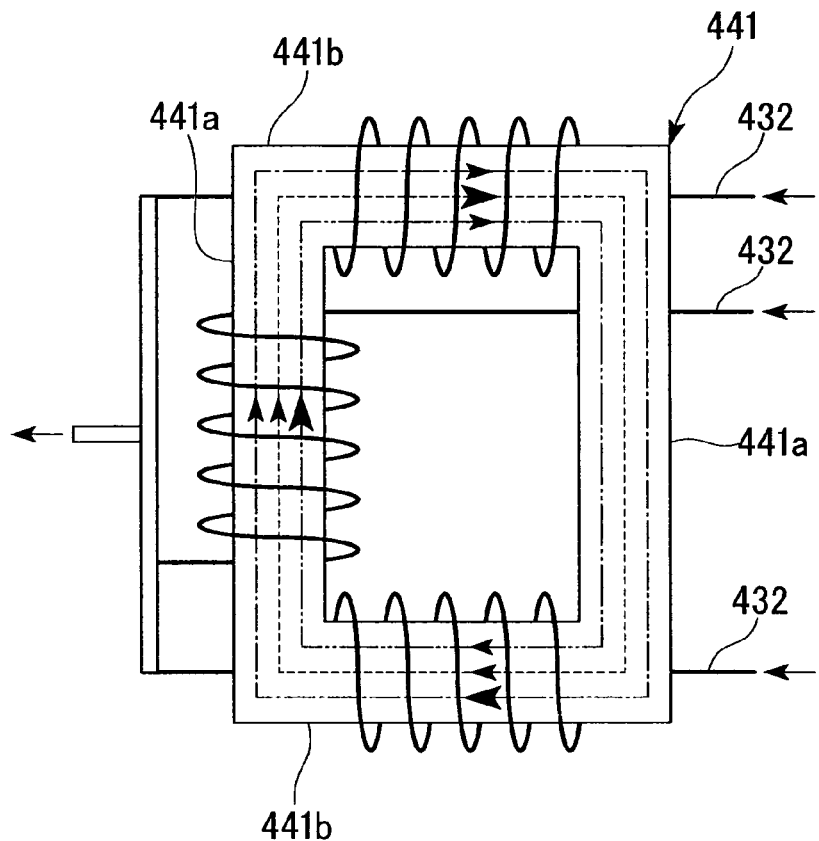
FIG. 65 is a configuration diagram of a choke coil with three phases according to a first variation of the above embodiment.

Each of the three-phase choke coil 432 can be concentrated and wrapped around three sides of the four sides forming the rectangular core 441, as shown in FIG. 65 for example. Further, each of the three-phase choke coil 432 can have a different winding structure.

With respect to three lines L401, L402, and L403, each having a different electric potential from one another (for example, electric potential of L401>electric potential of L402>electric potential of L403), a primary side of the first DC-DC converter 413 is connected to the second line L402 and the third line L403. The secondary side of the DC-DC converter 413 is connected to the first line L401 and the third line L403. In other words, the first line L401 is connected to the secondary side positive terminal P402, the second line L402 is connected to the primary side positive terminal P401, and the third line L403 is connected to the primary side negative terminal N401 and the secondary side negative terminal N402.

Concerning this first DC-DC converter 413, when a boost operation is performed from the primary side to the secondary side, at the time the drive motor 422 is driven for example, each of the transistors AH, BH, and CH of the high side arm are first turned off. At the same time, each of the transistors AL, BL, and CL of the low side arm are turned on. Due to the electric current flowing from the primary side, the choke coil 432 undergoes a direct current energization, and magnetic energy is accumulated.

Then, each of the transistors AH, BH, and CH of the high side arm are turned on. At the same time, each of the transistors AL, BL, and CL of the low side arm are turned off. While preventing a change in the magnetic flux due to the interruption of the electric current flowing through the choke coil 432, an induced voltage is generated between both ends of the choke coil 432. The induced voltage, generated by magnetic energy accumulated in the choke coil 432, is added to the input voltage in the primary side. In this way, a boosting voltage, higher than the input voltage in the primary side, is applied to the secondary side. The fluctuation in voltage, generated during this switchover operation, is smoothed by the smoothing capacitor 433. In addition, a boosting voltage is outputted from the secondary side.

On the other hand, during a regenerating operation from the secondary side to the primary side when the drive motor 422 is regenerated for example, each of the transistors AH, BH, and CH of the high side arm are first turned off. At the same time, each of the transistors AL, BL, and CL of the low side arm are turned on. The choke coil 432 undergoes a direct-current energization by the electric current inputted from the secondary side, and magnetic energy is accumulated.

Then, each of the transistors AH, BH, and CH of the high side arm are turned on. At the same time, each of the transistors AL, BL, and CL of the low side arm are turned off. While preventing a change in the magnetic flux due to the blockage of the electric current flowing through the choke coil 432, an induced voltage is generated between both ends of the choke coil 432. The induced voltage, generated by the magnetic energy accumulated in the choke coil 432, becomes a depressed voltage generated by stepping down the input voltage of the secondary side according to the on/off ratio of each of the transistors AH, BH, and CH of the high side arm. In this way, a depressed voltage is applied to the primary side.

The first DC-DC converter 413 is driven by a signal (PWM signal) which is pulse-width modulated (PWM), the signal being outputted from the control device 425 and inputted to a gate of each of the transistors. The first DC-DC converter 413 switches over the on/off condition of each of the transistors AH, BH, and CH of the high side arm and each of the transistors AL, BL, and CL of the low side arm, according to a switching duty defined, for example, as a ratio of each of the transistors AH, BH, and CH of the high side arm that are turned on during one cycle of the PWM signal.

Incidentally, each of the transistors AH, BH, and CH of the high side arm and each of the transistors AL, BL, and CL of the low side arm are prohibited from being simultaneously turned on when the on/off condition is switched over. An appropriate dead time is provided during which each of the above transistors can be simultaneously turned off.

The fuel cell stack 411 is connected to the second line L402 and the third line L403 through a contactor 411a and a capacitor 411b placed in the positive electrode side and the negative electrode side. The battery 412 is connected to the first line L401 and the second line L402 through a contactor 412a placed in the positive electrode side and the negative electrode side, and through a current limiting circuit 412b placed in the positive electrode side. Therefore, the fuel cell stack 411 and the battery 412 are connected in series between the first line L401 and the third line L403. The fuel cell stack 411 and the battery 412 thus comprise the battery circuit 410a.

While electric power is outputted from the first line L401 and the third line L403 to a load (for example, the drive motor 422), the first line L401 and the third line L403 are connected to the drive motor inverter 415.

The air pump inverter 414 is connected to the first line L401 and the second line L402. This air pump inverter 414 is a drive circuit of the air pump 421.

The drive motor inverter 415, comprising a drive circuit of the three-phase drive motor 422, is a PWM inverter with a pulse-width modulation (PWM). This drive motor inverter 415 includes a three-phase bridge circuit 451 comprising a plurality of switching elements (for example, an IGBT: Insulated Gate Bipolar Mode Transistor) which are bridge-connected.

The bridge circuit 451 is same as a three-phase bridge circuit 431 forming the first DC-DC converter 413. In the bridge circuit 451, a high-side and a low-side U-phase transistor UH and UL, a high-side and a low-side V-phase transistor VH and VL, and a high-side and a low-side W-phase transistor WH and WL, which form a pair for each of the phases, are bridge-connected for example. Each of the transistors UH, VH, and WH form a high side arm by a collector being connected to a secondary side positive terminal P402 of the first DC-DC converter 413. Each of the transistors UL, VL, and WL form a low side arm by an emitter being connected to a secondary side negative terminal N402 of the first DC-DC converter 413. For each phase, the emitter of each of the transistors UH, VH, and WH of the high side arm is connected to the collector of each of the transistors UL, VL, and WL of the low side arm. Between the collector and the emitter of each of the transistors UH, UL, VH, VL, WH, and WL, each of the diodes DUH, DUL, DVH, DVL, DWH, and DWL are connected, so that the direction from the emitter to the collector is the forward direction.

This drive motor inverter 415 is driven by a signal (PWM signal) which is pulse-width modulated (PWM), the signal being outputted from the control device 425 and inputted to a gate of each of the transistors of the bridge circuit 451. For example, when the drive motor 422 is driven, the direct-current power outputted from the power supply device 410 is converted to a three phase alternating-current power, by switching over the on (conduction) and off (interruption) condition of each of the transistors forming a pair for each of the phases. By sequentially commutating the electric current to the three phase stator winding, a U phase electric current Iu, a V phase electric current Iv, and a W phase electric current Iw, all of which are an alternating-current, are supplied to the stator winding of each phase. Meanwhile, when the drive motor 422 is regenerated, for example, the drive motor inverter 415 converts the three phase alternating-current power, outputted from the drive motor 422, to a direct-current power, and supplies the direct-current power to the first DC-DC converter 413. Then, the drive motor inverter 415 charges the battery 412, and feeds power to a load connected to the first DC-DC converter 413.

The drive motor 422 is, for example, a three phase alternating-current synchronous motor of a permanent magnet type utilizing a permanent magnet as a field. This drive motor 422 is driven and controlled by a three phase alternating-current power supplied by the drive motor inverter 415. At the same time, when the drive power is transmitted from the drive wheel side to the driver motor 422 side while the vehicle is decelerating, the drive motor 422 functions as an electric generator. In this way, the drive motor 422 creates a so-called regenerative breaking force. Further, the drive motor 422 recovers the kinetic energy of the vehicle as an electric energy.

The second DC-DC converter 423 is, for example, a chopper type DC-DC converter. At least a part of the vehicle auxiliary machinery equipped on the fuel cell vehicle (for example, a processing device, a magnetic valve, and a 12 volt type load) is connected to the second DC-DC converter 423 as a load.

The second DC-DC converter 423 is connected to the first line L401 and the second line L402. This second DC-DC converter 423 depresses the electric voltage applied between the first line L401 and the second line L402, by a chopping movement according to a control command outputted from the control device 425, and supplies the electric voltage to the load connected to the second DC-DC converter 423.

The air conditioner 424 is included in at least a part of the vehicle auxiliary machinery equipped on the fuel cell vehicle. This air conditioner 424 includes, for example, a heater loaded on the fuel cell vehicle, a motor for a compressor, and a drive circuit (for example, an inverter).

The air conditioner 424 is connected to the first line L401 and the second line L402. Electric power is supplied from the first line L401 and the second line L402 to the air conditioner 424.

The control device 425 performs a duty control, controlling the switching duty of the first DC-DC converter 413. At the same time, the control device 425 controls the electric power conversion operation of the drive motor inverter 415.

The control device 425 receives an input of a detection signal outputted by, for example, a ground fault sensor 426 which is connected to the first line L401 and the third line L403 and detects the occurrence of a ground fault, an output current sensor 427 which detects an output current IFC of the fuel cell stack 411, a phase current sensor 428 which detects each of the three phase current between the drive motor inverter 415 and the drive motor 422, and an angle sensor 429 which detects a rotational angle of a rotator of the drive motor 422 (in other words, a rotational angle of the magnetic pole of the rotor from a predetermined standard rotational position, and a rotational position of the rotational axis of the drive motor 422).

The control device 425 includes, for example, a power consumption computation unit 461, a target electric current distribution unit 462, a target electric current setting unit 463, a duty controlling unit 464, and a drive motor controlling unit 465.

The power consumption computation unit 461 computes the total power consumption of the load (from example, the drive motor 422 and the air conditioner and the vehicle auxiliary device, which are loads outside of the power supply device 410, and the air pump inverter 414, which is a load inside of the power supply device 410) to which electric power is supplied from the power supply device 410.

When the drive motor 422 is driven, for example, the target electric power distribution setting unit 462 sets the electric power distribution of the fuel cell stack 411 and the battery 412 forming the battery circuit 410a of the power supply device 410, based on, for example, the condition of the fuel cell stack (for instance, the rate of change of the condition of the fuel cell stack 411 according to a command for power generation) and the remaining capacity SOC of the battery 412. In other words, the target electric power distribution setting unit 462 sets the distribution when the total electric power consumption computed by the electric power consumption computation unit 461 is a value obtained by adding an electric power outputted by the fuel cell stack 411 and an electric power outputted by the battery 412.

For example, when the drive motor 422 is driven, the electric power distribution becomes a value corresponding to the switching duty of the first DC-DC converter 413 (in other words, the proportion of each of the transistors AH, BH, and CH of the high side arm in one cycle of the PWM signal that are turned on). The switching duty ("duty") can be expressed using the electric voltage of the fuel cell stack 411 ("VFC") and the electric voltage of the battery 412 ("VB"), as shown below.

$$\text{duty}=VFC/(VFC+VB)$$

From this equation, the ratio of the electric voltage of the fuel cell stack 411 ("VFC") and the electric voltage of the battery 412 ("VB") can be expressed, as shown below, using the switching duty ("duty").

$$VB/VFC=(1-\text{duty})/\text{duty}$$

Figure 66:
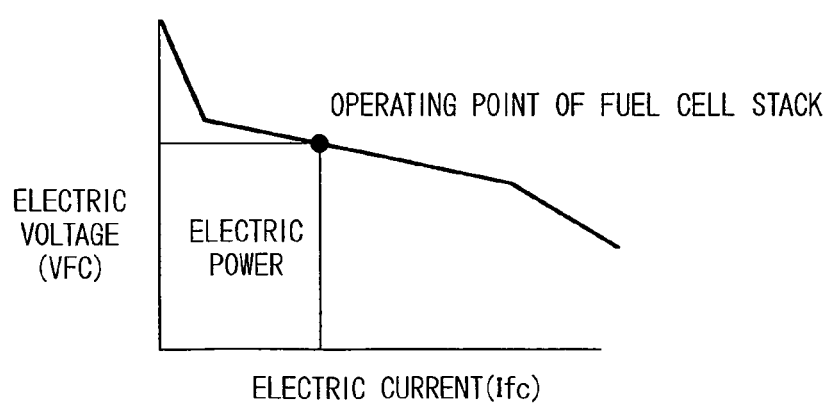
FIG. 66 shows an example of an operating point of a fuel cell stack according to the above embodiment.
Figure 67:
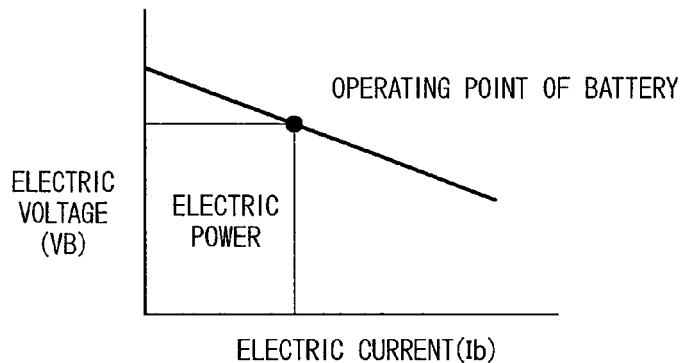
FIG. 67 shows an example of an operating point of a battery according to the above embodiment.

The electric voltage of the fuel cell stack 411 ("VFC") and the electric voltage of the battery 412 ("VB") are in a predetermined correspondence relationship with each of the electric current (output electric current Ifc) and the electric power of the fuel cell stack 411 as well as the electric current (Ib) and the electric power of the battery 412, as shown in FIGS. 66 and 67 for example. From this correspondence relationship, the ratio of the operating point of the fuel cell stack 411 (for example, the electric voltage or the electric current or the electric power) and the operating point of the battery 412 (for example, the electric voltage or the electric current or the electric power) is expressed using the switching duty ("duty").

When the drive motor 422 is regenerated, for example, the target electric power distribution setting unit 462 sets the electric power distribution of the electric power supplying side of the fuel cell stack 411 and the drive motor inverter 415, and also sets the electric power distribution of the electric power receiving side of the battery 412 and the load (for example, the air conditioner 424 and the vehicle auxiliary device and the air pump inverter 414), based on the condition of the fuel cell stack 411 (for instance, the rate of change of the condition of the fuel cell stack 411 according to a command for power generation) and the remaining capacity SOC of the battery 412, and the regenerative electric power of the drive motor 422, and the like.

Because the ratio of the operating point of the fuel cell stack 411 (for example, the electric voltage or the electric current or the electric power) and the operating point of the battery 412 (for example, the electric voltage or the electric current or the electric power) is expressed using the switching duty ("duty"), the target electric current setting unit 463 obtains the target electric current corresponding to the output electric current Ifc of the fuel cell stack 411, when the drive motor 422 is driven for example, by referring to a predetermined map representing the correspondence relationship between the operating point of the fuel cell stack 411, the operating point of the battery 412, the switching duty of the first DC-DC converter 413, and the total power consumption of the load.

Figure 68:
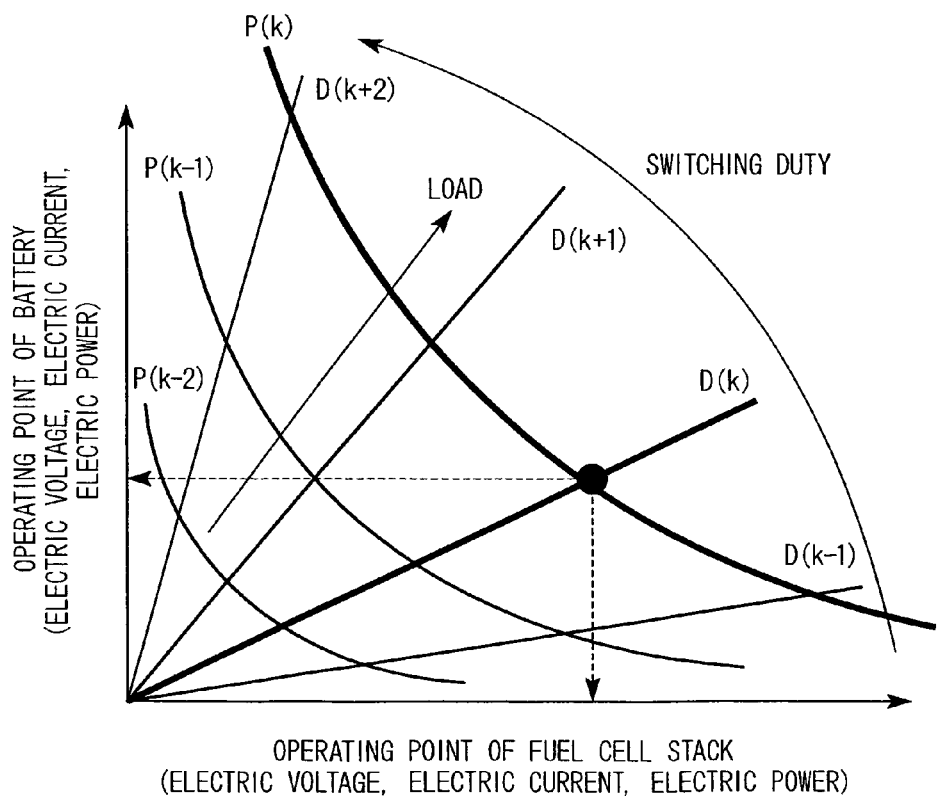
FIG. 68 shows an example of a predetermined map representing a correspondence relationship between an operating point of a fuel cell stack, an operating point of a battery, a switching duty of a first DC-DC converter, and a total power consumption of a load according to the above embodiment.

This predetermined map shows a correspondence relationship of the operating point of the fuel cell stack 411 and the operating point of the battery 412 which are set with respect to each of multiple values of the switching duty of the first DC-DC converter 413 (D(1), . . . , D(k), . . . ) on a two-dimensional coordinate in which the operating point of the fuel cell stack 411 and the operating point of the battery 412 are the orthogonal coordinates, as shown in FIG. 68, for example. In addition, the predetermined map shows the correspondence relationship between the operating point of the fuel cell stack 411 and the operating point of the battery 412 which are set with respect to each of the multiple values of the total power consumption of the load (P(1), . . . , P(k), . . . ).

Considering the correspondence relationship set for each of the multiple values of the switching duty of the first DC-DC converter 413, the operating point of the battery 412 is set to have a tendency to increase at a rate according to the switching duty, as the operating point of the fuel cell stack 411 increases.

Meanwhile, considering the correspondence relationship between the operating point of the fuel cell stack 411 and the operating point of the battery 412 which are set for each of the multiple values of the total consumption power of the load, a combination of the operating points is set so that the sum of the electric power corresponding to the operating point of the fuel cell stack 411 and the electric power corresponding to the operating point of the battery 412 equals the total consumption power of the load.

When, on a two-dimensional coordinate in which the operating point of the fuel cell stack 411 and the operating point of the battery 412 are the orthogonal coordinates, the operating point of the fuel cell stack 411 and the battery 412 is set to be the intersection between the correspondence relationship P(k) according to the total power consumption of the load computed by the consumption power computation unit 461 and the correspondence relationship D(k) according to the switching duty of the first DC-DC converter 413 according to the electric power distribution set by the target electric power distribution unit 462, the target electric current setting unit 463 outputs the electric current (output current Ifc) of the fuel cell stack 411 corresponding to this operating point, as the target electric current.

In addition, when the drive motor 422 is regenerated, for example, the target electric current setting unit 463 outputs zero or a positive value as the target electric current of the electric current (output current Ifc) of the fuel cell stack 411 according to the electric power distribution set by the target electric power distribution setting unit 462.

The duty controlling unit 464 controls the switching duty of the first DC-DC converter 413, so that the actual electric power distribution of the fuel cell stack 411 and the battery 412 equals the electric power distribution (target electric power distribution) set by the target electric power distribution setting unit 462. For example, the duty controlling unit 464 controls the switching duty of the first DC-DC converter 413 so that, the detected value of the output current IFC of the fuel cell stack 411 outputted by the output current sensor 427 equals the target electric current of the fuel cell stack 411 outputted by the target electric current setting unit 463 (the output current Ifc).

This duty controlling unit 464 includes, for example, an electric current deviation computation unit 471, a feed back processing unit 472, and a PWM signal generation unit 473.

The electric current deviation computation unit 471 computes and outputs the electric current deviation between the detected value of the output current IFC of the fuel cell stack 411 outputted from the output current sensor 427 and the target electric current of the fuel cell stack 411 (the output current Ifc) outputted from the target electric current setting unit 463.

The feedback processing unit 472 computes an electric voltage command value by controlling and amplifying the electric current deviation outputted by the electric current deviation computation unit 471 through, for example, a PID (Proportional Integral Derivative) operation.

In order to output an output current Ifc from the fuel cell stack 411 corresponding to the electric voltage command value outputted from the feedback processing unit 472, the PWM signal creation unit 473 creates and outputs a gate signal (namely, a PWM signal) that turns on and off each of the transistors AH, BH, and CH of the high side arm of the first DC-DC converter 413 as well as each of the transistors AL, BL, and CL of the low side arm.

While the drive motor 422 is driven, for example, the drive motor controlling unit 465 performs a feed back control (a vector control) of the electric current on a dq-coordinate system in the form of a rotating orthogonal coordinate. This drive motor controlling unit 465 computes a target d-axis electric current and a target q-axis electric current according to a torque command based on a driver's accelerating operation and the number of rotations of the drive motor 422. Then, the drive motor controlling unit 465 computes each of the three phase output electric voltage Vu, Vv, and Vw based on the target d-axis electric current and the target q-axis electric current. Further, the drive motor controlling unit 465 inputs a PWM signal, which is a gate signal, to the bridge circuit 451 of the drive motor inverter 415 according to each phase of the output electric voltage Vu, Vv, and Vw. At the same time, the drive motor controlling unit 465 performs a control so that the deviation between the d-axis electric current and the q-axis electric current obtained by converting the detected values of each phase of the electric current Iu, Iv, and Iw, actually supplied by the F-drive motor inverter 415 to the drive motor 422, to the dq-coordinate system, and the deviation between the target d-axis electric current and the target q-axis electric current equal zero.

In addition, when the drive motor 422 is regenerated, for example, the drive motor controlling unit 465 turns on and off, each of the transistors of the bridge circuit 451 of the drive motor inverter 415 according to a pulse synchronized based on the output waveform of the rotational angle $8m$ of the rotator of the drive motor 422 outputted by the angle sensor 429. The three-phase alternating-current power outputted from the drive motor controlling unit 465 is converted to a direct-current power. At this time, the drive motor controlling unit 465 performs a feedback control of the regenerating electric voltage according to the duty of the gate signal that turns each of the transistors of the bridge circuit 451 on and off. The drive motor controlling unit 465 outputs a predetermined electric voltage value to a primary side of the drive motor inverter 415, in other words, between the secondary side positive terminal P402 of the first DC-DC converter 413 and the secondary side negative terminal N402.

In other words, when the drive motor 422 is driven, for example, the control device 425 performs a feedback control so that the detected value of the electric current (the output electric current Ifc) of the fuel cell stack 411 equals the target electric current. Thus, the control device 425 controls the switching duty of the first DC-DC converter 413. This control device 425 continuously controls the operating mode of the power supply device 410 as shown in FIG. 69, for example.

Figure 70A:
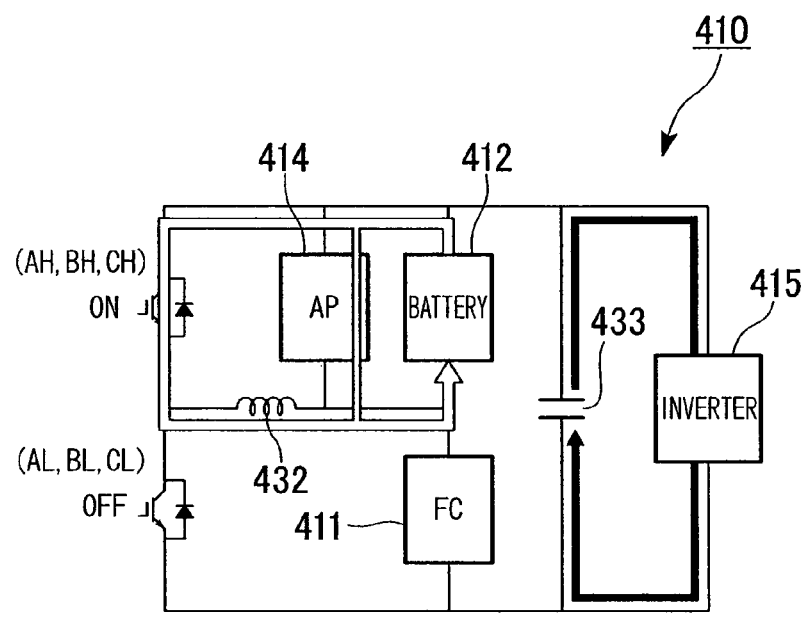
FIG. 70A shows an electricity supply state during an operation mode (EV mode) of a power supply device when a drive motor is driven according to the above embodiment.
Figure 70B:
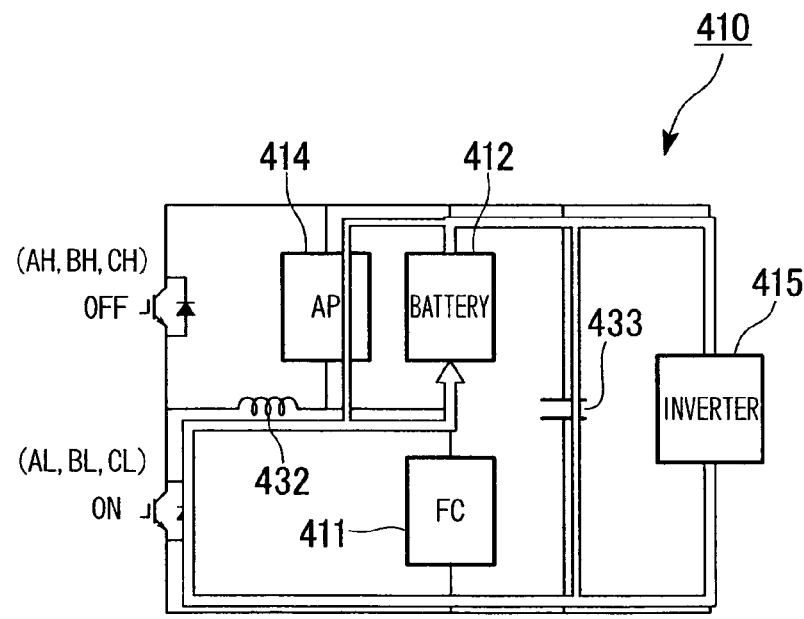
FIG. 70B shows an electricity supply state during an operation mode (EV mode) of a power supply device when a drive motor is driven according to the above embodiment.
Figure 71A:
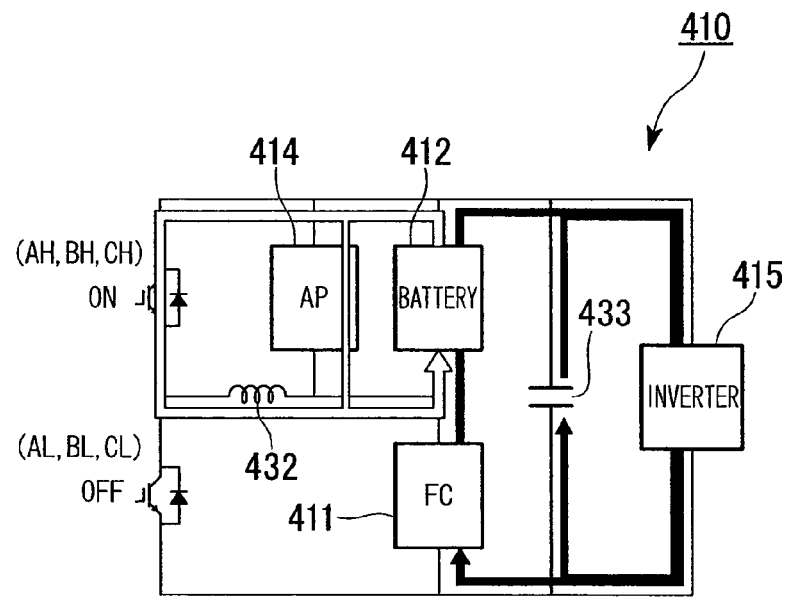
FIG. 71A shows an electricity supply state during an operation mode (first (FC+battery) mode) of a power supply device when a drive motor is driven according to the above embodiment.
Figure 71B:
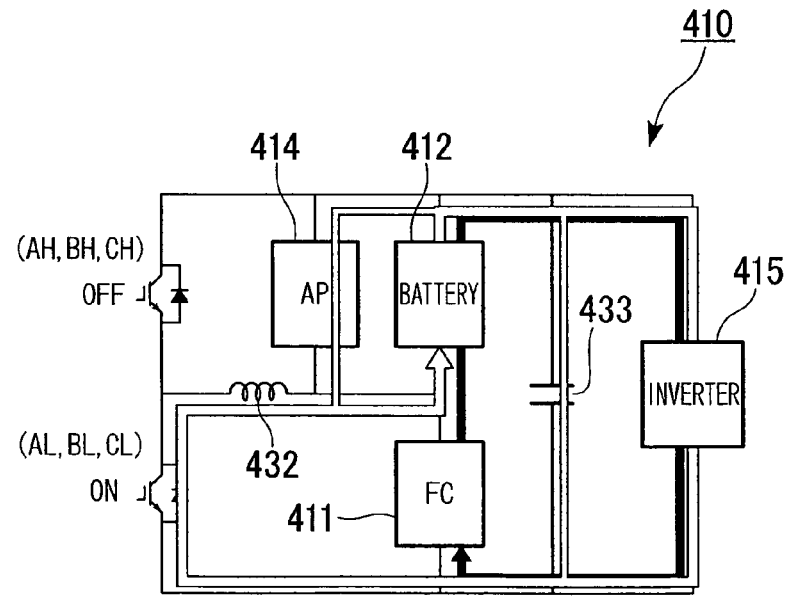
FIG. 71B shows an electricity supply state during an operation mode (first (FC+battery) mode) of a power supply device when a drive motor is driven according to the above embodiment.
Figure 72A:
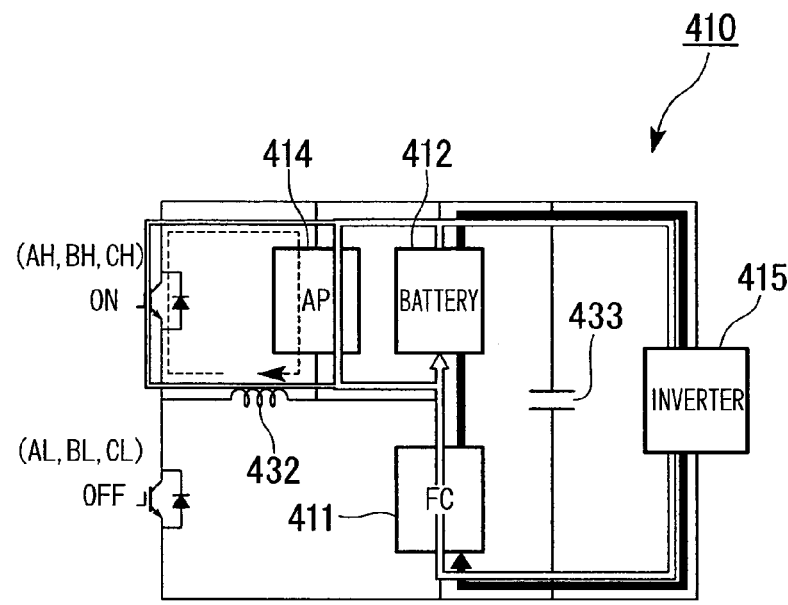
FIG. 72A shows an electricity supply state during an operation mode (second (FC+battery) mode) of a power supply device when a drive motor is driven according to the above embodiment.
Figure 72B:
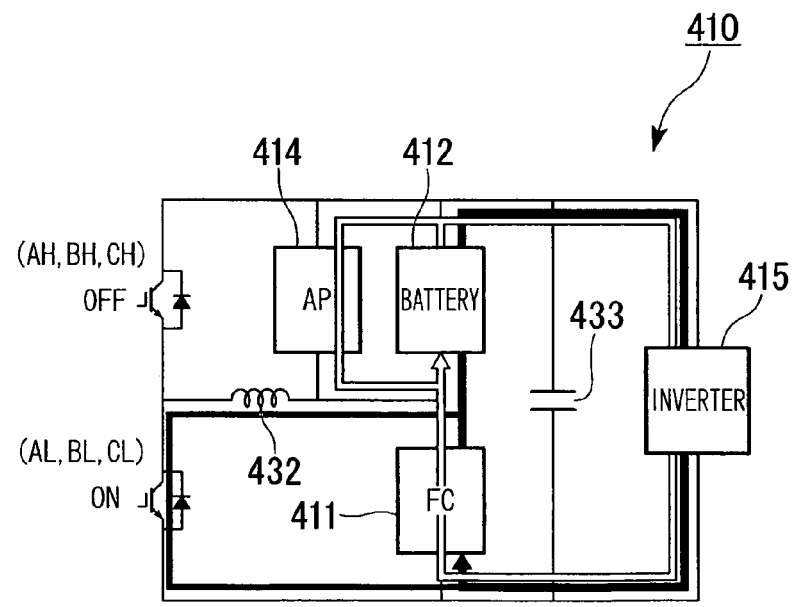
FIG. 72B shows an electricity supply state during an operation mode (second (FC+battery) mode) of a power supply device when a drive motor is driven according to the above embodiment.
Figure 73A:
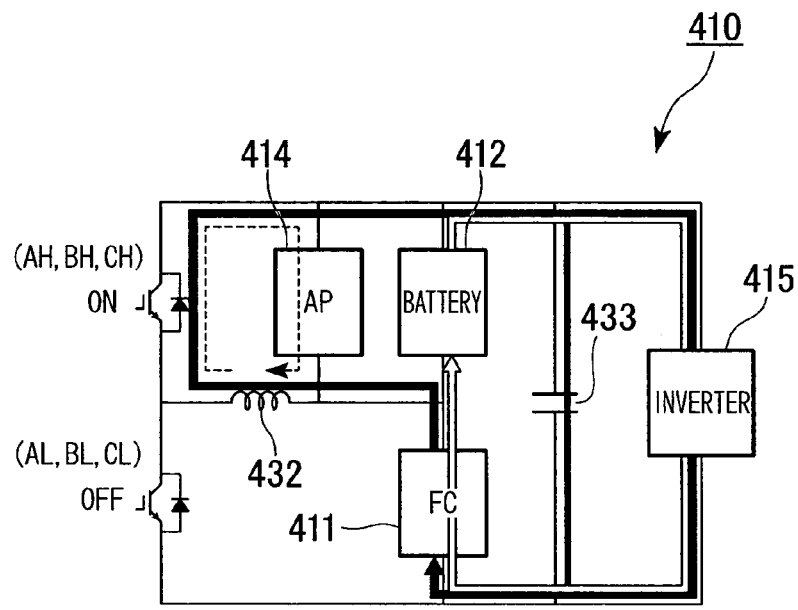
FIG. 73A shows an electricity supply state during an operation mode (third (FC+battery) mode) of a power supply device when a drive motor is driven according to the above embodiment.
Figure 73B:
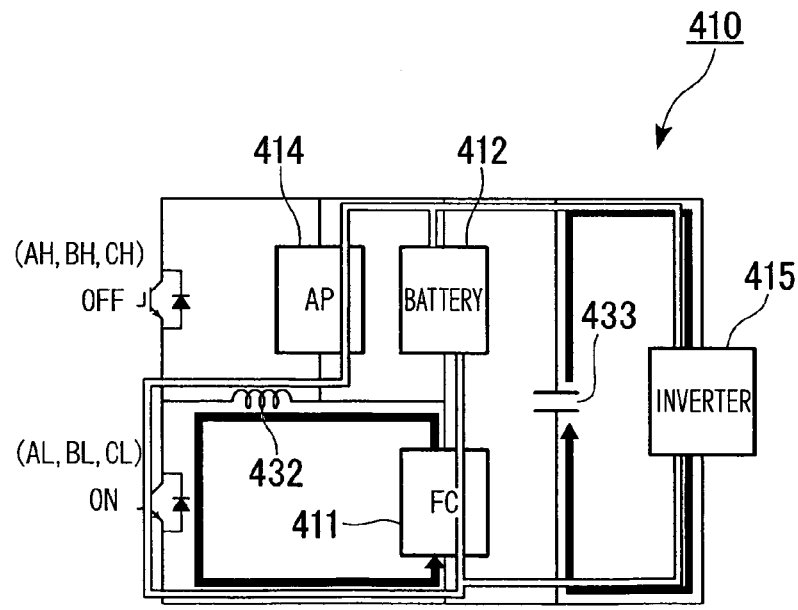
FIG. 73B shows an electricity supply state during an operation mode (third (FC+battery) mode) of a power supply device when a drive motor is driven according to the above embodiment.
Figure 74A:
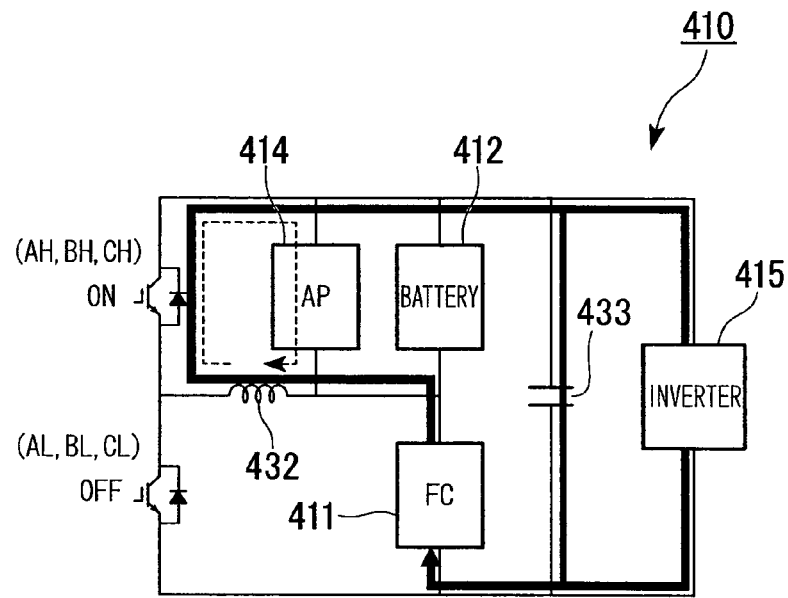
FIG. 74A shows an electricity supply state during an operation mode (first FC mode) of a power supply device when a drive motor is driven according to the above embodiment.
Figure 74B:
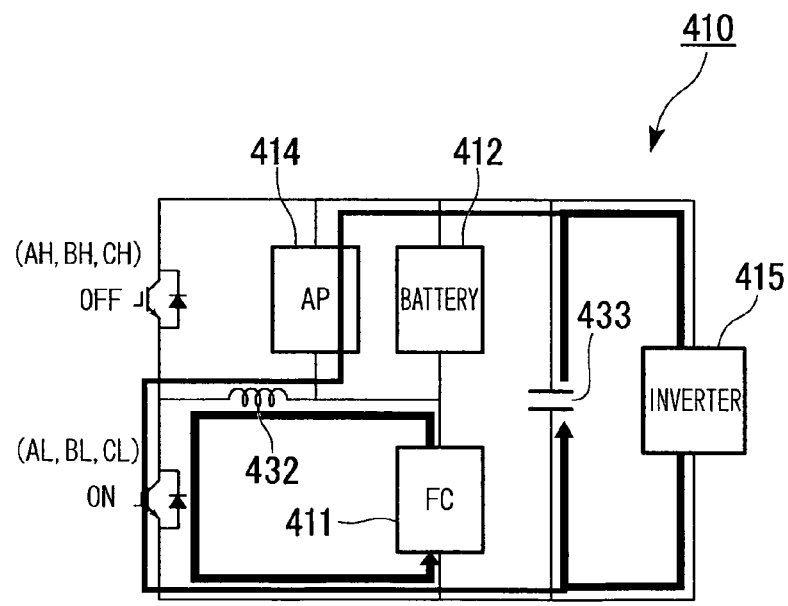
FIG. 74B shows an electricity supply state during an operation mode (first FC mode) of a power supply device when a drive motor is driven according to the above embodiment.
Figure 75A:
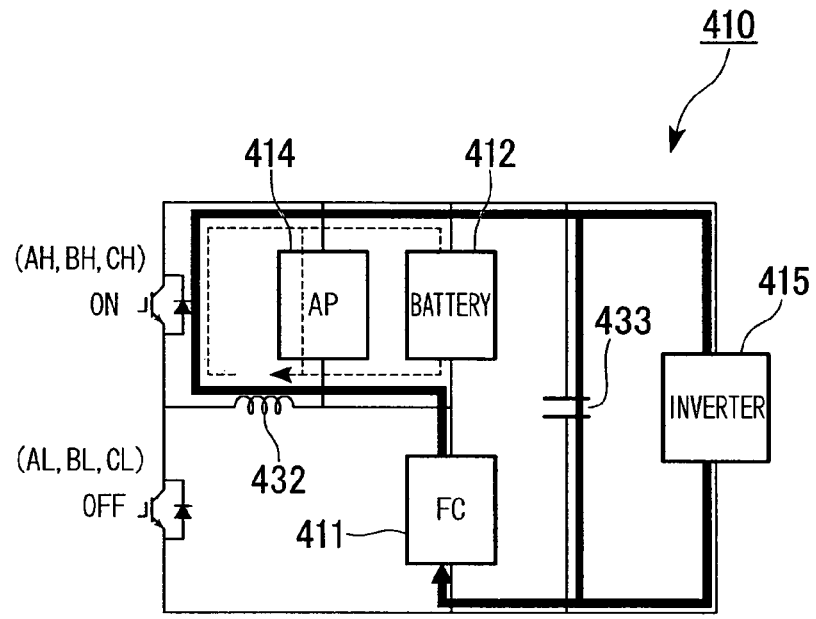
FIG. 75A shows an electricity supply state during an operation mode (second FC mode) of a power supply device when a drive motor is driven according to the above embodiment.
Figure 75B:
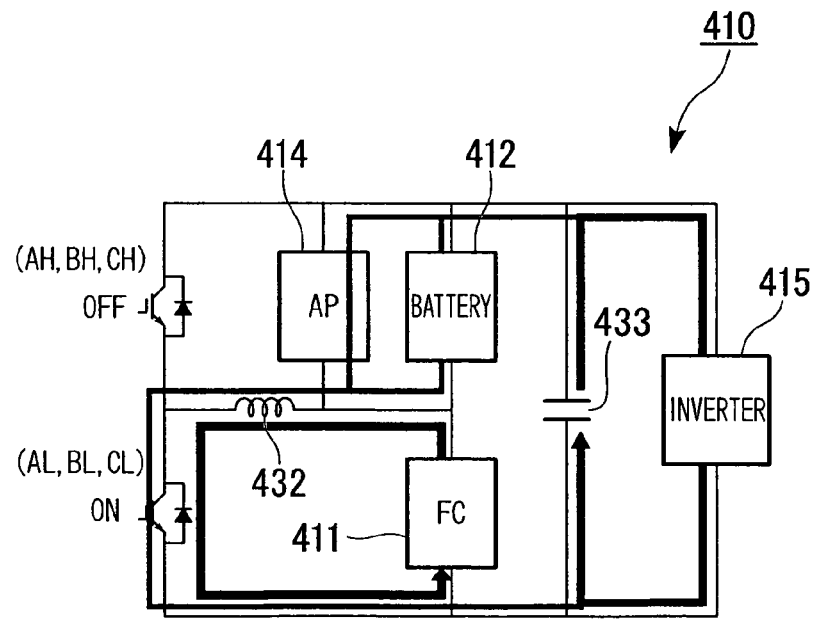
FIG. 75B shows an electricity supply state during an operation mode (second FC mode) of a power supply device when a drive motor is driven according to the above embodiment.

When, for example, the boosting ratio of the first DC-DC converter 413 approximately equals 2 to 3, the operating mode of the power supply device 410 that maximizes the switching duty is an EV mode in which only the output by the battery 412 is supplied to the drive motor inverter 415 and the air pump inverter 414, as shown in FIGS. 70A and 70B, for example.

As the switching duty tends to decline from the EV mode, the operating mode of the power supply device 410 shifts sequentially from a first (FC+battery) mode to a second (FC+battery) mode to a third (FC+battery) mode, as shown in FIGS. 71A to 73B, for example. In the first mode, the output of the battery 412 is supplied to the drive motor inverter 415 and the air pump inverter 414. At the same time, in the first mode, the output of the fuel cell stack 411 is supplied to the drive motor inverter 415, and the electric current (Ib) of the battery 412 becomes larger than the electric current (output current Ifc) of the fuel cell stack 411. In the second mode, the output of the battery 412 is supplied to the drive motor inverter 415 and the air pump inverter 414. At the same time, in the second mode, the output of the fuel cell stack 411 is supplied to the drive motor inverter 415, and the electric current (Ib) of the battery 412 becomes equal to the sum of the electric current (output current Ifc) of the fuel cell stack 411 and the electric current (IAP) flowing through the air pump inverter 414. In the third mode, the output of the battery 412 and the fuel cell stack 411 is supplied to the drive motor inverter 415 and the air pump inverter 414, and the electric current (Ib) of the battery 412 becomes smaller than the electric current (output current Ifc) of the fuel cell stack 411.

Figure 69:
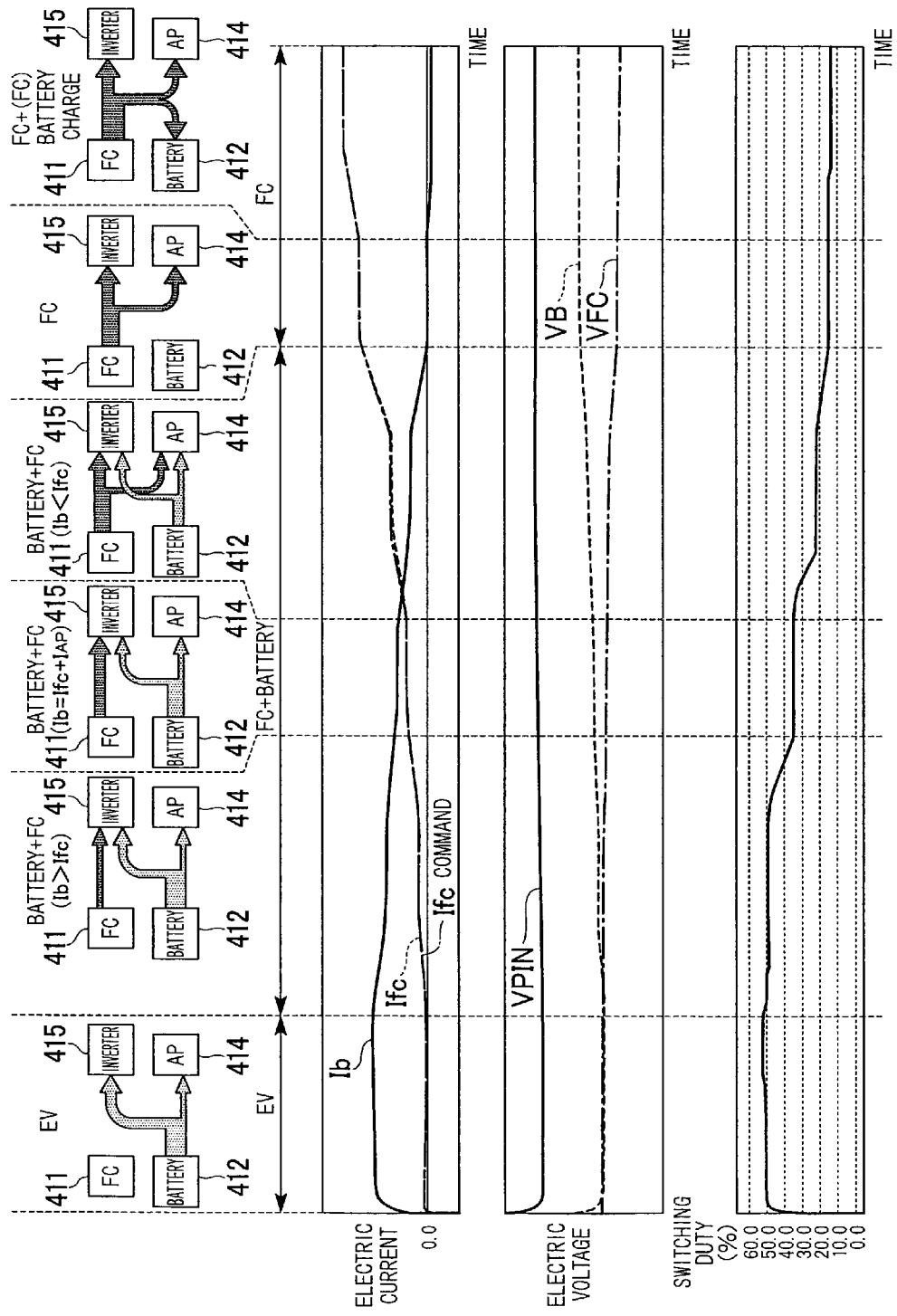
FIG. 69 shows an example of a change in an electric current and an electric voltage of a fuel cell stack and a battery, a change in an operation mode of a power supply device, corresponding to a change in a switching duty of a first DC-DC converter when a drive motor is driven according to the above embodiment.

Accordingly, the electric current (Ib) of the battery 412 tends to decline, as shown in FIG. 69 for example. In addition, the electric current (output current Ifc) of the fuel cell stack 411 and the target electric current (the Ifc command) tend to increase. The input electric voltage (VPIN) of the primary side of the drive motor inverter 415 is maintained to be approximately constant. The electric voltage of the battery 412 (VB) tends to increase, while the electric voltage of the fuel cell stack 411 (VFC) tends to decrease.

Further, as the switching duty tends to decline to a minimum value from the third (FC+battery) mode, the operating mode of the power supply device 410 shifts to the first FC mode and the second FC mode, in sequence, as shown in FIGS. 74A to 75B, for example. In the first FC mode, only the output of the fuel cell stack 411 is supplied to the drive motor inverter 415 and the air pump inverter 414. In the second FC mode, only the output of the fuel cell stack 411 is supplied to the drive motor inverter 415, the air pump inverter 414, and the battery 412, therefore charging the battery 412.

Accordingly, the electric current (Ib) of the battery 412 tends to decrease from zero to a negative value as shown in FIG. 69 for example. Meanwhile, the electric current (the output current Ifc) of the fuel cell stack 411 and the target electric current (the Ifc command) tend to increase. In addition, the input electric voltage (VPIN) in the primary side of the drive motor inverter 415 is maintained to be approximately constant. The electric voltage of the battery 412 (VB) tends to increase. On the other hand, the electric voltage of the fuel cell stack 411 (VFC) tends to decrease.

When the drive motor 422 is regenerated, for example, the control device 425 performs a feedback control so that the detected value of the electric current of the fuel cell stack 411 (the output current Ifc) equals the target electric current (either zero or a positive value). This control device 425 controls the switching duty of the first DC-DC converter 413 by performing a feedback control of the regenerative electric voltage.

Figure 76A:
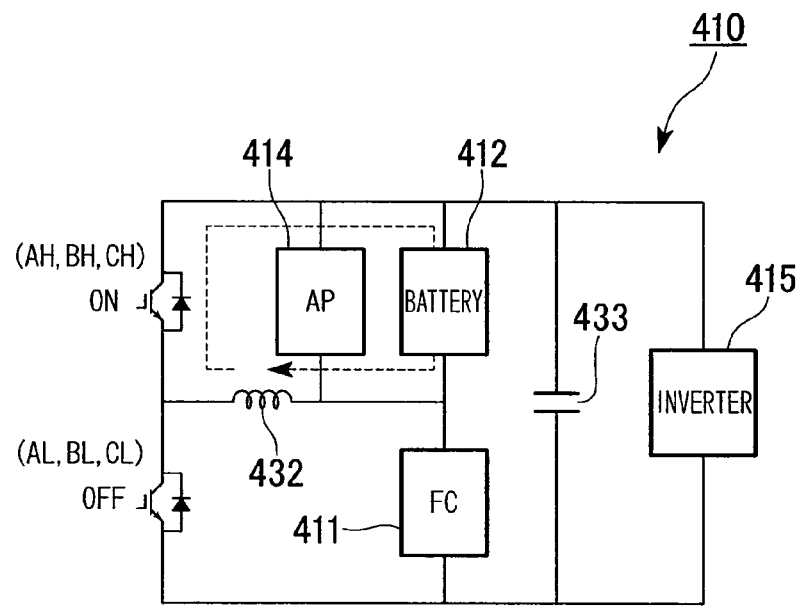
FIG. 76A shows an electricity supply state during an operation mode (regeneration mode) of a power supply device when a drive motor is regenerated according to the above embodiment.
Figure 76B:
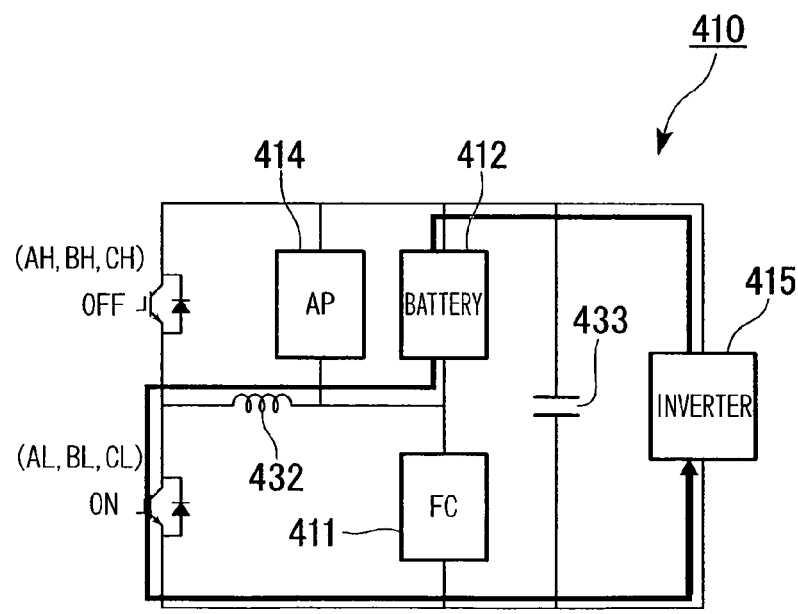
FIG. 76B shows an electricity supply state during an operation mode (regeneration mode) of a power supply device when a drive motor is regenerated according to the above embodiment.

For example, the operating mode of the power supply device 410 in which the target of the electric current of the fuel cell stack 411 (the output current Ifc) equals zero is, as shown in FIGS. 76A and 76B, the regenerative mode in which the battery 412 is charged by the regenerative electric power of the drive motor inverter 415.

Figure 77A:
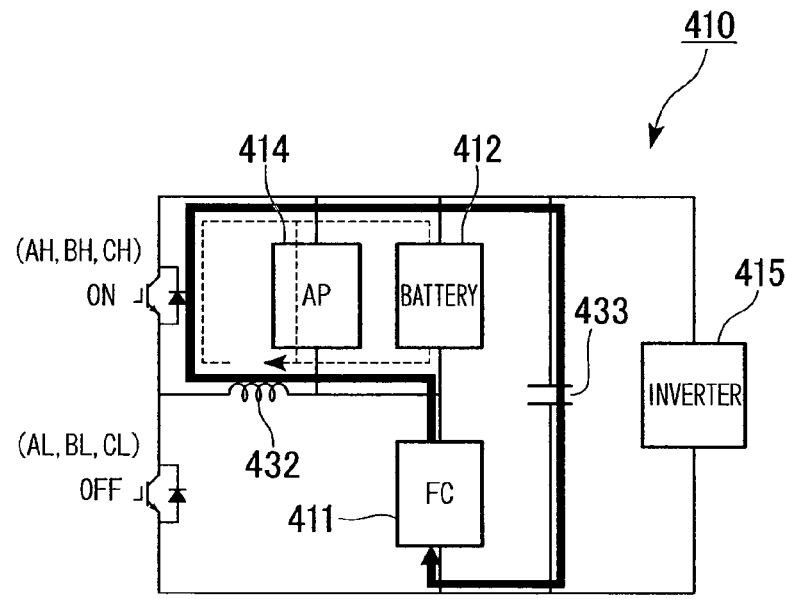
FIG. 77A shows an electricity supply state during an operation mode ((regeneration+battery charging by FC) mode) of a power supply device when a drive motor is regenerated according to the above embodiment.
Figure 77B:
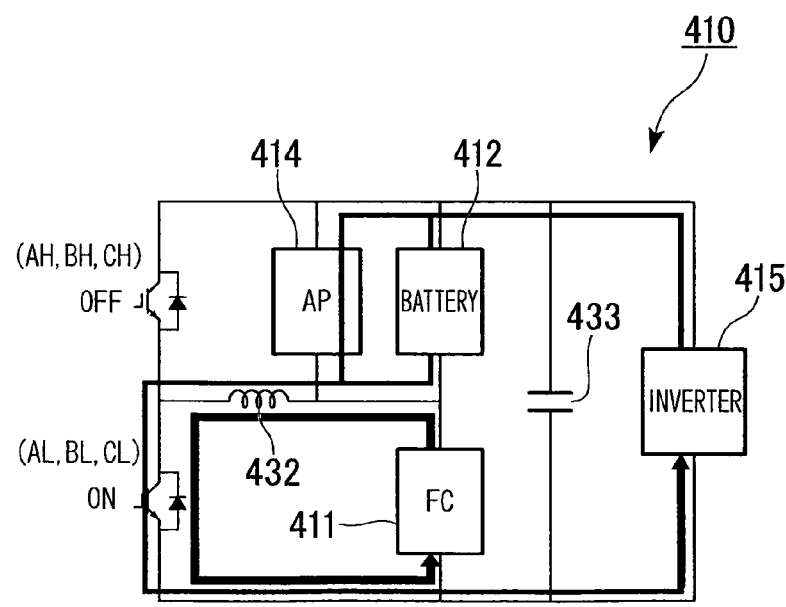
FIG. 77B shows an electricity supply state during an operation mode ((regeneration+battery charging by FC) mode) of a power supply device when a drive motor is regenerated according to the above embodiment.

Meanwhile, the operating mode of the power supply device 410 in which the target of the electric current of the fuel cell stack 411 (the output current Ifc) equals a positive value, for example, is a (regenerative+battery charging by the FC) mode in which the regenerative electric power of the drive motor inverter 415 and the output of the fuel cell stack 411 are supplied to the air pump inverter 414 and the battery 412, and the battery 412 is charged, as shown in FIGS. 77A and 77B.

The control device 425 outputs a command value regarding the pressure and the flux of the reactive gas supplied to the fuel cell stack 411, as a command to the fuel cell stack 411 to generate electric power, the output of the command value being based on, for example, the condition in which the fuel cell vehicle is driven, the concentration of hydrogen included in the reactive gas supplied to the anode of the fuel cell stack 411, the concentration of hydrogen included in the discharge gas emitted from the anode of the fuel cell stack 411, the condition in which the fuel cell stack 411 is generating electric power, the electric voltage between the terminals of each of the plurality of fuel cells, the electric voltage VFC of the fuel cell stack 411, the output current Ifc of the fuel cell stack 411, and the internal temperature of the fuel cell stack 411. In this way, the control device 425 controls the condition in which the fuel cell stack 411 generates electric power.

The control device 425 switches over the on and off conditions of the contactor 411a according to the condition in which the fuel cell stack 411 is generating electric power. In addition, the control device 425 controls the connection between the fuel cell stack 411, the second line L402, and the third line L403.

The control device 425 also switches over the on and off conditions of the contactor 412a and the current limiting circuit 412b according to the remaining capacity SOC of the battery 412, for example. Thus, the control device 425 controls the connection between the battery 412 and the first line L401 and the second line L402.

The power supply device 410 and the power supply system 420 of the fuel cell vehicle are configured as described above. Next, an explanation is provided an operation of the power supply device 410 and the power supply system 420 of the fuel cell vehicle with reference to FIG. 78. In particular, an explanation is provided regarding an operation to control the switching duty of the first DC-DC converter 413 by performing a feedback control so that the detected value of the electric current (the output current Ifc) of the fuel cell stack 411 is equal to the target electric current.

Figure 78:
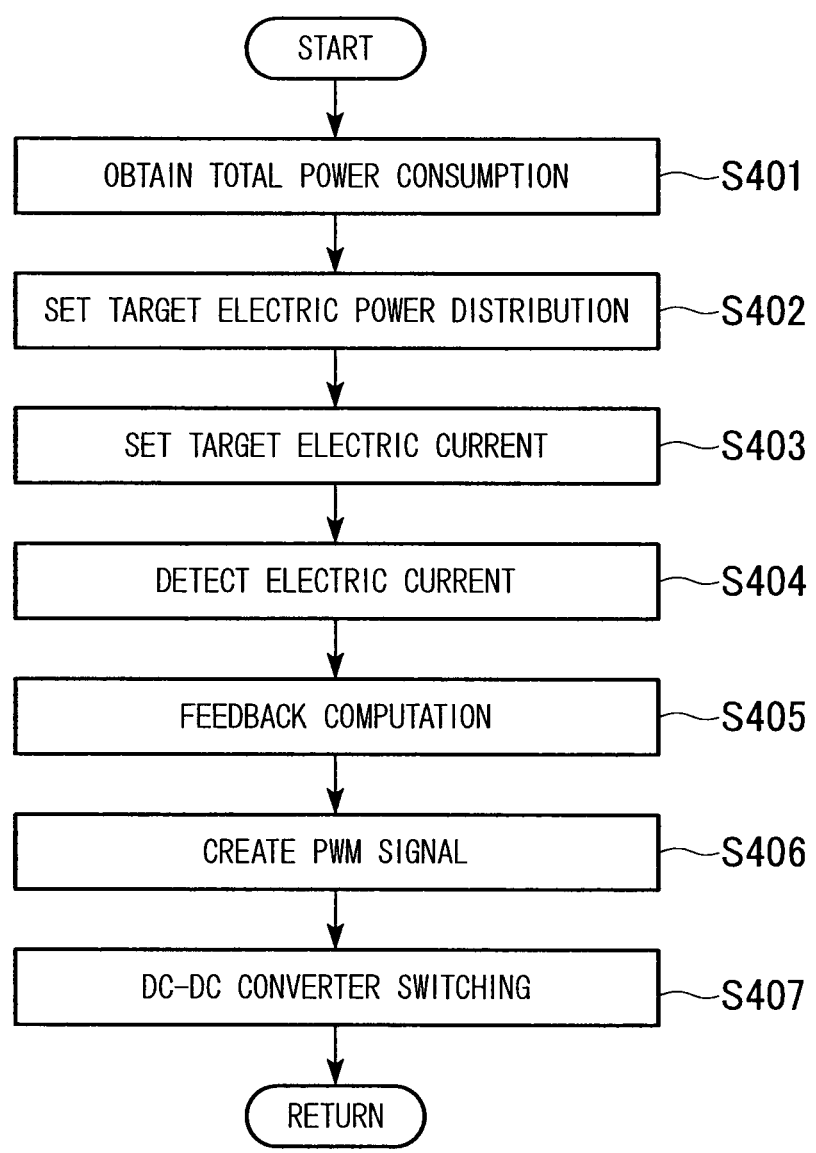
FIG. 78 is a flowchart showing an operation of a power supply system of a fuel cell vehicle according to the above embodiment.

First, in step S401 shown in FIG. 78 for example, the total consumption of the load, to which the power supply device 410 supplies electric power, is computed. Examples of the load include the drive motor 422, the air conditioner 424, and the vehicle auxiliary machinery.

Next, in step S402, the electric power distribution of the fuel cell stack 411 and the battery 412 forming the battery circuit 410a of the power supply device 410 is set, based on, for example, the condition of the fuel cell stack 411 (for instance, the rate of change of the condition of the fuel cell stack 411 according to a command for power generation) and the remaining capacity SOC of the battery 412. In other words, the distribution is set in S402 when the total electric power consumption of the load is a value obtained by adding an electric power outputted by the fuel cell stack 411 and an electric power outputted by the battery 412.

This electric power distribution becomes a value corresponding to the switching duty of the first DC-DC converter 413.

Next, in step S403, at the time the drive motor 422 is driven for example, a target electric current corresponding to the output electric current Ifc of the fuel cell stack 411 is obtained, by referring to a predetermined map representing the correspondence relationship between the operating point of the fuel cell stack 411, the operating point of the battery 412, the switching duty of the first DC-DC converter 413, and the total power consumption of the load.

Next, in step S404, the detected value of the output electric current IFC of the fuel cell stack 411 outputted by the output current sensor 427 is obtained.

Next, in step S405, an electric voltage command value is computed, by controlling and amplifying the electric current deviation between the target electric current and the detected value of the output electric current IFC of the fuel cell stack 411 outputted from the output current sensor 427, through a PID (Proportional Integral Derivative) operation, for example.

Next, in step S406, a gate signal (namely, a PWM signal) is outputted which turns on and off each of the transistors AH, BH, and CH of the high side arm of the first DC-DC converter 413 as well as each of the transistors AL, BL, and CL of the low side arm, in order to output an output current Ifc from the fuel cell stack 411 corresponding to the electric voltage command value.

Next, in step S407, each of the transistors AH, BH, and CH of the high side arm of the first DC-DC converter 413 and each of the transistors AL, BL, and CL of the low side arm are turned on and off according to the PWM signal, and proceeds to return.

As described above, according to the power supply device 410 based on the above embodiment of the present invention, a plurality of operating modes corresponding to the electric power of the fuel cell stack 411 and the battery 412 can be freely switched over, by providing a single first DC-DC converter 413 with respect to the battery circuit 410a in which the fuel cell stack 411 and the battery 412 are connected in series, and by controlling the switching duty of the first DC-DC converter 413 so that the actual electric power distribution of the fuel cell stack 411 and the battery 412 with regard to the total power consumption of the load equals the target electric power distribution. Compared to the instance in which a DC-DC converter is equipped individually for each of the fuel cell stack 411 and the battery 412, for example, it is possible to lower the cost necessary for configuration and reduce the size.

Further, according to the power supply system 420 of the fuel cell vehicle based on the above embodiment of the present invention, the cost necessary for configuring the power supply device 410 can be lowered, and the size of the power supply device 410 can be reduced, by providing a single first DC-DC converter 413. Because the fuel cell stack 411 and the battery 412 are connected in series, the operating electric voltage of the drive motor inverter 415 can be augmented, and the electric current can be reduced, compared to the case in which the fuel cell stack 411 and the battery 412 are connected in parallel. In this way, the size of the drive motor 422 and the drive motor inverter 415 can be reduced. At the same time the operating efficiency can be enhanced. Therefore, the cost necessary for configuring the power supply system 420 of the fuel cell vehicle can be lowered, and the size can be reduced.

Further, even though the condition of the first DC-DC converter 413 is abnormal (for example, when an open failure occurs), it is possible to drive the fuel cell vehicle, by supplying electric power from the battery circuit 410a to the drive motor inverter 415.

Figure 79:
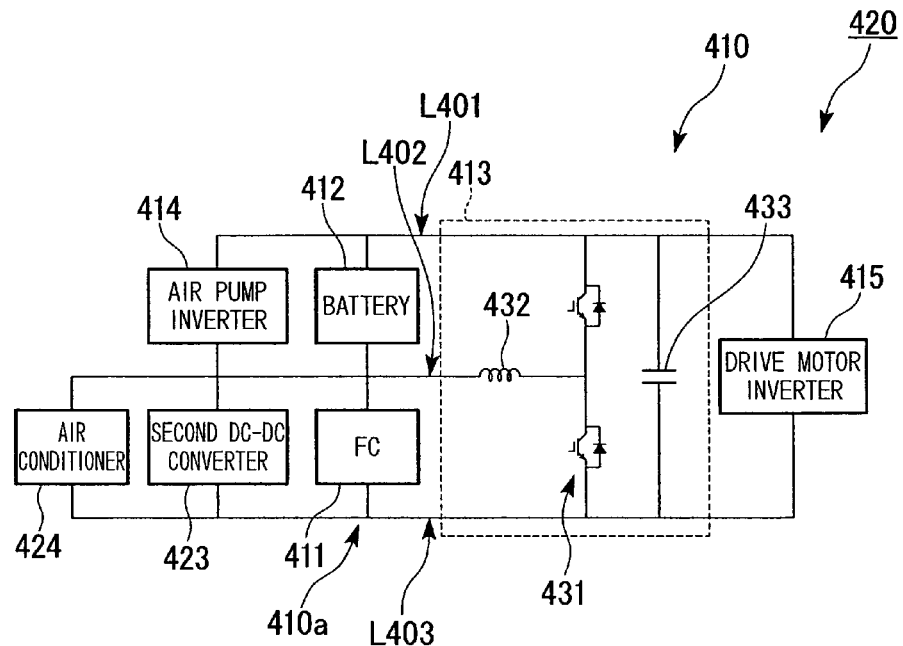
FIG. 79 is a configuration diagram of a power supply system of a fuel cell vehicle according to a second variation of the above embodiment.
Figure 80:
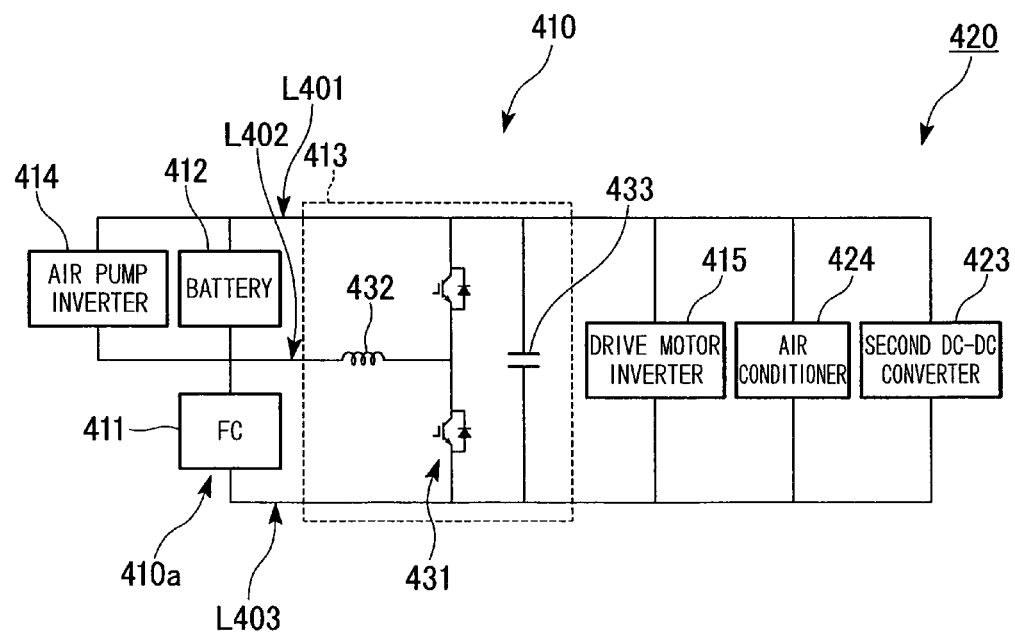
FIG. 80 is a configuration diagram of a power supply system of a fuel cell vehicle according to a third variation of the above embodiment.

According to the above embodiment, at least a portion of the vehicle auxiliary machinery equipped on the fuel cell vehicle (for example, an air conditioner 424 separate from the second DC-DC converter 423, and a load connected to the second DC-DC converter 423 (a processing device, a magnetic valve, and a 12 volt type load)) is connected to the first line L401 and the second line L402 either directly or through the second DC-DC converter 423. However, the present invention is not limited to this configuration. For example, as shown in FIG. 79, at least a part of the vehicle auxiliary machinery can be connected to the second line L402 and the third line L403. In addition, as shown in FIG. 80, at least a part of the vehicle auxiliary machinery can be connected to the first line L401 and the third line L403.

According to the above configuration, the air pump inverter 414 is connected to the first line L401 and the second line L402, the air pump inverter 414 being a drive circuit of the air pump 421. However, the present invention is not limited to this configuration. The drive circuit of at least one of a pump that supplies reactive gas to the fuel cell stack 411 (for example, the air pump 421) and a pump that supplies a refrigerant (not diagramed) can be connected to the first line L401 and the second line L402.

In addition, the drive circuit of at least one of a pump that supplies reactive gas to the fuel cell stack 411 (for example, the air pump 421) and a pump that supplies a refrigerant (not diagramed) can be connected to the second line L402 and the third line L403. The drive circuit of at least one of the above pumps can be connected to the first line L401 and the third line L403.

According to the above embodiment, the battery 412 is connected to the first line L401 and the second line L402, while the fuel cell stack 411 is connected to the second line L402 and the third line L403. However, the present invention is not limited to the above configuration. The fuel cell stack 411 can be connected to the first line L401 and the second line L402. The battery 412 can be connected to the second line L402 and the third line L403.

According to the above embodiment, the control device 425 controls the switching duty of the first DC-DC converter 413 by performing a feedback control so that the actual electric power distribution of the fuel cell stack 411 and the battery 412 equals the target electric power distribution, for example, so that the detected value of the electric current (the output current Ifc) of the fuel cell stack 411 equals the target electric current. However, the present invention is not limited to this configuration. For example, a feedback control can be performed so that, instead of the electric current of the fuel cell stack 411 (the output electric current Ifc), the electric current of the battery 412 (Ib) equals a target value. Further, a feedback control can be performed so that, instead of the electric current, the detected value of the electric voltage of the fuel cell stack 411 (VFC) or the electric voltage of the battery 412 (VB) equals a target value. It is also possible to perform a feedback control of the switching duty so that the output ratio of the fuel cell stack 411 and the battery 412 equals a target value.

According to the above embodiment, the first DC-DC converter 413, alternately switches over between a condition in which each of the transistors AH, BH, and CH of the high side arm are turned off and each of the transistors AL, BL, and CL of the low side arm are turned on, and a condition in which each of the transistors AH, BH, and CH of the high side arm are turned on and each of the transistors AL, BL, and CL of the low side arm are turned off. However, the present invention is not limited to this configuration. For example, during a boosting operation from the primary side to the secondary side when the drive motor 422 is driven, each of the transistors AL, BL, and CL of the low side arm can alternately be switched on and off while each of the transistors AH, BH, and CH of the high side arm are turned off. As another example, during a regenerative operation from the secondary side to the primary side when the drive motor 422 is regenerated, each of the transistors AH, BH, and CH of the high side arm can be alternately switched on and off while each of the transistors AL, BL, and CL of the low side arm are turned off.

Below, a description of a power supply system for a fuel cell vehicle according to a sixth embodiment of the present invention is provided with reference to FIGS. 81 to 100.

Figure 81:
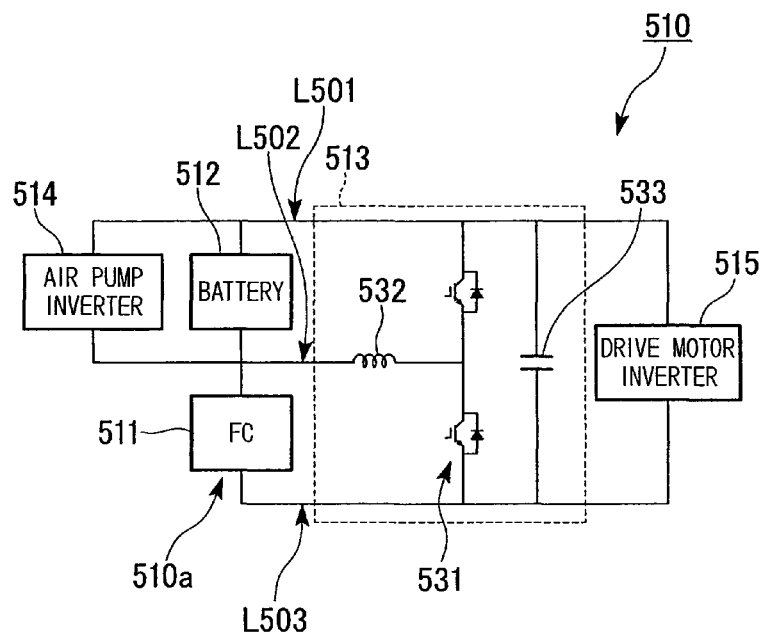
FIG. 81 is a configuration diagram of a power supply device according to a sixth embodiment of the present invention.
Figure 82:
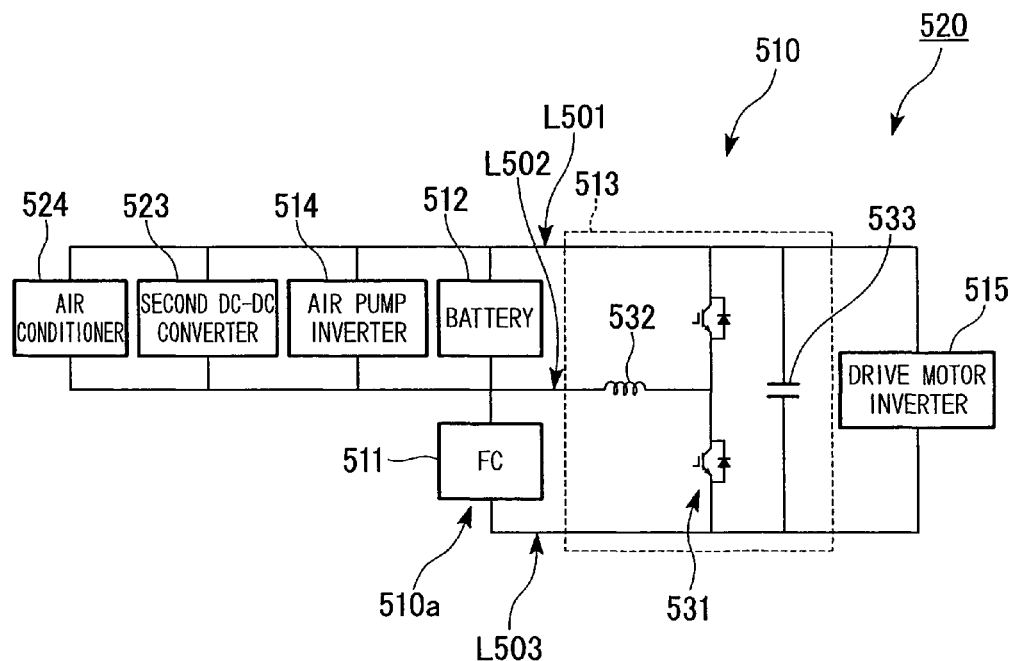
FIG. 82 is a configuration diagram of a power supply system for a fuel cell vehicle according to the above embodiment.
Figure 83:
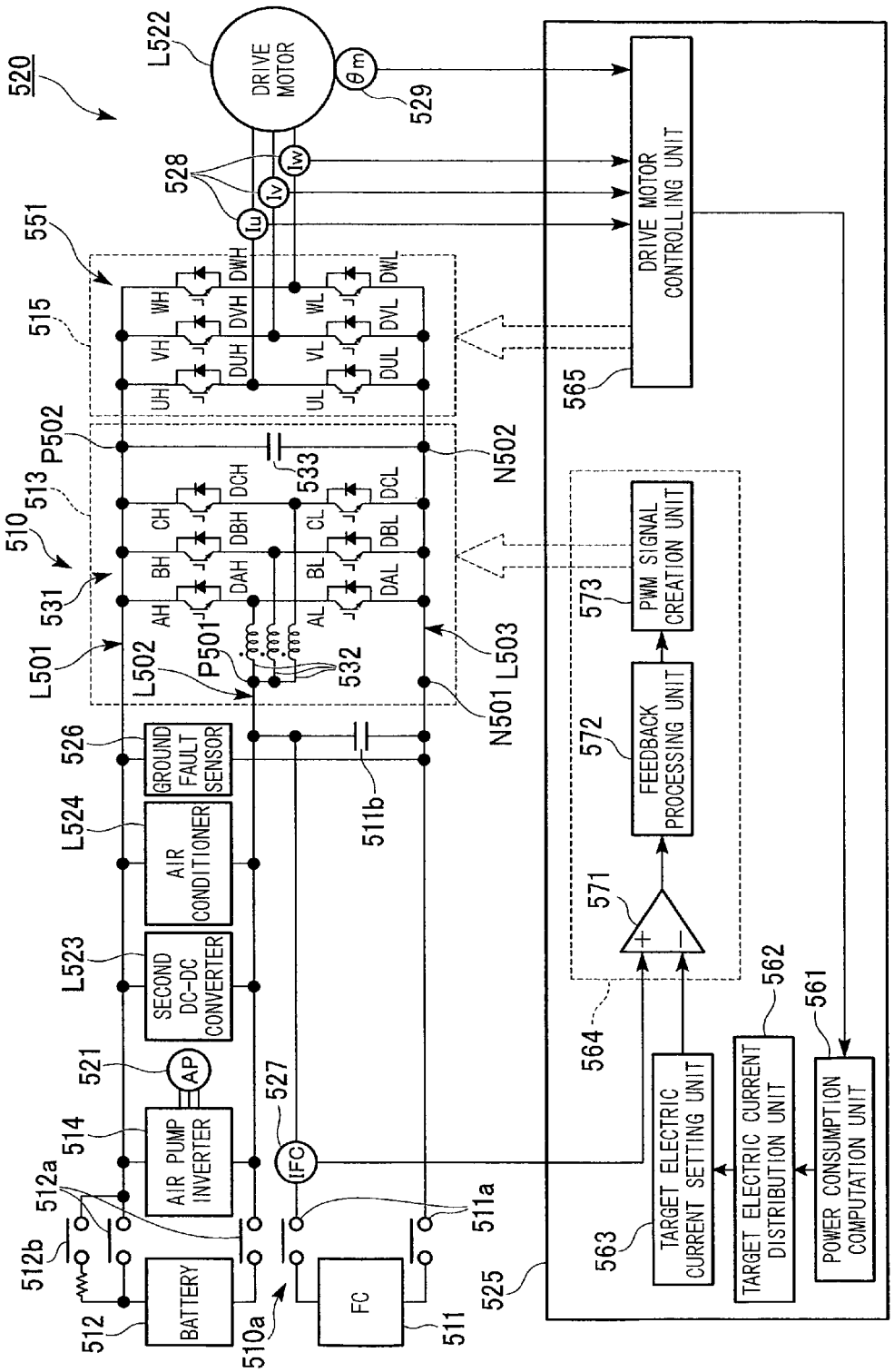
FIG. 83 is a configuration diagram of a power supply system for a fuel cell vehicle according to the above embodiment.

A power supply device 510 according to the present embodiment includes a fuel cell stack (FC) 511, a battery 512, a first DC-DC converter 513, an air pump inverter 514, and a control device 525 as shown in FIGS. 81 to 83 for example. In addition, the power supply device 510 is connected to a drive motor inverter 515, for example.

The power supply device 510 is provided in a power supply system 520 for a fuel cell vehicle, for example. For example, this power supply system 520 for the fuel cell vehicle includes, as shown in FIGS. 82 and 83, the power supply device 510, an air pump (AP) 521, a drive motor 522, a second DC-DC converter 523, an air conditioner 524, a ground fault sensor 526, an output current sensor 527, a phase current sensor 528, and an angle sensor 529.

The fuel cell stack 511 is formed by layering multiple fuel cells including a solid polymer electrolyte membrane comprising a cation exchange membrane and the like, the solid polymer electrolyte membrane being held by a fuel electrode (anode) including an anode catalyst and a gas diffusion layer, and an oxygen electrode (cathode) including a cathode catalyst and a gas diffusion layer, the solid polymer electrolyte membrane and the anode and the cathode thus forming an electrolytic electrode structure, the electrolytic electrode structure further being held by a pair of separators. The laminated body of the fuel cell is sandwiched by a pair of end plates from both sides of the direction in which the layers are formed.

Air is supplied to the cathode of the fuel cell stack 511 from the air pump 521, the air being an oxidant gas (reactant gas) including oxygen. A fuel gas (reactant gas) including hydrogen is supplied to the anode from a high-pressure hydrogen tank (not diagramed), for example.

The hydrogen is ionized by the catalytic reaction with the anode catalyst at the anode and moves to the cathode through a reasonably humidified solid polymer electrolyte membrane. An electron is generated while the hydrogen moves, and the electron is extracted by the external circuit, and is utilized as an electric energy of the direct current. At this time, the hydrogen ion, the electron, and oxygen react at the cathode, forming water.

Here, the air pump 521 brings in air from outside the vehicle and compresses the air, for example. The air pump 521 supplies this air to the cathode of the fuel cell stack 511 as reactive gas. The number of rotations of a motor (not diagramed) driving this air pump 521 is controlled by the air pump inverter 514 according to a control command outputted by the control device 525. The air pump inverter 514 includes a PWM inverter based on a pulse width modulation (PWM).

As an alternative to the battery 512, the power supply device 510 can include, for example, a capacitor as an electric storage device, the capacitor including an electric double layer capacitor or an electrolytic capacitor.

The first DC-DC converter 513 is, for example, a chopper type DC-DC converter. As shown in FIG. 83, this first DC-DC converter 513 includes a bridge circuit 531 with three phases, a choke coil 532 with three phases, and a smoothing capacitor 533. The above bridge circuit 531 includes a plurality of switching elements (for example, an IGBT: Insulated Gate Bipolar Mode Transistor) which are bridge-connected.

The first DC-DC converter 513 is shown in FIGS. 81 and 82 in simplified form. Thus, among the three phases, only one phase of the switching element and the choke coil 532 is shown in FIGS. 81 and 82.

The bridge circuit 531 is same as a three-phase bridge circuit 551 forming the drive motor inverter 515 described later. In the bridge circuit 531, a high-side and a low-side first transistor AH and AL, a high-side and a low-side second transistor BH and BL, and a high-side and a low-side third transistor CH and CL, which form a pair for each of the phases, are bridge-connected. Each of the transistors AH, BH, and CH form a high side arm by a collector being connected to a secondary side positive terminal P502. Each of the transistors AL, BL, and CL form a low side arm by an emitter being connected to a secondary side negative terminal N502. For each phase, the emitter of each of the transistors AH, BH, and CH of the high side arm is connected to the collector of each of the transistors AL, BL, and CL of the low side arm. Between the collector and the emitter of each of the transistors AH, AL, BH, BL, CH, and CL, each of the diodes DAH, DAL, DBH, DBL, DCH, and DCL are connected, so that the direction from the emitter to the collector is the forward direction.

This bridge circuit 531 is driven by a signal (PWM signal) which is pulse-width modulated (PWM), the signal being outputted from the control device 525 and inputted to a gate of each of the transistors. A condition in which each of the transistors AH, BH, and CH of the high side arm are turned on and each of the transistors AL, BL, and CL of the low side arm are turned off, and another condition in which each of the transistors AH, BH, and CH of the high side arm are turned off and each of the transistors AL, BL, and CL of the low side arm are turned on, are switched over in alternation.

The smoothing capacitor 533 is connected to the secondary side positive terminal P502 and the secondary side negative terminal N502.

Regarding the three-phase choke coil 532, an end of each of the choke coil 532 is connected between the collector and the emitter of each of the phases of the bridge circuit 531. In other words, the end of each of the choke coil 532 is connected, respectively, between the collector and the emitter of each of the transistors AH and AL, between the collector and emitter of each of the transistors BH and BL, and between the collector and emitter of each of the transistors CH and CL. The other side of each of the choke coil 532 is connected mutually to the primary side positive terminal P501.

Figure 84:
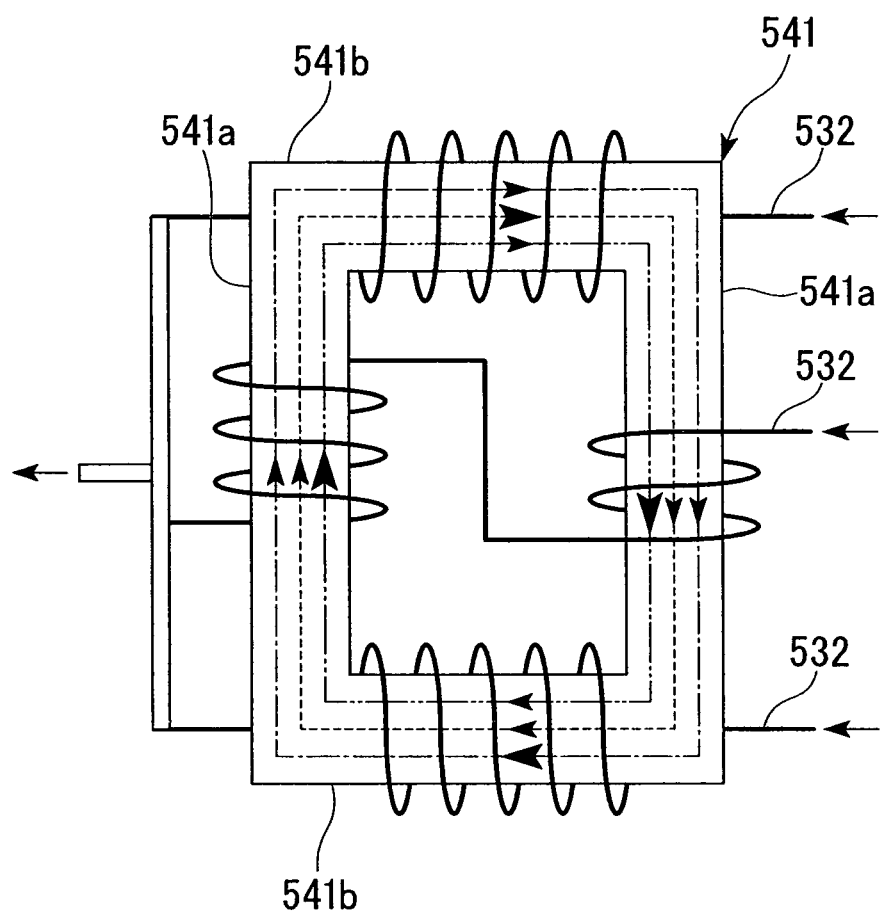
FIG. 84 is a configuration diagram of a choke coil with three phases according to the above embodiment.

The three-phase choke coil 532 is formed by wrapping around a single rectangular core 541 in common mode, as shown in FIG. 84 for example. This choke coil 532 is set so that the direction of the magnetic flux, generated by each of the choke coil 532 while electricity is supplied, is in the same direction.

One phase of the three-phase choke coil 532 is dispersed and wrapped around a pair of opposite sides 541a which is one of the two pairs of opposite sides forming the rectangular core 541. The other two phases of the three-phase choke coil 532 is concentrated and wrapped around the other pair of opposite sides 541b among the two pairs of opposite sides forming the rectangular core 541.

Figure 85:
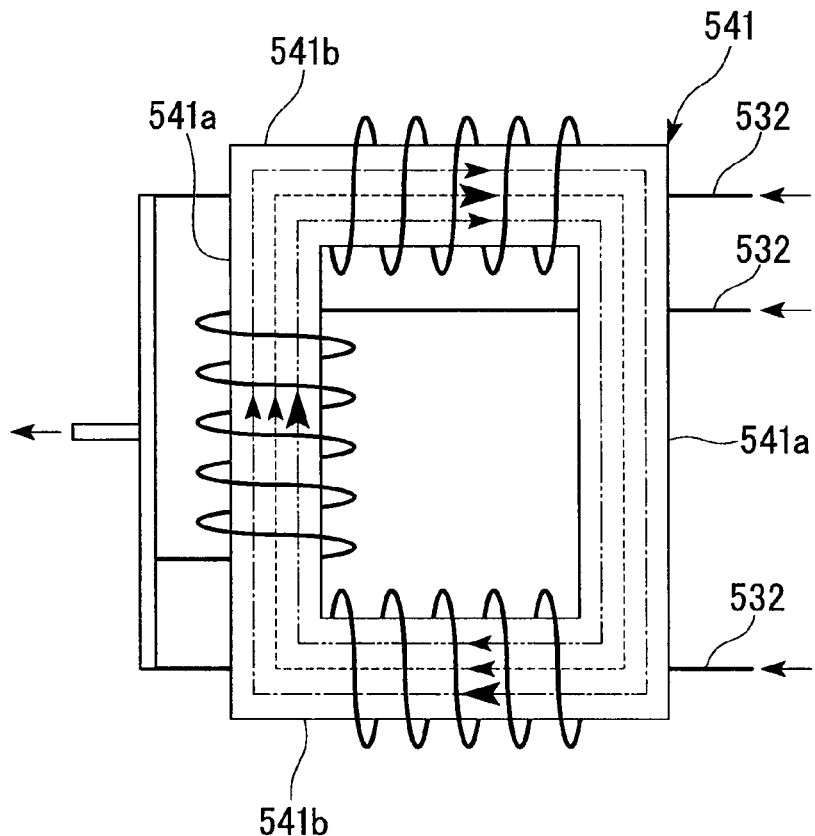
FIG. 85 is a configuration diagram of a choke coil with three phases according to a first variation of the above embodiment.

Each of the three-phase choke coil 532 can be concentrated and wrapped around three sides of the four sides forming the rectangular core 541, as shown in FIG. 85 for example. Further, each of the three-phase choke coil 532 can have a different winding structure.

With respect to three lines L501, L502, and L503, each having a different electric potential from one another (for example, electric potential of L501>electric potential of L502>electric potential of L503), a primary side of the first DC-DC converter 513 is connected to the second line L502 and the third line L503, as shown in FIG. 83, for example. The secondary side of the DC-DC converter 513 is connected to the first line L501 and the third line L503. In other words, the first line L501 is connected to the secondary side positive terminal P502, the second line L502 is connected to the primary side positive terminal P501, and the third line L503 is connected to the primary side negative terminal N501 and the secondary side negative terminal N502.

Concerning this first DC-DC converter 513, when a boost operation is performed from the primary side to the secondary side, at the time the drive motor 522 is driven for example, each of the transistors AH, BH, and CH of the high side arm are first turned off. At the same time, each of the transistors AL, BL, and CL of the low side arm are turned on. Due to the electric current flowing from the primary side, the choke coil 532 undergoes a direct current energization, and magnetic energy is accumulated.

Then, each of the transistors AH, BH, and CH of the high side arm are turned on. At the same time, each of the transistors AL, BL, and CL of the low side arm are turned Off. While preventing a change in the magnetic flux due to the interruption of the electric current flowing through the choke coil 532, an induced voltage is generated between both ends of the choke coil 532. The induced voltage, generated by magnetic energy accumulated in the choke coil 532, is added to the input voltage in the primary side. In this way, a boosting voltage, higher than the input voltage in the primary side, is applied to the secondary side. The fluctuation in voltage, generated during this switchover operation, is smoothed by the smoothing capacitor 533. In addition, a boosting voltage is outputted from the secondary side.

On the other hand, during a regenerating operation from the secondary side to the primary side when the drive motor 522 is regenerated for example, each of the transistors AH, BH, and CH of the high side arm are first turned off. At the same time, each of the transistors AL, BL, and CL of the low side arm are turned on. The choke coil 532 undergoes a direct-current energization by the electric current inputted from the secondary side, and magnetic energy is accumulated.

Then, each of the transistors AH, BH, and CH of the high side arm are turned on. At the same time, each of the transistors AL, BL, and CL of the low side arm are turned off. While preventing a change in the magnetic flux due to the blockage of the electric current flowing through the choke coil 532, an induced voltage is generated between both ends of the choke coil 532. The induced voltage, generated by the magnetic energy accumulated in the choke coil 532, becomes a depressed voltage generated by stepping down the input voltage of the secondary side according to the on/off ratio of each of the transistors AH, BH, and CH of the high side arm. In this way, a depressed voltage is applied to the primary side.

The first DC-DC converter 513 is driven by a signal (PWM signal) which is pulse-width modulated (PWM), the signal being outputted from the control device 525 and inputted to a gate of each of the transistors. The first DC-DC converter 513 switches over the on/off condition of each of the transistors AH, BH, and CH of the high side arm and each of the transistors AL, BL, and CL of the low side arm, according to a switching duty defined, for example, as a ratio of each of the transistors AH, BH, and CH of the high side arm that are turned on during one cycle of the PWM signal.

Incidentally, each of the transistors AH, BH, and CH of the high side arm and each of the transistors AL, BL, and CL of the low side arm are prohibited from being simultaneously turned on when the on/off condition is switched over. An appropriate dead time is provided during which each of the above transistors can be simultaneously turned off.

The fuel cell stack 511 is connected to the second line L502 and the third line L503 through a contactor 511a and a capacitor 511b placed in the positive electrode side and the negative electrode side. The battery 512 is connected to the first line L501 and the second line L502 through a contactor 512a placed in the positive electrode side and the negative electrode side, and through a current limiting circuit 512b placed in the positive electrode side. Therefore, the fuel cell stack 511 and the battery 512 are connected in series between the first line L501 and the third line L503. The fuel cell stack 511 and the battery 512 thus are included in the battery circuit 510a.

While electric power is outputted from the first line L501 and the third line L503 to a load (for example, the drive motor 522), the first line L501 and the third line L503 are connected to the drive motor inverter 515.

The air pump inverter 514 is connected to the first line L501 and the second line L502. This air pump inverter 514 is a drive circuit of the air pump 521.

The drive motor inverter 515, comprising a drive circuit of the three-phase drive motor 522, is a PWM inverter with a pulse-width modulation (PWM), for example. This drive motor inverter 515 includes a three-phase bridge circuit 551 comprising a plurality of switching elements (for example, an IGBT: Insulated Gate Bipolar Mode Transistor) which are bridge-connected.

The bridge circuit 551 is same as a three-phase bridge circuit 531 forming the first DC-DC converter 513. In the bridge circuit 551, a high-side and a low-side U-phase transistor UH and UL, a high-side and a low-side V-phase transistor VH and VL, and a high-side and a low-side W-phase transistor WH and WL, which form a pair for each of the phases, are bridge-connected for example. Each of the transistors UH, VH, and WH form a high side arm by a collector being connected to a secondary side positive terminal P502 of the first DC-DC converter 513. Each of the transistors UL, VL, and WL form a low side arm by an emitter being connected to a secondary side negative terminal N502 of the first DC-DC converter 513. For each phase, the emitter of each of the transistors UH, VH, and WH of the high side arm is connected to the collector of each of the transistors UL, VL, and WL of the low side arm. Between the collector and the emitter of each of the transistors UH, UL, VH, VL, WH, and WL, each of the diodes DUH, DUL, DVH, DVL, DWH, and DWL are connected, so that the direction from the emitter to the collector is the forward direction.

This drive motor inverter 515 is driven by a signal (PWM signal) which is pulse-width modulated (PWM), the signal being outputted from the control device 525 and inputted to a gate of each of the transistors of the bridge circuit 551. For example, when the drive motor 522 is driven, the direct-current power outputted from the power supply device 510 is converted to a three phase alternating-current power, by switching over the on (conduction) and off (interruption) condition of each of the transistors forming a pair for each of the phases. By sequentially commutating the electric current to the three phase stator winding, a U phase electric current Iu, a V phase electric current Iv, and a W phase electric current Iw, all of which are an alternating-current, are supplied to the stator winding of each phase. Meanwhile, when the drive motor 522 is regenerated, for example, the drive motor inverter 515 converts the three phase alternating-current power, outputted from the drive motor 522, to a direct-current power, and supplies the direct-current power to the first DC-DC converter 513. Then, the drive motor inverter 515 charges the battery 512, and feeds power to a load connected to the first DC-DC converter 513.

The drive motor 522 is, for example, a three phase alternating-current synchronous motor of a permanent magnet type utilizing a permanent magnet as a field. This drive motor 522 is driven and controlled by a three phase alternating-current power supplied by the drive motor inverter 515. At the same time, when the drive power is transmitted from the drive wheel side to the driver motor 522 side while the vehicle is decelerating, the drive motor 522 functions as an electric generator. In this way, the drive motor 522 creates a so-called regenerative breaking force. Further, the drive motor 522 recovers the kinetic energy of the vehicle as an electric energy.

The second DC-DC converter 523 is, for example, a chopper type DC-DC converter. At least a part of the vehicle auxiliary machinery equipped on the fuel cell vehicle (for example, a processing device, a magnetic valve, and a 12 volt type load) is connected to the second DC-DC converter 523 as a load.

The second DC-DC converter 523 is connected to the first line L501 and the second line L502. This second DC-DC converter 523 depresses the electric voltage applied between the first line L501 and the second line L502, by a chopping movement according to a control command outputted from the control device 525, and supplies the electric voltage to the load connected to the second DC-DC converter 523.

The air conditioner 524 is included in at least a part of the vehicle auxiliary machinery equipped on the fuel cell vehicle. This air conditioner 524 includes, for example, a heater loaded on the fuel cell vehicle, a motor for a compressor, and a drive circuit (for example, an inverter).

The air conditioner 524 is connected to the first line L501 and the second line L502. Electric power is supplied from the first line L501 and the second line L502 to the air conditioner 524.

The control device 525 performs a duty control, controlling the switching duty of the first DC-DC converter 513. At the same time, the control device 525 controls the electric power conversion operation of the drive motor inverter 515.

The control device 525 receives an input of a detection signal outputted by, for example, a ground fault sensor 526 which is connected to the first line L501 and the third line L503 and detects the occurrence of a ground fault, an output current sensor 527 which detects an output current IFC of the fuel cell stack 511, a phase current sensor 528 which detects each of the three phase current between the drive motor inverter 515 and the drive motor 522, and an angle sensor 529 which detects a rotational angle of a rotator of the drive motor 522 (in other words, a rotational angle of the magnetic pole of the rotor from a predetermined standard rotational position, and a rotational position of the rotational axis of the drive motor 522).

The control device 525 includes, for example, a power consumption computation unit 561, a target electric current distribution unit 562, a target electric current setting unit 563, a duty controlling unit 564, and a drive motor controlling unit 565.

The power consumption computation unit 561 computes the total power consumption of the load (from example, the drive motor 522 and the air conditioner and the vehicle auxiliary device, which are loads outside of the power supply device 510, and the air pump inverter 514, which is a load inside of the power supply device 510) to which electric power is supplied from the power supply device 510.

When the drive motor 522 is driven, for example, the target electric power distribution setting unit 562 sets the electric power distribution of the fuel cell stack 511 and the battery 512 forming the battery circuit 510a of the power supply device 510, based on, for example, the condition of the fuel cell stack (for instance, the rate of change of the condition of the fuel cell stack 511 according to a command for power generation) and the remaining capacity SOC of the battery 512. In other words, the target electric power distribution setting unit 562 sets the distribution when the total electric power consumption computed by the electric power consumption computation unit 561 is a value obtained by adding an electric power outputted by the fuel cell stack 511 and an electric power outputted by the battery 512.

For example, when the drive motor 522 is driven, the electric power distribution becomes a value corresponding to the switching duty of the first DC-DC converter 513 (in other words, the proportion of each of the transistors AH, BH, and CH of the high side arm in one cycle of the PWM signal that are turned on). The switching duty ("duty") can be expressed using the electric voltage of the fuel cell stack 511 ("VFC") and the electric voltage of the battery 512 ("VB"), as shown below.

$$duty = VFC/(VFC+VB)$$

From this equation, the ratio of the electric voltage of the fuel cell stack 511 ("VFC") and the electric voltage of the battery 512 ("VB") can be expressed, as shown below, using the switching duty ("duty").

$$VB/VFC = (1-duty)/duty$$

Figure 86:
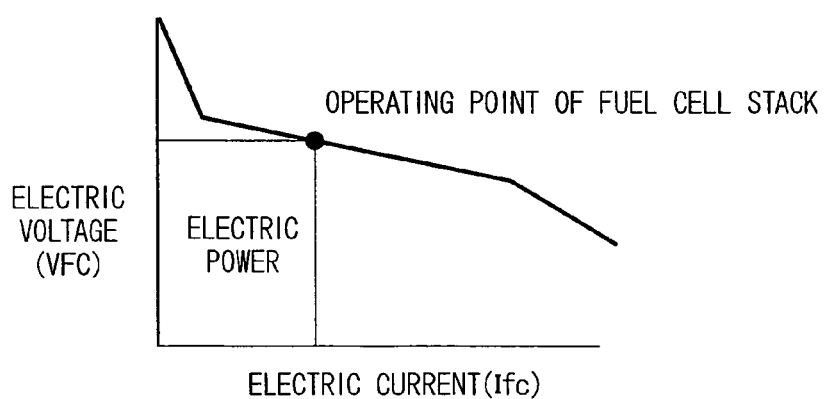
FIG. 86 shows an example of an operating point of a fuel cell stack according to the above embodiment.
Figure 87:
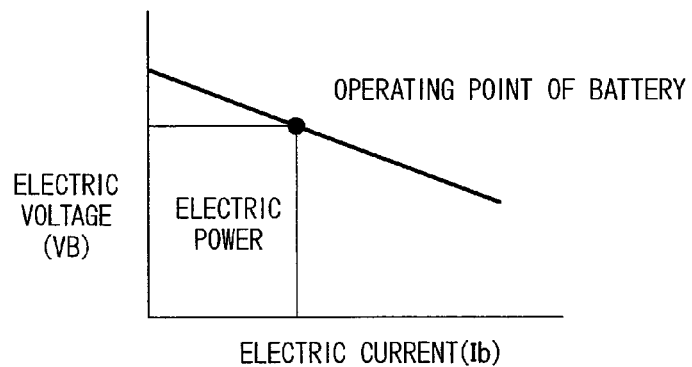
FIG. 87 shows an example of an operating point of a battery according to the above embodiment.

The electric voltage of the fuel cell stack 511 ("VFC") and the electric voltage of the battery 512 ("VB") are in a predetermined correspondence relationship with each of the electric current (output electric current Ifc) and the electric power of the fuel cell stack 511 as well as the electric current (Ib) and the electric power of the battery 512, as shown in FIGS. 86 and 87 for example. From this correspondence relationship, the ratio of the operating point of the fuel cell stack 511 (for example, the electric voltage or the electric current or the electric power) and the operating point of the battery 512 (for example, the electric voltage or the electric current or the electric power) is expressed using the switching duty ("duty").

When the drive motor 522 is regenerated, for example, the target electric power distribution setting unit 562 sets the electric power distribution of the electric power supplying side of the fuel cell stack 511 and the drive motor inverter 515, and also sets the electric power distribution of the electric power receiving side of the battery 512 and the load (for example, the air conditioner 524 and the vehicle auxiliary device and the air pump inverter 514), based on the condition of the fuel cell stack 511 (for instance, the rate of change of the condition of the fuel cell stack 511 according to a command for power generation) and the remaining capacity SOC of the battery 512, and the regenerative electric power of the drive motor 522, and the like.

Because the ratio of the operating point of the fuel cell stack 511 (for example, the electric voltage or the electric current or the electric power) and the operating point of the battery 512 (for example, the electric voltage or the electric current or the electric power) is expressed using the switching duty ("duty"), the target electric current setting unit 563 obtains the target electric current corresponding to the output electric current Ifc of the fuel cell stack 511, when the drive motor 522 is driven for example, by referring to a predetermined map representing the correspondence relationship between the operating point of the fuel cell stack 511, the operating point of the battery 512, the switching duty of the first DC-DC converter 513, and the total power consumption of the load.

Figure 88:
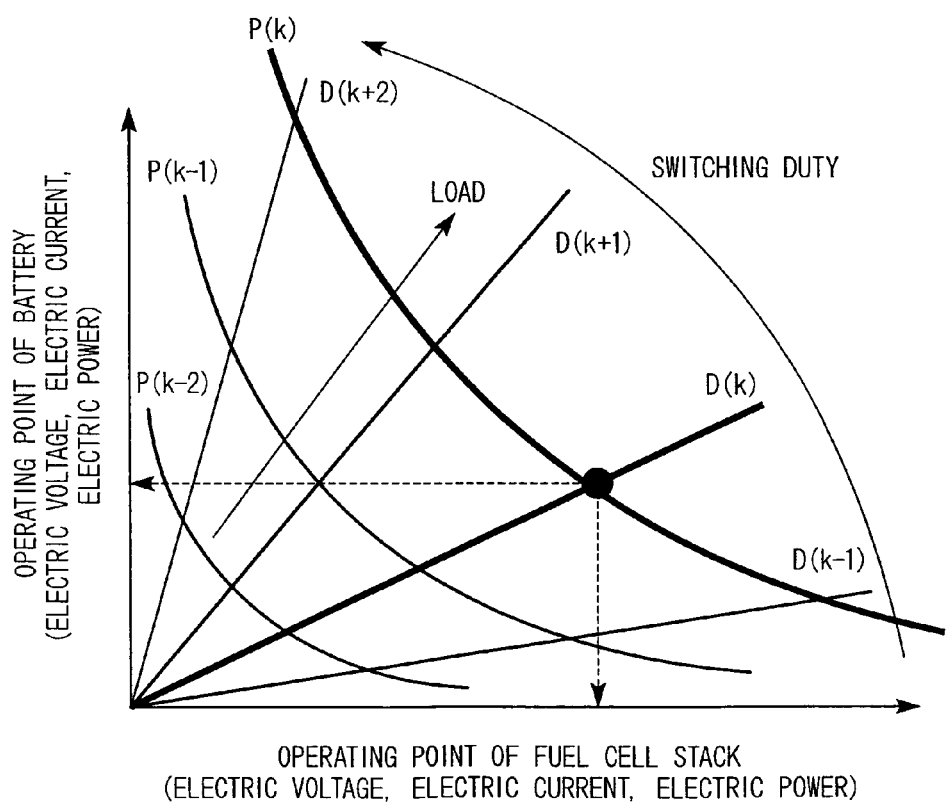
FIG. 88 shows an example of a predetermined map representing a correspondence relationship between an operating point of a fuel cell stack, an operating point of a battery, a switching duty of a first DC-DC converter, and a total power consumption of a load according to the above embodiment.

This predetermined map shows a correspondence relationship of the operating point of the fuel cell stack 511 and the operating point of the battery 512 which are set with respect to each of multiple values of the switching duty of the first DC-DC converter 513 (D(1), . . . , D(k), . . . ) on a two-dimensional coordinate in which the operating point of the fuel cell stack 511 and the operating point of the battery 512 are the orthogonal coordinates, as shown in FIG. 88, for example. In addition, the predetermined map shows the correspondence relationship between the operating point of the fuel cell stack 511 and the operating point of the battery 512 which are set with respect to each of the multiple values of the total power consumption of the load (P(1), . . . , P(k), . . . ).

Considering the correspondence relationship set for each of the multiple values of the switching duty of the first DC-DC converter 513, the operating point of the battery 512 is set to have a tendency to increase at a rate according to the switching duty, as the operating point of the fuel cell stack 511 increases.

Meanwhile, considering the correspondence relationship between the operating point of the fuel cell stack 511 and the operating point of the battery 512 which are set for each of the multiple values of the total consumption power of the load, a combination of the operating points is set so that the sum of the electric power corresponding to the operating point of the fuel cell stack 511 and the electric power corresponding to the operating point of the battery 512 equals the total consumption power of the load.

When, on a two-dimensional coordinate in which the operating point of the fuel cell stack 511 and the operating point of the battery 512 are the orthogonal coordinates, the operating point of the fuel cell stack 511 and the battery 512 is set to be the intersection between the correspondence relationship P(k) according to the total power consumption of the load computed by the consumption power computation unit 561 and the correspondence relationship D(k) according to the switching duty of the first DC-DC converter 513 according to the electric power distribution set by the target electric power distribution unit 562, the target electric current setting unit 563 outputs the electric current (output current Ifc) of the fuel cell stack 511 corresponding to this operating point, as the target electric current.

In addition, when the drive motor 522 is regenerated, for example, the target electric current setting unit 563 outputs zero or a positive value as the target electric current of the electric current (output current Ifc) of the fuel cell stack 511 according to the electric power distribution set by the target electric power distribution setting unit 562.

The duty controlling unit 564 controls the switching duty of the first DC-DC converter 513, so that the actual electric power distribution of the fuel cell stack 511 and the battery 512 equals the electric power distribution (target electric power distribution) set by the target electric power distribution setting unit 562. For example, the duty controlling unit 564 controls the switching duty of the first DC-DC converter 513 so that, the detected value of the output current IFC of the fuel cell stack 511 outputted by the output current sensor 527 equals the target electric current of the fuel cell stack 511 outputted by the target electric current setting unit 563 (the output current Ifc).

This duty controlling unit 564 includes, for example, an electric current deviation computation unit 571, a feed back processing unit 572, and a PWM signal generation unit 573.

The electric current deviation computation unit 571 computes and outputs the electric current deviation between the detected value of the output current IFC of the fuel cell stack 511 outputted from the output current sensor 527 and the target electric current of the fuel cell stack 511 (the output current Ifc) outputted from the target electric current setting unit 563.

The feedback processing unit 572 computes an electric voltage command value by controlling and amplifying the electric current deviation outputted by the electric current deviation computation unit 571 through, for example, a PID (Proportional Integral Derivative) operation.

In order to output an output current Ifc from the fuel cell stack 511 corresponding to the electric voltage command value outputted from the feedback processing unit 572, the PWM signal creation unit 573 creates and outputs a gate signal (namely, a PWM signal) that turns on and off each of the transistors AH, BH, and CH of the high side arm of the first DC-DC converter 513 as well as each of the transistors AL, BL, and CL of the low side arm.

While the drive motor 522 is driven, for example, the drive motor controlling unit 565 performs a feed back control (a vector control) of the electric current on a dq-coordinate system in the form of a rotating orthogonal coordinate. This drive motor controlling unit 565 computes a target d-axis electric current and a target q-axis electric current according to a torque command based on a driver's accelerating operation and the number of rotations of the drive motor 522. Then, the drive motor controlling unit 565 computes each of the three phase output electric voltage Vu, Vv, and Vw based on the target d-axis electric current and the target q-axis electric current. Further, the drive motor controlling unit 565 inputs a PWM signal, which is a gate signal, to the bridge circuit 551 of the drive motor inverter 515 according to each phase of the output electric voltage Vu, Vv, and Vw. At the same time, the drive motor controlling unit 565 performs a control so that the deviation between the d-axis electric current and the q-axis electric current obtained by converting the detected values of each phase of the electric current Iu, Iv, and Iw, actually supplied by the F-drive motor inverter 515 to the drive motor 522, to the dq-coordinate system, and the deviation between the target d-axis electric current and the target q-axis electric current equal zero.

In addition, when the drive motor 522 is regenerated, for example, the drive motor controlling unit 565 turns on and off, each of the transistors of the bridge circuit 551 of the drive motor inverter 515 according to a pulse synchronized based on the output waveform of the rotational angle θm of the rotator of the drive motor 522 outputted by the angle sensor 529. The three-phase alternating-current power outputted from the drive motor controlling unit 565 is converted to a direct-current power. At this time, the drive motor controlling unit 565 performs a feedback control of the regenerating electric voltage according to the duty of the gate signal that turns each of the transistors of the bridge circuit 551 on and off. The drive motor controlling unit 565 outputs a predetermined electric voltage value to a primary side of the drive motor inverter 515, in other words, between the secondary side positive terminal P502 of the first DC-DC converter 513 and the secondary side negative terminal N502.

In other words, when the drive motor 522 is driven, for example, the control device 525 performs a feedback control so that the detected value of the electric current (the output electric current Ifc) of the fuel cell stack 511 equals the target electric current. Thus, the control device 525 controls the switching duty of the first DC-DC converter 513. This control device 525 continuously controls the operating mode of the power supply device 510 as shown in FIG. 89, for example.

Figure 90A:
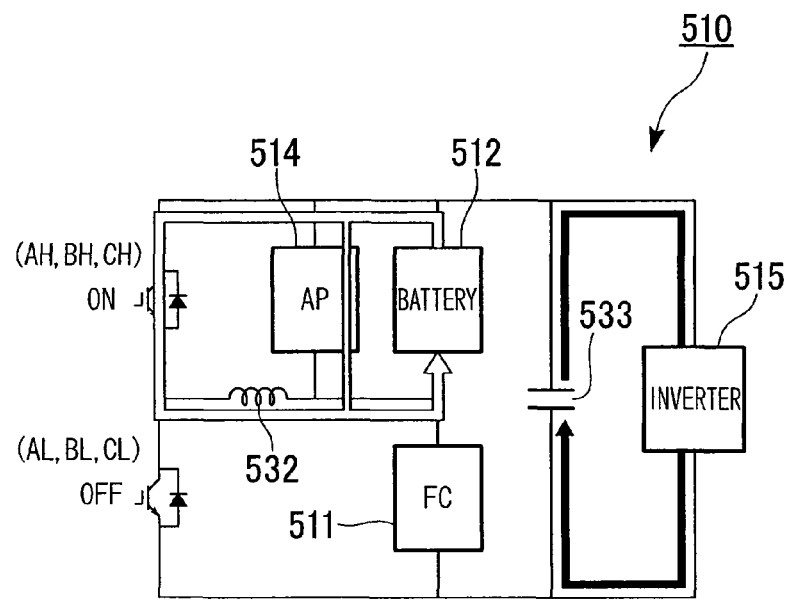
FIG. 90A shows an electricity supply state during an operation mode (EV mode) of a power supply device when a drive motor is driven according to the above embodiment.
Figure 90B:
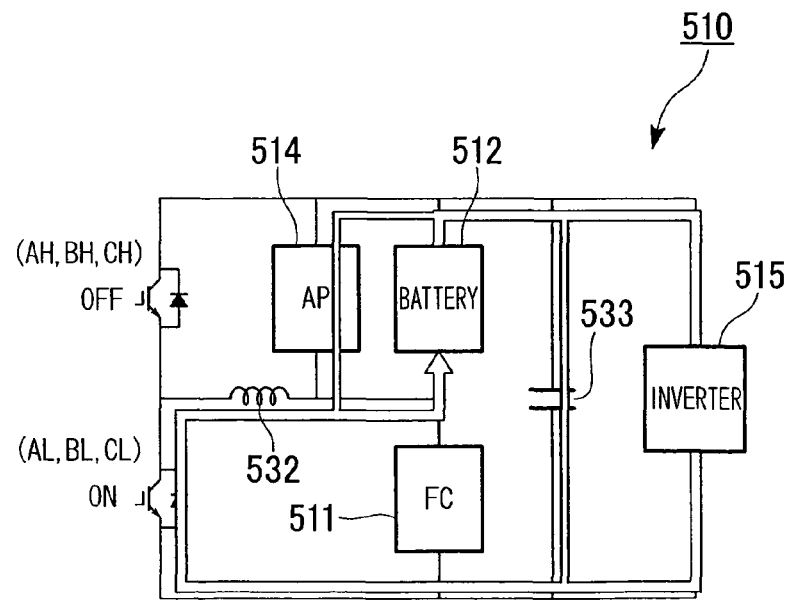
FIG. 90B shows an electricity supply state during an operation mode (EV mode) of a power supply device when a drive motor is driven according to the above embodiment.
Figure 91A:
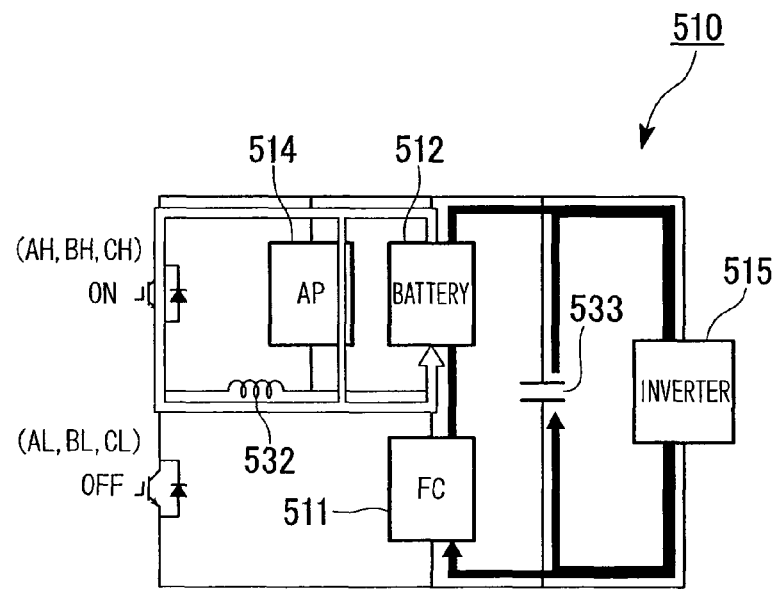
FIG. 91A shows an electricity supply state during an operation mode (first (FC+battery) mode) of a power supply device when a drive motor is driven according to the above embodiment.
Figure 91B:
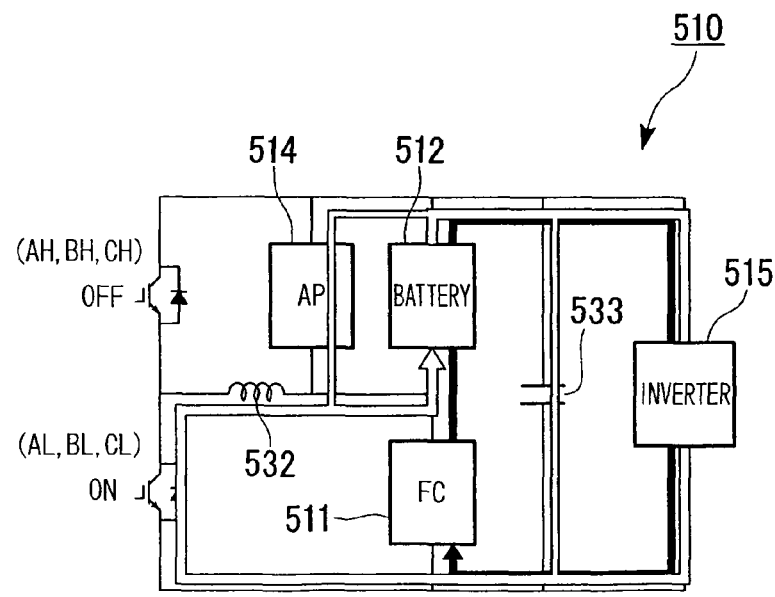
FIG. 91B shows an electricity supply state during an operation mode (first (FC+battery) mode) of a power supply device when a drive motor is driven according to the above embodiment.
Figure 92A:
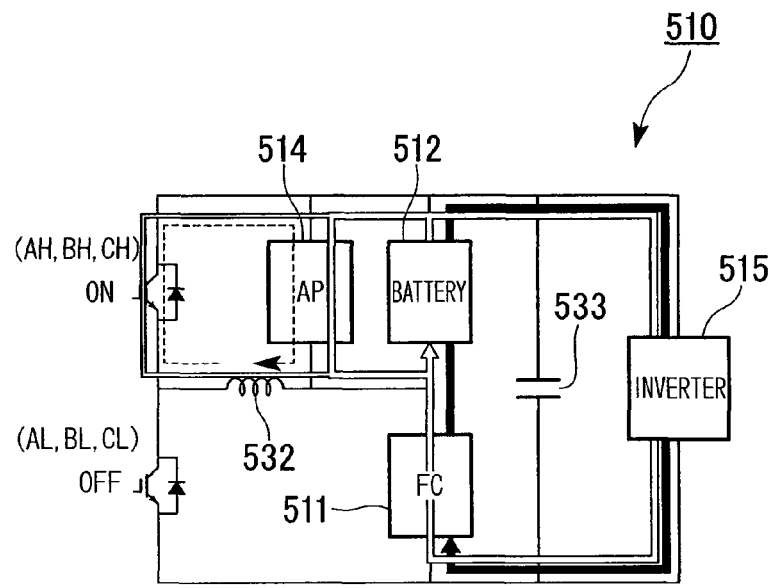
FIG. 92A shows an electricity supply state during an operation mode (second (FC+battery) mode) of a power supply device when a drive motor is driven according to the above embodiment.
Figure 92B:
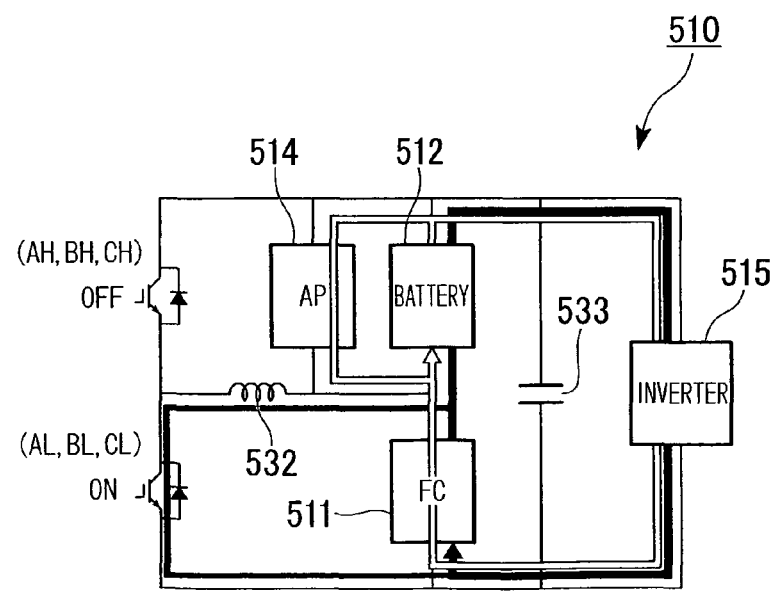
FIG. 92B shows an electricity supply state during an operation mode (second (FC+battery) mode) of a power supply device when a drive motor is driven according to the above embodiment.
Figure 93A:
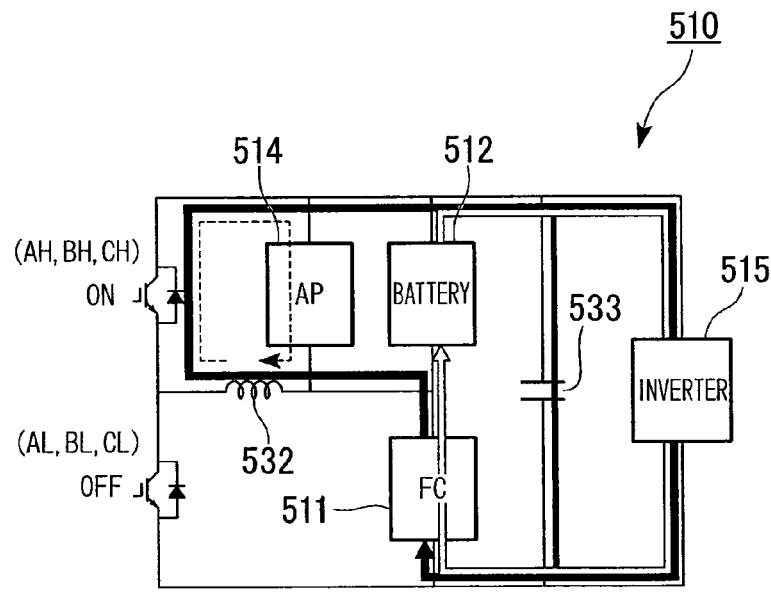
Figure 93B:
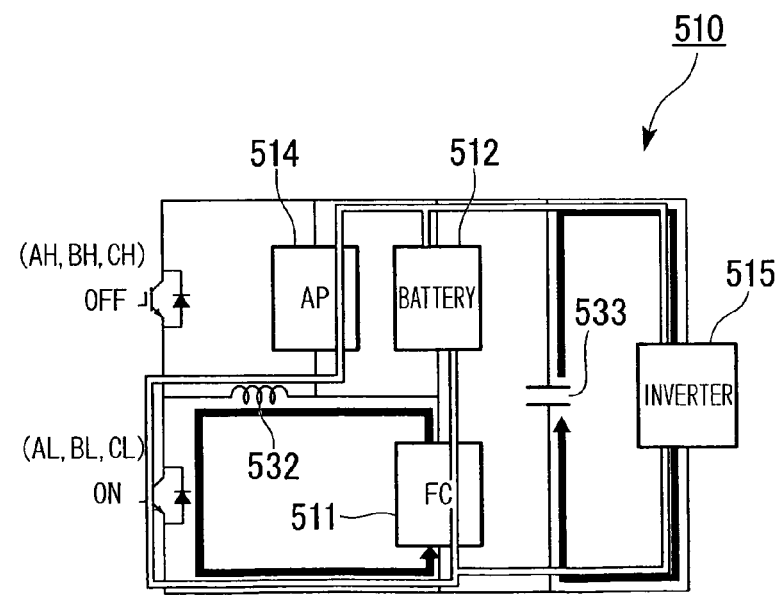
Figure 94A:
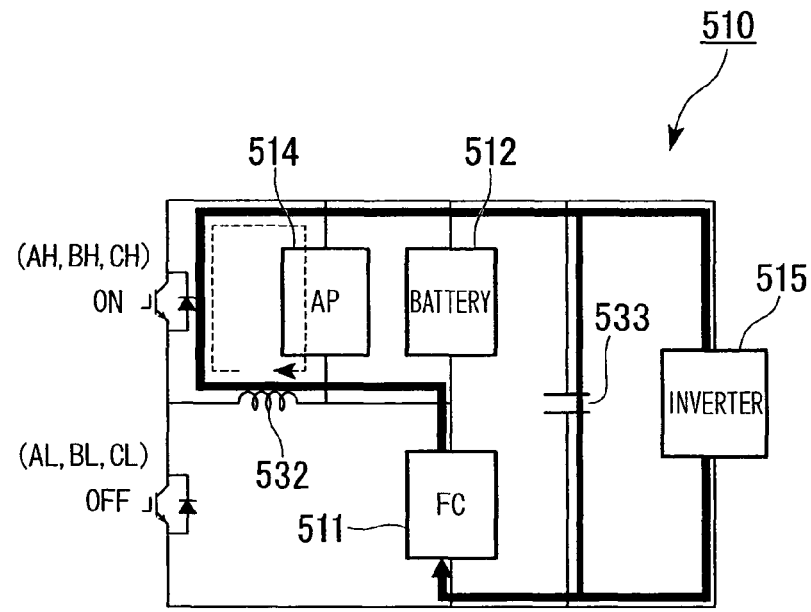
Figure 94B:
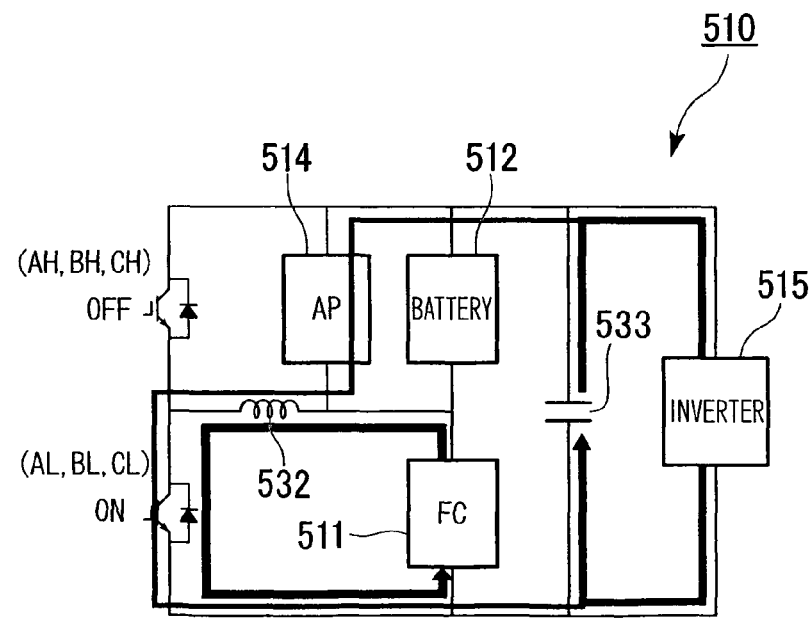
Figure 95A:
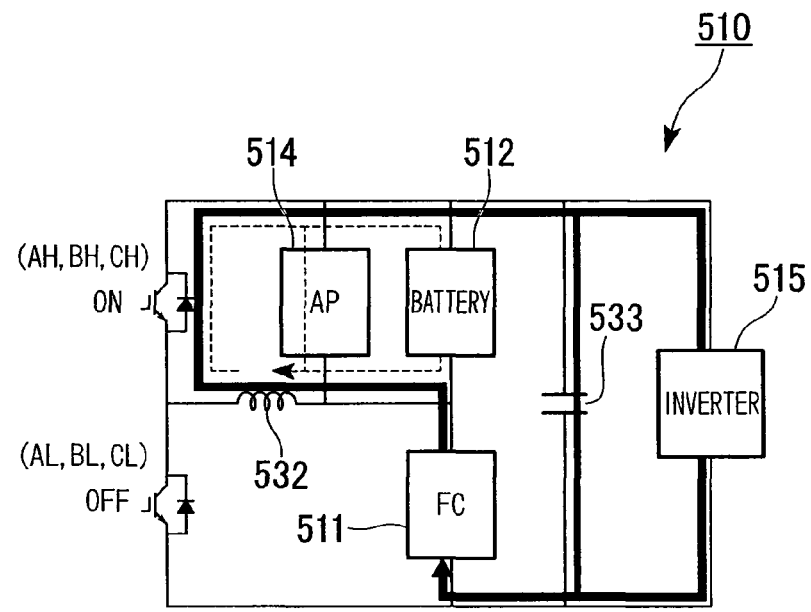
Figure 95B:
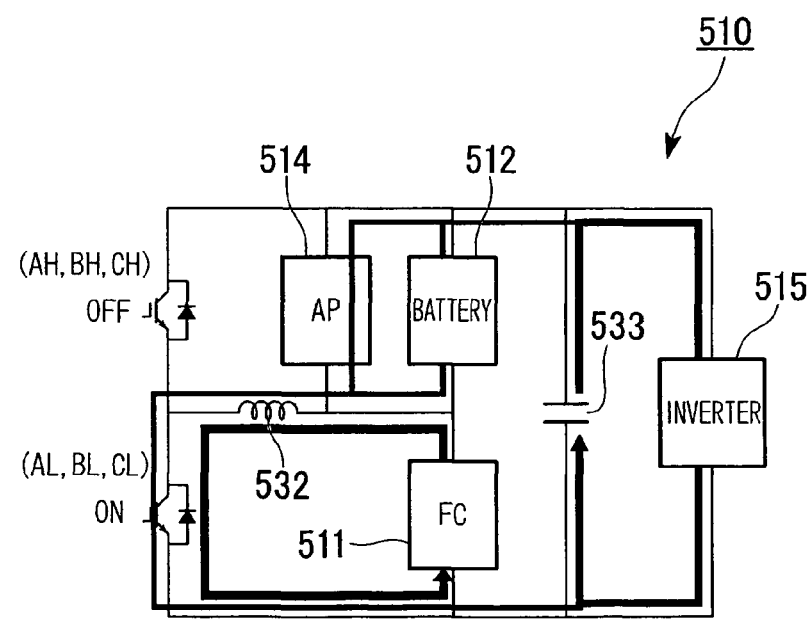

When, for example, the boosting ratio of the first DC-DC converter 513 approximately equals 2 to 3, the operating mode of the power supply device 510 that maximizes the switching duty is an EV mode in which only the output by the battery 512 is supplied to the drive motor inverter 515 and the air pump inverter 514, as shown in FIGS. 90A and 90B, for example.

As the switching duty tends to decline from the EV mode, the operating mode of the power supply device 510 shifts sequentially from a first (FC+battery) mode to a second (FC+battery) mode to a third (FC+battery) mode, as shown in FIGS. 91A to 93B, for example. In the first mode, the output of the battery 512 is supplied to the drive motor inverter 515 and the air pump inverter 514. At the same time, in the first mode, the output of the fuel cell stack 511 is supplied to the drive motor inverter 515, and the electric current (Ib) of the battery 512 becomes larger than the electric current (output current Ifc) of the fuel cell stack 511. In the second mode, the output of the battery 512 is supplied to the drive motor inverter 515 and the air pump inverter 514. At the same time, in the second mode, the output of the fuel cell stack 511 is supplied to the drive motor inverter 515, and the electric current (Ib) of the battery 512 becomes equal to the sum of the electric current (output current Ifc) of the fuel cell stack 511 and the electric current (IAP) flowing through the air pump inverter 514. In the third mode, the output of the battery 512 and the fuel cell stack 511 is supplied to the drive motor inverter 515 and the air pump inverter 514, and the electric current (Ib) of the battery 512 becomes smaller than the electric current (output current Ifc) of the fuel cell stack 511.

Accordingly, the electric current (Ib) of the battery 512 tends to decline, as shown in FIG. 89 for example. In addition, the electric current (output current Ifc) of the fuel cell stack 511 and the target electric current (the Ifc command) tend to increase. The input electric voltage (VPIN) of the primary side of the drive motor inverter 515 is maintained to be approximately constant. The electric voltage of the battery 512 (VB) tends to increase, while the electric voltage of the fuel cell stack 511 (VFC) tends to decrease.

Further, as the switching duty tends to decline to a minimum value from the third (FC+battery) mode, the operating mode of the power supply device 510 shifts to the first FC mode and the second FC mode, in sequence, as shown in FIGS. 94A to 95B, for example. In the first FC mode, only the output of the fuel cell stack 511 is supplied to the drive motor inverter 515 and the air pump inverter 514. In the second FC mode, only the output of the fuel cell stack 511 is supplied to the drive motor inverter 515, the air pump inverter 514, and the battery 512, therefore charging the battery 512.

Accordingly, the electric current (Ib) of the battery 512 tends to decrease from zero to a negative value as shown in FIG. 89 for example. Meanwhile, the electric current (the output current Ifc) of the fuel cell stack 511 and the target electric current (the Ifc command) tend to increase. In addition, the input electric voltage (VPIN) in the primary side of the drive motor inverter 515 is maintained to be approximately constant. The electric voltage of the battery 512 (VB) tends to increase. On the other hand, the electric voltage of the fuel cell stack 511 (VFC) tends to decrease.

When the drive motor 522 is regenerated, for example, the control device 525 performs a feedback control so that the detected value of the electric current of the fuel cell stack 511 (the output current Ifc) equals the target electric current (either zero or a positive value). This control device 525 controls the switching duty of the first DC-DC converter 513 by performing a feedback control of the regenerative electric voltage.

Figure 96A:
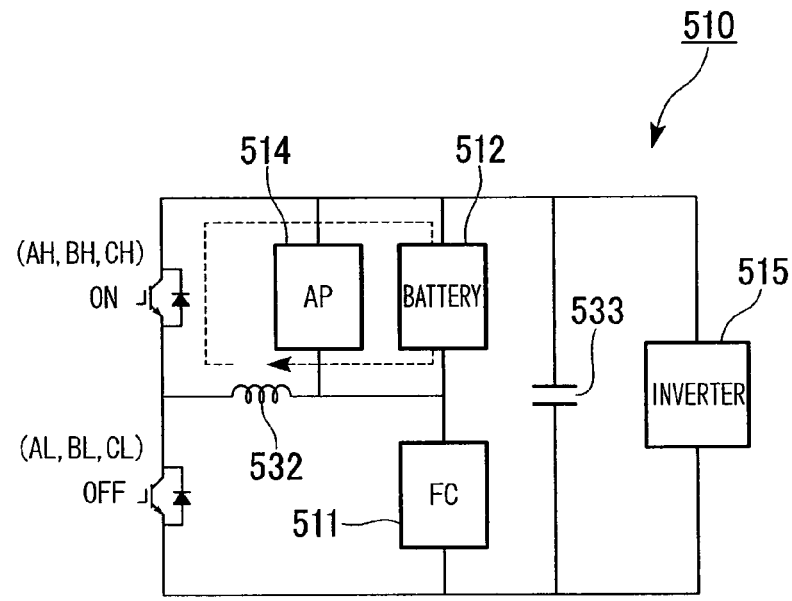
Figure 96B:
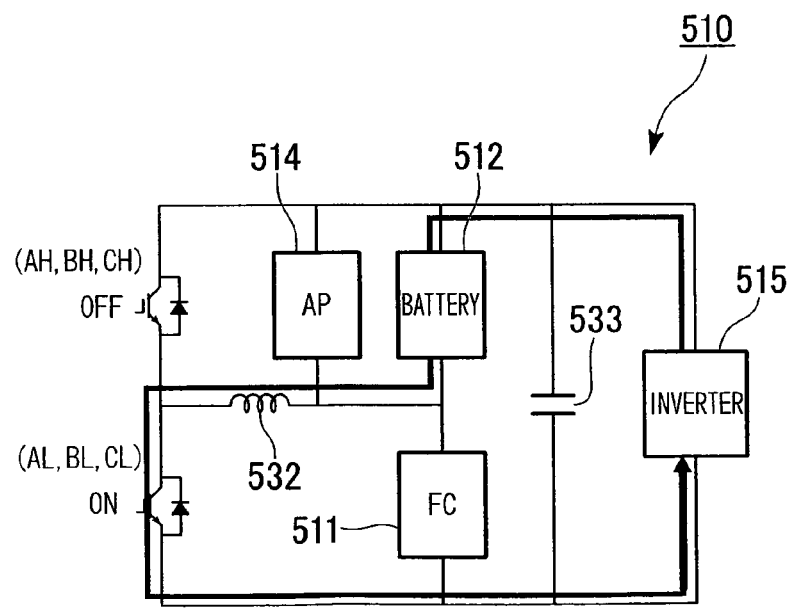

For example, the operating mode of the power supply device 510 in which the target of the electric current of the fuel cell stack 511 (the output current Ifc) equals zero is, as shown in FIGS. 96A and 96B, the regenerative mode in which the battery 512 is charged by the regenerative electric power of the drive motor inverter 515.

Figure 97A:
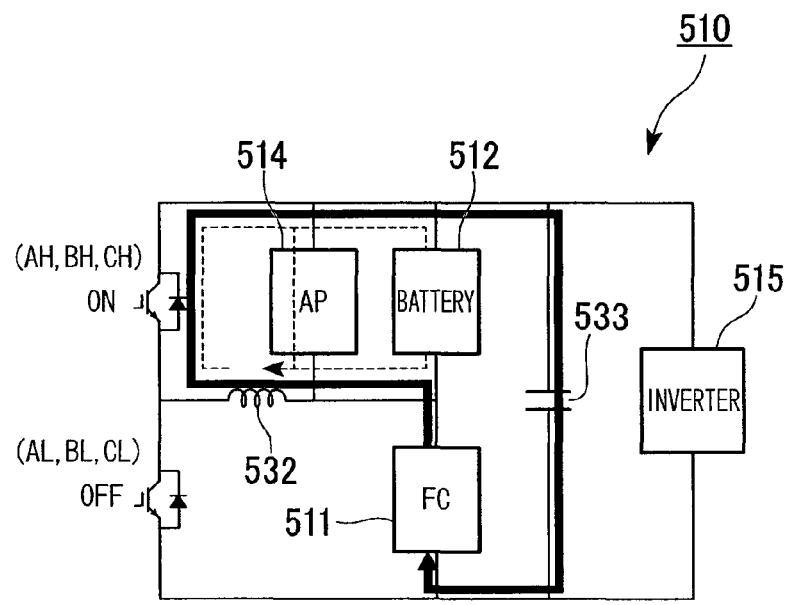
Figure 97B:
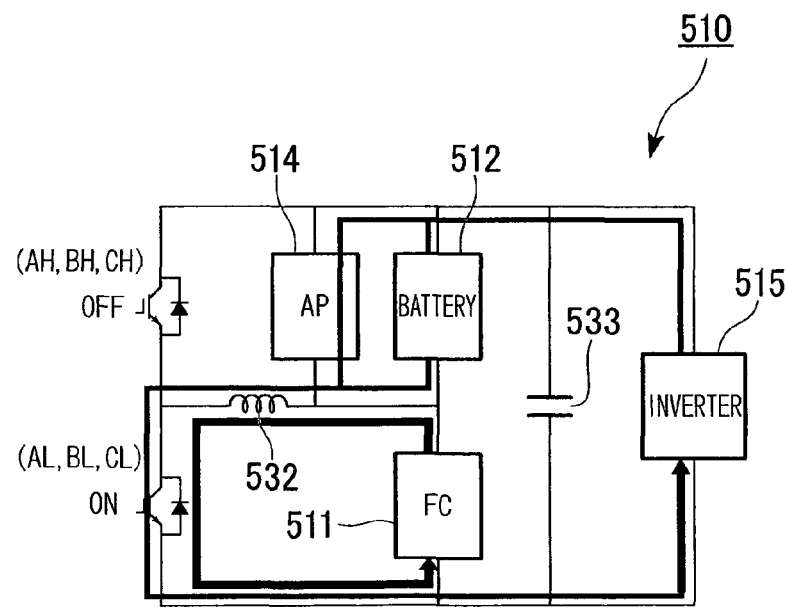

Meanwhile, the operating mode of the power supply device 510 in which the target of the electric current of the fuel cell stack 511 (the output current Ifc) equals a positive value, for example, is a (regenerative+battery charging by the FC) mode in which the regenerative electric power of the drive motor inverter 515 and the output of the fuel cell stack 511 are supplied to the air pump inverter 514 and the battery 512, and the battery 512 is charged, as shown in FIGS. 97A and 97B.

The control device 525 outputs a command value regarding the pressure and the flux of the reactive gas supplied to the fuel cell stack 511, as a command to the fuel cell stack 511 to generate electric power, the output of the command value being based on, for example, the condition in which the fuel cell vehicle is driven, the concentration of hydrogen included in the reactive gas supplied to the anode of the fuel cell stack 511, the concentration of hydrogen included in the discharge gas emitted from the anode of the fuel cell stack 511, the condition in which the fuel cell stack 511 is generating electric power, the electric voltage between the terminals of each of the plurality of fuel cells, the electric voltage VFC of the fuel cell stack 511, the output current Ifc of the fuel cell stack 511, and the internal temperature of the fuel cell stack 511. In this way, the control device 525 controls the condition in which the fuel cell stack 511 generates electric power.

The control device 525 switches over the on and off conditions of the contactor 511a according to the condition in which the fuel cell stack 511 is generating electric power. In addition, the control device 525 controls the connection between the fuel cell stack 511, the second line L502, and the third line L503.

The control device 525 also switches over the on and off conditions of the contactor 512a and the current limiting circuit 512b according to the remaining capacity SOC of the battery 512, for example. Thus, the control device 525 controls the connection between the battery 512 and the first line L501 and the second line L502.

The power supply system 520 of the fuel cell vehicle is configured as described above. Next, an explanation is provided an operation of the power supply system 520 of the fuel cell vehicle with reference to FIG. 98. In particular, an explanation is provided regarding an operation to control the switching duty of the first DC-DC converter 513 by performing a feedback control so that the detected value of the electric current (the output current Ifc) of the fuel cell stack 511 is equal to the target electric current.

Figure 98:
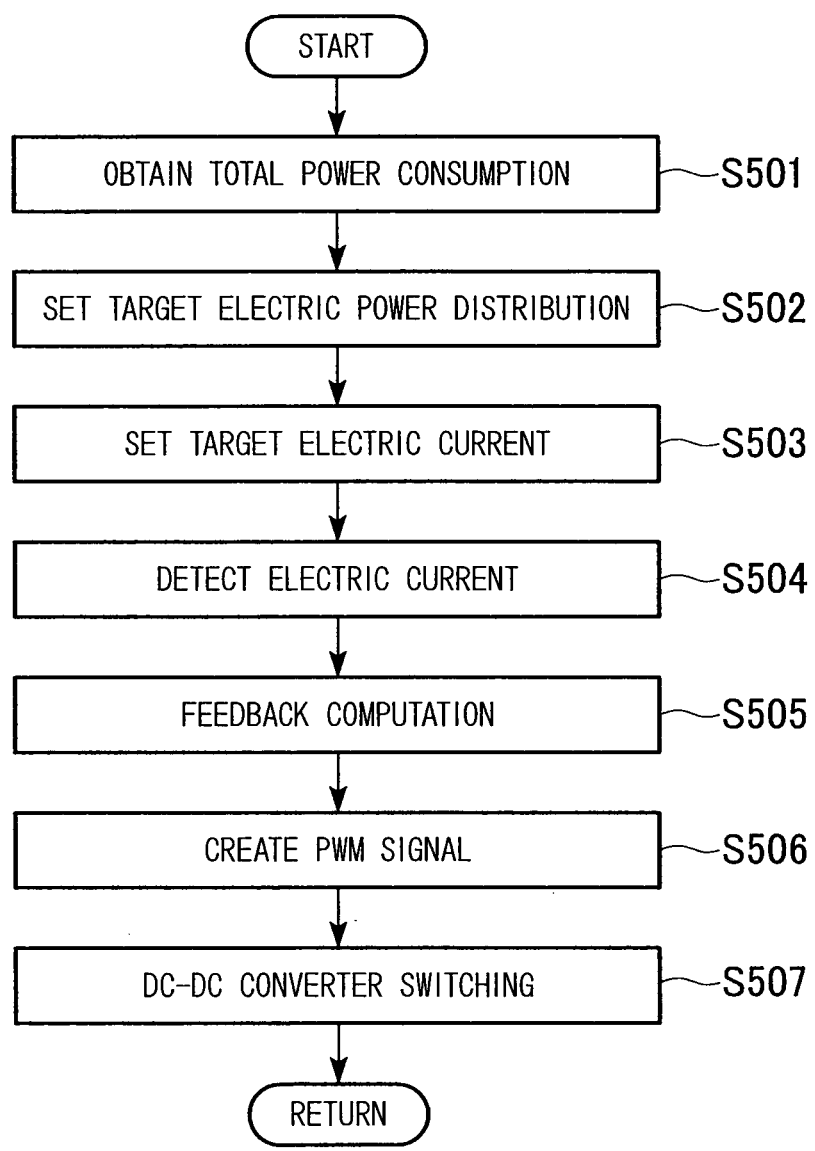

First, in step S501 shown in FIG. 98 for example, the total consumption of the load, to which the power supply device 510 supplies electric power, is computed. Examples of the load include the drive motor 522, the air conditioner 524, and the vehicle auxiliary machinery.

Next, in step S502, the electric power distribution of the power supplying side of the fuel cell stack 511 and the drive motor inverter 515, as well as the electric power distribution of the power receiving side of the battery 512 and the load (for example, the air conditioner 524, the vehicle auxiliary machinery, and the air pump inverter 514) are set, based on, for instance, the condition of the fuel cell stack 511 (for instance, the rate of change of the condition of the fuel cell stack 511 according to a command for power generation) and the remaining capacity SOC of the battery 512.

Next, in step S503, zero or a positive value is outputted as a target electric current (output current Ifc) of the fuel cell stack 511 according to the electric power distribution set by the target electric power distribution setting unit 562.

Next, in step S504, a detected value of the output electric current IFC of the fuel cell stack 511 outputted by the output current sensor 527 is obtained.

Next, in step S505, an electric voltage command value is computed, by controlling and amplifying the electric current deviation between the target electric current and the detected value of the output electric current IFC of the fuel cell stack 511 outputted from the output current sensor 527, through a PID (Proportional Integral Derivative) operation, for example.

Next, in step S506, a gate signal (namely, a PWM signal) is outputted which turns on and off each of the transistors AH, BH, and CH of the high side arm of the first DC-DC converter 513 as well as each of the transistors AL, BL, and CL of the low side arm, in order to output an output current Ifc from the fuel cell stack 511 corresponding to the electric voltage command value.

Next, in step S507, each of the transistors AH, BH, and CH of the high side arm of the first DC-DC converter 513 and each of the transistors AL, BL, and CL of the low side arm are turned on and off according to the PWM signal, and proceeds to return.

As described above, according to the power supply system 520 of the fuel cell vehicle based on the above embodiment of the present invention, the regenerative electric power generated while the drive motor 22 is undergoing a regenerative operation can be utilized effectively, by providing a single first DC-DC converter 513 with respect to the battery circuit 510a in which the fuel cell stack 511 and the battery 512 are connected in series, and by performing a feedback control on the switching duty of the first DC-DC converter 513 so that the detected value of the output electric current IFC of the fuel cell stack 511 outputted by the output current sensor 527 equals a target electric current, the target electric current being zero or a positive value. Compared to the instance in which a DC-DC converter is equipped individually for each of the fuel cell stack 511 and the battery 512, for example, the cost required for configuration can be lowered, the size can be reduced, and the electric power can be controlled efficiently.

Figure 99:
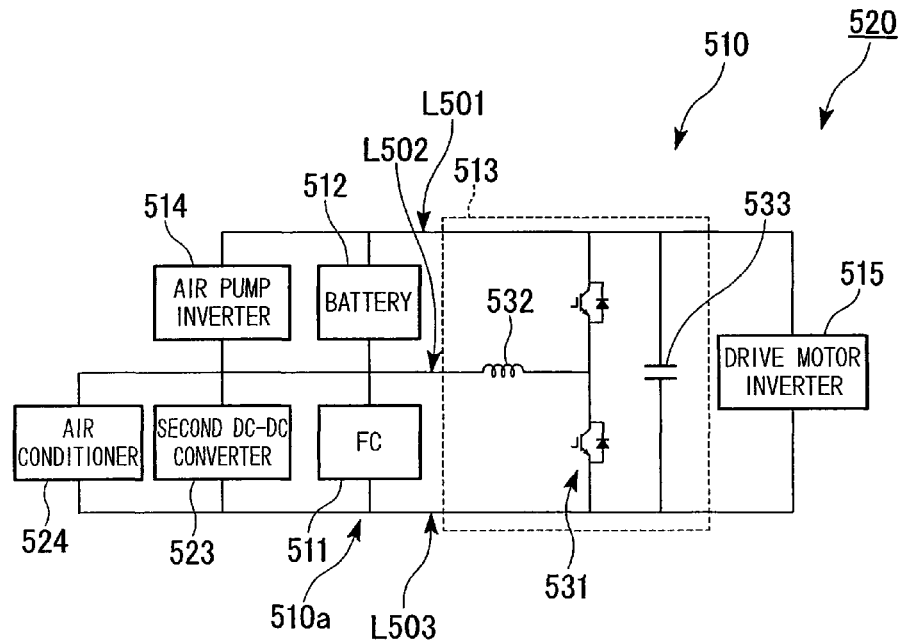

According to the above embodiment, at least a portion of the vehicle auxiliary machinery equipped on the fuel cell vehicle (for example, an air conditioner 524 separate from the second DC-DC converter 523, and a load connected to the second DC-DC converter 523 (a processing device, a magnetic valve, and a 12 volt type load)) is connected to the first line L501 and the second line L502 either directly or through the second DC-DC converter 523. However, the present invention is not limited to this configuration. For example, as shown in FIG. 99, at least a part of the vehicle auxiliary machinery can be connected to the second line L502 and the third line L503. In addition, as shown in FIG. 100, at least a part of the vehicle auxiliary machinery can be connected to the first line L501 and the third line L503.

According to the above configuration, the air pump inverter 514 is connected to the first line L501 and the second line L502, the air pump inverter 514 being a drive circuit of the air pump 521. However, the present invention is not limited to this configuration. The drive circuit of at least one of a pump that supplies reactive gas to the fuel cell stack 511 (for example, the air pump 521) and a pump that supplies a refrigerant (not diagramed) can be connected to the first line L501 and the second line L502.

In addition, the drive circuit of at least one of a pump that supplies reactive gas to the fuel cell stack 511 (for example, the air pump 521) and a pump that supplies a refrigerant (not diagramed) can be connected to the second line L502 and the third line L503. The drive circuit of at least one of the above pumps can be connected to the first line L501 and the third line L503.

According to the above embodiment, the battery 512 is connected to the first line L501 and the second line L502, while the fuel cell stack 511 is connected to the second line L502 and the third line L503. However, the present invention is not limited to the above configuration. The fuel cell stack 511 can be connected to the first line L501 and the second line L502. The battery 512 can be connected to the second line L502 and the third line L503.

According to the above embodiment, the control device 525 controls the switching duty of the first DC-DC converter 513 by performing a feedback control so that the detected value of the electric current (output current Ifc) of the fuel cell stack 511 equals the target electric current. However, the present invention is not limited to this configuration. The control device 525 may include, for example, a sensor that detects the output electric power of the fuel cell stack 511, and the control device 525 may perform a feedback control so that the output electric power of the fuel cell stack 511 outputted by this sensor equals a target value. In this case, the target value with respect to the output electric power of the fuel cell stack 511 is set to be zero or a positive value, according to the electric power distribution set by the target electric power distribution setting unit 562.

According to the above embodiment, the first DC-DC converter 513, alternately switches over between a condition in which each of the transistors AH, BH, and CH of the high side arm are turned off and each of the transistors AL, BL, and CL of the low side arm are turned on, and a condition in which each of the transistors AH, BH, and CH of the high side arm are turned on and each of the transistors AL, BL, and CL of the low side arm are turned off. However, the present invention is not limited to this configuration. For example, during a boosting operation from the primary side to the secondary side when the drive motor 522 is driven, each of the transistors AL, BL, and CL of the low side arm can alternately be switched on and off while each of the transistors AH, BH, and CH of the high side arm are turned off. As another example, during a regenerative operation from the secondary side to the primary side when the drive motor 522 is regenerated, each of the transistors AH, BH, and CH of the high side arm can be alternately switched on and off while each of the transistors AL, BL, and CL of the low side arm are turned off.

Below, a description of a power supply device and a power supply system for a fuel cell vehicle according to a seventh embodiment of the present invention is provided with reference to FIGS. 101 to 111.

A power supply device 610 according to the present embodiment includes a fuel cell stack (FC) 611, a battery 612, a first DC-DC converter 613, and an air pump inverter 614, as shown in FIG. 101 for example. In addition, the power supply device 610 is connected to a drive motor inverter 615, for example.

The power supply device 610 is provided in a power supply system 620 for a fuel cell vehicle, for example. For example, this power supply system 620 for the fuel cell vehicle includes, as shown in FIGS. 102 and 103, the power supply device 610, an air pump (AP) 621, a drive motor 622, a second DC-DC converter 623, an air conditioner 624, a control device 625, a ground fault sensor 626, an output current sensor 627, a phase current sensor 628, and an angle sensor 629.

The fuel cell stack 611 is formed by layering multiple fuel cells including a solid polymer electrolyte membrane comprising a cation exchange membrane and the like, the solid polymer electrolyte membrane being held by a fuel electrode (anode) including an anode catalyst and a gas diffusion layer, and an oxygen electrode (cathode) including a cathode catalyst and a gas diffusion layer, the solid polymer electrolyte membrane and the anode and the cathode thus forming an electrolytic electrode structure, the electrolytic electrode structure further being held by a pair of separators. The laminated body of the fuel cell is sandwiched by a pair of end plates from both sides of the direction in which the layers are formed.

Air is supplied to the cathode of the fuel cell stack 611 from the air pump 621, the air being an oxidant gas (reactant gas) including oxygen. A fuel gas (reactant gas) including hydrogen is supplied to the anode from a high-pressure hydrogen tank (not diagramed), for example.

The hydrogen is ionized by the catalytic reaction with the anode catalyst at the anode and moves to the cathode through a reasonably humidified solid polymer electrolyte membrane. An electron is generated while the hydrogen moves, and the electron is extracted by the external circuit, and is utilized as an electric energy of the direct current. At this time, the hydrogen ion, the electron, and oxygen react at the cathode, forming water.

Here, the air pump 621 brings in air from outside the vehicle and compresses the air, for example. The air pump 621 supplies this air to the cathode of the fuel cell stack 611 as reactive gas. The number of rotations of a motor (not diagramed) driving this air pump 621 is controlled by the air pump inverter 614 according to a control command outputted by the control device 625. The air pump inverter 614 includes a PWM inverter based on a pulse width modulation (PWM).

As an alternative to the battery 612, the power supply device 610 can include, for example, a capacitor as an electric storage device, the capacitor including an electric double layer capacitor or an electrolytic capacitor.

The first DC-DC converter 613 is, for example, a chopper type DC-DC converter. As shown in FIG. 103, this first DC-DC converter 613 includes a bridge circuit 631 with three phases, a choke coil 632 with three phases, and a smoothing capacitor 633. The above bridge circuit 631 includes a plurality of switching elements (for example, an IGBT: Insulated Gate Bipolar Mode Transistor) which are bridge-connected.

The first DC-DC converter 613 is shown in FIGS. 101 and 102 in simplified form. Thus, among the three phases, only one phase of the switching element and the choke coil 632 is shown in FIGS. 101 and 102.

The bridge circuit 631 is same as a three-phase bridge circuit 651 forming the drive motor inverter 615 described later. In the bridge circuit 631, a high-side and a low-side first transistor AH and AL, a high-side and a low-side second transistor BH and BL, and a high-side and a low-side third transistor CH and CL, which form a pair for each of the phases, are bridge-connected. Each of the transistors AH, BH, and CH form a high side arm by a collector being connected to a secondary side positive terminal P602. Each of the transistors AL, BL, and CL form a low side arm by an emitter being connected to a secondary side negative terminal N602. For each phase, the emitter of each of the transistors AH, BH, and CH of the high side arm is connected to the collector of each of the transistors AL, BL, and CL of the low side arm. Between the collector and the emitter of each of the transistors AH, AL, BH, BL, CH, and CL, each of the diodes DAH, DAL, DBH, DBL, DCH, and DCL are connected, so that the direction from the emitter to the collector is the forward direction.

This bridge circuit 631 is driven by a signal (PWM signal) which is pulse-width modulated (PWM), the signal being outputted from the control device 625 and inputted to a gate of each of the transistors. A condition in which each of the transistors AH, BH, and CH of the high side arm are turned on and each of the transistors AL, BL, and CL of the low side arm are turned off, and another condition in which each of the transistors AH, BH, and CH of the high side arm are turned off and each of the transistors AL, BL, and CL of the low side arm are turned on, are switched over in alternation.

The smoothing capacitor 633 is connected to the secondary side positive terminal P602 and the secondary side negative terminal N602.

Regarding the three-phase choke coil 632, an end of each of the choke coil 632 is connected between the collector and the emitter of each of the phases of the bridge circuit 631. In other words, the end of each of the choke coil 632 is connected, respectively, between the collector and the emitter of each of the transistors AH and AL, between the collector and emitter of each of the transistors BH and BL, and between the collector and emitter of each of the transistors CH and CL. The other side of each of the choke coil 632 is connected mutually to the primary side positive terminal P601.

The three-phase choke coil 632 is formed by wrapping around a single rectangular core 641 in common mode, as shown in FIG. 104 for example. This choke coil 632 is set so that the direction of the magnetic flux, generated by each of the choke coil 632 while electricity is supplied, is in the same direction.

One phase of the three-phase choke coil 632 is dispersed and wrapped around a pair of opposite sides 641*a* which is one of the two pairs of opposite sides forming the rectangular core 641. The other two phases of the three-phase choke coil 632 is concentrated and wrapped around the other pair of opposite sides 641*b* among the two pairs of opposite sides forming the rectangular core 641.

Each of the three-phase choke coil 632 can be concentrated and wrapped around three sides of the four sides forming the rectangular core 641, as shown in FIG. 105 for example. Further, each of the three-phase choke coil 632 can have a different winding structure.

With respect to three lines L601, L602, and L603, each having a different electric potential from one another (for example, electric potential of L601>electric potential of L602>electric potential of L603), a primary side of the first DC-DC converter 613 is connected to the second line L602 and the third line L603, as shown in FIG. 103, for example. The secondary side of the DC-DC converter 613 is connected to the first line L601 and the third line L603. In other words, the first line L601 is connected to the secondary side positive terminal P602, the second line L602 is connected to the primary side positive terminal P601, and the third line L603 is connected to the primary side negative terminal N601 and the secondary side negative terminal N602.

Concerning this first DC-DC converter 613, when a boost operation is performed from the primary side to the secondary side, at the time the drive motor 622 is driven for example, each of the transistors AH, BH, and CH of the high side arm are first turned off. At the same time, each of the transistors AL, BL, and CL of the low side arm are turned on. Due to the electric current flowing from the primary side, the choke coil 632 undergoes a direct current energization, and magnetic energy is accumulated.

Then, each of the transistors AH, BH, and CH of the high side arm are turned on. At the same time, each of the transistors AL, BL, and CL of the low side arm are turned off. While preventing a change in the magnetic flux due to the interruption of the electric current flowing through the choke coil 632, an induced voltage is generated between both ends of the choke coil 632. The induced voltage, generated by magnetic energy accumulated in the choke coil 632, is added to the input voltage in the primary side. In this way, a boosting voltage, higher than the input voltage in the primary side, is applied to the secondary side. The fluctuation in voltage, generated during this switchover operation, is smoothed by the smoothing capacitor 633. In addition, a boosting voltage is outputted from the secondary side.

On the other hand, during a regenerating operation from the secondary side to the primary side when the drive motor 622 is regenerated for example, each of the transistors AH, BH, and CH of the high side arm are first turned off. At the same time, each of the transistors AL, BL, and CL of the low side arm are turned on. The choke coil 632 undergoes a direct-current energization by the electric current inputted from the secondary side, and magnetic energy is accumulated.

Then, each of the transistors AH, BH, and CH of the high side arm are turned on. At the same time, each of the transistors AL, BL, and CL of the low side arm are turned off. While preventing a change in the magnetic flux due to the blockage of the electric current flowing through the choke coil 632, an induced voltage is generated between both ends of the choke coil 632. The induced voltage, generated by the magnetic energy accumulated in the choke coil 632, becomes a depressed voltage generated by stepping down the input voltage of the secondary side according to the on/off ratio of each of the transistors AH, BH, and CH of the high side arm. In this way, a depressed voltage is applied to the primary side.

The first DC-DC converter 613 is driven by a signal (PWM signal) which is pulse-width modulated (PWM), the signal being outputted from the control device 625 and inputted to a gate of each of the transistors. The first DC-DC converter 613 switches over the on/off condition of each of the transistors AH, BH, and CH of the high side arm and each of the transistors AL, BL, and CL of the low side arm, according to a switching duty defined, for example, as a ratio of each of the transistors AH, BH, and CH of the high side arm that are turned on during one cycle of the PWM signal.

Incidentally, each of the transistors AH, BH, and CH of the high side arm and each of the transistors AL, BL, and CL of the low side arm are prohibited from being simultaneously turned on when the on/off condition is switched over. An appropriate dead time is provided during which each of the above transistors can be simultaneously turned off.

The fuel cell stack 611 is connected to the first line L601 and the second line L602 through a contactor 611*a* and a capacitor 611*b* placed in the positive electrode side and the negative electrode side. The battery 612 is connected to the second line L602 and the third line L603 through a contactor 612*a* placed in the positive electrode side and the negative electrode side, and through a current limiting circuit 612*b* placed in the positive electrode side. Therefore, the fuel cell stack 611 and the battery 612 are connected in series between the first line L601 and the third line L603. The fuel cell stack 611 and the battery 612 thus are included in the battery circuit 610*a*.

The first line L601 and the third line L603 are connected to the drive motor inverter 615, so that electric power is outputted from the first line L601 and the third line L603 to a load (for example, the drive motor 622).

The air pump inverter 614 is connected to the second line L602 and the third line L603. This air pump inverter 614 is a drive circuit of the air pump 621.

The drive motor inverter 615, included in a drive circuit of the three-phase drive motor 622, is a PWM inverter with a pulse-width modulation (PWM), for example. This drive motor inverter 615 includes a three-phase bridge circuit 651 comprising a plurality of switching elements (for example, an IGBT: Insulated Gate Bipolar Mode Transistor) which are bridge-connected.

The bridge circuit 651 is same as a three-phase bridge circuit 631 forming the first DC-DC converter 613. In the bridge circuit 651, a high-side and a low-side U-phase transistor UH and UL, a high-side and a low-side V-phase transistor VH and VL, and a high-side and a low-side W-phase transistor WH and WL, which form a pair for each of the phases, are bridge-connected for example. Each of the transistors UH, VH, and WH form a high side arm by a collector being connected to a secondary side positive terminal P602 of the first DC-DC converter 613. Each of the transistors UL, VL, and WL form a low side arm by an emitter being connected to a secondary side negative terminal N602 of the first DC-DC converter 613. For each phase, the emitter of each of the transistors UH, VH, and WH of the high side arm is connected to the collector of each of the transistors UL, VL, and WL of the low side arm. Between the collector and the emitter of each of the transistors UH, UL, VH, VL, WH, and WL, each of the diodes DUH, DUL, DVH, DVL, DWH, and DWL are connected, so that the direction from the emitter to the collector is the forward direction.

This drive motor inverter 615 is driven by a signal (PWM signal) which is pulse-width modulated (PWM), the signal being outputted from the control device 625 and inputted to a gate of each of the transistors of the bridge circuit 651. For example, when the drive motor 622 is driven, the direct-current power outputted from the power supply device 610 is converted to a three phase alternating-current power, by switching over the on (conduction) and off (interruption) condition of each of the transistors forming a pair for each of the phases. By sequentially commutating the electric current to the three phase stator winding, a U phase electric current Iu, a V phase electric current Iv, and a W phase electric current Iw, all of which are an alternating-current, are supplied to the stator winding of each phase. Meanwhile, when the drive motor 622 is regenerated, for example, the drive motor inverter 615 converts the three phase alternating-current power, outputted from the drive motor 622, to a direct-current power, and supplies the direct-current power to the first DC-DC converter 613. Then, the drive motor inverter 615 charges the battery 612, and feeds power to a load connected to the first DC-DC converter 613.

The drive motor 622 is, for example, a three phase alternating-current synchronous motor of a permanent magnet type utilizing a permanent magnet as a field. This drive motor 622 is driven and controlled by a three phase alternating-current power supplied by the drive motor inverter 615. At the same time, when the drive power is transmitted from the drive wheel side to the driver motor 622 side while the vehicle is decelerating, the drive motor 622 functions as an electric generator. In this way, the drive motor 622 creates a so-called regenerative breaking force. Further, the drive motor 622 recovers the kinetic energy of the vehicle as an electric energy.

The second DC-DC converter 623 is, for example, a chopper type DC-DC converter. At least a part of the vehicle auxiliary machinery equipped on the fuel cell vehicle (for example, a processing device, a magnetic valve, and a 12 volt type load) is connected to the second DC-DC converter 623 as a load.

The second DC-DC converter 623 is connected to the second line L602 and the third line L603. This second DC-DC converter 623 depresses the electric voltage applied between the second line L602 and the third line L603, by a chopping movement according to a control command outputted from the control device 625, and supplies the electric voltage to the load connected to the second DC-DC converter 623.

The air conditioner 624 is included in at least a part of the vehicle auxiliary machinery equipped on the fuel cell vehicle. This air conditioner 624 includes, for example, a heater loaded on the fuel cell vehicle, a motor for a compressor, and a drive circuit (for example, an inverter).

The air conditioner 624 is connected to the second line L602 and the third line L603. Electric power is supplied from the second line L602 and the third line L603 to the air conditioner 624.

The control device 625 performs a duty control, controlling the switching duty of the first DC-DC converter 613. At the same time, the control device 625 controls the electric power conversion operation of the drive motor inverter 615.

The control device 625 receives an input of a detection signal outputted by, for example, a ground fault sensor 626 which is connected to the first line L601 and the third line L603 and detects the occurrence of a ground fault, an output current sensor 627 which detects an output current IFC of the fuel cell stack 611, a phase current sensor 628 which detects each of the three phase current between the drive motor inverter 615 and the drive motor 622, and an angle sensor 629 which detects a rotational angle of a rotator of the drive motor 622 (in other words, a rotational angle of the magnetic pole of the rotor from a predetermined standard rotational position, and a rotational position of the rotational axis of the drive motor 622).

The control device 625 includes, for example, a power consumption computation unit 661, a target electric current distribution unit 662, a target electric current setting unit 663, a duty controlling unit 664, and a drive motor controlling unit 665.

The power consumption computation unit 661 computes the total power consumption of the load (from example, the drive motor 622 and the air conditioner and the vehicle auxiliary device, which are loads outside of the power supply device 610, and the air pump inverter 614, which is a load inside of the power supply device 610) to which electric power is supplied from the power supply device 610.

When the drive motor 622 is driven, for example, the target electric power distribution setting unit 662 sets the electric power distribution of the fuel cell stack 611 and the battery 612 forming the battery circuit 610a of the power supply device 610, based on, for example, the condition of the fuel cell stack (for instance, the rate of change of the condition of the fuel cell stack 611 according to a command for power generation) and the remaining capacity SOC of the battery 612. In other words, the target electric power distribution setting unit 662 sets the distribution when the total electric power consumption computed by the electric power consumption computation unit 661 is a value obtained by adding an electric power outputted by the fuel cell stack 611 and an electric power outputted by the battery 612.

For example, when the drive motor 622 is driven, the electric power distribution becomes a value corresponding to the switching duty of the first DC-DC converter 613 (in other words, the proportion of each of the transistors AH, BH, and CH of the high side arm in one cycle of the PWM signal that are turned on). The switching duty ("duty") can be expressed using the electric voltage of the fuel cell stack 611 ("VFC") and the electric voltage of the battery 612 ("VB"), as shown below.

$$\text{duty}=VFC/(VFC+VB)$$

From this equation, the ratio of the electric voltage of the fuel cell stack 611 ("VFC") and the electric voltage of the battery 612 ("VB") can be expressed, as shown below, using the switching duty ("duty").

$$VB/VFC=(1-\text{duty})/\text{duty}$$

The electric voltage of the fuel cell stack 611 ("VFC") and the electric voltage of the battery 612 ("VB") are in a predetermined correspondence relationship with each of the electric current (output electric current Ifc) and the electric power of the fuel cell stack 611 as well as the electric current (Ib) and the electric power of the battery 612, as shown in FIGS. 106 and 107 for example. From this correspondence relationship, the ratio of the operating point of the fuel cell stack 611 (for example, the electric voltage or the electric current or the electric power) and the operating point of the battery 612 (for example, the electric voltage or the electric current or the electric power) is expressed using the switching duty ("duty").

When the drive motor 622 is regenerated, for example, the target electric power distribution setting unit 662 sets the electric power distribution of the electric power supplying side of the fuel cell stack 611 and the drive motor inverter 615, and also sets the electric power distribution of the electric power receiving side of the battery 612 and the load (for example, the air conditioner 624 and the vehicle auxiliary device and the air pump inverter 614), based on the condition of the fuel cell stack 611 (for instance, the rate of change of the condition of the fuel cell stack 611 according to a command for power generation) and the remaining capacity SOC of the battery 612, and the regenerative electric power of the drive motor 622, and the like.

Because the ratio of the operating point of the fuel cell stack 611 (for example, the electric voltage or the electric current or the electric power) and the operating point of the battery 612 (for example, the electric voltage or the electric current or the electric power) is expressed using the switching duty ("duty"), the target electric current setting unit 663 obtains the target electric current corresponding to the output electric current Ifc of the fuel cell stack 611, when the drive motor 622 is driven for example, by referring to a predetermined map representing the correspondence relationship between the operating point of the fuel cell stack 611, the operating point of the battery 612, the switching duty of the first DC-DC converter 613, and the total power consumption of the load.

This predetermined map shows a correspondence relationship of the operating point of the fuel cell stack 611 and the operating point of the battery 612 which are set with respect to each of multiple values of the switching duty of the first DC-DC converter 613 (D(1), ..., D(k), ...) on a two-dimensional coordinate in which the operating point of the fuel cell stack 611 and the operating point of the battery 612 are the orthogonal coordinates, as shown in FIG. 108, for example. In addition, the predetermined map shows the correspondence relationship between the operating point of the fuel cell stack 611 and the operating point of the battery 612 which are set with respect to each of the multiple values of the total power consumption of the load (P(1), ..., P(k), ...).

Considering the correspondence relationship set for each of the multiple values of the switching duty of the first DC-DC converter 613, the operating point of the battery 612 is set to have a tendency to increase at a rate according to the switching duty, as the operating point of the fuel cell stack 611 increases.

Meanwhile, considering the correspondence relationship between the operating point of the fuel cell stack 611 and the operating point of the battery 612 which are set for each of the multiple values of the total consumption power of the load, a combination of the operating points is set so that the sum of the electric power corresponding to the operating point of the fuel cell stack 611 and the electric power corresponding to the operating point of the battery 612 equals the total consumption power of the load.

When, on a two-dimensional coordinate in which the operating point of the fuel cell stack 611 and the operating point of the battery 612 are the orthogonal coordinates, the operating point of the fuel cell stack 611 and the battery 612 is set to be the intersection between the correspondence relationship P(k) according to the total power consumption of the load computed by the consumption power computation unit 661 and the correspondence relationship D(k) according to the switching duty of the first DC-DC converter 613 according to the electric power distribution set by the target electric power distribution unit 662, the target electric current setting unit 663 outputs the electric current (output current Ifc) of the fuel cell stack 611 corresponding to this operating point, as the target electric current.

In addition, when the drive motor 622 is regenerated, for example, the target electric current setting unit 663 outputs zero or a positive value as the target electric current of the electric current (output current Ifc) of the fuel cell stack 611 according to the electric power distribution set by the target electric power distribution setting unit 662.

The duty controlling unit 664 controls the switching duty of the first DC-DC converter 613, so that the actual electric power distribution of the fuel cell stack 611 and the battery 612 equals the electric power distribution (target electric power distribution) set by the target electric power distribution setting unit 662. For example, the duty controlling unit 664 controls the switching duty of the first DC-DC converter 613 so that, the detected value of the output current IFC of the fuel cell stack 611 outputted by the output current sensor 627 equals the target electric current of the fuel cell stack 611 outputted by the target electric current setting unit 663 (the output current Ifc).

This duty controlling unit 664 includes, for example, an electric current deviation computation unit 671, a feed back processing unit 672, and a PWM signal generation unit 673.

The electric current deviation computation unit 671 computes and outputs the electric current deviation between the detected value of the output current IFC of the fuel cell stack 611 outputted from the output current sensor 627 and the target electric current of the fuel cell stack 611 (the output current Ifc) outputted from the target electric current setting unit 663.

The feedback processing unit 672 computes an electric voltage command value by controlling and amplifying the electric current deviation outputted by the electric current deviation computation unit 671 through, for example, a PID (Proportional Integral Derivative) operation.

In order to output an output current Ifc from the fuel cell stack 611 corresponding to the electric voltage command value outputted from the feedback processing unit 672, the PWM signal creation unit 673 creates and outputs a gate signal (namely, a PWM signal) that turns on and off each of the transistors AH, BH, and CH of the high side arm of the first DC-DC converter 613 as well as each of the transistors AL, BL, and CL of the low side arm.

While the drive motor 622 is driven, for example, the drive motor controlling unit 665 performs a feed back control (a vector control) of the electric current on a dq-coordinate system in the form of a rotating orthogonal coordinate. This drive motor controlling unit 665 computes a target d-axis electric current and a target q-axis electric current according to a torque command based on a driver's accelerating operation and the number of rotations of the drive motor 622. Then, the drive motor controlling unit 665 computes each of the three phase output electric voltage Vu, Vv, and Vw based on the target d-axis electric current and the target q-axis electric current. Further, the drive motor controlling unit 665 inputs a PWM signal, which is a gate signal, to the bridge circuit 651 of the drive motor inverter 615 according to each phase of the output electric voltage Vu, Vv, and Vw. At the same time, the drive motor controlling unit 665 performs a control so that the deviation between the d-axis electric current and the q-axis electric current obtained by converting the detected values of each phase of the electric current Iu, Iv, and Iw, actually supplied by the F-drive motor inverter 615 to the drive motor 622, to the dq-coordinate system, and the deviation between the target d-axis electric current and the target q-axis electric current equal zero.

In addition, when the drive motor 622 is regenerated, for example, the drive motor controlling unit 665 turns on and off, each of the transistors of the bridge circuit 651 of the drive motor inverter 615 according to a pulse synchronized based on the output waveform of the rotational angle θm of the rotator of the drive motor 622 outputted by the angle sensor 629. The three-phase alternating-current power outputted from the drive motor controlling unit 665 is converted to a direct-current power. At this time, the drive motor controlling unit 665 performs a feedback control of the regenerating electric voltage according to the duty of the gate signal that turns each of the transistors of the bridge circuit 651 on and off. The drive motor controlling unit 665 outputs a predetermined electric voltage value to a primary side of the drive motor inverter 615, in other words, between the secondary side positive terminal P602 of the first DC-DC converter 613 and the secondary side negative terminal N602.

In other words, when the drive motor 622 is driven, for example, the control device 625 performs a feedback control so that the detected value of the electric current (the output electric current Ifc) of the fuel cell stack 611 equals the target electric current. Thus, the control device 625 controls the switching duty of the first DC-DC converter 613. This control device 625 continuously controls the operating mode of the power supply device 610 as shown in FIG. 109, for example.

When, for example, the boosting ratio of the first DC-DC converter 613 approximately equals 2 to 3, the operating mode of the power supply device 610 that maximizes the switching duty is an EV mode in which only the output by the battery 612 is supplied to the drive motor inverter 615 and the air pump inverter 614.

As the switching duty tends to decline from the EV mode, the operating mode of the power supply device 610 shifts sequentially from a first (FC+battery) mode to a second (FC+battery) mode to a third (FC+battery) mode, as shown in FIGS. 91A to 93B, for example. In the first mode, the output of the battery 612 is supplied to the drive motor inverter 615 and the air pump inverter 614. At the same time, in the first mode, the output of the fuel cell stack 611 is supplied to the drive motor inverter 615, and the electric current (Ib) of the battery 612 becomes larger than the electric current (output current Ifc) of the fuel cell stack 611. In the second mode, the output of the battery 612 is supplied to the drive motor inverter 615 and the air pump inverter 614. At the same time, in the second mode, the output of the fuel cell stack 611 is supplied to the drive motor inverter 615, and the electric current (Ib) of the battery 612 becomes equal to the sum of the electric current (output current Ifc) of the fuel cell stack 611 and the electric current (IAP) flowing through the air pump inverter 614. In the third mode, the output of the battery 612 and the fuel cell stack 611 is supplied to the drive motor inverter 615 and the air pump inverter 614, and the electric current (Ib) of the battery 612 becomes smaller than the electric current (output current Ifc) of the fuel cell stack 611.

Accordingly, the electric current (Ib) of the battery 612 tends to decline, as shown in FIG. 109 for example. In addition, the electric current (output current Ifc) of the fuel cell stack 611 and the target electric current (the Ifc command) tend to increase. The input electric voltage (VPIN) of the primary side of the drive motor inverter 615 is maintained to be approximately constant. The electric voltage of the battery 612 (VB) tends to increase, while the electric voltage of the fuel cell stack 611 (VFC) tends to decrease.

Further, as the switching duty tends to decline to a minimum value from the third (FC+battery) mode, the operating mode of the power supply device 610 shifts to the first FC mode and the second FC mode, in sequence. In the first FC mode, only the output of the fuel cell stack 611 is supplied to the drive motor inverter 615 and the air pump inverter 614. In the second FC mode, only the output of the fuel cell stack 611 is supplied to the drive motor inverter 615, the air pump inverter 614, and the battery 612, therefore charging the battery 612.

Accordingly, the electric current (Ib) of the battery 612 tends to decrease from zero to a negative value as shown in FIG. 109 for example. Meanwhile, the electric current (the output current Ifc) of the fuel cell stack 611 and the target electric current (the Ifc command) tend to increase. In addition, the input electric voltage (VPIN) in the primary side of the drive motor inverter 615 is maintained to be approximately constant. The electric voltage of the battery 612 (VB) tends to increase. On the other hand, the electric voltage of the fuel cell stack 611 (VFC) tends to decrease.

When the drive motor 622 is regenerated, for example, the control device 625 performs a feedback control so that the detected value of the electric current of the fuel cell stack 611 (the output current Ifc) equals the target electric current (either zero or a positive value). This control device 625 controls the switching duty of the first DC-DC converter 613 by performing a feedback control of the regenerative electric voltage.

For example, the operating mode of the power supply device 610 in which the target of the electric current of the fuel cell stack 611 (the output current Ifc) equals zero is the regenerative mode in which the battery 612 is charged by the regenerative electric power of the drive motor inverter 615.

Meanwhile, the operating mode of the power supply device 610 in which the target of the electric current of the fuel cell stack 611 (the output current Ifc) equals a positive value, for example, is a (regenerative+battery charging by the FC) mode in which the regenerative electric power of the drive motor inverter 615 and the output of the fuel cell stack 611 are supplied to the air pump inverter 614 and the battery 612, and the battery 612 is charged.

The control device 625 outputs a command value regarding the pressure and the flux of the reactive gas supplied to the fuel cell stack 611, as a command to the fuel cell stack 611 to generate electric power, the output of the command value being based on, for example, the condition in which the fuel cell vehicle is driven, the concentration of hydrogen included in the reactive gas supplied to the anode of the fuel cell stack 611, the concentration of hydrogen included in the discharge gas emitted from the anode of the fuel cell stack 611, the condition in which the fuel cell stack 611 is generating electric power, the electric voltage between the terminals of each of the plurality of fuel cells, the electric voltage VFC of the fuel cell stack 611, the output current Ifc of the fuel cell stack 611, and the internal temperature of the fuel cell stack 611. In this way, the control device 625 controls the condition in which the fuel cell stack 611 generates electric power.

The control device 625 switches over the on and off conditions of the contactor 611a according to the condition in which the fuel cell stack 611 is generating electric power. In addition, the control device 625 controls the connection between the fuel cell stack 611, the first line L601, and the second line L602.

The control device 625 also switches over the on and off conditions of the contactor 612a and the current limiting circuit 612b according to the remaining capacity SOC of the battery 612, for example. Thus, the control device 625 controls the connection between the battery 612 and the second line L602 and the third line L603.

As described above, according to the power supply device 610 based on the above embodiment of the present invention, a plurality of operating modes can be switched over merely by providing a single first DC-DC converter 613 with respect to the battery circuit 610a in which the fuel cell stack 611 and the battery 612 are connected in series. Compared to the case in which a DC-DC converter is equipped individually for each of the fuel cell stack 611 and the battery 612, for example, it is possible to lower the cost necessary for configuration and reduce the size.

Further, according to the power supply system 620 of the fuel cell vehicle based on the above embodiment of the present invention, the cost necessary for configuring the power supply device 610 can be lowered, and the size of the power supply device 610 can be reduced, by providing a single first DC-DC converter 613. Because the fuel cell stack 611 and the battery 612 are connected in series, the operating electric voltage of the drive motor inverter 615 can be augmented, and the electric current can be reduced, compared to the case in which the fuel cell stack 611 and the battery 612 are connected in parallel. In this way, the size of the drive motor 622 and the drive motor inverter 615 can be reduced. At the same time the operating efficiency can be enhanced. Therefore, the cost necessary for configuring the power supply system 620 of the fuel cell vehicle can be lowered, and the size can be reduced.

Further, even though the condition of the first DC-DC converter 613 is abnormal (for example, when an open failure occurs), it is possible to drive the fuel cell vehicle, by supplying electric power from the battery circuit 610a to the drive motor inverter 615.

According to the above embodiment, at least a portion of the vehicle auxiliary machinery equipped on the fuel cell vehicle (for example, an air conditioner 624 separate from the second DC-DC converter 623, and a load connected to the second DC-DC converter 623 (a processing device, a magnetic valve, and a 12 volt type load)) is connected to the second line L602 and the third line L603 either directly or through the second DC-DC converter 623. However, the present invention is not limited to this configuration. For example, as shown in FIG. 110, at least a part of the vehicle auxiliary machinery can be connected to the first line L601 and the second line L602. In addition, as shown in FIG. 111, at least a part of the vehicle auxiliary machinery can be connected to the first line L601 and the third line L603.

According to the above configuration, the air pump inverter 614 is connected to the second line L602 and the third line L603, the air pump inverter 614 being a drive circuit of the air pump 621. However, the present invention is not limited to this configuration. The drive circuit of at least one of a pump that supplies reactive gas to the fuel cell stack 611 (for example, the air pump 621) and a pump that supplies a refrigerant (not diagramed) can be connected to the second line L602 and the third line L603.

According to the above embodiment, the first DC-DC converter 613, alternately switches over between a condition in which each of the transistors AH, BH, and CH of the high side arm are turned off and each of the transistors AL, BL, and CL of the low side arm are turned on, and a condition in which each of the transistors AH, BH, and CH of the high side arm are turned on and each of the transistors AL, BL, and CL of the low side arm are turned off. However, the present invention is not limited to this configuration. For example, during a boosting operation from the primary side to the secondary side when the drive motor 622 is driven, each of the transistors AL, BL, and CL of the low side arm can alternately be switched on and off while each of the transistors AH, BH, and CH of the high side arm are turned off. As another example, during a regenerative operation from the secondary side to the primary side when the drive motor 622 is regenerated, each of the transistors AH, BH, and CH of the high side arm can be alternately switched on and off while each of the transistors AL, BL, and CL of the low side arm are turned off.

INDUSTRIAL APPLICABILITY

According to the power supply device based on the present invention, a plurality of operation modes can be switched over by providing a single first DC-DC converter to a battery circuit in which a fuel cell stack and an electric storage device are connected in series. Compared to the case in which a DC-DC converter is equipped individually to each of the fuel cell stack and the electric storage device, the cost required for configuration can be lowered, and the size can be made smaller.

Since the power supply system for a fuel cell vehicle according to the present invention includes a single first DC-DC converter, it is possible to lower the cost required to configure the power supply device and reduce the size. In addition, since the fuel cell stack and the electric storage device are connected in series, it is possible to increase the operating voltage of a drive circuit of an electric motor for driving a vehicle, compared to the case in which the fuel cell stack and the electric storage device are connected in parallel. At the same time, the electric current can be reduced. Further, the size of the drive circuit and the electric motor for driving a vehicle can be reduced. In addition, the operating efficiency can be enhanced. In these ways, the cost required for configuring the power supply system for the fuel cell vehicle can be lowered, and the size can be reduced.

Even during an emergency concerning the first DC-DC converter (for example, when an open failure occurs), it is possible to drive the fuel cell vehicle, by supplying electric power from the battery circuit to the drive circuit of the electric motor for driving the vehicle.

DESCRIPTION OF REFERENCE NUMERALS

10 ... power supply device; 10a ... battery circuit; 11 ... fuel cell stack; 12 ... battery (electric storage device); 13 ... first DC-DC converter; 14 ... air pump inverter (drive circuit); 15 ... drive motor inverter; 20 ... power supply system of fuel cell vehicle; 21 ... air pump (pump); 22 ... drive motor (electric motor for driving vehicle); 23 ... second DC-DC converter; 24 ... air conditioner; 25 ... control device; 110 ... power supply device; 110a ... battery circuit; 111 ... fuel cell stack; 112 ... battery (electric storage device); 113 ... first DC-DC converter; 114 ... air pump inverter (drive circuit); 115 ... drive motor inverter; 120 ... power supply system of fuel cell vehicle; 121 ... air pump (pump); 122 ... drive motor (electric motor for driving vehicle); 123 ... second DC-DC converter; 124 ... air conditioner; 125 ... control device; 210 ... power supply device; 210a ... battery circuit; 211 ... fuel cell stack; 212 ... battery (electric storage device); 213 ... first DC-DC converter; 214 ... air pump inverter (drive circuit); 215 ... drive motor inverter; 220 ... power supply system of fuel cell vehicle; 221 ... air pump (pump); 222 ... drive motor (electric motor for driving vehicle); 223 ... second DC-DC converter; 224 ... air conditioner; 225 ... control device; 310 ... power supply device; 310a ... battery circuit; 311 ... fuel cell stack; 312 ... battery (electric storage device); 313 ... first DC-DC converter; 314 ... air pump inverter; 315 ... drive motor inverter; 320 ... power supply system of fuel cell vehicle; 321 ... air pump; 322 ... drive motor (electric motor for driving vehicle); 323 ... second DC-DC converter; 324 ... air conditioner; 325 ... control device; 331 ... bridge circuit; 332 ... choke coil; 341 ... core; 410 ... power supply device;

410a . . . battery circuit; 411 . . . fuel cell stack; 412 . . . battery (electric storage device); 413 . . . first DC-DC converter (DC-DC converter); 414 . . . air pump inverter; 415 . . . drive motor inverter; 420 . . . power supply system of fuel cell vehicle; 421 . . . air pump; 422 . . . drive motor (electric motor for driving vehicle); 423 . . . second DC-DC converter; 424 . . . air conditioner; 425 . . . control device; 461 . . . consumption power computation unit (consumption power obtaining unit); 462 . . . target electric power distribution setting unit; 463 . . . target electric current setting unit; 464 . . . duty controlling unit; 510 . . . power supply device; 510a . . . battery circuit; 511 . . . fuel cell stack; 512 . . . battery (electric storage device); 513 . . . first DC-DC converter (DC-DC converter); 514 . . . air pump inverter; 515 . . . drive motor inverter; 520 . . . power supply system of fuel cell vehicle; 521 . . . air pump; 522 . . . drive motor (electric motor for driving vehicle); 523 . . . second DC-DC converter; 524 . . . air conditioner; 525 . . . control device; 527 . . . output electric current sensor (detecting unit); 563 . . . target electric current setting unit (target setting unit); 610 . . . power supply device; 610a . . . battery circuit; 611 . . . fuel cell stack; 612 . . . battery (electric storage device); 613 . . . first DC-DC converter; 614 . . . air pump inverter (drive circuit); 615 . . . drive motor inverter; 620 . . . power supply system of fuel cell vehicle; 621 . . . air pump (pump); 622 . . . drive motor (electric motor for driving vehicle); 623 . . . second DC-DC converter; 624 . . . air conditioner; 625 . . . control device

The invention claimed is:

1. A power supply device comprising:
a first line, a second line, and a third line, each having a different electric potential from one another;
a battery circuit in which a fuel cell stack and an electric storage device are connected in series;
a first DC-DC converter, wherein
both ends of the battery circuit are connected to the first line and the third line,
a connection point of the electric storage device and the fuel cell stack of the battery circuit is connected to the second line,
a primary side of the first DC-DC converter is connected to the second line and the third line,
a secondary side of the first DC-DC converter is connected to the first line and the third line,
electric power is outputted from the first line and the third line, and
at least two operating modes are provided, comprising a first mode in which electric power is supplied to a load under a condition in which a discharge current of a battery is greater than an electric generation current of the fuel cell stack, and a second mode in which electric power is supplied to a load under a condition in which a discharge current of a battery is smaller than an electric generation current of the fuel cell stack; and
a control device changes the operating modes by changing a switching duty cycle of the first DC-DC converter.

2. A power supply device according to claim 1, wherein the electric storage device is connected to the first line and the second line; and
the fuel cell stack is connected to the second line and the third line.

3. A power supply device according to claim 1, wherein a drive circuit, driving at least one of a first pump supplying reactive gas to the fuel cell stack and a second pump supplying refrigerant to the fuel cell stack, is connected to the first line and the second line.

4. A power supply system of a fuel cell vehicle comprising:
the power supply device as claimed in claim 1; and
an electric motor that drives a vehicle, the electric motor being supplied with electric power from the power supply device.

5. A power supply system of a fuel cell vehicle according to claim 4 further comprising a vehicle auxiliary machinery, wherein
at least one part of the vehicle auxiliary machinery is connected to the first line and the second line.

6. A power supply system of a fuel cell vehicle according to claim 5, wherein the at least one part of the vehicle auxiliary machinery is connected to the power supply device through a second DC-DC converter.

7. A power supply system of a fuel cell vehicle according to claim 5, wherein the at least one part of the vehicle auxiliary machinery includes an air conditioner.

8. A power supply system of a fuel cell vehicle according to claim 4 further comprising a vehicle auxiliary machinery, wherein
at least one part of the vehicle auxiliary machinery is connected to the second line and the third line.

9. A power supply system of a fuel cell vehicle according to claim 4 further comprising a vehicle auxiliary machinery, wherein
at least one part of the vehicle auxiliary machinery is connected to the first line and the third line.

10. A power supply device according to claim 1, wherein the electric storage device is connected to the first line and the second line,
the fuel cell stack is connected to the second line and the third line,
a drive circuit, driving at least one of a first pump supplying reactive gas to the fuel cell stack and a second pump supplying refrigerant to the fuel cell stack, is connected to the second line and the third line.

11. A power supply device according to claim 1, wherein a drive circuit, driving at least one of a first pump supplying reactive gas to the fuel cell stack and a second pump supplying refrigerant to the fuel cell stack, is connected to the first line and the third line.

12. A power supply device according to claim 1, wherein the first DC-DC converter is a chopper type comprising a plurality of choke coils.

13. A power supply device according to claim 12, wherein the first DC-DC converter includes a three-phase bridge circuit in which a switching element is bridge-connected, and a three-phase choke coil as the plurality of choke coils, the three-phase choke coil including three one-phase choke coils;
a first one-phase choke coil of the three-phase choke coil is dispersed and wrapped around a first side and a second side of a rectangular core,
the first side is opposite from the second side of the rectangular core; and
a second one-phase choke coil and a third one-phase choke coil of the three-phase choke coil are respectively concentrated and wrapped around a third side and a fourth side of the rectangular core,
the third side is opposite from the fourth side of the rectangular core.

14. A power supply device according to claim 1, wherein electric power is supplied to a load from the first line and the third line, the power supply device further comprising:
a power consumption obtaining device, obtaining a power consumption of the load;

a target electric power distribution setting device, setting a target electric power distribution of the fuel cell stack and the electric storage device, based on the power consumption; and a duty control device, controlling a switching duty cycle of the first DC-DC converter so that an actual electric power distribution of the fuel cell stack and the electric storage device equals the target electric power distribution.

15. A power supply device according to claim 14, wherein the power consumption obtaining device obtains the power consumption, the power consumption including an external load power consumption of an external load of the power supply device and an internal load power consumption of an internal load of the power supply device.

16. A power supply device according to claim 14 further comprising:

a target electric current setting device, setting a target electric current of the fuel cell stack or the electric storage device according to the target electric power distribution, wherein the duty control device performs a feedback control of the switching duty cycle so that an actual electric current of the fuel cell stack or the electric storage device equals the target electric current.

17. A power supply device according to claim 14 further comprising:

a target electric voltage setting device, setting a target electric voltage of the fuel cell stack or the electric storage device according to the target electric power distribution, wherein the duty control device performs a feedback control of the switching duty cycle so that an actual electric voltage of the fuel cell stack or the electric storage device equals the target electric voltage.

18. A power supply device according to claim 14, wherein the target electric power distribution setting device sets a target output ratio of the fuel cell stack and the electric storage device as the target electric power distribution; and the duty control device performs a feedback control of the switching duty cycle so that an actual output ratio of the fuel cell stack and the electric storage device equals the target output ratio.

19. A power supply device according to claim 1 further comprising:

an electric motor that drives a vehicle, the electric motor being supplied with electric power from the battery circuit;

a target setting device, setting a target output electric current or a target output electric power of the fuel cell stack as zero or a positive value;

a detection device, detecting an output electric current or an output electric voltage of the fuel cell stack; and a duty control device, performing a feedback control of a switching duty cycle of the first DC-DC converter, so that the output electric current detected by the detection device equals the target output electric current, or the output electric voltage detected by the detection device equals the target output electric voltage; wherein the duty control device continues the feedback control during a regenerative operation of the electric motor that drives a vehicle; and electric power is supplied from the first line and the third line to a load.

20. A power supply device according to claim 19, wherein the target setting device sets the target output electric current or the target output electric power to zero during the regenerative operation of the electric motor that drives a vehicle.

\* \* \* \* \*